US012083682B2

(12) United States Patent
Sorin et al.

(10) Patent No.: US 12,083,682 B2
(45) Date of Patent: *Sep. 10, 2024

(54) MOTION PLANNING OF A ROBOT FOR VARIOUS ENVIRONMENTS AND TASKS AND IMPROVED OPERATION OF SAME

(71) Applicant: REALTIME ROBOTICS, INC., Boston, MA (US)

(72) Inventors: Daniel Sorin, Boston, MA (US); George Konidaris, Boston, MA (US); Sean Murray, Cambridge, MA (US); William Floyd-Jones, Boston, MA (US); Peter Howard, Boston, MA (US); Xianchao Long, Boston, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,027

(22) Filed: Jul. 12, 2023

(65) Prior Publication Data

US 2023/0347519 A1    Nov. 2, 2023

Related U.S. Application Data

(63) Continuation of application No. 16/981,467, filed as application No. PCT/US2019/023031 on Mar. 19, 2019, now Pat. No. 11,738,457.

(Continued)

(51) Int. Cl.
*B25J 9/16* (2006.01)
*B25J 9/00* (2006.01)
(Continued)

(52) U.S. Cl.
CPC .......... *B25J 9/1666* (2013.01); *B25J 9/0093* (2013.01); *B25J 9/161* (2013.01); *B25J 9/1697* (2013.01);
(Continued)

(58) Field of Classification Search
CPC ........ B25J 9/1666; B25J 9/0093; B25J 9/161; B25J 9/1697; B25J 13/088; B25J 15/0019;
(Continued)

(56) References Cited

U.S. PATENT DOCUMENTS

| 4,163,183 | A | 7/1979 | Dunne et al. |
| 4,300,198 | A | 11/1981 | Davini |

(Continued)

FOREIGN PATENT DOCUMENTS

| CN | 101837591 A | 9/2010 |
| CN | 102814813 A | 12/2012 |

(Continued)

OTHER PUBLICATIONS

Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189.

(Continued)

*Primary Examiner* — Jaime Figueroa
(74) *Attorney, Agent, or Firm* — Cozen O'Connor

(57) ABSTRACT

A robot control system determines which of a number of discretizations to use to generate discretized representations of robot swept volumes and to generate discretized representations of the environment in which the robot will operate. Obstacle voxels (or boxes) representing the environment and obstacles therein are streamed into the processor and stored in on-chip environment memory. At runtime, (Continued)

the robot control system may dynamically switch between multiple motion planning graphs stored in off-chip or on-chip memory. The dynamically switching between multiple motion planning graphs at runtime enables the robot to perform motion planning at a relatively low cost as characteristics of the robot itself change. Various aspects of such robot motion planning are implemented in particular systems and methods that facilitate motion planning of the robot for various environments and tasks.

21 Claims, 37 Drawing Sheets

Related U.S. Application Data

(60) Provisional application No. 62/646,102, filed on Mar. 21, 2018.

(51) Int. Cl.
  *B25J 13/08* (2006.01)
  *B25J 15/00* (2006.01)
  *B25J 15/04* (2006.01)
  *B25J 17/02* (2006.01)

(52) U.S. Cl.
  CPC ......... *B25J 13/088* (2013.01); *B25J 15/0019* (2013.01); *B25J 15/04* (2013.01); *B25J 17/02* (2013.01)

(58) Field of Classification Search
  CPC B25J 15/04; B25J 17/02; Y02P 90/02; G05D 1/0212
  USPC ........ 700/259, 245–264; 318/568.11–568.25
  See application file for complete search history.

(56) References Cited

U.S. PATENT DOCUMENTS

| | | | |
|---|---|---|---|
| 4,763,276 A * | 8/1988 | Perreirra ................ | B25J 9/1653 700/262 |
| 4,862,373 A | 8/1989 | Meng | |
| 4,890,241 A * | 12/1989 | Hoffman ............ | G05B 19/4182 700/255 |
| 4,949,277 A | 8/1990 | Trovato et al. | |
| 5,177,563 A * | 1/1993 | Everett ................. | B25J 19/021 356/621 |
| 5,297,238 A * | 3/1994 | Wang .................... | B25J 9/1697 700/254 |
| 5,347,459 A | 9/1994 | Greenspan et al. | |
| 5,544,282 A | 8/1996 | Chen et al. | |
| 5,727,132 A * | 3/1998 | Arimatsu ........... | G05B 19/4083 901/4 |
| 6,004,016 A | 12/1999 | Spector | |
| 6,049,756 A | 4/2000 | Libby | |
| 6,089,742 A | 7/2000 | Warmerdam et al. | |
| 6,259,988 B1 | 7/2001 | Galkowski et al. | |
| 6,345,213 B1 * | 2/2002 | Graeser ................. | B25J 9/1692 414/744.1 |
| 6,470,301 B1 | 10/2002 | Barral | |
| 6,493,607 B1 | 12/2002 | Bourne et al. | |
| 6,526,372 B1 | 2/2003 | Orschel et al. | |
| 6,526,373 B1 | 2/2003 | Barral | |
| 6,529,852 B2 | 3/2003 | Knoll et al. | |
| 6,539,294 B1 | 3/2003 | Kageyama | |
| 6,629,037 B1 | 9/2003 | Nyland | |
| 6,671,582 B1 | 12/2003 | Hanley | |
| 6,836,702 B1 * | 12/2004 | Brogardh et al. . | B23K 26/0884 700/262 |
| 6,907,133 B2 * | 6/2005 | Gotoh ................ | G06V 30/224 356/3 |
| 6,944,584 B1 * | 9/2005 | Tenney ............. | G05B 19/0426 703/22 |
| 7,493,231 B2 * | 2/2009 | Graf .................. | H01L 21/67742 33/1 PT |
| 7,577,498 B2 | 8/2009 | Jennings et al. | |
| 7,609,020 B2 | 10/2009 | Kniss et al. | |
| 7,715,946 B2 * | 5/2010 | Watanabe ............. | B25J 19/023 700/262 |
| 7,865,277 B1 | 1/2011 | Larson et al. | |
| 7,904,202 B2 * | 3/2011 | Hoppe ................. | B25J 9/1692 700/250 |
| 7,940,023 B2 | 5/2011 | Kniss et al. | |
| 8,082,064 B2 | 12/2011 | Kay | |
| 8,103,085 B1 * | 1/2012 | Zadeh ..................... | G06T 7/001 382/141 |
| 8,111,904 B2 * | 2/2012 | Wallack .............. | G06V 10/147 382/152 |
| 8,162,584 B2 * | 4/2012 | Michael ................ | H01L 21/681 414/217 |
| 8,315,738 B2 | 11/2012 | Chang et al. | |
| 8,571,706 B2 | 10/2013 | Zhang et al. | |
| 8,666,548 B2 | 3/2014 | Lim | |
| 8,825,207 B2 | 9/2014 | Kim et al. | |
| 8,825,208 B1 | 9/2014 | Benson | |
| 8,855,812 B2 | 10/2014 | Kapoor | |
| 8,880,216 B2 | 11/2014 | Izumi et al. | |
| 8,972,057 B1 | 3/2015 | Freeman et al. | |
| 8,989,897 B2 * | 3/2015 | de Smet .............. | G01B 11/002 901/50 |
| 9,061,421 B2 * | 6/2015 | Trompeter ............. | B25J 9/1692 |
| 9,092,698 B2 | 7/2015 | Buehler et al. | |
| 9,102,055 B1 | 8/2015 | Konolige et al. | |
| 9,227,322 B2 | 1/2016 | Graca et al. | |
| 9,280,899 B2 | 3/2016 | Biess et al. | |
| 9,327,397 B1 | 5/2016 | Williams et al. | |
| 9,333,044 B2 | 5/2016 | Olson | |
| 9,434,072 B2 | 9/2016 | Buehler et al. | |
| 9,539,058 B2 | 1/2017 | Tsekos et al. | |
| 9,632,502 B1 | 4/2017 | Levinson et al. | |
| 9,645,577 B1 | 5/2017 | Frazzoli et al. | |
| 9,659,236 B2 * | 5/2017 | Barker .................. | G06F 18/217 |
| 9,687,982 B1 | 6/2017 | Jules et al. | |
| 9,687,983 B1 | 6/2017 | Prats | |
| 9,701,015 B2 | 7/2017 | Buehler et al. | |
| 9,707,682 B1 | 7/2017 | Konolige et al. | |
| 9,731,724 B2 | 8/2017 | Yoon | |
| 9,981,382 B1 | 5/2018 | Strauss et al. | |
| 9,981,383 B1 | 5/2018 | Nagarajan | |
| 10,035,266 B1 | 7/2018 | Kroeger | |
| 10,099,372 B2 | 10/2018 | Vu et al. | |
| 10,124,488 B2 | 11/2018 | Lee et al. | |
| 10,131,053 B1 | 11/2018 | Sampedro et al. | |
| 10,300,605 B2 | 5/2019 | Sato | |
| 10,303,180 B1 | 5/2019 | Prats | |
| 10,430,641 B2 | 10/2019 | Gao | |
| 10,671,081 B1 | 6/2020 | Prats | |
| 10,688,664 B2 * | 6/2020 | Kovacs .................. | G01B 11/00 |
| 10,705,528 B2 | 7/2020 | Wierzynski et al. | |
| 10,723,024 B2 | 7/2020 | Konidaris et al. | |
| 10,782,694 B2 | 9/2020 | Zhang et al. | |
| 10,792,114 B2 | 10/2020 | Hashimoto et al. | |
| 10,959,795 B2 | 3/2021 | Hashimoto et al. | |
| 11,314,254 B2 | 4/2022 | Macias et al. | |
| 11,358,337 B2 | 6/2022 | Czinger et al. | |
| 11,623,494 B1 | 4/2023 | Arnicar et al. | |
| 11,751,948 B2 * | 9/2023 | Gregerson ............. | B25J 9/1666 606/185 |
| 2002/0013675 A1 | 1/2002 | Knoll et al. | |
| 2002/0074964 A1 | 6/2002 | Quaschner et al. | |
| 2003/0155881 A1 | 8/2003 | Hamann et al. | |
| 2004/0249509 A1 | 12/2004 | Rogers et al. | |
| 2005/0071048 A1 | 3/2005 | Watanabe et al. | |
| 2005/0216181 A1 | 9/2005 | Estkowski et al. | |
| 2006/0235610 A1 | 10/2006 | Ariyur et al. | |
| 2006/0241813 A1 | 10/2006 | Babu et al. | |
| 2006/0247852 A1 | 11/2006 | Kortge et al. | |
| 2007/0106422 A1 | 5/2007 | Jennings et al. | |
| 2007/0112700 A1 | 5/2007 | Den et al. | |
| 2007/0239315 A1 * | 10/2007 | Sato ....................... | B25J 9/1612 700/245 |

(56) References Cited

U.S. PATENT DOCUMENTS

| | | |
|---|---|---|
| 2008/0012517 A1 | 1/2008 | Kniss et al. |
| 2008/0125893 A1 | 5/2008 | Tilove et al. |
| 2008/0186312 A1 | 8/2008 | Ahn et al. |
| 2008/0234864 A1 | 9/2008 | Sugiura et al. |
| 2009/0055024 A1 | 2/2009 | Kay |
| 2009/0192710 A1 | 7/2009 | Eidehall et al. |
| 2009/0234499 A1 | 9/2009 | Nielsen et al. |
| 2009/0295323 A1 | 12/2009 | Papiernik et al. |
| 2009/0326711 A1 | 12/2009 | Chang et al. |
| 2009/0326876 A1 | 12/2009 | Miller |
| 2010/0145516 A1 | 6/2010 | Cedoz et al. |
| 2010/0235033 A1 | 9/2010 | Yamamoto et al. |
| 2011/0036188 A1 | 2/2011 | Fujioka et al. |
| 2011/0066282 A1 | 3/2011 | Bosscher et al. |
| 2011/0153080 A1 | 6/2011 | Shapiro et al. |
| 2011/0222995 A1* | 9/2011 | Irie .............. B25J 9/1697 700/218 |
| 2011/0264111 A1 | 10/2011 | Nowlin et al. |
| 2012/0010772 A1 | 1/2012 | Pack et al. |
| 2012/0053728 A1* | 3/2012 | Theodorus .............. G06V 10/10 901/47 |
| 2012/0083964 A1 | 4/2012 | Montemerlo et al. |
| 2012/0215351 A1 | 8/2012 | Mcgee et al. |
| 2012/0297733 A1 | 11/2012 | Pierson et al. |
| 2012/0323357 A1 | 12/2012 | Izumi et al. |
| 2013/0076866 A1 | 3/2013 | Drinkard et al. |
| 2013/0325244 A1* | 12/2013 | Wang ...................... G16H 40/67 701/26 |
| 2013/0346348 A1 | 12/2013 | Buehler et al. |
| 2014/0012419 A1 | 1/2014 | Nakajima |
| 2014/0025201 A1 | 1/2014 | Ryu et al. |
| 2014/0025203 A1 | 1/2014 | Inazumi |
| 2014/0058406 A1 | 2/2014 | Tsekos |
| 2014/0067121 A1 | 3/2014 | Brooks et al. |
| 2014/0079524 A1 | 3/2014 | Shimono et al. |
| 2014/0121833 A1 | 5/2014 | Lee et al. |
| 2014/0121837 A1 | 5/2014 | Hashiguchi et al. |
| 2014/0147240 A1 | 5/2014 | Noda et al. |
| 2014/0156068 A1 | 6/2014 | Graca et al. |
| 2014/0249741 A1 | 9/2014 | Levien et al. |
| 2014/0251702 A1 | 9/2014 | Berger et al. |
| 2014/0277718 A1* | 9/2014 | Izhikevich ............... B25J 9/163 700/250 |
| 2014/0305227 A1* | 10/2014 | Johns ..................... B04B 13/00 73/863.01 |
| 2014/0309916 A1 | 10/2014 | Bushnell |
| 2015/0005785 A1 | 1/2015 | Olson |
| 2015/0037131 A1 | 2/2015 | Girtman et al. |
| 2015/0051783 A1 | 2/2015 | Tamir et al. |
| 2015/0134111 A1 | 5/2015 | Nakajima |
| 2015/0261899 A1 | 9/2015 | Atohira et al. |
| 2015/0266182 A1 | 9/2015 | Strandberg |
| 2016/0001775 A1 | 1/2016 | Wilhelm et al. |
| 2016/0008078 A1 | 1/2016 | Azizian et al. |
| 2016/0016312 A1* | 1/2016 | Lawrence, III ........ B25J 9/1671 901/41 |
| 2016/0107313 A1 | 4/2016 | Hoffmann et al. |
| 2016/0112694 A1 | 4/2016 | Nishi et al. |
| 2016/0121486 A1 | 5/2016 | Lipinski et al. |
| 2016/0121487 A1 | 5/2016 | Mohan et al. |
| 2016/0154408 A1 | 6/2016 | Eade et al. |
| 2016/0161257 A1 | 6/2016 | Simpson et al. |
| 2016/0299507 A1 | 10/2016 | Shah et al. |
| 2016/0324587 A1 | 11/2016 | Olson |
| 2016/0357187 A1 | 12/2016 | Ansari |
| 2017/0001775 A1 | 1/2017 | Cimmerer et al. |
| 2017/0004406 A1 | 1/2017 | Aghamohammadi |
| 2017/0028559 A1 | 2/2017 | Davidi et al. |
| 2017/0120448 A1 | 5/2017 | Lee et al. |
| 2017/0123419 A1 | 5/2017 | Levinson et al. |
| 2017/0132334 A1 | 5/2017 | Levinson et al. |
| 2017/0146999 A1 | 5/2017 | Cherepinsky et al. |
| 2017/0157769 A1 | 6/2017 | Aghamohammadi et al. |
| 2017/0168485 A1 | 6/2017 | Berntorp et al. |
| 2017/0168488 A1* | 6/2017 | Wierzynski .......... G05D 1/0212 |
| 2017/0193830 A1 | 7/2017 | Fragoso et al. |
| 2017/0210008 A1 | 7/2017 | Maeda |
| 2017/0219353 A1 | 8/2017 | Alesiani |
| 2017/0252922 A1* | 9/2017 | Levine ................... G06N 3/084 |
| 2017/0252924 A1* | 9/2017 | Vijayanarasimhan ..................... G05B 13/027 |
| 2017/0305015 A1 | 10/2017 | Krasny et al. |
| 2017/0315530 A1 | 11/2017 | Godau et al. |
| 2018/0001472 A1 | 1/2018 | Konidaris et al. |
| 2018/0001476 A1 | 1/2018 | Tan et al. |
| 2018/0029231 A1 | 2/2018 | Davis |
| 2018/0029233 A1 | 2/2018 | Lager |
| 2018/0032039 A1 | 2/2018 | Huynh et al. |
| 2018/0074505 A1 | 3/2018 | Lv et al. |
| 2018/0113468 A1 | 4/2018 | Russell |
| 2018/0136662 A1 | 5/2018 | Kim |
| 2018/0150077 A1 | 5/2018 | Danielson et al. |
| 2018/0172450 A1 | 6/2018 | Lalonde et al. |
| 2018/0173242 A1 | 6/2018 | Lalonde et al. |
| 2018/0189683 A1 | 7/2018 | Newman |
| 2018/0222050 A1 | 8/2018 | Vu et al. |
| 2018/0222051 A1 | 8/2018 | Vu et al. |
| 2018/0229368 A1 | 8/2018 | Leitner et al. |
| 2018/0281786 A1 | 10/2018 | Oyaizu et al. |
| 2018/0339456 A1 | 11/2018 | Czinger et al. |
| 2019/0015981 A1 | 1/2019 | Yabushita et al. |
| 2019/0039242 A1 | 2/2019 | Fujii et al. |
| 2019/0087976 A1* | 3/2019 | Sugahara ................. G06T 7/73 |
| 2019/0101930 A1 | 4/2019 | Yadmellat |
| 2019/0143518 A1 | 5/2019 | Maeda |
| 2019/0163191 A1 | 5/2019 | Sorin et al. |
| 2019/0164430 A1 | 5/2019 | Nix |
| 2019/0196480 A1 | 6/2019 | Taylor |
| 2019/0216555 A1 | 7/2019 | Dimaio et al. |
| 2019/0232496 A1 | 8/2019 | Graichen et al. |
| 2019/0234751 A1 | 8/2019 | Takhirov |
| 2019/0240835 A1 | 8/2019 | Sorin et al. |
| 2019/0262993 A1 | 8/2019 | Cole et al. |
| 2019/0293443 A1 | 9/2019 | Kelly et al. |
| 2019/0391597 A1 | 12/2019 | Dupuis |
| 2020/0069134 A1 | 3/2020 | Ebrahimi Afrouzi et al. |
| 2020/0078097 A1* | 3/2020 | Gregerson ............. B25J 9/1666 |
| 2020/0097014 A1 | 3/2020 | Wang |
| 2020/0215686 A1 | 7/2020 | Vijayanarasimhan et al. |
| 2020/0331146 A1 | 10/2020 | Vu et al. |
| 2020/0338730 A1 | 10/2020 | Yamauchi et al. |
| 2020/0338733 A1 | 10/2020 | Dupuis et al. |
| 2020/0353917 A1 | 11/2020 | Leitermann et al. |
| 2020/0368910 A1 | 11/2020 | Chu et al. |
| 2021/0009351 A1 | 1/2021 | Beinhofer et al. |
| 2022/0339875 A1 | 10/2022 | Czinger et al. |
| 2023/0063205 A1 | 3/2023 | Nerkar |
| 2023/0363833 A1* | 11/2023 | Gregerson ............. A61B 34/20 |

FOREIGN PATENT DOCUMENTS

| | | |
|---|---|---|
| CN | 103722565 A | 4/2014 |
| CN | 104407616 A | 3/2015 |
| CN | 104858876 A | 8/2015 |
| CN | 102186638 B | 3/2016 |
| CN | 106660208 A | 5/2017 |
| CN | 107073710 A | 8/2017 |
| CN | 107206592 A | 9/2017 |
| CN | 107486858 A | 12/2017 |
| CN | 108297059 A | 7/2018 |
| CN | 108453702 A | 8/2018 |
| CN | 108789416 A | 11/2018 |
| CN | 108858183 A | 11/2018 |
| CN | 108942920 A | 12/2018 |
| CN | 109521763 A | 3/2019 |
| CN | 109782763 B | 11/2021 |
| CN | 114073585 A | 2/2022 |
| EP | 1241628 A2 | 9/2002 |
| EP | 1901150 A1 | 3/2008 |
| EP | 2306153 A2 | 4/2011 |
| EP | 3250347 A1 | 12/2017 |
| EP | 3486612 A1 | 5/2019 |
| EP | 3725472 A1 | 10/2020 |

(56) References Cited

FOREIGN PATENT DOCUMENTS

| | | |
|---|---|---|
| JP | 07100755 | 4/1995 |
| JP | 1148177 | 2/1999 |
| JP | 11296229 A | 10/1999 |
| JP | 2001166806 A | 6/2001 |
| JP | 2002073130 A | 3/2002 |
| JP | 2003127077 A | 5/2003 |
| JP | 2005022062 A | 1/2005 |
| JP | 2005032196 A | 2/2005 |
| JP | 2005321196 A | 11/2005 |
| JP | 2006224740 A | 8/2006 |
| JP | 2007257274 A | 10/2007 |
| JP | 2007531110 A | 11/2007 |
| JP | 2008502488 A | 1/2008 |
| JP | 2008065755 A | 3/2008 |
| JP | 2008134165 A | 6/2008 |
| JP | 2010061293 A | 3/2010 |
| JP | 2010210592 A | 9/2010 |
| JP | 2011075382 A | 4/2011 |
| JP | 2011249711 A | 12/2011 |
| JP | 2012056023 A | 3/2012 |
| JP | 2012190405 A | 10/2012 |
| JP | 2012243029 A | 12/2012 |
| JP | 2013193194 A | 9/2013 |
| JP | 2014184498 A | 10/2014 |
| JP | 2015044274 A | 3/2015 |
| JP | 2015517142 A | 6/2015 |
| JP | 2015208811 A | 11/2015 |
| JP | 2016099257 A | 5/2016 |
| JP | 2017131973 A | 8/2017 |
| JP | 2017136677 A | 8/2017 |
| JP | 2017148908 A | 8/2017 |
| JP | 2018505788 A | 3/2018 |
| JP | 2018130793 A | 8/2018 |
| JP | 2018134703 A | 8/2018 |
| JP | 2018144158 A | 9/2018 |
| JP | 2018144166 A | 9/2018 |
| JP | 2020049623 A | 4/2020 |
| KR | 19980024584 A | 7/1998 |
| KR | 20110026776 A | 3/2011 |
| KR | 20130112507 A | 10/2013 |
| KR | 20150126482 A | 11/2015 |
| KR | 20170018564 A | 2/2017 |
| KR | 20170044987 A | 4/2017 |
| KR | 20170050166 A | 5/2017 |
| KR | 20180125646 A | 11/2018 |
| TW | 201318793 A | 5/2013 |
| TW | 615691 | 2/2018 |
| TW | 653130 | 3/2019 |
| WO | 9924914 A1 | 5/1999 |
| WO | 2015113203 A1 | 8/2015 |
| WO | 2016122840 A1 | 8/2016 |
| WO | 2017168187 A1 | 10/2017 |
| WO | 2017214581 A1 | 12/2017 |
| WO | 2018043525 A1 | 3/2018 |
| WO | 2019183141 A1 | 9/2019 |
| WO | 2020040979 A1 | 2/2020 |
| WO | 2020117958 A1 | 6/2020 |

OTHER PUBLICATIONS

International Search Report and Written Opinion for PCT/US2019/016700, Mailed Date: May 20, 2019, 14 pages.
International Search Report and Written Opinion for PCT/US2019/023031, Mailed Date: Aug. 14, 2019 in 19 pages.
International Search Report and Written Opinion for PCT/US2019/064511, Mailed Date: Mar. 27, 2020, 10 pages.
International Search Report and Written Opinion for PCT/US2021/061427, mailed Apr. 29, 2022, 14 pages.
International Search Report and Written Opinion for PCT/US2023/064012, mailed Jul. 10, 2023, 15 pages.
International Search Report and Written Opinion issued in PCT Application No. PCT/2020/034551, Mailed Date: Aug. 31, 2020, 18 pages.
International Search Report and Written Opinion issued in PCT Application No. PCT/US2016/012204; Mailed Date: Mar. 21, 2016, 10 pages.
International Search Report and Written Opinion issued in PCT Application No. PCT/US2017/036880; Mailed Date: Oct. 10, 2017, 15 pages.
International Search Report and Written Opinion issued in PCT Application No. PCT/US2019/045270; Mailed Date: Nov. 25, 2019, 11 pages.
International Search Report and Written Opinion issued in PCT/US2019/012209, Mailed Date: Apr. 25, 2019, 24 pages.
International Search Report and Written Opinion, mailed Apr. 22, 2021, for International Application No. PCT/US2021/013610, 9 pages.
International Search Report and Written Opinion, Mailed Date: Jul. 29, 2020, in PCT/US2020/028343, 11 pages.
International Search Report and Written Opinion, Mailed Date: Nov. 23, 2020, for PCT/US2020/047429, 11 Pages.
International Search Report and Written Opinion, Mailed Date: Sep. 29, 2020 for PCT/US2020/039193, 9 pages.
Invitation to Pay Additional Fees and, Where Applicable, Protest Fee issued in PCT/US2017/036880, Mailed Date: Aug. 14, 2017, 2 pages.
Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.
Japanese Office Action, Japanese Application No. 2021-576425, Mar. 13, 2023, 14 pages.
Kalawoun, "Motion planning of multi-robot system for airplane stripping," 2019, Universite Clermont Auvergne (Year: 2019).
Kapanoglu, et al., "A pattern-based genetic algorithm for multi-robot coverage path planning minimizing completion time," 2012, Journal of Intelligent Manufacturing 23, pp. 1035-1045 (Year: 2012).
Klampfl Erica et al: "Optimization of workcell layouts in a mixed-model assembly line environment" , International Journal of Flexible Manufacturing Systems, Kluwer Academic Publishers, Boston, vol. 17, No. 4, 23 pages., Oct. 10, 2006.
Li, et al., "A Novel Cost Function for Decision-Making Strategies in Automotive Collision Avoidance Systems", 2018 IEEE, ICVES, 8 pages.
Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.
Long Tao et al: "Optimization on multi-robot workcell layout in vertical plane", Information and Automation (ICIA), 2011 IEEE International Conference on, IEEE, Jun. 6, 2011, 6 pages.
Murray et al., "Robot Motion Planning on a Chip", Robotics: Science and Systems, Jan. 1, 2016, 9 pages.
Non Final Office Action for U.S. Appl. No. 16/883,376, mailed Sep. 27, 2022, 26 pages.
Non-Final Office Action Issued in U.S. Appl. No. 16/240,086, Mailed Date: Feb. 11, 2021, 79 pages.
Non-Final Office Action Issued in U.S. Appl. No. 16/268,290, Mailed Date: Jan. 27, 2021, 54 pages.
Non-Final Office Action Issued in U.S. Appl. No. 16/268,290, Mailed Date: Jun. 17, 2021, 35 pages.
Non-Final Office Action Issued in U.S. Appl. No. 16/308,693, Mailed Date: Dec. 11, 2020, 17 pages.
Non-Final Office Action Issued in U.S. Appl. No. 16/308,693, Mailed Date: Jun. 1, 2020, 16 pages.
Non-Final Office Action Issued in U.S. Appl. No. 15/546,441, Mailed Sep. 17, 2019, 58 Pages.
Non-Final Office Action Issued in U.S. Appl. No. 16/308,693, Mailed May 14, 2021, 16 pages.
Non-Final Office Action Issued in U.S. Appl. No. 16/909,096 Mailed May 6, 2022, 49 pages.
Non-Final Office Action Issued in U.S. Appl. No. 17/506,364, Mailed Apr. 28, 2023, 50 pages.
Non-Final Office Action Issued in U.S. Appl. No. 16/981,467, Mailed Mar. 16, 2023, 19 Pages.

(56) References Cited

OTHER PUBLICATIONS

Non-Final Office Action mailed Sep. 14, 2022, for U.S. Appl. No. 16/999,339, 18 pages.
Chen, Chao, Motion Planning for Nonholonomic Vehicles with Space Exploration Guided Heuristic Search, 2016, IEEE.com, Whole Document, 140 pages.
Hauck, Scott, et al., "Configuration Compression for the Xilinx XC6200 FPGA", IEEE Transactions on Computer-Aided Design of Integrated Circuits and Systems, vol. 18, No. 8; Aug. 1999.
Kavraki, L.E., et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.
Extended EP Search Report mailed Jan. 29, 2024, EP App No. 21772200.8-1205, 9 pages.
Japanese Decision of Registration for JP 2022-054900, mailed Jan. 9, 2024, 3 pages.
Office Action issued in Taiwan Application No. 109113033, mailed Jan. 19, 2024, 10 pages.
Office Action issued in Taiwan Application No. 109118558, mailed Jan. 4, 2024, 8 pages.
Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.
Bharathi Akilan et al: "Feedrate optimization for smooth minimum-time trajectory generation with higher order constraints", The International Journal of Advanced Manufacturing Technology, vol. 82, No. 5, Jun. 28, 2015 (Jun. 28, 2015), pp. 1029-1040.
Communication Pursuant to Article 94(3) EPC, dated Jul. 12, 2023, for European Application No. 19 893 874.8-1205, 5 pages.
Communication Pursuant to Article 94(3) EPC, issued in European Application No. 17811131.6, Mailed Date: Jun. 16, 2020, 5 pages.
Communication Pursuant to Article 94(3) EPC, issued in European Application No. 18209405.2, Mailed Date: Nov. 23, 2020, 4 pages.
Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.
European Search Report dated Jul. 23, 2021, for European Application No. 19851097.6, 15 pages.
European Search Report issued in European Application No. 19771537.8, Mailed Date: Mar. 29, 2021, 8 pages.
European Search Report, Mailed Date: Nov. 17, 2020 for EP Application No. 16743821.7, 4 pages.
Extended EP Search Report mailed Jul. 18, 2022 EP App No. 20832308.9-1205, 10 pages.
Extended EP Search Report mailed Jul. 25, 2022 EP App No. 20857383.2-1205, 10 pages.
Extended EP Search Report mailed May 10, 2023, EP App No. 20818760.9-1012, 9 pages.
Extended EP Search Report mailed Nov. 7, 2022, EP App No. 21744840.6-1205, 14 pages.
Extended European Search Report issued in European Application No. 17811131.6, Mailed Date: Apr. 24, 2019, 16 pages.
Extended European Search Report issued in European Application No. 18209405.2, Mailed Date: Aug. 2, 2019, 9 pages.
Extended European Search Report issued in European Application No. 19893874.8, Mailed Date: Jan. 5, 2022, 13 pages.
Extended European Search Report mailed Jul. 18, 2022 in EP App No. 20832308.9.
Extended European Search Report, Mailed Date: Apr. 10, 2018 for EP Application No. 16743821.7, in 9 pages.
Final Office Action for U.S. Appl. No. 17/682,732, mailed Jul. 7, 2023, 46 pages.
Final Office Action Issued in U.S. Appl. No. 16/268,290, Mailed Date: Apr. 21, 2021, 58 pages.
Final Office Action mailed Aug. 2, 2021 for U.S. Appl. No. 16/240,086 in 66 pages.
Final Office Action mailed Sep. 7, 2022, for U.S. Appl. No. 16/909,096, 54 pages.
First Office Action and Search Report issued in Chinese No. 202080040382.4 with English translation, Mailed Date: May 26, 2023, 15 pages.
First Office Action issued in Chinese No. 201680006941.3 with English translation, Mailed Date: Sep. 29, 2019, 16 pages.
First Office Action issued in Chinese No. 201980024188.4 with English translation, Mailed Date: Feb. 22, 2023, 28 pages.
First Office Action issued in Chinese No. 201980055188.0 with English translation, Mailed Date: Jul. 1, 2023, 16 pages.
First Office Action issued in Chinese No. 201980080759.6 with English translation, Mailed Date: Jun. 28, 2023, 4 pages.
First Office Action issued in Chinese No. 202080055382.1 with English translation, Mailed Date: Jun. 28, 2023, 30 pages.
First Office Action issued in Chinese No. 202080059714.3 with English translation, Mailed Date: May 24, 2023, 24 pages.
First Office Action issued in Japanese Patent Application No. 2017-557268, Mailed Date: Aug. 7, 2018, 15 pages.
Gasparetto A et al: "Experimental validation and comparative analysis of optimal time-jerk algorithms for trajectory planning", Robotics and Computer Integrated Manufacturing, Elsevier Science Publishers BV., Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
Hassan, "Modeling and Stochastic Optimization of Complete Coverage under Uncertainties in Multi-Robot Base Placements," 2016, Intelligent Robots and Systems (IROS} (Year: 2016).
Hassan, et al., "An Approach to Base Placement for Effective Collaboration of Multiple Autonomous Industrial Robots," 2015 IEEE International Conference on Robotics and Automation (ICRA}, pp. 3286-3291 (Year: 2015).
Hassan, et al., "Simultaneous area partitioning and allocation for complete coverage by multiple autonomous industrial robots," 2017, Autonomous Robots 41, pp. 1609-1628 (Year: 2017).
Atay, Nuzhet, et al., "A Motion Planning Processor on Reconfigurable Hardware", All Computer Science and Engineering Research, Computer Science and Engineering; Report No. WUCSE-2005-46; Sep. 23, 2005.
Murray, Sean, et al., "The microarchitecture of a real-time robot motion planning accelerator", 2016 49th Annual IEEE/ACM International Symposium on Microarchitecture (Micro), IEEE, Oct. 15, 2016, 12 pages.
Pan, Jia, et al., Efficient Configuration Space Construction and Optimization for Motion Planning, 2015, Research Robotics, Whole Document, 12 pages.
Pobil, Angel P, et al., "A New Representation for Collision Avoidance and Detection", Proceedings of the 1992 IEEE, XP000300485, pp. 246-251.
Sato, Yuichi, et al., "Efficient Collision Detection using Fast Distance-Calculation Algorithms for Convex and Non-Convex Objects", Proceeding of the 1996 IEEE, XP-000750294, 8 pages.
Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.
Notice of Reasons for Refusal for Japanese Patent Application No. 2022-562247, mailed Sep. 25, 2023, 7 pages.
Notice of Reasons for Refusal. Japanese Application No. 2022-556467, dated Sep. 28, 2023, 10 pages.
Final Office Action for U.S. Appl. No. 17/506,364, mailed Aug. 25, 2023, 55 pages.
Non-Final Office Action Issued in U.S. Appl. No. 17/270,597, mailed Aug. 18, 2023, 25 pages.
Office Action, ROC (Taiwan) Pat. Appln. No. 108130161 and Search Report—APP.108130161—mailed Sep. 19, 2023.
Christian Potthast et al: "Seeing with your hands: A Better way to obtain perception capablities with a personal robot", Advance Robotics and Its Social Impacts, Oct. 2, 2011, pp. 50-53. xp032235164.

(56) References Cited

OTHER PUBLICATIONS

Efrain Lopez-Damian et al: "Probabilistic view planner for 3D modelling indoor environments", Intelligent Robots and Systems, 2009. Oct. 10, 2009, pp. 4021-4026, xp031580735.
EP Search Report mailed Sep. 1, 2023, EP App No. 21789270.2-1205 /4135940 PCT/US2021026818—23 pages.
Kececi F et al:"Improving Visually Servoed Disassembly Operations by Automatic Camera Placement", Proceedings of The 1998 IEEE International Conference on Robotics and Automation. ICRA '98. May 16-20, 1998; New York, NY : IEEE, US , XP000784527.
Notice of Reasons for Refusal for Japanese Patent Application No. 2021-571340, mailed Aug. 8, 2023, 8 pages.
Notice of Allowance for U.S. Appl. No. 17/153,662, mailed Dec. 6, 2022, 15 pages.
Notice of Allowance mailed Sep. 23, 2021, for Ritchey, "Motion Planning for Autonomous Vehicles and Reconfigurable Motion Planning Processors," U.S. Appl. No. 16/615,493, 11 pages.
Notice of Allowance mailed Dec. 24, 2021, for Sorin, "Apparatus, Method and Article to Facilitate Motion Planning of an Autonomous Vehicle in an Environment Having Dynamic Objects," U.S. Appl. No. 16/240,086, 28 pages.
Notice of Allowance mailed Jan. 25, 2022, for Sorin, "Motion Planning for Autonomous Vehicles and Reconfigurable Motion Planning Processors ," U.S. Appl. No. 16/308,693, 18 pages.
Notice of Allowance mailed Sep. 24, 2021, for Ritchey, "Motion Planning of a Robot Storing a Discretized Environment on One or More Processors and Improved Operation of Same," U.S. Appl. No. 16/268,290, 8 pages.
Notice of Reasons for Rejection dated Feb. 16, 2023, for Japanese Application No. 2021-571340, 10 pages.
Notice of Reasons for Rejection dated Feb. 7, 2023, for Japanese Application No. 2022-054900, 7 pages.
Notice of Reasons for Rejection, issued in corresponding Japanese Application No. 2021-509212, dated Apr. 7, 2022, 6 pages (English Translation).
Notification of Transmittal of International Search Report and Written Opinion for International Application No. PCT/US2021/056317, mailed Feb. 11, 2022, 13 pages.
Office Action Issued in Japanese Application No. 2018-564836, Mailed Date: Dec. 3, 2019, 3 Pages.
Office Action Issued in Japanese Application No. 2018-564836, Mailed Date: May 19, 2020, 5 Pages.
Office Action Issued in Japanese Application No. 2021-171704, Mailed Date: Jan. 28, 2022, 3 Pages.
Office Action Issued in Japanese Application No. 2021-171726, Mailed Date: Jan. 26, 2022, 4 Pages.
Office Action issued in Taiwan Application No. 108104094, mailed Feb. 6, 2023, 24 pages.
Or.pdf (Or | Definition of Or by Merriam-Webster, Sep. 9, 2019, https://www.merriam-webster.com/dictionary/or, pp. 1-12; Year: 2019.
Pashkevich AP et al: "Multiobjective optimisation of robot location in a workcell using genetic algorithms", Control '98. UKACC International Conference on (Conf. Publ. No. 455) Swansea, UK Sep. 1-4, 1998, London, UK, vol. 1, Sep. 1, 1998, 6 pages.
Pires, et al., "Robot Trajectory Planning Using Multi-objective Genetic Algorithm Optimization," 2004, Genetic and Evolutionary Computation—GECCO 2004, pp. 615-626 (Year: 2004).

Ratliff, et al., "CHOMP: Gradient Optimization Techniques for Efficient Motion Planning", 2009 IEEE International Conferenced on Robotics and Automation, Kobe, Japan, May 12-17, 2009, 6 pages.
Rodriguez et al., "Planning manipulation movements of a dual-arm system considering obstacle removing". Robotics and Autonomous Systems, Elsevier Science Publishers, vol. 62, No. 12, pp. 1816-1826; Aug. 1, 2014.
S. Saravana Perumaal et al: "Automated Trajectory Planner of Industrial Robot for Pick-and-Place Task", International Journal of Advanced Robotic Systems, vol. 10, No. 2, Jan. 1, 2013.
Schwesinger, "Motion Planning n Dynamic Environments with Application to Self-Driving Vehicles", Dr. Andreas Krause, Jan. 1, 2017, XP093029842.
Second Office Action issued in Japanese Patent Application No. 2017-557268, Mailed Date: Feb. 26, 2019, 5 pages.
Sicilliano et al. "Robotics. Modelling, Planning and Control", Chapter 12: Motion Planning, pp. 523-559, 2009.
Sonja Macfarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.
Taiwanese First Office Action—Application No. 106119452 dated Jun. 18, 2021, 25 pages.
Zhen Yang et al: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.
Corrales, J.A. , et al., Safe Human-robot interaction based on dynamic sphere-swept line bounding volumes Robotic and Computer-Integrated Manufacturing 27 (2011) 177-185, 9 page.
Johnson, David E., et al., "Bound Coherence for Minimum Distance Computations", Proceedings of the 1999 IEEE International Conference on Robotics and Automation, May 1999.
Stilman, Mike , et al., "Manipulation Planning Among Movable Obstacles", Proceedings of the IEEE Int. Conf. on Robotics and Automation, Apr. 2007.
Final Office Action Issued in U.S. Appl. No. 17/270,597, mailed Oct. 27, 2023, 29 pages.
Non-Final Office Action Issued in U.S. Appl. No. 17/604,285, mailed Nov. 21, 2023, 28 pages.
Notice of Reasons for Refusal dated Nov. 27, 2023, for Japanese Application No. 2021-561986, 10 pages.
Oleynikova, et al., "Singed Distance Fields: A Natural Representation for Both Mapping and Planning", 2016, 7 pages.
Taiwanese First Office Action—Application No. 109120779 dated Nov. 9, 2023, 11 pages.
Communication Pursuant to Article 94(3) EPC, dated Apr. 30, 2024, for European Application No. 19851097.6-1201, 9 pages.
Hassan, Mahdi et al., "An Approach to Base Placement for Effective Collaboration of Multiple Autonomous Industrial Robots", 2015 IEEE International Conference on Robotics and Automation (ICRA), pp. 3286-3291.
Japanese Notice of Allowance for Application No. 2022-544106, mailed Apr. 30, 2024, 3 pages.
Lim, Zhen Yang et al., "Multi-objective hybrid algorithms for layout optimization in multi-robot cellular manufacturing systems", Knowledge-Based Systems, vol. 120, pp. 87-98.
European Examination Report mailed Mar. 18, 2024 for European Application No. 20832308.9-1205, 8 pages.
Notice of Reasons for Refusal. Japanese Application No. 2023-524134, dated Mar. 12, 2024, 6 pages.

* cited by examiner

MOTION PLANNING OF A ROBOT FOR VARIOUS ENVIRONMENTS AND TASKS AND IMPROVED OPERATION OF SAME

TECHNICAL FIELD

The present disclosure generally relates to robot motion planning, and in particular to systems and methods that facilitate motion planning of a robot for various environments and tasks.

BACKGROUND

Description of the Related Art

Motion planning is a fundamental problem in robot control and robotics. A motion plan completely specifies a path a robot can follow from a starting state to a goal state, typically without colliding with any obstacles in an operational environment or with a reduced possibility of colliding with any obstacles in the operational environment. Challenges to motion planning involve the ability to perform motion planning at relatively low cost and very fast speeds for various environments and tasks.

BRIEF SUMMARY

Provided are systems and methods for motion planning of a robot for various environments and tasks. For example, such various environments and tasks may involve, but are not limited to: kitting, conveyors, threaded fasteners, inspections, self-calibration, a volume of space which is inhabitable by static objects and dynamic objects including humans, multi-manual grasping, grasping by touch, information collected by a sensor carried by an appendage, box packing, shelf inspection, baggage handling, recycling, medical procedures, dental procedures, drones, construction, painting, inspection of lines, fruit picking, interaction with plants, packaging fruit in boxes and an environment populated by humans.

A method of operation in a robotic system, the robotic system including at least one motion planning processor and at least one robot, the at least one robot having at least one appendage, the at least one appendage having at least one joint and at least one end effector, may be summarized as including: receiving information or data that represents a respective position and orientation of each of a plurality of like parts of a first type in a first bulk parts container, the like parts of the first type in the first bulk parts container being like one another, the first bulk parts container accessible by the at least one end effector; determining a first one of the like parts of the first type to retrieve from the first bulk parts container; processing by a plurality of logic circuits of the at least one motion planning processor where at least one wall of the container is represented and removed from the data, to determine at least one motion plan for the at least one appendage of the at least one robot that moves the at least one appendage from a first pose to a second pose without collisions and from the second pose to a third pose without collisions, the second pose being a position and an orientation in which the determined first one of the like parts of the first type in the first bulk parts container is graspable/engageable by the at least one end effector and the third pose being a position and orientation in which the at least one end effector with the determined first one of the like parts of the first type is positioned at least one of over or in a kit container to at least partially form a kit of parts which includes at least one part that is unlike the like parts of the first type; and causing the at least one robot to execute at least one of the determined motion plans by moving the at least one appendage from the first pose to the third pose without collisions.

The method may further include: receiving information that represents a respective position and orientation of each of a plurality of like parts of a second type in a second bulk parts container, the like parts of the second type in the second bulk parts container being like each other and unlike the like parts of the first type in the first bulk parts container, the second bulk parts container accessible by the at least one end effector; determining a first one of the like parts of the second type to retrieve from the second bulk parts container; processing by a plurality of logic circuits of the at least one motion planning processor, to determine at least one motion plan for the at least one appendage of the at least one robot that moves the at least one appendage from a fourth pose to a fifth pose without collisions and from the fifth pose to a sixth pose without collisions, the fifth pose being a position and an orientation in which the determined first one of the like parts of the second type in the second bulk parts container is graspable/engageable by the at least one end effector and the sixth pose being a position and an orientation in which the at least one end effector with the determined first one of the like parts of the second type is positioned at least one of over or in the kit container to at least partially form the kit of parts; and causing the at least one robot to execute at least one of the determined motion plans by moving the at least one appendage from the fifth pose to the sixth pose without collisions. The method may further include: after causing the at least one robot to execute at least one of the determined motion plans by moving the at least one appendage from the first pose to the third pose without collisions, causing the at least one robot to deposit the determined first one of the like parts of the first type into a first defined space in the kit container; and after causing the at least one robot to execute at least one of the determined motion plans by moving the at least one appendage from the fourth pose to the sixth pose without collisions, causing the at least one robot to deposit the determined first one of the like parts of the second type into a second defined space in the kit container. The kit container may be an additive manufactured kit container, and the method may further include: after causing the at least one robot to execute at least one of the determined motion plans by moving the at least one appendage from the first pose to the third pose without collisions, causing the at least one robot to deposit the determined first one of the like parts of the first type into a defined space in the additive manufactured kit container. Receiving information that represents a respective position and orientation of each of a plurality of like parts in a container may include receiving one or more images of the first bulk parts container. Receiving information that represents a respective position and orientation of each of a plurality of like parts in a first bulk parts container may include receiving one or more images of at least a subset of all of the like parts in at least a portion of the first bulk parts container, and the method may further include: performing image recognition on at least some of the received images to identify individual ones of the like parts and a position and an orientation of the individual ones of the like parts in the first bulk parts container. A first appendage of the at least one appendage may carry at least one sensor, and the method may further include capturing information that represents a respective position and orientation of each of a plurality of like parts of the first type in a the first bulk parts container by the at least one sensor carried by the first appendage, and generating a first motion plan may include generating a first motion plan based at least in part on the captured information. Generating a first motion plan based at least in part on the received information may include generating the first motion plan in which the first appendage moves from a respective first pose to a respective second pose, the respective second pose which positions the at least one sensor carried by the first appendage to operatively sense a portion of an environment. A second appendage of the at least one appendage may carry at least one end effector and the method may further include: generating a second motion plan based at least in part on the received information, the second motion plan in which the second appendage moves from a respective first pose to a respective second pose, the respective second pose which positions the end effector of the second appendage to operatively engage an object within the portion of the environment that is sensed by the at least one sensor. A first appendage of the at least one appendage may carry at least one image sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. A first appendage of the at least one appendage may carry at least one contact sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. A first appendage of the at least one appendage may carry at least one capacitive sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one capacitive sensor carried by the first appendage to operatively sense a portion of an environment. A first appendage of the at least one appendage may carry at least one force sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one force sensor carried by the first appendage to operatively sense a portion of an environment. A first appendage of the at least one appendage may carry at least one proximity sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one proximity sensor carried by the first appendage to operatively sense a portion of an environment. The robotic system may include at least a first appendage and a second appendage, and motion planning may include determining motion plans for each of the first and the second appendages to pass the determined first one of the like parts of the first type between the first and the second appendages. The robotic system may perform the acts autonomously.

A robotic system may be summarized as including: at least one robotic appendage, the at least one appendage having at least one joint and at least one end effector; at least one motion planning processor; and at least one nontransitory processor-readable medium that stores at least one of processor-executable instructions or data which, when executed by the at least one motion planning processor, causes the at least one motion planning processor to: receive captured information that represents a respective position and orientation of each of a plurality of like parts of a first type in a first bulk parts container, the like parts of the first type in the first bulk parts container being like one another, the first bulk parts container accessible by the at least one end effector; determine a first one of the like parts of the first type to retrieve from the first bulk parts container; process by a plurality of logic circuits of the at least one motion planning processor where at least one wall of the container is represented and removed from the data, to determine at least one motion plan for the at least one appendage of the at least one robot that moves the at least one appendage from a first pose to a second pose without collisions and from the second pose to a third pose without collisions, the second pose being a position and an orientation in which the determined first one of the like parts of the first type in the first bulk parts container is graspable/engageable by the at least one end effector and the third pose being a position and orientation in which the at least one end effector with the determined first one of the like parts of the first type is positioned at least one of over or in a kit container to at least partially form a kit of parts which includes at least one part that is unlike the like parts of the first type; and cause the at least one robot to execute at least one of the determined motion plans by moving the at least one appendage from the first pose to the third pose without collisions.

A method of operation in a robotic system on an assembly line that includes at least one conveyor that transports a plurality of objects being assembled along an assembly line, the robotic system including at least one motion planning processor and at least one robot, the at least one robot having at least one appendage, the at least one appendage having at least one joint and at least one end effector, the method may be summarized as including: for each of the objects being assembled, receiving information that represents a respective position and orientation of the respective object; processing by a plurality of logic circuits of the at least one motion planning processor to determine at least one motion plan for the at least one appendage of the at least one robot that moves the at least one appendage from a first pose to a second pose without collisions, the second pose being a defined position and a defined orientation of a portion of the at least one appendage relative to one of the objects being assembled; and causing the at least one robot to execute at least one of the determined motion plans by moving the at least one appendage from the first pose to the second pose without collisions.

Processing by a plurality of logic circuits of the at least one motion planning processor to determine at least one motion plan for the at least one appendage of the at least one robot may include a motion plan that moves the at least one appendage from the first pose to the second pose passing through at least a third pose all without collisions, the third pose being a defined position and a defined orientation with respect to a part to be assembled on one of the objects being assembled. The at least one robot may include a base that is at a fixed position and the objects being assembled move relative to the base, and processing by a plurality of logic circuits of the at least one motion planning processor to determine at least one motion plan for the at least one appendage may include processing to account for both a motion of the conveyor and a motion of the respective object to be assembled with respect to the conveyor. The at least one robot may include a base that moves in sequence and in parallel with movement of the objects being assembled, and processing by a plurality of logic circuits of the at least one motion planning processor to determine at least one motion plan for the at least one appendage may include processing to account for both a motion of the conveyor and a motion of the respective object to be assembled with respect to the conveyor. The at least one appendage may be removably coupleable to at least one of a moving portion of the conveyor, to a fixture carried by a portion of the conveyor or to the objects to be assembled to move along therewith, and processing by a plurality of logic circuits of the at least one motion planning processor to determine at least one motion plan for the at least one appendage may include processing to account for a motion of the respective object to be assembled with respect to the conveyor. Processing by a plurality of logic circuits of the at least one motion planning processor to determine at least one motion plan for the at least one appendage may include processing to determine a motion plan for a first appendage of the at least one appendage to detachably couple a second appendage of the at least one appendage to at least one of: a moving portion of the conveyance, a fixture carried by the moving portion of the conveyance, or the object being assembled and transported by the moving portion of the conveyance. Processing by a plurality of logic circuits of the at least one motion planning processor to determine at least one motion plan for the at least one appendage may include processing to determine a motion plan for the first appendage of the at least one appendage to uncouple the second appendage of the at least one appendage from at least one of: the moving portion of the conveyance, the fixture carried by the moving portion of the conveyance, or the object being assembled and transported by the moving portion of the conveyance. Processing by a plurality of logic circuits of the at least one motion planning processor to determine at least one motion plan for the at least one appendage may include processing to determine a motion plan for a first appendage of the at least one appendage to uncouple a second appendage of the at least one appendage from at least one of: a moving portion of the conveyance, a fixture carried by the moving portion of the conveyance, or the object being assembled and transported by the moving portion of the conveyance. Receiving information that represents a respective position and orientation of the respective object may include capturing image information from at least one camera carried by the at least one appendage. The at least one appendage may include a first appendage and at least a second appendage, the second appendage is separately moveable from the first appendage, and processing by a plurality of logic circuits of the at least one motion planning processor to determine at least one motion plan for the at least one appendage may include processing by the plurality of logic circuits of the at least one motion planning processor to determine at least one motion plan for the first appendage, and may further include capturing image information from at least one camera carried by the second appendage, wherein receiving information that represents a respective position and orientation of the respective object may include receiving the information from at least one camera carried by the second appendage. The method may further include: processing by a plurality of logic circuits of the at least one motion planning processor to determine at least one motion plan for the second appendage which carries the at least one camera between at least two different poses without collisions. The at least one robot may include one or more external cables, and the processing by a plurality of logic circuits of the motion planning processor may include processing by a plurality of logic circuits of by the motion planning processor to produce a motion plan where at least a portion of one or more external cables that are part of the at least one robot are modeled. The at least one robot may include one or more external cables, and the processing by a plurality of logic circuits of the motion planning processor may include processing by a plurality of logic circuits of by the motion planning processor to produce a motion plan where at least a portion of one or more external cables that are part of the at least one robot are modeled including a representation of a relative flexibility of the respective cable. The processing by a plurality of logic circuits of the motion planning processor may include processing by a plurality of logic circuits of the motion planning processor to produce a motion plan based on a predicted future position and a future orientation of a given one of the objects being assembled. The robotic system may include a collection of end effectors that are interchangeably detachably coupleable to a same one of the at least one appendage, and the processing by a plurality of logic circuits of the motion planning processor may include processing by a plurality of logic circuits of the motion planning processor to produce a motion plan based on a given one of the end effectors that is or that will be coupled to the appendage. At least some of the end effectors may be end of arm tools selected from a welding head, a riveter, a drill, a miller, a reamer, or a screwdriver. The robotic system may include a collection of end effectors that are interchangeably detachably coupleable to a same one of the at least one appendage, and the processing by a plurality of logic circuits of the motion planning processor may include processing by a plurality of logic circuits of the motion planning processor to produce a motion plan that moves a first one of the at least one appendage to the collection of end effectors to exchange an end effector carried by the first appendage. The robotic system may include a first appendage and a second appendage, and a collection of end effectors that are interchangeably detachably coupleable to a same one of the at least one appendage, and the processing by a plurality of logic circuits of the motion planning processor may include processing by a plurality of logic circuits of the motion planning processor to produce a motion plan that moves the first appendage to the collection of end effectors to pick up one of the end effectors, and to subsequently move a distal end of the first appendage toward a distal end of the second appendage to attach to the distal end of the second appendage the one of the end effectors picked up by the first appendage. The robotic system may include at least a first appendage and a second appendage, and motion planning may include determining motion plans for each of the first and the second appendages to pass one of the end effectors between the first and the second appendages. The robotic system may perform the acts autonomously.

A robotic system for use on an assembly line that includes at least one conveyor that transports a plurality of objects being assembled along an assembly line, the robotic system may be summarized as including: at least one robotic appendage, the at least one appendage having at least one joint and at least one end effector; at least one motion planning processor; and at least one nontransitory processor-readable medium that stores at least one of processor-executable instructions or data which, when executed by the at least one motion planning processor, causes that at least one motion planning processor to: for each of the objects being assembled, receive information that represents a respective position and orientation of the respective object; and process by a plurality of logic circuits of the at least one motion planning processor to determine at least one motion plan for the at least one appendage of the at least one robot that moves the at least one appendage from a first pose to a second pose without collisions, the second pose being a defined position and a defined orientation of a portion of the at least one appendage relative to one of the objects being assembled.

A method of operation in a robotic system on an assembly line that includes at least one conveyor that transports a plurality of objects being assembled along an assembly line, the robotic system including at least one motion planning processor and at least one robot, the at least one robot having at least one appendage, the at least one appendage having at least one joint and at least one end effector, the method may be summarized as including: for each of the objects being assembled, receiving information that represents a respective position and orientation of the respective object; processing by a plurality of logic circuits of the at least one motion planning processor to determine at least one motion plan for the at least one appendage of the at least one robot that moves the at least one appendage from a first pose to a second pose without collisions and from the second pose to a third pose without collisions, the second pose being a position and an orientation in which a threaded fastener is positioned with respect to a threaded hole; causing the at least one robot to execute at least one of the determined motion plans by moving the at least one appendage from the first pose to the third pose without collisions; causing the end effector to rotate in a first rotational direction; detecting a seating of the threaded fastener with a thread of the threaded hole; and causing the end effector to rotate in a second rotational direction, the second rotational direction opposite the first rotational direction.

Causing the end effector to rotate in a first rotational direction may include causing the end effector to rotate in a rotational direction opposite to a rotational direction in which the threaded fastener is threaded into the threaded hole. The method may further include: sensing information that represents a physical engagement of the threaded fastener with the threaded hole. Detecting a seating of the threaded fastener with a thread of the threaded hole may be based on the sensed information. The robotic system may include at least a first appendage and a second appendage, and motion planning may include determining motion plans for each of the first and the second appendages to pass threaded fastener between the first and the second appendages. The method may further include: causing the at least one appendage to change an orientation of the object as gripped by an end effector of the at least one end effector. Causing the at least one appendage to change an orientation of the object as gripped by an end effector of the at least one end effector may include: generating at least a first motion plan for a first appendage that moves the first appendage between at least a respective first pose and a respective second pose within the first operational volume without collisions at least between the first and the second appendages; generating at least a second motion plan for a second appendage that moves the second appendage between at least a respective first pose and a respective second pose within the second operational volume without collisions at least between the first and the second appendages, wherein generating a first motion plan and a second motion plan may include generating a first motion plan and a second motion plan in which the second pose of at least one of the first appendage or the second appendage is a pose in which an object is transferrable from a portion of one of the first or the second appendages to a portion of the other one of the first or the second appendages; causing the first appendage to move according to the first motion plan; and causing the second appendage to move according to the second motion plan. The robotic system may perform the acts autonomously.

A robotic system for use on an assembly line that includes at least one conveyor that transports a plurality of objects being assembled along an assembly line, the robotic system may be summarized as including: at least one robotic appendage, the at least one appendage having at least one joint and at least one end effector; at least one motion planning processor; and at least one nontransitory processor-readable medium that stores at least one of processor-executable instructions or data which, when executed by the at least one motion planning processor, causes that at least one motion planning processor to: for each of the objects being assembled, receive information that represents a respective position and orientation of the respective object; process by a plurality of logic circuits of the at least one motion planning processor to determine at least one motion plan for the at least one appendage of the at least one robot that moves the at least one appendage from a first pose to a second pose without collisions and from the second pose to a third pose without collisions, the second pose being a position and an orientation in which a threaded fastener is positioned with respect to a threaded hole; cause the at least one robot to execute at least one of the determined motion plans by moving the at least one appendage from the first pose to the third pose without collisions; cause the end effector to rotate in a first rotational direction; detect a seating of the threaded fastener with a thread of the threaded hole; and cause the end effector to rotate in a second rotational direction, the second rotational direction opposite the first rotational direction.

A method of operation in a robotic system to perform an inspection of each of a plurality of assembled objects as the assembled objects are transported past one or more inspection stations, the robotic system including at least one motion planning processor and at least one robot, the at least one robot having at least one appendage, the at least one appendage having at least one joint and at least one sensor, the method may be summarized as including: for each of the objects, capturing information that represents a respective position and orientation of the respective object; processing by a plurality of logic circuits of the at least one motion planning processor to determine at least one motion plan for the at least one appendage of the at least one robot that moves the at least one appendage from a first pose to a second pose without collisions, the first pose being a first defined position and a first defined orientation of the at least one sensor carried by the at least one appendage, the second pose being a second defined position and a second defined orientation of the at least one sensor carried by the at least one appendage relative to one of the assembled objects being inspected; and causing the at least one robot to execute at least one of the determined motion plans by moving the at least one appendage from the first pose to the second pose without collisions.

Processing by a plurality of logic circuits of the at least one motion planning processor to determine at least one motion plan for the at least one appendage of the at least one robot may include a motion plan that moves the at least one appendage from the first pose to the second pose passing through at least a third pose all without collisions, the third pose being a third defined position and a third defined orientation of the at least one sensor carried by the at least one appendage relative to one of the assembled objects being inspected, at least one of the third defined position and the third defined orientation different from a respective one of the second defined position and the second defined orientation. The at least one robot may include a base that is at a fixed position and the assembled objects move relative to the base, and processing by a plurality of logic circuits of the at least one motion planning processor to determine at least one motion plan for the at least one appendage may include processing to account for both a motion of travel of the assembled object in a real world reference frame and a motion of the respective object to be assembled with respect to a conveyor. The at least one robot a base that moves in sequence and in parallel with movement of the assembled objects, and processing by a plurality of logic circuits of the at least one motion planning processor to determine at least one motion plan for the at least one appendage may include processing to account for both a motion of a conveyor and a motion of the respective object to be assembled with respect to the conveyor. The at least one appendage may be removably coupleable to at least one of a moving portion of a conveyor, to a fixture carried by a portion of the conveyor or to the objects to be assembled to move along therewith, and processing by a plurality of logic circuits of the at least one motion planning processor to determine at least one motion plan for the at least one appendage may include processing to account for a motion of the respective object to be assembled with respect to the conveyor. Processing by a plurality of logic circuits of the at least one motion planning processor to determine at least one motion plan for the at least one appendage may include processing to determine a motion plan for a first appendage of the at least one appendage to detachably couple a second appendage of the at least one appendage to at least one of: a moving portion of a conveyance, a fixture carried by the moving portion of the conveyance, or the object being assembled and transported by the moving portion of the conveyance. Processing by a plurality of logic circuits of the at least one motion planning processor to determine at least one motion plan for the at least one appendage may include processing to determine a motion plan for the first appendage of the at least one appendage to uncouple the second appendage of the at least one appendage from at least one of: the moving portion of the conveyance, the fixture carried by the moving portion of the conveyance, or the object being assembled and transported by the moving portion of the conveyance. Processing by a plurality of logic circuits of the at least one motion planning processor to determine at least one motion plan for the at least one appendage may include processing to determine a motion plan for a first appendage of the at least one appendage to uncouple a second appendage of the at least one appendage from at least one of: a moving portion of a conveyance, a fixture carried by the moving portion of the conveyance, or the object being assembled and transported by the moving portion of the conveyance. Capturing information that represents a respective position and orientation of the respective object may include capturing image information from at least one camera carried by the at least one appendage. The at least one appendage may include a first appendage and at least a second appendage, the second appendage is separately moveable from the first appendage, and processing by a plurality of logic circuits of the at least one motion planning processor to determine at least one motion plan for the at least one appendage may include processing by the plurality of logic circuits of the at least one motion planning processor to determine at least one motion plan for the first appendage and capturing information that represents a respective position and orientation of the respective object may include capturing image information from at least one camera carried by the second appendage. The method may further include: processing by a plurality of logic circuits of the at least one motion planning processor to determine at least one motion plan for the second appendage which carries the at least one camera between at least two different poses without collisions. The at least one robot may include one or more external cables, and the processing by a plurality of logic circuits of the motion planning processor may include processing by a plurality of logic circuits of by the motion planning processor to produce a motion plan where at least a portion of one or more external cables that are part of the at least one robot are modeled. The at least one robot may include one or more external cables, and the processing by a plurality of logic circuits of the motion planning processor may include processing by a plurality of logic circuits of by the motion planning processor to produce a motion plan where at least a portion of one or more external cables that are part of the at least one robot are modeled including a representation of a relative flexibility of the respective cable. The processing by a plurality of logic circuits of the motion planning processor may include processing by a plurality of logic circuits of the motion planning processor to produce a motion plan based on a predicted future position and a future orientation of a given one of the assembled objects. A first appendage of the at least one appendage may carry at least one image sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. A first appendage of the at least one appendage may carry at least one contact sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. A first appendage of the at least one appendage may carry at least one capacitive sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one capacitive sensor carried by the first appendage to operatively sense a portion of an environment. A first appendage of the at least one appendage may carry at least one force sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one force sensor carried by the first appendage to operatively sense a portion of an environment. A first appendage of the at least one appendage may carry at least one proximity sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one proximity sensor carried by the first appendage to operatively sense a portion of an environment. The at least one appendage may include two or more appendages, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and capturing information that represents a respective position and orientation of the respective object may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The robotic system may include at least a first appendage and a second appendage, and motion planning may include determining motion plans for each of the first and the second appendages to pass one of the end effectors between the first and the second appendages. The robotic system may perform the acts autonomously.

A robotic system to perform an inspection of each of a plurality of assembled objects as the assembled objects are transported past one or more inspection stations may be summarized as including: at least one robot, the at least one robot having at least one appendage, the at least one appendage having at least one joint and at least one sensor; at least one motion planning processor; and at least one nontransitory processor-readable medium that stores at least one of processor-executable instructions or data which, when executed by the at least one motion planning processor, causes that at least one motion planning processor to: for each of the objects, capture information that represents a respective position and orientation of the respective object; process by a plurality of logic circuits of the at least one motion planning processor to determine at least one motion plan for the at least one appendage of the at least one robot that moves the at least one appendage from a first pose to a second pose without collisions, the first pose being a first defined position and a first defined orientation of the at least one sensor carried by the at least one appendage, the second pose being a second defined position and a second defined orientation of the at least one sensor carried by the at least one appendage relative to one of the assembled objects being inspected; and cause the at least one robot to execute at least one of the determined motion plans by moving the at least one appendage from the first pose to the second pose without collisions.

A method of operation in a robotic system, the robotic system including at least one motion planning processor, at least one sensor, and at least one robot, the at least one robot having at least one appendage, the at least one appendage having at least one joint and at least one end effector may be summarized as including: successively causing the at least one appendage to move to each of a plurality of successive poses; for the at least one sensor, successively capturing information that represents a respective position and orientation of the respective sensor with respect to a respective portion of the at least one appendage at each of the successive poses; for the at least one sensor, determining a respective set of calibration values from the successively captured information; processing by a plurality of logic circuits of the at least one motion planning processor to determine at least one calibrated motion plan for the at least one appendage of the at least one robot that moves the at least one appendage from a first pose to a second pose without collisions; and causing the at least one robot to execute at least one of the determined motion plans by moving the at least one appendage from the first pose to the second pose without collisions.

A method of operation in a robotic system, the robotic system including at least one motion planning processor, at least one sensor, and at least one robot, the at least one robot having at least one appendage, the at least one appendage having at least one joint and at least one end effector, the method may be summarized as including: successively capturing information that represents a volume of space in which the at least one appendage operates, the volume of space which is inhabitable by static objects and dynamic objects including humans; based at least in part on the captured information, processing by a plurality of logic circuits of the at least one motion planning processor to determine at least a first motion plan that provides a first trajectory through a portion of the volume of space for the at least one appendage that moves the at least one appendage between a number of successive poses; based at least in part on the captured information, processing by a plurality of logic circuits of the at least one motion planning processor to determine at least a subsequent motion plan that provides a subsequent trajectory through a portion of the volume of space for the at least one appendage that moves the at least one appendage between a number of successive poses and that avoids a dynamic object that would otherwise present a risk of collision above a defined threshold for the previous first trajectory; and successively causing the at least one appendage to move to each of a plurality of successive poses according to a current one of the motion plan.

The robotic system may include a first number of sensors at respective fixed locations that monitor the volume of space, the first number of sensors not carried by the appendages, and successively capturing information that represents a volume of space in which the at least one appendage operates may include successively capturing information via the first number of sensors at the respective fixed locations. The robotic system may include a second number of sensors carried by the appendages that monitor the volume of space, and successively capturing information that represents a volume of space in which the at least one appendage operates may include successively capturing information via the second number of sensors carried by the appendages. The robotic system may include a number of sensors carried by the appendages that monitor the volume of space, and successively capturing information that represents a volume of space in which the at least one appendage operates may include successively capturing information via the number of sensors carried by the appendages. The at least one sensor may include at least one image sensor, and processing by a plurality of logic circuits of the at least one motion planning processor to determine at least a subsequent motion plan for the at least one appendage may include processing by a plurality of logic circuits of the at least one motion planning processor to determine the subsequent motion plan based on image information captured via the at least one sensor. The at least one sensor may include at least one image sensor, and processing by a plurality of logic circuits of the at least one motion planning processor to determine at least a subsequent motion plan for the at least one appendage may include processing by a plurality of logic circuits of the at least one motion planning processor to determine the subsequent motion plan based on image information captured via the at least one sensor, the subsequent motion plan that employs a momentum of the at least one appendage to follow a trajectory that minimizes a probability of a collision with the dynamic object. The at least one sensor may include at least one image sensor, and processing by a plurality of logic circuits of the at least one motion planning processor to determine at least a subsequent motion plan for the at least one appendage may include processing by a plurality of logic circuits of the at least one motion planning processor to determine the subsequent motion plan based on image information captured via the at least one sensor. The at least one sensor may include at least one image sensor, and processing by a plurality of logic circuits of the at least one motion planning processor to determine at least a subsequent motion plan for the at least one appendage may include processing by a plurality of logic circuits of the at least one motion planning processor to determine the subsequent motion plan based on image information captured via the at least one sensor, the subsequent motion plan that employs a momentum of the at least one appendage to follow a trajectory that minimizes a probability of a collision with the dynamic object without stopping a motion of the at least one appendage in response to a presence of the dynamic object in the volume of space. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and processing by a plurality of logic circuits of the at least one motion planning processor to determine at least a subsequent motion plan for the at least one appendage may include processing by a plurality of logic circuits of the at least one motion planning processor to determine the subsequent motion plan based on the information captured via the at least one sensor, the subsequent motion plan that employs a momentum of the at least one appendage to follow a trajectory that minimizes a probability of a collision with the dynamic object. The at least one sensor may include a plurality of at least one type of sensor that provides a high level of redundancy, and processing by a plurality of logic circuits of the at least one motion planning processor to determine at least a subsequent motion plan for the at least one appendage may include processing by a plurality of logic circuits of the at least one motion planning processor to determine the subsequent motion plan based on the information captured via the at least one sensor that is operating, the subsequent motion plan that employs a momentum of the at least one appendage to follow a trajectory that minimizes a probability of a collision with the dynamic object. The robotic system may perform the acts autonomously.

A robotic system may be summarized as including: at least one robot, the at least one robot having at least one appendage, the at least one appendage having at least one joint and at least one end effector; at least one motion planning processor; and at least one nontransitory processor-readable medium that stores at least one of processor-executable instructions or data which, when executed by the at least one motion planning processor, causes that at least one motion planning processor to: successively capture information that represents a volume of space in which the at least one appendage operates, the volume of space which is inhabitable by static objects and dynamic objects including humans; based at least in part on the captured information, process by a plurality of logic circuits of the at least one motion planning processor to determine at least a first motion plan that provides a first trajectory through a portion of the volume of space for the at least one appendage that moves the at least one appendage between a number of successive poses; based at least in part on the captured information, process by a plurality of logic circuits of the at least one motion planning processor to determine at least a subsequent motion plan that provides a subsequent trajectory through a portion of the volume of space for the at least one appendage that moves the at least one appendage between a number of successive poses and that avoids a dynamic object that would otherwise present a risk of collision above a defined threshold for the previous first trajectory; and successively cause the at least one appendage to move to each of a plurality of successive poses according to a current one of the motion plan.

A method of operation in a robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another, the method may be summarized as including: generating at least a first motion plan for a first appendage that moves the first appendage between at least a respective first pose and a respective second pose within the first operational volume without collisions at least between the first and the second appendages; generating at least a second motion plan for a second appendage that moves the second appendage between at least a respective first pose and a respective second pose within the second operational volume without collisions at least between the first and the second appendages; causing the first appendage to move according to the first motion plan; and causing the second appendage to move according to the second motion plan.

Generating a first motion plan and a second motion plan may include generating a first motion plan and a second motion plan in which the second pose of at least one of the first appendage or the second appendage is a pose in which an object is transferrable from a portion of one of the first or the second appendages to a portion of the other one of the first or the second appendages. Generating a first motion plan may include generating a first motion plan in which the second pose of the first appendage positions a portion of the first appendage to operatively engage a first object in an environment, and generating a second motion plan may include generating a second motion plan in which the second pose of the second appendage positions a portion of the second appendage to operatively engage the first object in the environment. Generating a first motion plan may include generating a first motion plan in which the second pose of the first appendage positions a portion of the first appendage to operatively engage a drawer in an environment, and generating a second motion plan may include generating a second motion plan in which the second pose of the second appendage positions a portion of the second appendage to at least one of place or retrieve an object from the drawer. The first appendage may carry at least one sensor, and generating a first motion plan may include generating a first motion plan in which the second pose of the first appendage positions the at least one sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one sensor. The first appendage may carry at least one image sensor, and generating a first motion plan may include generating a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. The first appendage may carry at least one contact sensor, and generating a first motion plan may include generating a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. The first appendage may carry at least one capacitive sensor, and generating a first motion plan may include generating a first motion plan in which the second pose of the first appendage positions the at least one capacitive sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one capacitive sensor. The first appendage may carry at least one force sensor, and generating a first motion plan may include generating a first motion plan in which the second pose of the first appendage positions the at least one force sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one force sensor. The first appendage may carry at least one proximity sensor, and generating a first motion plan may include generating a first motion plan in which the second pose of the first appendage positions the at least one proximity sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one proximity sensor. Generating a first motion plan may include generating a first motion plan in which the second pose of the first appendage positions a portion of the first appendage to grasp a first object in an environment, and generating a second motion plan may include generating a second motion plan in which the second pose of the second appendage positions a portion of the second appendage to grasp the first object in the environment. Generating a first motion plan may include generating a first motion plan in which the second pose of the first appendage positions a portion of the first appendage to grasp a first object in an environment, and generating a second motion plan may include generating a second motion plan in which the second pose of the second appendage positions a portion of the second appendage to grasp the first object in the environment while the first appendage grasps the first object. Causing the first appendage to move according to the first motion plan may include causing the first appendage to move to be in the respective second pose during a first period and causing the second appendage to move according to the second motion plan may include causing the second appendage to move to be in the respective second pose during the first period. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The method may further include: dynamically generating a plurality of updated first motion plans while causing the first appendage to move at least partially between the respective first and the respective second poses. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The second appendage may also carry a respective sensor in addition to the respective end effector carried by the second appendage, and the method may further include: receiving information collected by the sensor carried by the second appendage; and dynamically generating a plurality of updated second motion plans based at least in part on the received information collected by the sensor carried by the second appendage. The first appendage may also carry a respective end effector in addition to the respective at least one sensor carried by the first appendage, and the method may further include: dynamically generating a plurality of updated first motion plans based at least in part on the received information collected by at least one of the sensors carried by the second appendage, the updated first motion plans which position the respective end effector carried by the first appendage to physically engage an object in an environment in cooperation with the respective end effector of the second appendage. Generating at least a first motion plan for a first appendage may include generating a first motion plan that further moves the first appendage between at least the respective second pose and a respective third pose within the first operational volume without collisions at least between the first and the second appendages. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; causing the third appendage to move according to the third motion plan. The robotic system may perform the acts autonomously.

A robotic system may be summarized as including: a first appendage moveable within a first operational volume; at least a second appendage moveable within a second operational volume, at least a portion of the second operational volume overlaps with at least a portion of the first operational volume such that the first and second appendages are capable of physically colliding with one another; at least one motion planning processor; and at least one nontransitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions at least between the first and the second appendages; generate at least a second motion plan for a second appendage that moves the second appendage between at least a respective first pose and a respective second pose within the second operational volume without collisions at least between the first and the second appendages; cause the first appendage to move according to the first motion plan; and cause the second appendage to move according to the second motion plan.

A method of operation in a robotic system including a first appendage that carries at least one sensor and at least a second appendage that carries at least one end effector, the first and the second appendages moveable within a first operational volume and a second operational volume, respectively, at least a portion of the second operational volume overlapping with at least a portion of the first operational volume such that the first and the second appendages are capable of physically colliding with one another, the method may be summarized as including: generating at least a first motion plan for the first appendage that moves the first appendage between at least a respective first pose and a respective second pose within the first operational volume without collisions at least between the first and the second appendages, the respective second pose which positions the at least one sensor carried by the first appendage to operatively sense a portion of an environment; generating at least a second motion plan for the second appendage that moves the second appendage between at least a respective first pose and a respective second pose within the second operational volume without collisions at least between the first and the second appendages, the respective second pose in which the end effector carried by the second appendage is positioned to operatively engage an object within the portion of the environment that is sensed by the at least one sensor; causing the first appendage to move according to the first motion plan; receiving information collected by the at least one sensor carried by the first appendage; and causing the second appendage to move according to the second motion plan.

The method may further include: dynamically generating a plurality of updated second motion plans based on the received information collected by the at least one sensor carried by the first appendage. The method may further include: dynamically generating a plurality of updated second motion plans based on the received information collected by the at least one sensor carried by the first appendage while causing the first appendage to move. The at least one sensor carried by the first appendage may include at least one image sensor, and receiving information collected by the at least one sensor carried by the first appendage may include receiving image information. The at least one sensor carried by the first appendage may include at least one contact sensor, and receiving information collected by the at least one sensor carried by the first appendage may include receiving contact information. The at least one sensor carried by the first appendage may include at least one capacitive sensor, and receiving information collected by the at least one sensor carried by the first appendage may include receiving capacitive information. The at least one sensor carried by the first appendage may include at least one force sensor, and receiving information collected by the at least one sensor carried by the first appendage may include receiving force information. The at least one sensor carried by the first appendage may include at least one proximity sensor, and receiving information collected by the at least one sensor carried by the first appendage may include receiving proximity information. Generating a first motion plan may include generating a first motion plan in which the second pose of the first appendage positions a portion of the first appendage to touch a first object in an environment, and generating a second motion plan may include generating a second motion plan in which the second pose of the second appendage positions a portion of the second appendage to grasp the first object in the environment. Generating a first motion plan may include generating a first motion plan in which the second pose of the first appendage positions a portion of the first appendage to touch a first object in a container, and generating a second motion plan may include generating a second motion plan in which the second pose of the second appendage positions a portion of the second appendage to grasp the first object in the container. Generating a first motion plan may include generating a first motion plan in which the second pose of the first appendage positions a portion of the first appendage to touch a first object in a drawer, and generating a second motion plan may include generating a second motion plan in which the second pose of the second appendage positions a portion of the second appendage to grasp the first object in the drawer. The second appendage may also carry a respective sensor in addition to the respective end effector carried by the second appendage, and the method may further include: receiving information collected by the sensor carried by the second appendage; and dynamically generating a plurality of updated second motion plans based at least in part on the received information collected by the sensor carried by the second appendage. The first appendage may also carry a respective end effector in addition to the respective at least one sensor carried by the first appendage, and the method may further include: dynamically generating a plurality of updated first motion plans based at least in part on the received information collected by at least one of the sensors carried by the second appendage, the updated first motion plans which position the respective end effector carried by the first appendage to physically engage an object in an environment in cooperation with the respective end effector of the second appendage. Generating at least a first motion plan for a first appendage may include generating a first motion plan that further moves the first appendage between at least the respective second pose and a respective third pose within the first operational volume without collisions at least between the first and the second appendages. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; and causing the third appendage to move according to the third motion plan. The robotic system may perform the acts autonomously.

A robotic system may be summarized as including: a first appendage that carries at least one sensor and that is moveable within a first operational volume; at least a second appendage that carries at least one end effector and that is moveable within a second operational volume, at least a portion of the second operational volume overlaps with at least a portion of the first operational volume such that the first and second appendages are capable of physically colliding with one another; at least one motion planning processor; and at least one nontransitory processor-readable medium that stores at least one of processor-executable instructions or data which, when executed by the at least one motion planning processor, causes the at least one motion planning processor to: generate at least a first motion plan for the first appendage that moves the first appendage between at least a respective first pose and a respective second pose within the first operational volume without collisions at least between the first and the second appendages, the respective second pose which positions the at least one sensor carried by the first appendage to operatively sense a portion of an environment; generate at least a second motion plan for the second appendage that moves the second appendage between at least a respective first pose and a respective second pose within the second operational volume without collisions at least between the first and the second appendages, the respective second pose in which the end effector carried by the second appendage is positioned to operatively engage an object within the portion of the environment that is sensed by the at least one sensor; cause the first appendage to move according to the first motion plan; receive information collected by the at least one sensor carried by the first appendage; and cause the second appendage to move according to the second motion plan.

A method of operation in a robotic system including a first appendage that carries at least one sensor and at least one end effector, the first appendage moveable within a first operational volume, the method may be summarized as including: receiving information collected by the at least one sensor carried by the first appendage; dynamically generating at a plurality of successive intervals of time a plurality of updated motion plans for the first appendage that moves the first appendage between at least a respective first pose and a respective second pose within the first operational volume without collisions based at least in part on the received information collected by the at least one sensor carried by the first appendage; and causing the first appendage to move according to the dynamically generated motion plans for the first appendage.

Dynamically generating at a plurality of successive intervals of time a plurality of updated motion plans for the first appendage may include dynamically generating the plurality of updated motion plans for the first appendage while causing the first appendage to move. The at least one sensor carried by the first appendage may include at least one image sensor, and receiving information collected by the at least one sensor carried by the first appendage may include receiving image information. The at least one sensor carried by the first appendage may include at least one contact sensor, and receiving information collected by the at least one sensor carried by the first appendage may include receiving contact information. The at least one sensor carried by the first appendage may include at least one capacitive sensor, and receiving information collected by the at least one sensor carried by the first appendage may include receiving capacitive information. The at least one sensor carried by the first appendage may include at least one force sensor, and receiving information collected by the at least one sensor carried by the first appendage may include receiving force information. The at least one sensor carried by the first appendage may include at least one proximity sensor, and receiving information collected by the at least one sensor carried by the first appendage may include receiving proximity information. Dynamically generating at a plurality of successive intervals of time a plurality of updated motion plans for the first appendage may include generating a first motion plan in which the second pose of the first appendage positions the end effector carried by the first appendage to touch a first object in an environment. Dynamically generating at a plurality of successive intervals of time a plurality of updated motion plans for the first appendage may include generating a first motion plan in which the second pose of the first appendage positions a portion of the first appendage to touch a first object in a container. Dynamically generating at a plurality of successive intervals of time a plurality of updated motion plans for the first appendage may include generating a first motion plan in which the second pose of the first appendage positions a portion of the first appendage to touch a first object in a drawer. Dynamically generating at a plurality of successive intervals of time a plurality of updated motion plans for the first appendage may include generating a first motion plan in which the second pose of the first appendage positions the end effector carried by the first appendage to grasp a first object in a drawer. Dynamically generating at a plurality of successive intervals of time a plurality of updated motion plans for the first appendage may include generating a first motion plan that further moves the first appendage between at least the respective second pose and a respective third pose within the first operational volume without collisions at least between the first and the second appendages. The robotic system may further include at least a second appendage, the second appendage moveable within a second operational volume at least a portion of the second operational volume overlapping with at least a portion of the first operational volume such that the first and the second appendages are capable of physically colliding with one another, the method may include: dynamically generating at a plurality of successive intervals of time a plurality of updated motion plans for the second appendage that moves the second appendage between at least a respective first pose and a respective second pose within the second operational volume without collisions; and causing the second appendage to move according to the dynamically generated updated motion plans for the second appendage. The robotic system may perform the acts autonomously.

A robotic system may be summarized as including: a first appendage that carries at least one sensor and at least one end effector, and that is moveable within a first operational volume; at least one motion planning processor; and at least one nontransitory processor-readable medium that stores at least one of processor-executable instructions or data which, when executed by the at least one motion planning processor, causes that at least one motion planning processor to: receive information collected by the at least one sensor carried by the first appendage; dynamically generate at a plurality of successive intervals of time a plurality of updated motion plans for the first appendage that moves the first appendage between at least a respective first pose and a respective second pose within the first operational volume without collisions based at least in part based on the received information collected by the at least one sensor carried by the first appendage; cause the first appendage to move according to the dynamically generated motion plans for the first appendage.

A method of operation in a robotic system to package items in boxes, the robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another, the method may be summarized as including: generating at least a first motion plan for the first appendage that moves the first appendage between at least a respective first pose and a respective second pose within the first operational volume without collisions at least between the first and the second appendages, the second pose locating a portion of the first appendage at least one of above or within a box; generating at least a second motion plan for the second appendage that moves the second appendage between at least a respective first pose and a respective second pose within the second operational volume without collisions at least between the first and the second appendages; causing the first appendage to move according to the first motion plan; and causing the second appendage to move according to the second motion plan.

Generating a first motion plan and a second motion plan may include generating a first motion plan and a second motion plan in which the second pose of at least one of the first appendage or the second appendage may be a pose in which an item is transferrable from a portion of one of the first or the second appendages into the box. Generating a first motion plan may include generating a first motion plan in which the second pose of the first appendage positions a portion of the first appendage to transfer the item into the box, and generating a second motion plan may include generating a second motion plan in which the second pose of the second appendage positions a portion of the second appendage to operatively engage a portion of the box. Generating a first motion plan may include generating a first motion plan in which the second pose of the first appendage positions a portion of the first appendage to transfer the item into the box, and generating a second motion plan may include generating a second motion plan in which the second pose of the second appendage positions a portion of the second appendage to operatively engage a flap of the box. Generating a first motion plan may include generating a first motion plan in which the first pose of the first appendage positions a portion of the first appendage to operatively engage a drawer in an environment, and generating a second motion plan may include retrieve the object from a container and the second pose of the first appendage positions a portion of the first appendage to place the item in the box. The second appendage may carry at least one sensor, and generating a second motion plan may include generating a second motion plan in which the second pose of the second appendage positions the at least one sensor carried by the second appendage to operatively sense a portion of an interior of the box, and generating a first motion plan may include generating a first motion plan in which the second pose of the first appendage positions a portion of the first appendage to transfer the item in the interior of the box while the interior of the box is sensed by the at least one sensor. The second appendage may carry at least one image sensor, and generating a second motion plan may include generating a second motion plan in which the second pose of the second appendage positions the at least one image sensor carried by the first appendage to operatively sense a portion of an interior of the box, and generating a first motion plan may include generating a first motion plan in which the second pose of the first appendage positions a portion of the first appendage to transfer the item in the interior of the box. Generating a first motion plan may include generating a first motion plan in which the second pose of the first appendage positions a portion of the first appendage to transfer the item into the box, and generating a second motion plan may include generating a second motion plan in which the first pose of the second appendage positions a portion of the second appendage to retrieve packaging materials and the second pose of the second appendage positions a portion of the second appendage to transfer the retrieved packaging material into an interior of the box. The method may further include: generating a third motion plan in which a first pose of at least one of the appendages positions the at least one appendage to retrieve packaging materials, a second pose of at least one of the appendages positions the at least one appendage to wrap an item, and a third pose of at least one of the appendages positions the at least one appendage to transfer the wrapped item into an interior of the box. The at least one appendage may include two or more appendages, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The method may further include: dynamically generating a plurality of updated first motion plans while causing the first appendage to move at least partially between the respective first and the respective second poses. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; causing the third appendage to move according to the third motion plan. The robotic system may perform the acts autonomously.

A robotic system to package items in boxes, the robotic system may be summarized as including: a first appendage that is moveable within a first operational volume; a second appendage that is moveable within a second operational volume, at least a portion of the second operational volume overlaps with at least a portion of the first operational volume such that the first and second appendages are capable of physically colliding with one another; at least one motion planning processor; and at least one nontransitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions at least between the first and the second appendages, the second pose locating a portion of the first appendage at least one of above or within a box; generate at least a second motion plan for a second appendage that moves the second appendage between at least a respective first pose and a respective second pose within the second operational volume without collisions at least between the first and the second appendages; cause the first appendage to move according to the first motion plan; and cause the second appendage to move according to the second motion plan.

A method of operation in a robotic system to handle shelf stocking and arrangement of items on shelves, the robotic system including at least one robot that carries at least one sensor, the method may be summarized as including: generating at least a first motion plan for a first robot of the at least one robotic system, the first motion plan that moves at least a portion of the first robot between at least a respective first pose and a respective second pose with respect to a first set of shelves to sense at least one of a quantity and arrangement of items on the shelves; causing the at least a portion of the first robot to move according to the first motion plan; and successively capturing information that represents stocking and arrangement of items on shelves in at least one of the first pose, the second pose or an intermediary pose between the first and the second poses.

The first robot may be a self-propelled robot, and generating at least a first motion plan for a first robot may include generating at least a first motion plan that specifies a trajectory for the self-propelled robot with respect to an aisle along which the first set of shelves extends. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and successively capturing information that represents a stocking and arrangement of items on shelves may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: successively capturing information that represents an operational volume of space of an aisle along which the first set of shelves extends, and wherein generating at least a first motion plan for a first robot may include generating at least a first motion plan that specifies a trajectory for the self-propelled robot with respect to an aisle that minimizes a risk of collision with objects in the aisle. The method may further include: successively capturing information that represents an operational volume of space of an aisle along which the first set of shelves extends, and wherein generating at least a first motion plan for a first robot may include generating at least a first motion plan that specifies a trajectory for the self-propelled robot with respect to an aisle that stops the self-propelled robot if a human-like object is detected in the trajectory of the self-propelled robot. The method may further include: successively capturing information that represents an operational volume of space of an aisle along which the first set of shelves extends, and wherein generating at least a first motion plan for a first robot may include generating at least a first motion plan that specifies a trajectory for the self-propelled robot with respect to an aisle that changes the trajectory of the self-propelled robot to avoid a human-like object that is detected in the trajectory of the self-propelled robot, without stopping a movement of the self-propelled robot. The first robot may include a first appendage with at least one joint and which carries at least one sensor, and generating at least a first motion plan for a first robot may include generating at least a first motion plan that specifies a trajectory for the first appendage with respect to the first set of shelves. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and successively capturing information that represents a stocking and arrangement of items on shelves may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The first robot may include a second appendage with at least one joint, and generating at least a first motion plan for a first robot may include generating at least a second motion plan that specifies a trajectory for the second appendage with respect to the first set of shelves. The second appendage may carry at least one sensor, and generating at least a first motion plan for a first robot may include generating at least a second motion plan that specifies a trajectory for the second appendage with respect to a second set of shelves that extend along the aisle. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and successively capturing information that represents a stocking and arrangement of items on shelves may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The second appendage may carry at least one end effector, and generating at least a second motion plan for a first robot may include generating at least a second motion plan that specifies a trajectory for the second appendage with respect to the first set of shelves that extend along the aisle. The second appendage may carry at least one end effector, and generating at least a second motion plan for a first robot may include generating at least a second motion plan that specifies a trajectory for the second appendage with respect to a second set of shelves that extend along the aisle. The at least one end effector may include a gripper, a hook, or a claw, and generating at least a second motion plan for a first robot may include generating at least a second motion plan that specifies a trajectory for the second appendage with respect to the first set of shelves that extend along the aisle. The at least one end effector may include a gripper, a hook, or a claw, and generating at least a second motion plan for a first robot may include generating at least a second motion plan that specifies a trajectory for the second appendage with respect to a second set of shelves that extend along the aisle. Generating at least a second motion plan for a first robot may include generating at least a second motion plan that specifies a trajectory for the second appendage between a first pose and a second pose, the first pose which positions and orients the second appendage to retrieve an item from a supply of items to replenish a shelf of the first set of shelves and the second pose which positions and orients the second appendage to place the retrieved item on the shelf of the first set of shelves. Generating at least a second motion plan for a first robot may include generating at least a second motion plan that specifies a trajectory for the second appendage between a first pose and a second pose, the first pose which positions and orients the second appendage to operatively engage one or more items on a shelf of the first set of shelves and the second pose which positions and orients the second appendage to reposition the operatively engaged one or more items on the shelf of the first set of shelves. Generating at least a second motion plan for a first robot may include generating at least a second motion plan that specifies a trajectory for the second appendage between a first pose and a second pose, the first pose which positions and orients the second appendage to retrieve an item from a shelf of the first set of shelves and the second pose which positions and orients the second appendage to place the retrieved item on a second shelf of the first set of shelves. Generating at least a second motion plan for a first robot may include generating at least a second motion plan that specifies a trajectory for the second appendage between a first pose and a second pose, the first pose which positions and orients the second appendage to retrieve an item from a shelf of the first set of shelves and the second pose which positions and orients the second appendage to place the retrieved item in a container carried by the first robot. The method may further include generating at least a third motion plan for the first robot that specifies a trajectory for the second appendage between a third pose and a fourth pose, the third pose which positions and orients the second appendage to retrieve the item from the container carried by the first robot and the second pose which positions and orients the second appendage to place the retrieved item from the container on a shelf of a second set of shelves, the second set of shelves exclusive of the first set of shelves. The first robot is a self-propelled robot, the method may further include: generating at least a fourth motion plan for the self-propelled robot that specifies a trajectory for the self-propelled robot between the first set of shelves and the second set of shelves; and causing the self-propelled robot to traverse the trajectory defined by the fourth motion plan; subsequently, causing the second appendage to move along the trajectory defined by the third motion plan. The method may further include: causing the second appendage to move according to the second motion plan. Generating at least a first motion plan for a first robot of the at least one robot may include processing by a plurality of logic circuits of the at least one motion planning processor to determine at least one motion plan. The robotic system may perform the acts autonomously.

A robotic system to handle shelf stocking and arrangement of items on shelves may be summarized as including: at least one robot; at least one sensor, the at least one sensor carried by that at least one robot; at least one motion planning processor; and at least one nontransitory processor-readable medium that stores at least one of processor-executable instructions or data which, when executed by the at least one motion planning processor, causes the at least one motion planning processor to: generate at least a first motion plan for the at least one robot, the first motion plan that moves the first robot between at least a respective first pose and a respective second pose with respect to a first set of shelves to sense at least one of a quantity and arrangement of items on the shelves; cause the at least one robot to move according to the first motion plan; and successively capture information that represents stocking and arrangement of items on shelves in at least one of the first pose, the second pose or an intermediary pose between the first and the second poses.

A method of operation in a robotic system to handle baggage, the robotic system including at least one robot and at least one sensor, the method may be summarized as including: receiving information that represents an environment which includes a plurality of pieces of baggage; generating at least a first motion plan for a first robot of the at least one robot, the first motion plan that moves at least a portion of the first robot between at least a respective first pose and a respective second pose with respect to the plurality of pieces of baggage; and causing the at least a portion of the first robot to move according to the first motion plan.

The first robot may be a self-propelled robot, and generating at least a first motion plan for a first robot may include generating at least a first motion plan that specifies a trajectory for the self-propelled robot with respect to the pieces of baggage. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and receiving information that represents an environment which includes a plurality of pieces of baggage may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. Generating at least a first motion plan for a first robot may include generating at least a first motion plan that specifies a trajectory for at least the portion of the first robot with respect to the environment that minimizes a risk of collision with objects in the environment. Generating at least a first motion plan for a first robot may include generating at least a first motion plan that specifies a trajectory for at least the portion of the first robot with respect to the first environment that stops the at least the portion of the first robot if a human-like object is detected in the trajectory of the self-propelled robot. Generating at least a first motion plan for a first robot may include generating at least a first motion plan that specifies a trajectory for the at least the portion of the first robot that changes the trajectory of the at least the portion of the first robot to avoid a human-like object that is detected in the trajectory of the at least the portion of the robot, without stopping a movement of the at least the portion of the first robot. The first robot may include a first appendage with at least one joint and which carries at least one sensor, and generating at least a first motion plan for a first robot may include generating at least a first motion plan that specifies a trajectory for the first appendage with respect to at least one piece of baggage of the plurality of pieces of baggage. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and receiving information that represents an environment which includes a plurality of pieces of baggage may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The environment may include at least one conveyor, and the first robot may include a first appendage with at least one joint and which carries at least one sensor, and generating at least a first motion plan for a first robot may include generating at least a first motion plan that specifies a trajectory for the first appendage with respect to the at least one conveyor or piece of baggage of the plurality of pieces of baggage. The environment may include at least one conveyor, and the first robot may include a first appendage with at least one joint and which carries at least one sensor, and generating at least a first motion plan for a first robot may include generating at least a first motion plan that specifies a trajectory for the first appendage to pick up a first piece of baggage of the plurality of pieces of baggage and place the picked up piece of baggage on a first conveyor of the at least one conveyor. The environment may include at least one conveyor, and the first robot may include a first appendage with at least one joint and which carries at least one sensor, and generating at least a first motion plan for a first robot may include generating at least a first motion plan that specifies a trajectory for the first appendage to pick up a first piece of baggage of the plurality of pieces of baggage from a first conveyor of the at least one conveyor. Generating at least a first motion plan for a first robot may include generating at least a first motion plan that specifies a trajectory for the first appendage to deposit the first piece of baggage of the plurality of pieces of baggage in a defined location. Generating at least a first motion plan for a first robot may include generating at least a first motion plan that specifies a trajectory for the first appendage to deposit the first piece of baggage of the plurality of pieces of baggage on a second conveyor of the at least one conveyor, the second conveyor being a different conveyor from the first conveyor and unconnected thereto. Generating a first motion plan may include generating at least a first motion plan that specifies a trajectory for the first appendage first to retrieve the first piece of baggage of the plurality of pieces of baggage from a first conveyor and second to deposit the first piece of baggage on the second conveyor. Generating a first motion plan may include generating at least a first motion plan that specifies a trajectory for the first appendage first to retrieve the first piece of baggage of the plurality of pieces of baggage from the first conveyor, matching a first speed of the first conveyor, and second to deposit the first piece of baggage on the second conveyor, matching a second speed of the second conveyor, the second speed different than the first speed. The first robot may include a second appendage with at least one joint, and generating at least a first motion plan for a first robot may include generating at least a second motion plan that specifies a trajectory for the second appendage with respect to at least one piece of baggage of the plurality of pieces of baggage. The second appendage may carry at least one sensor, and generating at least a first motion plan for a first robot may include generating at least a second motion plan that specifies a trajectory for the second appendage with respect to at least one piece of baggage of the plurality of pieces of baggage or a conveyor. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and receiving information that represents a stocking and arrangement of items on shelves may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The second appendage may carry at least one end effector, and generating at least a second motion plan for a first robot may include generating at least a second motion plan that specifies a trajectory for the second appendage with respect to at least one piece of baggage of the plurality of pieces of baggage. The second appendage may carry at least one end effector, and generating at least a second motion plan for a first robot may include generating at least a second motion plan that specifies a trajectory for the second appendage with respect to at least one conveyor or baggage trolley. The at least one end effector may include a gripper, a hook, or a claw, and generating at least a second motion plan for a first robot may include generating at least a second motion plan that specifies a trajectory for the second appendage to at least one piece of baggage of the plurality of pieces of baggage. The at least one end effector may include a gripper, a hook, or a claw, and generating at least a second motion plan for a first robot may include generating at least a second motion plan that specifies a trajectory for the second appendage with respect to a baggage conveyor. Generating at least a second motion plan for a first robot may include generating at least a second motion plan that specifies a trajectory for the second appendage between a first pose and a second pose, the first pose which positions and orients the second appendage to retrieve a piece of baggage from a first area and the second pose which positions and orients the second appendage to place the retrieved piece of baggage in a second area, the second area spaced from the first area. Generating at least a second motion plan for a first robot may include generating at least a second motion plan that specifies a trajectory for the second appendage between a first pose and a second pose, the first pose which positions and orients the second appendage to retrieve a piece of baggage from a first area and the second pose which positions and orients the second appendage to place the retrieved piece of baggage on a baggage conveyor. Generating at least a second motion plan for a first robot may include generating at least a second motion plan that specifies a trajectory for the second appendage between a first pose and a second pose, the first pose which positions and orients the second appendage to retrieve a piece of baggage from a conveyor and the second pose which positions and orients the second appendage to place the retrieved piece of baggage in an area that is not a conveyor. Generating at least a second motion plan for a first robot may include generating at least a second motion plan that specifies a trajectory for the second appendage between a first pose and a second pose, the first pose which positions and orients the second appendage to retrieve a piece of baggage from a conveyor and the second pose which positions and orients the second appendage to place the retrieved piece of baggage on a luggage trolley. Generating at least a second motion plan for a first robot may include generating at least a second motion plan that specifies a trajectory for the second appendage between a first pose and a second pose, the first pose which positions and orients the second appendage to retrieve a piece of baggage from a luggage trolley and the second pose which positions and orients the second appendage to place the retrieved piece of baggage on a luggage conveyor. Generating at least a second motion plan for a first robot may include generating at least a second motion plan that specifies a trajectory for the second appendage between a first pose and a second pose, the first pose which positions and orients the second appendage to retrieve a piece of baggage from a first conveyor and the second pose which positions and orients the second appendage to place the retrieved piece of baggage on a second conveyor, the second conveyor different than the first conveyor. The method may further include: generating at least a third motion plan for the first robot that specifies a trajectory for the second appendage between a third pose and a fourth pose, the third pose which positions and orients the second appendage to retrieve the baggage from a first luggage trolley and the fourth pose which positions and orients the second appendage to place the retrieved baggage on a second luggage trolley. The first robot may be a self-propelled robot, the method may further include: generating at least a fourth motion plan for the self-propelled robot that specifies a trajectory for the self-propelled robot through at least a portion of the environment; and causing the self-propelled robot to traverse the trajectory defined by the fourth motion plan; subsequently, causing the second appendage to move along the trajectory defined by the third motion plan. The method may further include: causing the second appendage to move according to the second motion plan. Generating at least a first motion plan for a first robot of the at least one robot may include processing by a plurality of logic circuits of the at least one motion planning processor to determine at least one motion plan. Generating at least a first motion plan for a first robot of the at least one robot may include processing by a plurality of logic circuits of the at least one motion planning processor to determine at least one motion plan. The robotic system may perform the acts autonomously.

A robotic system to handle baggage may be summarized as including: at least one robot, including a first robot; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes a plurality of pieces of baggage; generate at least a first motion plan for a first robot of the at least one robot, the first motion plan that moves at least a portion of the first robot between at least a respective first pose and a respective second pose with respect to the plurality of pieces of baggage; and cause the at least a portion of the first robot to move according to the first motion plan.

A method of operation in a robotic system to handle materials to be recycled, the robotic system including at least one robot and at least one sensor, the method may be summarized as including: receiving information that represents an environment which includes a plurality of pieces of materials for recycling; generating at least a first motion plan for a first robot of the at least one robot, the first motion plan that moves at least a portion of the first robot between at least a respective first pose and a respective second pose with respect to the plurality of pieces of materials for recycling; and causing the at least a portion of the first robot to move according to the first motion plan.

The first robot may be a self-propelled robot, and generating at least a first motion plan for a first robot may include generating at least a first motion plan that specifies a trajectory for the self-propelled robot with respect to the pieces of material for recycling. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and/or one or more proximity sensors mounted to a non-appendage portion of the self-propelled robot, and receiving information that represents an environment which includes a plurality of pieces of materials for recycling may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and/or one or more proximity sensors. Generating at least a first motion plan for a first robot may include generating at least a first motion plan that specifies a trajectory for at least the portion of the first robot with respect to the environment that minimizes a risk of collision with objects in the environment. Generating at least a first motion plan for a first robot may include generating at least a first motion plan that specifies a trajectory for at least the portion of the first robot with respect to the first environment that stops the at least the portion of the first robot if a human-like object is detected in the trajectory of the self-propelled robot. Generating at least a first motion plan for a first robot may include generating at least a first motion plan that specifies a trajectory for the at least the portion of the first robot that changes the trajectory of the at least the portion of the first robot to avoid a human-like object that is detected in the trajectory of the at least the portion of the robot, without stopping a movement of the at least the portion of the first robot. The first robot may include a first appendage with at least one joint and which carries at least one sensor, and generating at least a first motion plan for a first robot may include generating at least a first motion plan that specifies a trajectory for the first appendage with respect to at least one piece of material of the plurality of pieces of material for recycling. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment which includes a plurality of pieces of material for recycling may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The environment may include at least one conveyor, and the first robot may include a first appendage with at least one joint and which carries at least one sensor, and generating at least a first motion plan for a first robot may include generating at least a first motion plan that specifies a trajectory for the first appendage with respect to the at least one conveyor or a piece of material of the plurality of pieces of material for recycling. The environment may include at least one conveyor, and the first robot may include a first appendage with at least one joint and which carries at least one sensor, and generating at least a first motion plan for a first robot may include generating at least a first motion plan that specifies a trajectory for the first appendage to pick up a first piece of material of the plurality of pieces of material for recycling and place the picked up piece of material on a first conveyor of the at least one conveyor. The environment may include at least one conveyor, and the first robot may include a first appendage with at least one joint and which carries at least one sensor, and generating at least a first motion plan for a first robot may include generating at least a first motion plan that specifies a trajectory for the first appendage to pick up a first piece of material of the plurality of pieces of material for recycling from a first conveyor of the at least one conveyor. Generating at least a first motion plan for a first robot may include generating at least a first motion plan that specifies a trajectory for the first appendage to deposit the first piece of material of the plurality of pieces of material for recycling in a defined location. Generating at least a first motion plan for a first robot may include generating at least a first motion plan that specifies a trajectory for the first appendage to deposit the first piece of material of the plurality of pieces of material for recycling on a second conveyor of the at least one conveyor, the second conveyor being a different conveyor from the first conveyor and unconnected thereto. Generating a first motion plan may include generating at least a first motion plan that specifies a trajectory for the first appendage first to retrieve the first piece of material of the plurality of pieces of material for recycling from a first conveyor and second to deposit the first piece of material on the second conveyor. Generating a first motion plan may include generating at least a first motion plan that specifies a trajectory for the first appendage first to retrieve the first piece of material of the plurality of pieces of material for recycling from the first conveyor, matching a first speed of the first conveyor, and second to deposit the first piece of material on the second conveyor, matching a second speed of the second conveyor, the second speed different than the first speed. The first robot may include a second appendage with at least one joint, and generating at least a first motion plan for a first robot may include generating at least a second motion plan that specifies a trajectory for the second appendage with respect to at least one piece of material of the plurality of pieces of material for recycling. The second appendage may carry at least one sensor, and generating at least a first motion plan for a first robot may include generating at least a second motion plan that specifies a trajectory for the second appendage with respect to at least one piece of material of the plurality of pieces of material for recycling or a conveyor. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors, and receiving information that represents an environment which includes a plurality of pieces of materials for recycling may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The second appendage may carry at least one end effector, and generating at least a second motion plan for a first robot may include generating at least a second motion plan that specifies a trajectory for the second appendage with respect to at least one piece of material of the plurality of pieces of material for recycling. The second appendage may carry at least one end effector, and generating at least a second motion plan for a first robot may include generating at least a second motion plan that specifies a trajectory for the second appendage with respect to at least one conveyor or container or pallet. The at least one end effector may include a gripper, a hook, or a claw, and generating at least a second motion plan for a first robot may include generating at least a second motion plan that specifies a trajectory for the second appendage to at least one piece of material of the plurality of pieces of material for recycling. The at least one end effector may include a gripper, a hook, or a claw, and generating at least a second motion plan for a first robot may include generating at least a second motion plan that specifies a trajectory for the second appendage with respect to a conveyor. Generating at least a second motion plan for a first robot may include generating at least a second motion plan that specifies a trajectory for the second appendage between a first pose and a second pose, the first pose which positions and orients the second appendage to retrieve a piece of material from a first area and the second pose which positions and orients the second appendage to place the retrieved piece of material in a second area, the second area spaced from the first area. Generating at least a second motion plan for a first robot may include generating at least a second motion plan that specifies a trajectory for the second appendage between a first pose and a second pose, the first pose which positions and orients the second appendage to retrieve a piece of material from a first area and the second pose which positions and orients the second appendage to place the retrieved piece of material on a conveyor. Generating at least a second motion plan for a first robot may include generating at least a second motion plan that specifies a trajectory for the second appendage between a first pose and a second pose, the first pose which positions and orients the second appendage to retrieve a piece of material from a conveyor and the second pose which positions and orients the second appendage to place the retrieved piece of material in an area that is not a conveyor. Generating at least a second motion plan for a first robot may include generating at least a second motion plan that specifies a trajectory for the second appendage between a first pose and a second pose, the first pose which positions and orients the second appendage to retrieve a piece of material from a conveyor and the second pose which positions and orients the second appendage to place the retrieved piece of material in a container or on a pallet. Generating at least a second motion plan for a first robot may include generating at least a second motion plan that specifies a trajectory for the second appendage between a first pose and a second pose, the first pose which positions and orients the second appendage to retrieve a piece of material from a container or pallet and the second pose which positions and orients the second appendage to place the retrieved piece of material on a conveyor. Generating at least a second motion plan for a first robot may include generating at least a second motion plan that specifies a trajectory for the second appendage between a first pose and a second pose, the first pose which positions and orients the second appendage to retrieve a piece of material from a first conveyor and the second pose which positions and orients the second appendage to place the retrieved piece of material on a second conveyor, the second conveyor different than the first conveyor. The method may further include: generating at least a third motion plan for the first robot that specifies a trajectory for the second appendage between a third pose and a fourth pose, the third pose which positions and orients the second appendage to retrieve the item from a first container or pallet and the second pose which positions and orients the second appendage to place the retrieved piece of material in a second container or on a second pallet. The first robot may be a self-propelled robot, the method may further include: generating at least a fourth motion plan for the self-propelled robot that specifies a trajectory for the self-propelled robot through at least a portion of the environment; and causing the self-propelled robot to traverse the trajectory defined by the fourth motion plan; subsequently, causing the second appendage to move along the trajectory defined by the third motion plan. The method may further include: causing the second appendage to move according to the second motion plan. Generating at least a first motion plan for a first robot of the at least one robot may include processing by a plurality of logic circuits of the at least one motion planning processor to determine at least one motion plan. The robotic system may perform the acts autonomously.

A robotic system to handle materials to be recycled may be summarized as including: at least one robot, including a first robot; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes a plurality of pieces of materials for recycling; generate at least a first motion plan for a first robot of the at least one robot, the first motion plan that moves at least a portion of the first robot between at least a respective first pose and a respective second pose with respect to the plurality of pieces of materials for recycling; and cause the at least a portion of the first robot to move according to the first motion plan.

A method of operation in a robotic medical system, the robotic medical system including at least one robot and at least one sensor, the method may be summarized as including: receiving information that represents an environment which includes bodily tissue; generating at least a first motion plan for a first robot of the at least one robot, the first motion plan moves at least a portion of the first robot between at least a respective first pose and a respective second pose with respect to the bodily tissue; and causing the at least a portion of the first robot to move according to the first motion plan.

The first robot may be a self-propelled robot, and generating at least a first motion plan for a first robot may include generating at least a first motion plan that specifies a trajectory for the self-propelled robot with respect to the bodily tissue. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors mounted to a non-appendage portion of the self-propelled robot, and receiving information that represents the environment which includes the bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. Generating at least a first motion plan for a first robot may include generating at least a first motion plan that specifies a trajectory for at least the portion of the first robot with respect to the environment that minimizes a risk of collision with objects in the environment. Generating at least a first motion plan for a first robot may include generating at least a first motion plan that specifies a trajectory for at least the portion of the first robot with respect to the first environment that stops the at least the portion of the first robot if a human-like object other than a patient or subject is detected in the trajectory of the self-propelled robot. Generating at least a first motion plan for a first robot may include generating at least a first motion plan that specifies a trajectory for the at least the portion of the first robot that changes the trajectory of the at least the portion of the first robot to avoid a human-like object other than a patient or subject that is detected in the trajectory of the at least the portion of the robot, without stopping a movement of the at least the portion of the first robot. The first robot may include a first appendage with at least one joint and which carries at least one sensor, and generating at least a first motion plan for a first robot may include generating at least a first motion plan that specifies a trajectory for the first appendage with respect to at least one piece of bodily tissue. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment which includes bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a first appendage with at least one joint and which carries at least one medical implement, and generating at least a first motion plan for a first robot may include generating at least a first motion plan that specifies a trajectory for the first appendage with respect to the bodily tissue. The first robot may include a first appendage with at least one joint and which carries at least one surgical tool, and generating at least a first motion plan for a first robot may include generating at least a first motion plan that specifies a trajectory for the first appendage to position the surgical tool with respect to the bodily tissue. The first robot may include a first appendage with at least one joint and which carries at least one biopsy needle, and generating at least a first motion plan for a first robot may include generating at least a first motion plan that specifies a trajectory for the first appendage to position the biopsy needle with respect to the bodily tissue. Generating at least a first motion plan for a first robot may include generating at least a first motion plan that specifies a trajectory for the first appendage to position a surgical tool having at least one flexible or deformable portion in a defined location within the bodily tissue. Generating at least a first motion plan for a first robot may include generating at least a first motion plan that specifies a trajectory for the first appendage to position a biopsy needle having at least one flexible portion at a defined location within the bodily tissue and cause the biopsy needle to capture a sample of the bodily tissue at the defined location. Generating a first motion plan may include generating at least a first motion plan that specifies a trajectory for the first appendage first to position a biopsy needle having at least one flexible portion at a defined location within the bodily tissue, then to cause the biopsy needle to capture a sample of the bodily tissue at the defined location, and then to retrieve the captured sample of bodily tissue from the defined location. The first robot may include a first appendage with at least one joint and which carries at least one surgical cutting instrument, and generating at least a first motion plan for a first robot may include generating at least a first motion plan that specifies a trajectory for the first appendage to position the at least one surgical cutting instrument at a position to start a cut in the bodily tissue, to then cut a portion of the bodily tissue, and then to retract from the bodily tissue. The first robot may include a first appendage with at least one joint and which carries at least one surgical cutting instrument, and generating at least a first motion plan for a first robot may include generating at least a first motion plan that specifies a trajectory for the first appendage to position the at least one surgical cutting instrument at a position to start a cut in the bodily tissue taking into account a cutting depth of the surgical cutting instrument, and to then cut a portion of the bodily tissue. The first robot may include a first appendage with at least one joint and which carries at least one non-contact surgical cutting instrument that emits a beam of energy, and generating at least a first motion plan for a first robot may include generating at least a first motion plan that specifies a trajectory for the first appendage to position the at least one surgical cutting instrument at a defined position relative to the bodily tissue and that steers the beam of energy. The first robot may include a first appendage with at least one joint and which carries at least one surgical cutting instrument, and generating at least a first motion plan for a first robot may include generating at least a first motion plan that specifies a trajectory for the first appendage to position the at least one surgical cutting instrument at a defined position relative to the bodily tissue taking into account a movement of at least one organ. The first robot may include a first appendage with at least one joint and which carries at least one surgical cutting instrument, and generating at least a first motion plan for a first robot may include predicting a movement of at least one organ; and generating at least a first motion plan that specifies a trajectory for the first appendage to position the at least one surgical cutting instrument at a defined position relative to the bodily tissue taking into account the predicted movement of at least one organ. Generating at least a first motion plan that specifies a trajectory for the first appendage to position the at least one surgical cutting instrument at a defined position relative to the bodily tissue taking into account a movement of at least one organ may include generating at least a first motion plan that specifies a trajectory for the first appendage to position the at least one surgical cutting instrument at a defined position relative to the bodily tissue taking into account a movement of at least one of a heart or diaphragm or lungs. The first appendage may carry at least one surgical instrument that is responsive to at least one physical characteristic of the bodily tissue, and the method may further include: detecting the at least one physical characteristic of the bodily tissue via the at least one surgical instrument, and receiving information that represents an environment which includes bodily tissue may include receiving information that represents the at least one physical characteristic of the bodily tissue via the at least one surgical instrument carried by the first appendage. Generating a first motion plan may include generating at least a first motion plan that specifies a trajectory for the first appendage first to position a first instrument with respect to the bodily tissue, the first trajectory includes a number of rotations of at least a portion of the first instrument as the first instrument passes through at least of portion of the bodily tissue. The first robot may include a second appendage with at least one joint, and generating at least a first motion plan for a first robot may include generating at least a second motion plan that specifies a trajectory for the second appendage with respect to the bodily tissue. The second appendage may carry at least one sensor, and generating at least a first motion plan for a first robot may include generating at least a second motion plan that specifies a trajectory for the second appendage with respect to the bodily tissue. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors, and receiving information that represents the environment which includes bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a second appendage with at least one joint, and the second appendage carries at least one end effector, and generating at least a second motion plan for a first robot may include generating at least a second motion plan that specifies a trajectory for the second appendage with respect to the bodily tissue. The first robot may include a second appendage with at least one joint, and the second appendage carries at least one surgical instrument, and generating at least a second motion plan for a first robot may include generating at least a second motion plan that specifies a trajectory for the second appendage with respect to the bodily tissue. The surgical instrument may be a biopsy needle, and generating at least a second motion plan for a first robot may include generating at least a second motion plan that specifies a trajectory for the second appendage to position the biopsy needle at a defined location within the bodily tissue. Receiving information that represents an environment which includes bodily tissue may include receiving information that represents a physical characteristic of one or more portions of bodily tissue, and generating at least a second motion plan for a first robot may include generating at least a second motion plan that specifies a trajectory for the second appendage with respect to the bodily tissue based at least in part on information that represents the physical characteristic of one or more portions of bodily tissue. Receiving information that represents an environment which includes bodily tissue may include receiving information that represents a physical characteristic of one or more portions of bodily tissue, and generating at least a second motion plan for a first robot may include generating at least a second motion plan that specifies a trajectory for the second appendage between a first pose and a second pose based on the physical characteristic of one or more portions of bodily tissue, the first pose which positions and orients the second appendage to retrieve a piece of material from a first area and the second pose which positions and orients the second appendage to place the retrieved piece of material in a second area, the second area spaced from the first area. The first robot is a self-propelled robot, the method may further include: generating at least one motion plan for the self-propelled robot that specifies a trajectory for the self-propelled robot through at least a portion of the environment; and causing the self-propelled robot to traverse the trajectory defined by the generated at least one motion plan. Generating at least a first motion plan for a first robot of the at least one robot may include processing by a plurality of logic circuits of the at least one motion planning processor to determine at least one motion plan. The robotic medical system may perform the acts autonomously.

A robotic medical system may be summarized as including: at least one robot, including a first robot; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes bodily tissue; generate at least a first motion plan for a first robot of the at least one robot, the first motion plan moving at least a portion of the first robot between at least a respective first pose and a respective second pose with respect to the bodily tissue; and cause the at least a portion of the first robot to move according to the first motion plan.

A method of operation in a robotic medical system, the robotic medical system including at least one robot and at least one sensor, the at least one robot including at least one source that is operable to emit at least one beam of energy, the method may be summarized as including: receiving information from the at least one sensor, the information representing an environment which includes bodily tissue;

generating at least a first motion plan for a first robot of the at least one robot, the first motion plan defines a trajectory for the beam of energy emitted by the at least one source; and causing the beam of energy to interact with the bodily tissue along the defined trajectory.

The first robot may include a first appendage with at least one head via which the beam of energy is emitted, and generating at least a first motion plan for a first robot may include generating at least a first motion plan that specifies a trajectory for the first appendage with respect to the bodily tissue. The first robot may include a first appendage with at least one joint and which carries at least one surgical cutting instrument that emits the beam of energy, and generating at least a first motion plan for a first robot may include generating at least a first motion plan that specifies a trajectory for the first appendage to position the at least one surgical cutting instrument at a defined position relative to the bodily tissue and that steers the beam of energy. The first robot may include a first appendage with at least one joint and which carries at least one surgical cutting instrument that emits the beam of energy, and generating at least a first motion plan for a first robot may include generating at least a first motion plan that specifies a trajectory for the first appendage to position the at least one surgical cutting instrument at a defined position relative to the bodily tissue taking into account a movement of at least one organ. The first robot may include a first appendage with at least one joint and which carries at least one surgical cutting instrument that emits the beam of energy, and generating at least a first motion plan for a first robot may include predicting a movement of at least one organ; and generating at least a first motion plan that specifies a trajectory for the first appendage to position the at least one surgical cutting instrument at a defined position relative to the bodily tissue taking into account the predicted movement of at least one organ. Generating at least a first motion plan that specifies a trajectory for the first appendage to position the at least one surgical cutting instrument that emits the beam of energy at a defined position relative to the bodily tissue taking into account a movement of at least one organ may include generating at least a first motion plan that specifies a trajectory for the first appendage to position the at least one surgical cutting instrument at a defined position relative to the bodily tissue taking into account a movement of at least one of a heart or diaphragm or lungs over time. The first appendage may carry at least one surgical instrument that is responsive to at least one physical characteristic of the bodily tissue, and the method may further include: detecting the at least one physical characteristic of the bodily tissue via the at least one surgical instrument, and receiving information that represents an environment which includes bodily tissue may include receiving information that represents the at least one physical characteristic of the bodily tissue via the at least one surgical instrument carried by the first appendage. The first robot may include a first appendage with at least one joint and which carries at least one sensor, and generating at least a first motion plan for a first robot may include generating at least a first motion plan that specifies a trajectory for the first appendage with respect to at least one piece of bodily tissue. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment which includes bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a second appendage with at least one joint, and generating at least a first motion plan for a first robot may include generating at least a second motion plan that specifies a trajectory for the second appendage with respect to the bodily tissue. The second appendage may carry at least one sensor, and generating at least a first motion plan for a first robot may include generating at least a second motion plan that specifies a trajectory for the second appendage with respect to the bodily tissue. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors, and receiving information that represents the environment which includes bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The second appendage may carry at least one end effector, and generating at least a second motion plan for a first robot may include generating at least a second motion plan that specifies a trajectory for the second appendage with respect to the bodily tissue and which does not collide with the first appendage. The second appendage may carry at least one surgical instrument, and generating at least a second motion plan for a first robot may include generating at least a second motion plan that specifies a trajectory for the second appendage with respect to the bodily tissue and which does not collide with the first appendage. The second appendage may carry at least one target, and generating at least a second motion plan for a first robot may include generating at least a second motion plan that specifies a trajectory for the second appendage with respect to the bodily tissue and which does not collide with the first appendage. The first robot is a self-propelled robot, and generating at least a first motion plan for a first robot may include generating at least a first motion plan that specifies a trajectory for the self-propelled robot with respect to the bodily tissue. Generating at least a first motion plan for a first robot of the at least one robot may include processing by a plurality of logic circuits of the at least one motion planning processor to determine at least one motion plan. The robotic medical system may perform the acts autonomously.

A robotic medical system may be summarized as including: at least one robot, including a first robot including at least one source that is operable to emit at least one beam of energy; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes bodily tissue; generate at least a first motion plan for a first robot of the at least one robot, the first motion plan defines a trajectory for the beam of energy emitted by at least one source; and cause the beam of energy to interact with the bodily tissue along the defined trajectory.

A method of operation in a robotic dental system, the robotic dental system including at least one robot and at least one sensor, the method may be summarized as including: receiving information that represents an environment which includes one or more of: gums and a number of teeth in a mouth; generating at least a first motion plan for a first robot of the at least one robot, the first motion plan that moves at least a portion of the first robot between at least a respective first pose and a respective second pose with respect to the number of teeth; and causing the at least a portion of the first robot to move according to the first motion plan.

The first robot may be a self-propelled robot, and generating at least a first motion plan for a first robot may include generating at least a first motion plan that specifies a trajectory for the self-propelled robot with respect to the number of teeth. The at least one sensor may be carried by the self-propelled robot and may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors mounted to a non-appendage portion of the self-propelled robot, and receiving information that represents the environment which includes the one or more of: gums and a number of teeth may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. Generating at least a first motion plan for a first robot may include generating at least a first motion plan that specifies a trajectory for at least the portion of the first robot with respect to the environment that minimizes a risk of collision with objects in the environment. The first robot may include a first appendage with at least one joint and which carries at least one sensor, and generating at least a first motion plan for a first robot may include generating at least a first motion plan that specifies a trajectory for the first appendage with respect to at least one piece of number of teeth. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment which includes number of teeth may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a first appendage with at least one joint and which carries at least one dental instrument, and generating at least a first motion plan for a first robot may include generating at least a first motion plan that specifies a trajectory for the first appendage with respect to the number of teeth to locate the dental instrument relative to at least one tooth. The first robot may include a first appendage with at least one joint and which carries at least one dental drill, and generating at least a first motion plan for a first robot may include generating at least a first motion plan that specifies a trajectory for the first appendage to position the dental drill with respect relative to at least one tooth. The first robot may include a first appendage with at least one joint and which carries at least one dental polisher, and generating at least a first motion plan for a first robot may include generating at least a first motion plan that specifies a trajectory for the first appendage to position the dental polisher with respect to the number of teeth. The first robot may include a first appendage with at least one joint and which carries at least one ultraviolet light source, and generating at least a first motion plan for a first robot may include generating at least a first motion plan that specifies a trajectory for the first appendage to position the at least one ultraviolet light source with respect to the number of teeth. The first robot may include a first appendage with at least one joint and which carries at least one x-ray source, and generating at least a first motion plan for a first robot may include generating at least a first motion plan that specifies a trajectory for the first appendage to position the at least one x-ray source with respect to the number of teeth. The first robot may include a first appendage with at least one joint and which carries at least one sensor, and generating at least a first motion plan for a first robot may include generating at least a first motion plan that specifies a trajectory for the first appendage to position the at least one imager sensor with respect to the number of teeth. Generating at least a first motion plan for a first robot may include generating at least a first motion plan that specifies a trajectory for the first appendage to position a dental instrument having at least one flexible or deformable portion in a defined location relative to at least one of the teeth. Generating at least a first motion plan for a first robot may include generating at least a first motion plan that specifies a trajectory for the first appendage to position a needle at a defined location relative to at least one of the teeth. The first appendage may carry at least one surgical instrument that is responsive to at least one physical characteristic of the number of teeth, and the method may further include: detecting the at least one physical characteristic of the number of teeth via the at least one surgical instrument, and receiving information that represents an environment which includes number of teeth may include receiving information that represents the at least one physical characteristic of the number of teeth via the at least one surgical instrument carried by the first appendage. The first robot may include a second appendage with at least one joint, and generating at least a first motion plan for a first robot may include generating at least a second motion plan that specifies a trajectory for the second appendage with respect to the number of teeth. The second appendage may carry at least one sensor, and generating at least a first motion plan for a first robot may include generating at least a second motion plan that specifies a trajectory for the second appendage with respect to the number of teeth. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors, and receiving information that represents the environment which includes number of teeth may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a second appendage with at least one joint, the second appendage carries at least one end effector, and generating at least a second motion plan for a first robot may include generating at least a second motion plan that specifies a trajectory for the second appendage with respect to the number of teeth. The first robot may include a second appendage with at least one joint, the second appendage carries at least one dental instrument, and generating at least a second motion plan for a first robot may include generating at least a second motion plan that specifies a trajectory for the second appendage with respect to the number of teeth. The dental instrument may be at least one of a dental drill, a needle, a dental polisher, an ultraviolet source, or an x-ray source, and generating at least a second motion plan for a first robot may include generating at least a second motion plan that specifies a trajectory for the second appendage to position the dental instrument at a defined location with respect to at least one of the teeth. Receiving information that represents an environment which includes number of teeth may include receiving information that represents a physical characteristic of one or more portions of at least one of the teeth, and generating at least a second motion plan for a first robot may include generating at least a second motion plan that specifies a trajectory for the second appendage with respect to the number of teeth based at least in part on information that represents the physical characteristic of one or more portions of the at least one of the teeth. Receiving information that represents an environment which includes number of teeth may include receiving information that represents a physical characteristic of one or more portions of number of teeth, and generating at least a second motion plan for a first robot may include generating at least a second motion plan that specifies a trajectory for the second appendage between a first pose and a second pose based on the physical characteristic of one or more portions of number of teeth, the first pose which positions and orients the second appendage to perform work on one of the teeth from each of at least two different poses. The first robot may be a self-propelled robot, the method may further include: generating at least one motion plan for the self-propelled robot that specifies a trajectory for the self-propelled robot through at least a portion of the environment; and causing the self-propelled robot to traverse the trajectory defined by the generated at least one motion plan. Generating at least a first motion plan for a first robot of the at least one robot may include processing by a plurality of logic circuits of the at least one motion planning processor to determine at least one motion plan. The robotic dental system may perform the acts autonomously.

A robotic dental system may be summarized as including: at least one robot, including a first robot; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes one or more of: gums and a number of teeth; generate at least a first motion plan for a first robot of the at least one robot, the first motion plan moving at least a portion of the first robot between at least a respective first pose and a respective second pose with respect to the number of teeth; and cause the at least a portion of the first robot to move according to the first motion plan.

A method of operation in a drone system including at least one drone and at least one sensor, the method may be summarized as including: receiving information that represents an environment in which the at least one drone operates; generating at least a first motion plan for a first drone of the at least one drone, the first motion plan moving at least a portion of the first drone between at least a respective first pose and a respective second pose with respect to the environment; and causing at least the first drone to move according to the first motion plan.

The first drone may be at least one of a self-propelled flying drone, a self-propelled land drone, a self-propelled waterborne drone, a self-propelled underwater drone, or a self-propelled amphibious drone, and generating at least a first motion plan for a first drone may include generating at least a first motion plan that specifies a trajectory for the first drone with respect to the environment. The at least one sensor may be carried by the first drone and may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors mounted to a non-appendage portion of the first drone, and receiving information that represents the environment may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. Generating at least a first motion plan for a first drone may include generating at least a first motion plan that specifies a trajectory for at least the portion of the first drone with respect to the environment that minimizes a risk of collision with objects in the environment. The first drone may include a first appendage with at least one joint and which carries at least one sensor, and generating at least a first motion plan for a first drone may include generating at least a first motion plan that specifies a trajectory for the first appendage with respect to the environment in which the first drone operates. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first drone may include a first grip that is selectively operable to releasably retain an item carried by the first drone, and generating at least a first motion plan for a first drone may include generating at least a first motion plan that specifies a trajectory for the first drone with respect to the environment to a pose at which the first grip is selectively controlled to release the item carried by the first drone. The first drone may include a first grip which carries at least one item with an associated parachute, and generating at least a first motion plan for a first drone may include generating at least a first motion plan that specifies a trajectory for the first drone with respect to the environment to a pose at which the first grip is selectively controlled to release the item carried by the first drone with the associated parachute. The first drone may include a first winch with a cable, the first winch operable selectively retract and payout the cable, and generating at least a first motion plan for a first drone may include generating at least a first motion plan that specifies a trajectory for the first drone with respect to the environment to a pose at which the first winch is selectively controlled to payout the cable. Generating at least a first motion plan for a first drone may include generating at least a first motion plan that accommodates for at least one physical characteristic of a payload carried by the first drone. Generating at least a first motion plan for a first drone may include generating at least a first motion plan that accommodates for an external force experienced by the first drone as the first drone traverses at least a portion of the environment. Generating at least a first motion plan for a first drone may include generating at least a first motion plan that accommodates for a wind velocity, a wave velocity, current velocity, or a tidal velocity that will be experienced by the first drone as the first drone traverses at least a portion of the environment. The first drone may carry at least one sensor that is responsive to at least one physical characteristic of in the environment, and generating at least a first motion plan for a first drone may include generating at least a first motion plan that moves the first drone with respect to an item to be inspected, to sense information from a plurality of successive poses with respect to the item to be inspected. Generating at least a first motion plan for a first drone may include generating at least a first motion plan that accommodates for one or more obstacles in the environment. Generating at least a first motion plan for a first drone may include generating at least a first motion plan that accommodates for one or more of kelp, coral, rocks, or vehicles. The generating at least a first motion plan for a first drone may include generating at least a first motion plan that specifies a first trajectory that moves the first drone from a first location to a first target location and a second motion plan that specifies a second trajectory about the first target location. The generating at least a first motion plan for a first drone may further include generating at least a third motion plan that specifies a third trajectory that moves the first drone from a first target to a second target location. The generating at least a first motion plan for a first drone may further include generating at least a fourth motion plan that specifies a fourth trajectory that moves the first drone from the second target location to the first location. The generating at least a first motion plan for a first drone may further include generating at least a third motion plan that specifies a third trajectory that moves the first drone from the first target location to the first location. The first drone may be a self-propelled, autonomous vehicle, the method may further include: generating at least one motion plan for the self-propelled, autonomous vehicle that specifies a trajectory for self-propelled, autonomous vehicle through at least a portion of the environment; and causing the self-propelled, autonomous vehicle to traverse the trajectory defined by the generated at least one motion plan. The first drone may be an aquatic vehicle and generating at least a first motion plan for a first drone may include generating at least a first motion plan that docks the aquatic drone in a desired pose at a dock. The first drone may be an airborne vehicle and generating at least a first motion plan for a first drone may include generating at least a first motion plan that docks the airborne vehicle in a desired pose at a dock. Generating at least a first motion plan for a first drone of the at least one drone may include processing by a plurality of logic circuits of the at least one motion planning processor to determine at least one motion plan. The drone system may perform the acts autonomously.

A drone system may be summarized as including: at least one drone; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment in which the at least one drone operates; generate at least a first motion plan for a first drone of the at least one robot, the first motion plan moving at least a portion of the first drone between at least a respective first pose and a respective second pose with respect to the environment; and cause the at least a portion of the first drone to move according to the first motion plan.

A method of operation in a robotic system, the robotic system including at least one motion planning processor and at least one robot, the at least one robot having at least one appendage, the at least one appendage having at least one joint and at least one end effector, the method may be summarized as including: receiving information that represents a respective position and orientation of each of a plurality of like pieces of building material of a first type, the like pieces of building material of the first type accessible by the at least one end effector; determining a first one of the like pieces of building material of the first type to retrieve; processing by a plurality of logic circuits of the at least one motion planning processor to determine at least one motion plan for the at least one appendage of the at least one robot that moves the at least one appendage from a first pose to a second pose without collisions, the first pose being a position and an orientation in which the determined first one of like pieces of building material of the first type is graspable/engageable by the at least one end effector and the second pose being a position and orientation in which the at least one end effector places the first one of the like pieces of building material of the first type in physical engagement with at least one other piece of building material; and causing the at least one robot to execute at least one of the determined motion plans by moving the at least one appendage from the first pose to the second pose without collisions.

The method may further include: receiving information that represents a respective position and orientation of each of a plurality of like pieces of building material of a second type, the like pieces of building material of the second type being like each other and unlike the like pieces of building material of the first type, the like pieces of building material of the second type accessible by the at least one end effector; determining a first one of the like pieces of building material of the second type to retrieve; processing by a plurality of logic circuits of the at least one motion planning processor, to determine at least one motion plan for the at least one appendage of the at least one robot that moves the at least one appendage from a third pose to a fourth pose without collisions, the third pose being a position and orientation in which the determined first one of the like parts of pieces of building material the second type is graspable/engageable by the at least one end effector and the fourth pose being a position and orientation in which the at least one end effector places the first one of the like pieces of building material of the second type in physical engagement with at least one other piece of building material; and causing the at least one robot to execute at least one of the determined motion plans by moving the at least one appendage from the third pose to the fourth pose without collisions. The method may further include: after causing the at least one robot to execute at least one of the determined motion plans by moving the at least one appendage from the first pose to the second pose without collisions, causing the at least one robot to secure the determined the first one of the like pieces of building material of the first type with at least one other piece of building material. The pieces of building material of the first type may be bricks, and processing by a plurality of logic circuits of the at least one motion planning processor, to determine at least one motion plan for the at least one appendage may include processing by a plurality of logic circuits of the at least one motion planning processor, to determine at least one motion plan for the at least one appendage that positions the at least one appendage to retrieve bricks from a supply of bricks and that positions the at least one appendage to deposit the retrieved bricks as a wall. The pieces of building material of the first type may be pieces of dimensional lumber, and processing by a plurality of logic circuits of the at least one motion planning processor, to determine at least one motion plan for the at least one appendage may include processing by a plurality of logic circuits of the at least one motion planning processor, to determine at least one motion plan for the at least one appendage that positions the at least one appendage to retrieve the pieces of dimensional lumber from a supply of dimensional lumber and that positions the at least one appendage to deposit the retrieved pieces of dimensional lumber as at least one of a wall, a floor or a roof. The pieces of building material of the first type may be metal studs or metal trusses, and processing by a plurality of logic circuits of the at least one motion planning processor, to determine at least one motion plan for the at least one appendage may include processing by a plurality of logic circuits of the at least one motion planning processor, to determine at least one motion plan for the at least one appendage that positions the at least one appendage to retrieve metal studs or metal trusses from a supply of metal studs or metal trusses and that positions the at least one appendage to deposit the retrieved metal studs or metal trusses as a wall. The pieces of building material of the first type may be parts of a piece of furniture, and processing by a plurality of logic circuits of the at least one motion planning processor, to determine at least one motion plan for the at least one appendage may include processing by a plurality of logic circuits of the at least one motion planning processor, to determine at least one motion plan for the at least one appendage that positions the at least one appendage to retrieve parts of a piece of furniture from a supply of parts of a piece of furniture and that positions the at least one appendage to deposit the retrieved parts of a piece of furniture as a piece of furniture. The method may further include receiving information that represents a respective position and orientation of each of the like pieces of building material of the first type. Receiving information that represents a respective position and orientation of each of a plurality of like pieces of building material may include receiving one or more images of at least a subset of all of the like pieces of building material of the first type in at least a portion of a collection of the like pieces of building material of the first type, and the method may further include: performing image recognition on at least some of the captured images to identify individual ones of the like pieces of building material of the first type and a position and an orientation of the individual like pieces of building material of the first type in the collection of pieces of building material of the first type. A first appendage of the at least one appendage may carry at least one sensor, and the method may further include capturing information that represents a respective position and orientation of each of the plurality of like pieces of building material of the first type in a first bulk parts container by the at least one sensor carried by the first appendage, and generating a first motion plan may include generating a first motion plan based at least in part on the captured information. Generating a first motion plan based at least in part on the captured information may include generating the first motion plan in which the first appendage moves from a respective first pose to a respective second pose, the respective second pose which positions the at least one sensor carried by the first appendage to operatively sense a portion of an environment. A second appendage of the at least one appendage may carry at least one end effector and the method may further include: generating a second motion plan based at least in part on the captured information, the second motion plan in which the second appendage moves from a respective first pose to a respective second pose, the respective second pose which positions the end effector of the second appendage to operatively engage an object within the portion of the environment that is sensed by the at least one sensor. A first appendage of the at least one appendage may carry at least one image sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. A first appendage of the at least one appendage may carry at least one contact sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. A first appendage of the at least one appendage may carry at least one capacitive sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one capacitive sensor carried by the first appendage to operatively sense a portion of an environment. A first appendage of the at least one appendage may carry at least one force sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one force sensor carried by the first appendage to operatively sense a portion of an environment. A first appendage of the at least one appendage may carry at least one proximity sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one proximity sensor carried by the first appendage to operatively sense a portion of an environment. The robotic system may include at least a first appendage and a second appendage, and motion planning may include determining motion plans for each of the first and the second appendages to pass the determined first one of the like pieces of building material of the first type between the first and the second appendages. The robotic system may perform the acts autonomously.

A robotic system may be summarized as including: at least one robotic appendage, the at least one appendage having at least one joint and at least one end effector; at least one motion planning processor; and at least one nontransitory processor-readable medium that stores at least one of processor-executable instructions or data which, when executed by the at least one motion planning processor, causes that at least one motion planning processor to: receive captured information that represents a respective position and orientation of each of a plurality of like pieces of building material of a first type, the like pieces of building material of the first type accessible by the at least one end effector; determine a first one of the like pieces of building material of the first type to retrieve; process by a plurality of logic circuits of the at least one motion planning processor to determine at least one motion plan for the at least one appendage of the at least one robot that moves the at least one appendage from a first pose to a second pose without collisions, the first pose being a position and an orientation in which the determined first one of like pieces of building material of the first type is graspable/engageable by the at least one end effector and the second pose being a position and orientation in which the at least one end effector places the first one of the like pieces of building material of the first type in physical engagement with at least one other piece of building material; and cause the at least one robot to execute at least one of the determined motion plans by moving the at least one appendage from the first pose to the second pose without collisions.

A method of operation in a robotic system, the robotic system including at least one motion planning processor and at least one robot, the at least one robot having at least one appendage, the at least one appendage having at least one joint and at least one end effector, the at least one end effector including at least one of a brush or a nozzle, the method may be summarized as including: receiving information that represents a respective position and orientation of the end effector relative to a structure; determining at least one motion plan for the at least one appendage of the at least one robot that moves the at least one appendage from a first pose to a second pose without collisions, in the second pose the first end effector in a position and an orientation to deposit a material on at least a portion of the structure; and causing the at least one robot to execute at least one of the determined motion plans by moving the at least one appendage from the first pose to the second pose without collisions.

The method may further include: after causing the at least one robot to execute at least one of the determined motion plans by moving the at least one appendage from the first pose to the second pose without collisions, causing the at least one robot to deposit the material on the at least a portion of the structure. The material may be paint, and the method may further include: after causing the at least one robot to execute at least one of the determined motion plans by moving the at least one appendage from the first pose to the second pose without collisions, causing the at least one robot to deposit the paint on the at least a portion of the structure. The material may be stucco and the structure includes a lath, and the method may further include: after causing the at least one robot to execute at least one of the determined motion plans by moving the at least one appendage from the first pose to the second pose without collisions, causing the at least one robot to deposit the stucco on the at least a portion of the lath. The material may be thermal insulation, and the method may further include: after causing the at least one robot to execute at least one of the determined motion plans by moving the at least one appendage from the first pose to the second pose without collisions, causing the at least one robot to deposit the thermal insulation on the at least a portion of the structure. The material may be a sealant, and the method may further include: after causing the at least one robot to execute at least one of the determined motion plans by moving the at least one appendage from the first pose to the second pose without collisions, causing the at least one robot to deposit the sealant on the at least a portion of the structure. Receiving information that represents a respective position and orientation of the end effector relative to a structure may include receiving information that represents the position and orientation of a first end effector with respect to a wall. Receiving information that represents the position and orientation of a first end effector with respect to a wall may include receiving one or more images of at least a portion of the wall, and the method may further include: performing image recognition on at least some of the captured images to identify a position and an orientation of the first end effector with respect to the wall. Determining a first motion plan may include determining at least one motion plan includes generating at least one motion plan based at least in part on the received information that represents a respective position and orientation of the end effector relative to a structure. Generating a first motion plan based at least in part on the captured information may include generating the first motion plan in which the first appendage moves from a respective first pose to a respective second pose, the respective second pose which positions the at least one sensor carried by the first appendage to operatively sense a portion of an environment. A second appendage of the at least one appendage may carry at least one end effector and the method may further include: generating a second motion plan based at least in part on the captured information, the second motion plan in which the second appendage moves from a respective first pose to a respective second pose, the respective second pose which positions the end effector of the second appendage to operatively engage an object within the portion of the environment that is sensed by the at least one sensor. A first appendage of the at least one appendage may carry at least one image sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. A first appendage of the at least one appendage may carry at least one contact sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. A first appendage of the at least one appendage may carry at least one capacitive sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one capacitive sensor carried by the first appendage to operatively sense a portion of an environment. A first appendage of the at least one appendage may carry at least one force sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one force sensor carried by the first appendage to operatively sense a portion of an environment. A first appendage of the at least one appendage may carry at least one proximity sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one proximity sensor carried by the first appendage to operatively sense a portion of an environment. The robotic system may include at least a first appendage and a second appendage, and motion planning may include determining motion plans for each of the first and the second appendages to pass the determined first one of the like pieces of building material of the first type between the first and the second appendages. The robotic system may perform the acts autonomously.

A robotic system may be summarized as including: at least one robot, the at least one robot having at least one appendage, the at least one appendage having at least one joint and at least one end effector, the at least one end effector including at least one of a brush or a nozzle; at least one motion planning processor; and at least one nontransitory processor-readable medium that stores at least one of processor-executable instructions or data which, when executed by the at least one motion planning processor, causes that at least one motion planning processor to: receive information that represents information that represents a respective position and orientation of the end effector relative to a structure; determine at least one motion plan for the at least one appendage of the at least one robot that moves the at least one appendage from a first pose to a second pose without collisions, in the second pose the first end effector in a position and an orientation to deposit a material on at least a portion of the structure; and cause the at least one robot to execute at least one of the determined motion plans by moving the at least one appendage from the first pose to the third pose without collisions.

A method of operation in a robotic system to perform line inspection, the robotic system including at least one robot that carries at least one sensor, the method may be summarized as including: generating at least a first motion plan for a first robot of the at least one robot, the first motion plan moving at least a portion of the first robot between at least a respective first pose and a respective second pose with respect to a first line to be inspected to sense at least one physical characteristic of the line; causing the at least a portion of the first robot to move according to the first motion plan; and successively capturing information that represents at least one physical characteristic of the first line in at least one of the first pose, the second pose or an intermediary pose between the first and the second poses.

The first robot may be a self-propelled robot, and generating at least a first motion plan for a first robot may include generating at least a first motion plan that specifies a trajectory for the self-propelled robot with respect to a path along which the first line extends. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and successively capturing information that represents at least one physical characteristic of the first line may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: successively capturing information that represents a location of the first robot as the first robot moves along the path along which the first line extends. The method may further include: successively capturing information that represents at least one physical characteristic of the first line, and generating at least a first motion plan for a first robot may include generating at least a first motion plan that specifies a trajectory for the self-propelled robot with respect to the path along which the first line extends if a human-like object is detected in the trajectory of the self-propelled robot. The method may further include: successively capturing information that represents at least one physical characteristic of the first line, and generating at least a first motion plan for a first robot may include generating at least a first motion plan that specifies a trajectory for the self-propelled robot with respect to the path along which the first line extends that changes the trajectory of the self-propelled robot to avoid a human-like object that is detected in the trajectory of the self-propelled robot, without stopping a movement of the self-propelled robot. The first robot may include a first appendage with at least one joint and which carries at least one sensor, and generating at least a first motion plan for a first robot may include generating at least a first motion plan that specifies a trajectory for the first appendage with respect to the first line. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and successively capturing information that represents at least one physical characteristic of the first line may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The first robot may include a second appendage with at least one joint, and generating at least a first motion plan for a first robot may include generating at least a second motion plan that specifies a trajectory for the second appendage with respect to the first line. The second appendage may carry at least one sensor, and generating at least a first motion plan for a first robot may include generating at least a second motion plan that specifies a trajectory for the second appendage with respect to a second line. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and successively capturing information that represents at least one physical characteristic of the first line may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The second appendage may carry at least one end effector, and generating at least a second motion plan for a first robot may include generating at least a second motion plan that specifies a trajectory for the second appendage with respect to the first line. The second appendage may carry at least one end effector, and generating at least a second motion plan for a first robot may include generating at least a second motion plan that specifies a trajectory for the second appendage with respect to a second line. The at least one end effector may include a gripper, a hook, or a claw, and generating at least a second motion plan for a first robot may include generating at least a second motion plan that specifies a trajectory for the second appendage with respect to the first line. The at least one end effector may include a gripper, a hook, or a claw, and generating at least a second motion plan for a first robot may include generating at least a second motion plan that specifies a trajectory for the second appendage with respect to the first line. The first line may be an electrical line, and generating at least a second motion plan for a first robot may include generating at least a second motion plan that specifies a trajectory for the second appendage between a first pose and a second pose, the first pose which positions and orients the second appendage to engage the electrical line. The first line may be a gas line, and generating at least a second motion plan for a first robot may include generating at least a second motion plan that specifies a trajectory for the second appendage between a first pose and a second pose, the first pose which positions and orients the second appendage to operatively engage the gas line. The first line may be a water line, and generating at least a second motion plan for a first robot may include generating at least a second motion plan that specifies a trajectory for the second appendage between a first pose and a second pose, the first pose which positions and orients the second appendage to operatively engage the water line. The first line may be a communications line, and generating at least a second motion plan for a first robot may include generating at least a second motion plan that specifies a trajectory for the second appendage between a first pose and a second pose, the first pose which positions and orients the second appendage to operatively engage the communications line. The method may further include: generating at least a third motion plan for the first robot that specifies a trajectory for the second appendage between a third pose and a fourth pose, the fourth pose which positions and orients the second appendage to retrieve the item from the first appendage. The first robot may be a self-propelled robot, the method may further include: generating at least a fourth motion plan for the self-propelled robot that specifies a trajectory for the self-propelled robot between the first line and the second line; causing the self-propelled robot to traverse the trajectory defined by the fourth motion plan; and subsequently, causing the second appendage to move along the trajectory defined by the third motion plan. The method may further include: causing the second appendage to move according to the second motion plan. Generating at least a first motion plan for a first robot of the at least one robot may include processing by a plurality of logic circuits of the at least one motion planning processor to determine at least one motion plan. The robotic system may perform the acts autonomously.

A robotic system to perform line inspection may be summarized as including: at least one robot, including a first robot; at least one sensor, the at least one sensor carried by that at least one robot; at least one motion planning processor; and at least one nontransitory processor-readable medium that stores at least one of processor-executable instructions or data which, when executed by the at least one motion planning processor, causes that at least one motion planning processor to: generate at least a first motion plan for a first robot of the at least one robot, the first motion plan that moves at least a portion of the first robot between at least a respective first pose and a respective second pose with respect to a first line to be inspected to sense at least one physical characteristic of the line; cause the first robot to move according to the first motion plan; and successively capture information that represents at least one physical characteristic of the first line in at least one of the first pose, the second pose or an intermediary pose between the first and the second poses.

A method of operation in a robotic system to pick fruit, the robotic system including at least a first appendage, the first appendage moveable within a first operational volume, the first appendage carrying a respective end effector, the method may be summarized as including: generating at least a first motion plan for the first appendage that moves the first appendage between at least a respective first pose and a respective second pose within the first operational volume without collisions, the first pose locating a portion of the first appendage with respect to a branch bearing one or more pieces of fruit and the second pose locating the end effector carried by the first appendage to physically engage one of the pieces of fruit to move the one of the pieces of fruit from the branch; and causing the first appendage to move according to the first motion plan.

The respective end effector carried by the first appendage may be a gripper and the second pose positions and orients the gripper to grip the piece of fruit. The respective end effector carried by the first appendage may be a blade and the second pose positions and orients the gripper to cut a portion of the piece of fruit that attaches the piece of fruit to the branch. The respective end effector carried by the first appendage may be a blade and the second pose positions and orients the blade to cut a portion of the branch that bears the piece of fruit. The respective end effector carried by the first appendage may be a pruning shears and the second pose positions and orients the pruning shears to cut a portion of the piece of fruit that attaches the piece of fruit to the branch or a portion of the branch that bears the piece of fruit. The respective end effector carried by the first appendage may be a gripper and the second pose positions and orients the gripper to grip the branch that bears the piece of fruit and oscillate the gripped branch that bears the piece of fruit. The first appendage may further carry at least one sensor, and the method may further include: receiving information via the at least one sensor. The first appendage may further carry at least one sensor, and the method may further include: receiving information via the at least one sensor, wherein generating at least a first motion plan may include generating at least a first motion plan based at least in part on the information received via the at least one sensor carried by the first appendage. The first appendage may further carry at least one image sensor, and the method may further include: receiving image information via the at least one image sensor when the first appendage is in the respective first pose, wherein generating at least a first motion plan may include generating at least a first motion plan where the second pose is based at least in part on the image information received via the at least one image sensor carried by the first appendage in the first pose. Generating a first motion plan may include generating a first motion in which in at least one pose of at least the first appendage the piece of fruit is transferrable into a collection bin. The robotic system may include at least a second appendage, the second appendage moveable within a second operational volume, at least a portion of the second operational volume overlapping with at least a portion of the first operational volume such that the first and second appendages are capable of physically colliding with one another, the method may further include: generating at least a second motion plan for the second appendage that moves the second appendage between at least a respective first pose and a respective second pose within the second operational volume without collisions at least between the first and the second appendages; and causing the second appendage to move according to the second motion plan. The second appendage may carry a collection bin, and generating a second motion plan may include generating a second motion plan in which the respective second pose of the second appendage is a pose in which the collection bin is positioned and oriented to receive the piece of fruit physically engaged by the end effector carried by the first appendage. The second appendage may carry a collection bin, and generating a second motion plan may include generating a second motion plan in which the respective second pose of the second appendage is a pose in which the collection bin is positioned and oriented relatively below the piece of fruit physically engaged by the end effector carried by the first appendage, with an opening of the collection bin facing up to receive the piece of fruit as the piece of fruit falls under an influence of gravity. The second appendage may further carry at least one sensor, and the method may further include: receiving information via the at least one sensor carried by the second appendage when the second appendage is in the respective first pose, wherein generating at least a second motion plan may include generating at least a second motion plan where the second pose is based at least in part on the information received via the at least one sensor carried by the second appendage in the second pose. The second appendage may further carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The second appendage may carry at least one sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The second appendage may carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The second appendage may carry a respective end effector, and generating a second motion plan may include generating a second motion plan in which the second pose of at least one of the second appendage is a pose in which the piece of fruit is transferrable into a collection bin from the respective end effector of carried by one of the first or the second appendages. The second appendage may carry a respective end effector, and generating a first motion plan and a second motion plan may include generating a first motion plan and a second motion plan in which the second pose of at least one of the first appendage or the second appendage is a pose in which the piece of fruit is transferrable from the respective end effector carried by one of the first or the second appendages to the respective end effector carried by the other one of the first or the second appendages. The second appendage may carry a respective end effector, and generating a second motion plan may include generating a second motion plan in which the respective second pose of the second appendage positions the end effector carried by the second appendage to operatively engage the branch bearing a first piece of fruit, and generating a first motion plan includes generating a first motion plan in which the respective second pose of the first appendage positions the respective end effector carried by the first appendage to operatively engage the first piece of fruit while the respective end effector carried by the second appendage operatively engages the branch which bears the first piece of fruit. The second appendage may further carry at least one sensor, and the method may further include: receiving information via the at least one sensor carried by the second appendage when the second appendage is in the respective first pose, wherein generating at least a second motion plan may include generating at least a second motion plan where the second pose is based at least in part on the information received via the at least one sensor carried by the second appendage in the second pose. The second appendage may further carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and receiving information via that at least one sensor may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: dynamically generating a plurality of updated first motion plans while causing the first appendage to move at least partially between the respective first and the respective second poses. The robotic system may include a first self-propelled robot, and generating at least a first motion plan may include generating at least a first motion plan that specifies a trajectory for the first self-propelled robot through at least a portion of an orchard. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; and causing the third appendage to move according to the third motion plan. The robotic system may perform the acts autonomously.

A robotic system to pick fruit may be summarized as including: at least a first appendage that is moveable within a first operational volume, the first appendage carrying a respective end effector; at least one motion planning processor; and at least one nontransitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions, the first pose locating a portion of the first appendage with respect to a branch bearing one or more pieces of fruit and the second pose locating the end effector carried by the first appendage to physically engage one of the pieces of fruit to move the one of the pieces of fruit from the branch; and cause the first appendage to move according to the first motion plan.

A method of operation in a robotic system to interact with plants, the robotic system including at least a first appendage, the first appendage moveable within a first operational volume, the first appendage carrying at least one sensor, the method may be summarized as including: generating at least a first motion plan for the first appendage that moves the first appendage between at least a respective first pose and a respective second pose within the first operational volume without collisions, the first pose locating a portion of the first appendage with respect to a branch bearing one or more pieces of fruit and the second pose locating the at least one sensor carried by the first appendage with respect to at least one portion of at least one plant; causing the first appendage to move according to the first motion plan; and receiving information via the at least one sensor.

Generating at least a first motion plan may include generating at least a first motion plan based at least in part on the information received via the at least one sensor carried by the first appendage. The at least one sensor carried by the first appendage may include at least one image sensor, and generating at least a first motion plan may include generating at least a first motion plan based at least in part on the image information received via the at least one image sensor carried by the first appendage. The first appendage may further carry at least one end effector, and generating at least a first motion plan for the first appendage may include generating at least a first motion plan that positions and orients the at least one end effector carried by the first appendage in contact with the portion of the plant. The plant may be a tree and the first appendage may further carry at least one end effector, and generating at least a first motion plan for the first appendage may include generating at least a first motion plan that positions and orients the at least one end effector carried by the first appendage in contact with the portion of the tree. The plant may be a tree and the first appendage may further carry at least one end effector, and generating at least a first motion plan for the first appendage may include generating at least a first motion plan that positions and orients the at least one end effector carried by the first appendage in contact with a branch of the tree. The at least one end effector carried by the first appendage may be a gripper, and generating at least a first motion plan for the first appendage may include generating at least a first motion plan that positions and orients the at least one gripper to grip the portion of the plant. The at least one end effector carried by the first appendage may be a saw blade, and generating at least a first motion plan for the first appendage may include generating at least a first motion plan that positions and orients the at least one saw blade to cut the portion of the plant and to oscillate the saw blade. The at least one end effector carried by the first appendage may be a saw blade, and generating at least a first motion plan for the first appendage may include generating at least a first motion plan that positions and orients the at least one saw blade to cut the portion of the plant. The at least one end effector carried by the first appendage may be a pruning shears, and generating at least a first motion plan for the first appendage may include generating at least a first motion plan that positions and orients the at least one pruning shears to cut the portion of the plant. The robotic system may include at least a second appendage, the second appendage moveable within a second operational volume, at least a portion of the second operational volume overlapping with at least a portion of the first operational volume such that the first and second appendages are capable of physically colliding with one another, the method may further include: generating at least a second motion plan for the second appendage that moves the second appendage between at least a respective first pose and a respective second pose within the second operational volume without collisions at least between the first and the second appendages; and causing the second appendage to move according to the second motion plan. The second appendage may carry a respective end effector, and generating a second motion plan may include generating a second motion plan in which the second pose of at least one of the second appendage is a pose in which the portion of the plant is transferrable into a collection bin from the respective end effector of carried by one of the first or the second appendages. The second appendage may carry a respective end effector, and generating a first motion plan and a second motion plan may include generating a first motion plan and a second motion plan in which the second pose of at least one of the first appendage or the second appendage is a pose in which the portion of the plant is transferrable from the respective end effector carried by one of the first or the second appendages to the respective end effector carried by the other one of the first or the second appendages. The second appendage may carry a respective end effector, and generating a second motion plan may include generating a second motion plan in which the respective second pose of the second appendage positions the end effector carried by the second appendage to operatively engage a first branch of a first tree, and generating a first motion plan may include generating a first motion plan in which the respective second pose of the first appendage positions the respective end effector carried by the first appendage to operatively engage the first branch of the first tree while the respective end effector carried by the second appendage operatively engages the first branch of the first tree. The second appendage may carry a respective end effector, and generating a second motion plan may include generating a second motion plan in which the respective second pose of the second appendage positions the end effector carried by the second appendage to operatively engage a second branch of a first tree, and generating a first motion plan may include generating a first motion plan in which the respective second pose of the first appendage positions the respective end effector carried by the first appendage to operatively engage a first branch of the first tree while the respective end effector carried by the second appendage operatively engages the second branch of the first tree. The second appendage may carry a respective end effector, and generating a second motion plan may include generating a second motion plan in which the respective second pose of the second appendage positions the end effector carried by the second appendage to operatively engage a first branch of a first tree, and generating a first motion plan may include generating a first motion plan in which the respective second pose of the first appendage positions the respective end effector carried by the first appendage to operatively engage a first branch of a second tree while the respective end effector carried by the second appendage operatively engages the first branch of the first tree. The second appendage may further carry at least one sensor, and the method may further include: receiving information via the at least one sensor carried by the second appendage when the second appendage is in the respective first pose, wherein generating at least a second motion plan may include generating at least a second motion plan where the second pose is based at least in part on the information received via the at least one sensor carried by the second appendage in the second pose. The second appendage may further carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and receiving information via that at least one sensor may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: dynamically generating a plurality of updated first motion plans while causing the first appendage to move at least partially between the respective first and the respective second poses. The robotic system may include a first self-propelled robot, and generating at least a first motion plan may include generating at least a first motion plan that specifies a trajectory for the first self-propelled robot through at least a portion of an orchard. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; and causing the third appendage to move according to the third motion plan. Generating at least a first motion plan for the first appendage may include generating at least a first motion plan for the first appendage based on a location of at least one human and that eliminates or reduces a probability of a collision between the at least the first appendage and the at least one human. Generating at least a first motion plan for the first appendage may include generating at least a first motion plan for the first appendage based on a location of at least one human and that eliminates or reduces a probability of a collision between a falling portion of the plant and the at least one human. Generating at least a first motion plan for the first appendage may include generating at least a first motion plan for the first appendage based on a location of at least one human and that eliminates or reduces a probability of a cutting a portion of the plant which portion supports the at least one human or to which the at least one human is anchored. Generating at least a first motion plan for the first appendage may include generating at least a first motion plan for the first appendage based on a canopy of a plurality of trees that eliminates or reduces a probability of a collision between the appendage and the canopy of the plurality of trees. The robotic system may perform the acts autonomously.

A robotic system to interact with plants may be summarized as including: a first appendage that is moveable within a first operational volume, the first appendage carrying at least one sensor; at least one motion planning processor; and at least one nontransitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions, the first pose locating a portion of the first appendage with respect to a branch bearing one or more pieces of fruit and the second pose locating the at least one sensor carried by the first appendage with respect to at least one portion of at least one plant; cause the first appendage to move according to the first motion plan; and receiving information via the at least one sensor.

A method of operation in a robotic system to package fruit in boxes, the robotic system including a first appendage, the first appendage having at least one end effector and moveable within a first operational volume, the method may be summarized as including: generating at least a first motion plan for the first appendage that moves the first appendage between at least a respective first pose and a respective second pose within the first operational volume without collisions, the second pose locating the at least one end effector carried by the first appendage at least one of above or within a box to place a piece of fruit in the box; and causing the first appendage to move according to the first motion plan.

Generating at least a first motion plan may include generating at least a first motion plan in which the second pose of the first appendage is a pose in which a the piece of fruit is transferrable from the end effector carried by the first into the box without damage to the piece of fruit. Generating at least a first motion plan may include generating at least a first motion plan in which the first pose of the first appendage positions the at least one end effector carried by the first appendage to retrieve the piece of fruit from a conveyor or a bin. Generating at least a first motion plan for the first appendage may include generating at least a first motion plan that moves the first appendage between the respective second pose and at least a respective third pose, the third pose which positions and orients a portion of the first appendage to operatively engage a portion of the box. Generating at least a first motion plan for the first appendage may include generating at least a first motion plan that moves the first appendage between the respective second pose and at least a respective third pose, the third pose which positions and orients a portion of the first appendage to operatively engage a flap of the box. Generating at least a first motion plan for the first appendage may include generating at least a first motion plan that moves the first appendage between the respective second pose and at least a respective third pose, the third pose which positions and orients a portion of the first appendage to close a flap of the box. The first appendage may further carry at least one sensor, and the method may further include: receiving information via the at least one sensor carried by the first appendage, and generating at least a first motion plan may include generating at least a first motion plan where the respective second pose is based at least in part on the information received via the at least one sensor carried by the first appendage. The robotic system may include at least a second appendage, the second appendage moveable within a second operational volume, at least a portion of the second operational volume overlapping with at least a portion of the first operational volume such that the first and second appendages are capable of physically colliding with one another, the method may further include: generating at least a second motion plan for the second appendage that moves the second appendage between at least a respective first pose and a respective second pose within the second operational volume without collisions at least between the first and the second appendages; and causing the second appendage to move according to the second motion plan. The second appendage may carry a respective end effector, and generating a second motion plan may include generating a second motion plan in which the second pose of at least one of the second appendage is a pose in which at least one piece of fruit is transferrable into the box from the respective end effector of carried by one of the first or the second appendages. The second appendage may carry a respective end effector, and generating a first motion plan and a second motion plan may include generating a first motion plan and a second motion plan in which the second pose of at least one of the first appendage or the second appendage is a pose in which the portion of at least one piece of fruit is transferrable from the respective end effector carried by one of the first or the second appendages to the respective end effector carried by the other one of the first or the second appendages. The second appendage may carry a respective end effector, and generating a second motion plan may include generating a second motion plan in which the respective second pose of the second appendage positions the end effector carried by the second appendage to operatively engage a first piece of fruit, and generating a first motion plan may include generating a first motion plan in which the respective second pose of the first appendage positions the respective end effector carried by the first appendage to operatively engage the first piece of fruit while the respective end effector carried by the second appendage operatively engages the first piece of fruit. The second appendage may carry a respective end effector, and generating a second motion plan may include generating a second motion plan in which the respective second pose of the second appendage positions the end effector carried by the second appendage to operatively engage a portion of the box after the first appendage positions the respective end effector carried by the first appendage to deposit the piece of fruit in the box. Generating a first motion plan may include generating a first motion plan in which the second pose of the first appendage positions a portion of the first appendage to transfer the piece of fruit into the box, and generating a second motion plan includes generating a second motion plan in which the first pose of the second appendage positions a portion of the second appendage to retrieve packaging materials and the second pose of the second appendage positions a portion of the second appendage to transfer the retrieved packaging material into an interior of the box. The second appendage may further carry at least one sensor, and the method may further include: receiving information via the at least one sensor carried by the second appendage when the second appendage is in the respective first pose, wherein generating at least a second motion plan may include generating at least a second motion plan where the second pose is based at least in part on the information received via the at least one sensor carried by the second appendage in the second pose. The second appendage may further carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and receiving information via that at least one sensor may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: dynamically generating a plurality of updated first motion plans while causing the first appendage to move at least partially between the respective first and the respective second poses. The robotic system may include a first self-propelled robot, and generating at least a first motion plan may include generating at least a first motion plan that specifies a trajectory for the first self-propelled robot through at least a portion of a packing environment. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; and causing the third appendage to move according to the third motion plan. Generating at least a first motion plan for the first appendage may include generating at least a first motion plan for the first appendage based on a location of at least one human and that eliminates or reduces a probability of a collision between the at least the first appendage and the at least one human. Generating at least a first motion plan for the first appendage may include generating at least a first motion plan for the first appendage based on a canopy of a plurality of trees that eliminates or reduces a probability of a collision between the appendage and the canopy of the plurality of trees. The robotic system may perform the acts autonomously.

A robotic system to package fruit in boxes may be summarized as including: at least a first appendage that is moveable within a first operational volume; at least one motion planning processor; and at least one nontransitory processor-readable medium that stores at least one of processor-executable instructions or data which, when executed by the at least one motion planning processor, causes that at least one motion planning processor to: generate at least a first motion plan for the first appendage that moves the first appendage between at least a respective first pose and a respective second pose within the first operational volume without collisions, the second pose locating the at least one end effector carried by the first appendage at least one of above or within a box to place a piece of fruit in the box; and cause the first appendage to move according to the first motion plan.

A method of operation in a robotic system to perform actions in an environment populated by humans, the robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another, the method may be summarized as including: generating at least a first motion plan for a first appendage that moves the first appendage between at least a respective first pose and a respective second pose within the first operational volume without collisions at least between the first and the second appendages, the second pose locating a portion of the first appendage to interact with at least one object in the environment; generating at least a second motion plan for a second appendage that moves the second appendage between at least a respective first pose and a respective second pose within the second operational volume without collisions at least between the first and the second appendages; causing the first appendage to move according to the first motion plan; and causing the second appendage to move according to the second motion plan.

Generating a first motion plan and a second motion plan may include generating a first motion plan and a second motion plan in which the second pose of at least one of the first appendage or the second appendage is a pose in which at least one object in the environment is moved from one location to another location in the environment. Generating a first motion plan may include generating a first motion plan in which the second pose of the first appendage positions a portion of the first appendage to transfer at least one object in the environment between the first and the second appendage without collisions. Generating a first motion plan may include generating a first motion plan in which the first appendage move between the respective first and the second poses while maintaining an object held by the first appendage in an upright orientation through the movement between the first and the second poses. Generating a first motion plan may include generating a first motion plan in which the first appendage holds a first portion of an object in the environment to resist rotation thereof, and generating a second motion plan may include generating a second motion plan in which the second appendage causes a second portion of the object in the environment to rotate the second portion with respect to the first portion. The first appendage may hold a first implement, and generating a first motion plan may include generating a first motion plan in which the first implement moves from the first pose to the second pose in close proximity to a first human in the environment. The first appendage may hold a first implement, and generating a first motion plan may include generating a first motion plan in which the first implement moves from the first pose to the second pose in contact with a portion of a first human in the environment. The first appendage may hold a first comb or brush, and generating a first motion plan may include generating a first motion plan in which the first comb or brush moves from the first pose to the second pose in contact with at least one of hair or teeth of a first human in the environment. The first appendage may hold a first human, and generating a first motion plan may include generating a first motion plan in which the first appendage moves from the first pose to the second pose while supporting the first human. The first appendage may hold a first human, and generating a first motion plan may include generating a first motion plan in which the first appendage moves from the first pose to the second pose while carrying the first human. Generating a first motion plan may include generating a first motion plan in which the second pose of the first appendage positions a portion of the first appendage to operatively engage a drawer in an environment, and generating a second motion plan may include generating a second motion plan in which the second pose of the second appendage positions a portion of the second appendage to at least one of place or retrieve an object from the drawer. The first appendage may carry an end effector and generating a first motion plan may include generating a first motion plan in which the first appendage changes an orientation of a first object as gripped the first object is gripped by the end effector. The first appendage may carry a respective end effector, the second appendage may carry a respective end effector, and generating a first motion plan and a second motion plan may include generating a first motion plan and a second motion plan in which the second pose of at least one of the first appendage or the second appendage is a pose in which an object is transferrable from the respective end effector carried by one of the first or the second appendages to the respective end effector carried by the other one of the first or the second appendages. Generating a first motion plan may include generating a first motion plan that accommodates for at least one medical restraint that applies to a first human in the environment. The robotic system includes at least one sensor, and the method may further include: successively capturing information that represents at least one of the operational volumes of space in which at least one of the first or the second appendage operates; successively determining a number of successive motion plans based at least in part on the captured information; and successively causing at least one of the first or the second appendage to move to each of a plurality of successive poses according to a current one of the motion plan. Successively determining a number of successive motion plans based at least in part on the captured information may include successively determining a number of successive motion plans that specifies a respective trajectory for at least one of the first or the second appendages that stops the at least one of the first or the second appendage if a human-like object other than a patient or subject is detected in the trajectory of the at least one of the first or the second appendage. Successively determining a number of successive motion plans based at least in part on the captured information may include successively determining a number of successive motion plans that specifies a respective trajectory for at least one of the first or the second appendages that provides a subsequent trajectory through a portion of the operational volume of space for the at least one of the first or second appendages that moves the at least one of the first or the second appendages between a number of successive poses and that avoids a dynamic object that would otherwise present a risk of collision above a defined threshold for the previous first trajectory. The robotic system may include a self-propelled robot, and successively determining a number of successive motion plans based at least in part on the captured information may include successively determining a number of successive motion plans that specifies a respective trajectory for the self-propelled robot that stops the self-propelled robot if a human-like object other than a patient or subject is detected in the trajectory of the self-propelled robot. The robotic system may include a self-propelled robot, and successively determining a number of successive motion plans based at least in part on the captured information may include generating at least a first motion plan that specifies a trajectory for the self-propelled robot that changes the trajectory of the self-propelled robot to avoid a human-like object other than a patient or subject that is detected in the trajectory of the self-propelled robot, without stopping a movement of the self-propelled robot. At least one of the first or the second appendages may carry at least one sensor, and generating at least a first motion plan for the first appendage or a second motion plan for the second appendage may include generating at least a first motion plan or a second motion plan based at least in part on information representing at least a portion of the environment sensed by that at least one sensor. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and the method may further include: successively capturing information that represents the at least a portion of the first environment via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The method may further include: dynamically generating a plurality of updated first motion plans while causing the first appendage to move at least partially between the respective first and the respective second poses. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; causing the third appendage to move according to the third motion plan. The robotic system may perform the acts autonomously.

A robotic system to perform actions in an environment populated by humans may be summarized as including: a first appendage that is moveable within a first operational volume; a second appendage that is moveable within a second operational volume, at least a portion of the second operational volume overlaps with at least a portion of the first operational volume such that the first and second appendages are capable of physically colliding with one another; at least one motion planning processor; and at least one nontransitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions at least between the first and the second appendages, the second pose locating a portion of the first appendage to interact with at least one object in the environment; generate at least a second motion plan for a second appendage that moves the second appendage between at least a respective first pose and a respective second pose within the second operational volume without collisions at least between the first and the second appendages; cause the first appendage to move according to the first motion plan; and cause the second appendage to move according to the second motion plan.

The robotic system to perform actions in an environment populated by humans may include processor-executable instructions or data that, when executed by the at least one motion planning processor, may cause that at least one motion planning processor to perform any of the methods described above.

The at least one of processor-executable instructions or data, when executed by the at least one processor, may further cause the at least one processor to perform any of the methods described above.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
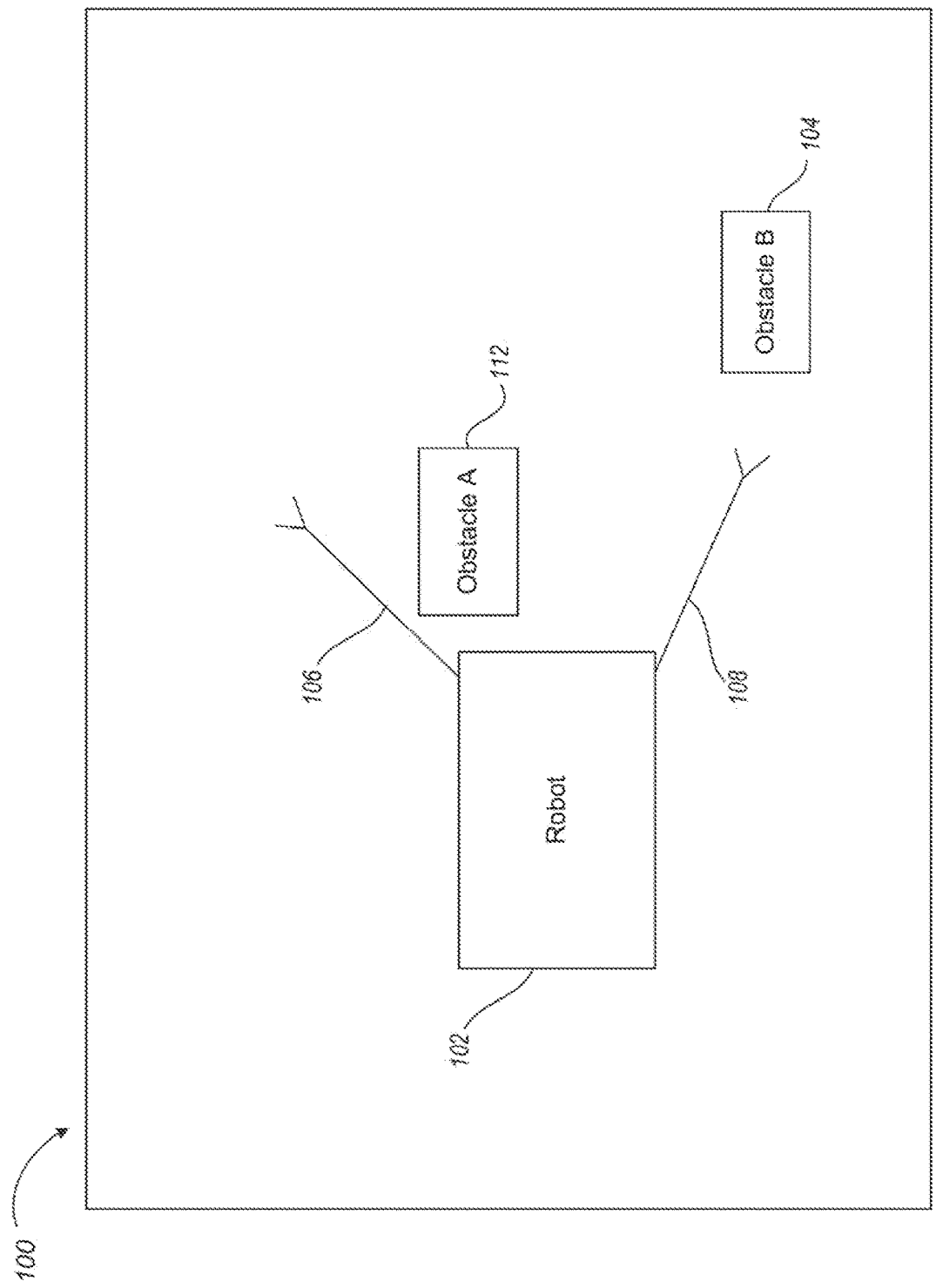
FIG. 1 is a schematic view of an environment in which a robot may operate, according to one illustrated embodiment.

FIG. 1 shows an operational environment 100 in which a robot 102 may operate, according to one illustrated embodiment. For the sake of brevity, the operational environment 100 is referred to herein as the environment 100. The environment represents a two-dimensional or three-dimensional space in which the robot 102 may operate and move. The robot 102 may be any type of robot, including, but not limited to: Cartesian, selectively compliant arm for robotic assembly (SCARA), cylindrical, delta, polar and vertically articulated. The robot may also be an automobile, airplane, drone, or any other vehicle that can operate autonomously or semi-autonomously (i.e., at least partially autonomously) and move in the space represented by the environment 100. The environment 100 is the two- or three-dimensional space in which the robot operates and is different than the robot's "configuration space" (often called "C-space") referenced below with respect to the motion planning graphs of FIGS. 4A and 4B and as explained in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," which is hereby incorporated by reference in its entirety; and in International Patent Application Publication No. WO 2016/122840, filed Jan. 5, 2016, entitled "SPECIALIZED ROBOT MOTION PLANNING HARDWARE AND METHODS OF MAKING AND USING SAME," which is also hereby incorporated by reference in its entirety. The configuration space is typically many dimensional (i.e., greater than 3 dimensions). In particular, each node of the planning graph represents a state of the robot which may include, but is not limited to, a particular configuration of the robot (which is the complete specification of a particular set of joint positions of the robot), pose, velocity and heading of the robot. Each edge of the planning graph represents a transition of the robot from one state to another state.

Referring to FIG. 1, the environment 100 can include obstacle collision regions. These obstacle collision regions may be due to static objects (e.g., buildings, trees, rocks, furniture, etc.) or dynamic objects (e.g., other robots, vehicles, people, animals, rolling rocks, birds, etc.) in the environment 100. For example, obstacle A 112 and obstacle B 104 represent objects that create collision regions in the environment 100 such that it is possible for robot 102 to collide with obstacle A 112 or obstacle B 104 if robot 102 attempts to occupy the same space within the environment 100 at the same time as either obstacle A 112 or obstacle B 104. In various embodiments, there may be fewer or additional objects than that shown in FIG. 1. For example, such various environments and tasks may include fewer or additional objects and may involve, but are not limited to: kitting, conveyors, threaded fasteners, inspections, self-calibration, a volume of space which is inhabitable by static objects and dynamic objects including humans, multi-manual grasping, grasping by touch, information collected by a sensor carried by an appendage, box packing, shelf inspection, baggage handling, recycling, medical procedures, dental procedures, drones, construction, painting, inspection of lines, fruit picking, interaction with plants, packaging fruit in boxes and an environment populated by humans.

Challenges to motion planning involve the ability to perform motion planning at a relatively low cost, but at very fast speeds and frequently as characteristics of the robot itself change. For example, such characteristics may include, but are not limited to, the volume considered occupied by the robot when the robot is holding objects of various sizes, when changing to a different end effector or when changing to a different appendage. Thus, it is advantageous for the robot 102 to keep up with those changes in order to perform motion. Involved with this are challenges to efficiently represent, communicate and compare the space considered to be occupied by the robot 102 and the obstacles in the environment 100. For example, as shown in FIG. 1, obstacle A 112 is currently in front of robot 102. It is advantageous for robot 102 to be able to quickly and efficiently determine which movements of robot arm 106 (and any movement of robot 102) would result in a collision with obstacle A 112. Therefore, the present disclosure provides solutions that would enable robot 102 to efficiently represent, communicate and compare the space occupied by robot 102 and obstacle A 112 in the environment 100 to facilitate determining which movements of robot arm 106 would result in a collision with obstacle A 112. Challenges to motion planning also involve the ability to perform motion planning at a relatively low cost and very fast speeds for various environments and tasks. For example, such various environments and tasks may involve, but are not limited to: kitting, conveyors, threaded fasteners, inspections, self-calibration, a volume of space which is inhabitable by static objects and dynamic objects including humans, multi-manual grasping, grasping by touch, information collected by a sensor carried by an appendage, box packing, shelf inspection, baggage handling, recycling, medical procedures, dental procedures, drones, construction, painting, inspection of lines, fruit picking, interaction with plants, packaging fruit in boxes and an environment populated by humans. Therefore, the present disclosure provides solutions that improve the operation of robot 102 to perform such various tasks in various environments.

While FIG. 1 illustrates a representative environment 100, typical environments may include many additional objects and entities, including objects that correspond to other robots and various other natural or artificial static and dynamic objects and obstacles. The concepts taught herein may be employed in a similar fashion with a more populated environment than that illustrated.

Figure 2:
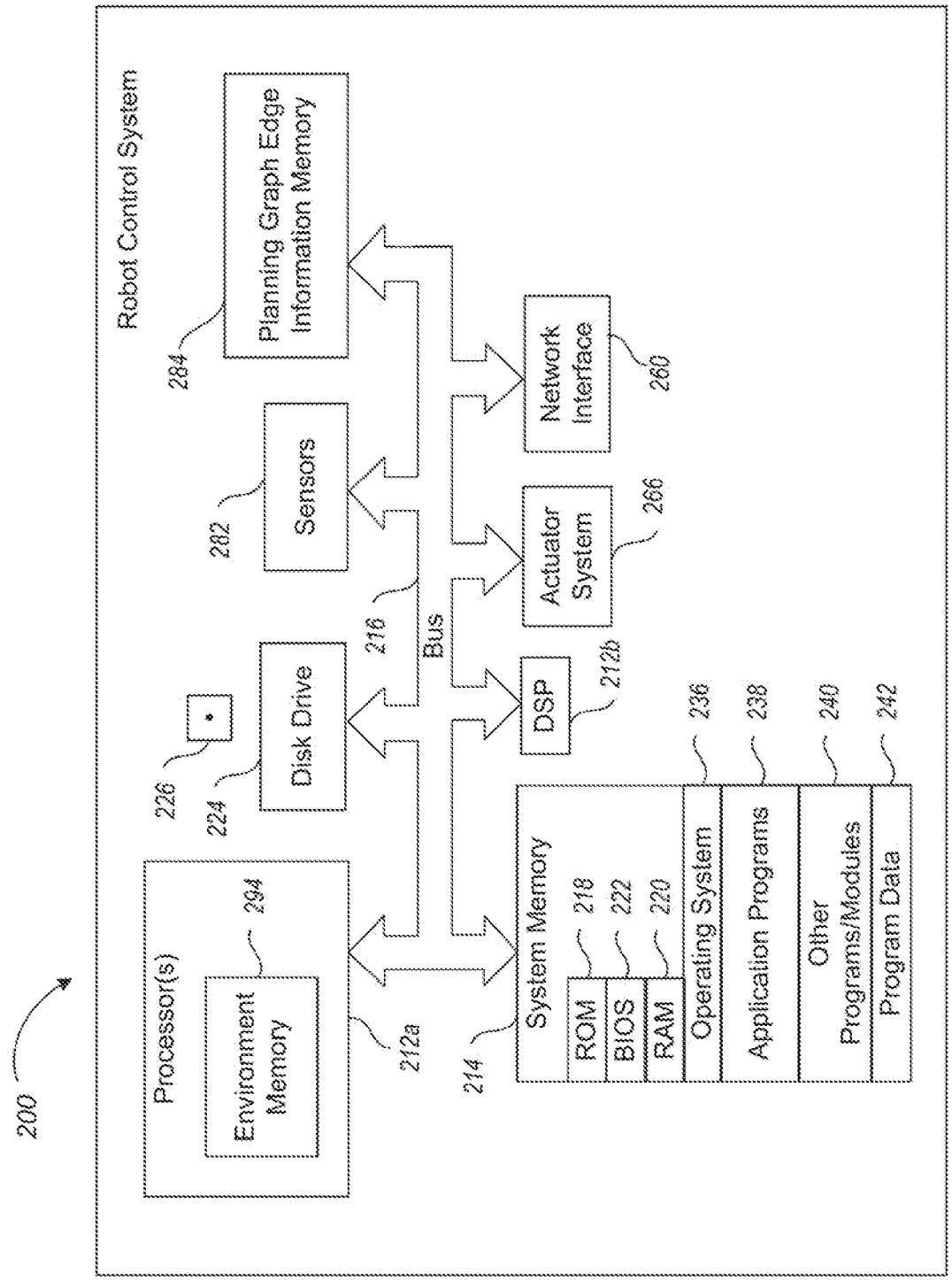
FIG. 2 is a functional block diagram of a robot control system of a robot that may operate in the environment of FIG. 1, according to one illustrated embodiment.

FIG. 2 and the following discussion provide a brief, general description of a suitable robot control system 200 in which various illustrated and described motion planning systems and methods might be implemented, according to one illustrated embodiment.

Although not required, many of the embodiments will be described in the general context of computer-executable instructions, such as program application modules, objects, or macros stored on computer- or processor-readable media and executed by one or more computer or processors that can perform collision assessments and motion planning operations. Such motion planning operations may include, but are not limited to, one or more of: generating one or more discretized representations of robot swept volumes associated with edges of planning graphs; determining which of a number of discretizations to use to generate discretized representations of robot sweep volumes; generating discretized representations of the environment in which the robot 102 will operate, including obstacles in the environment; determining which of a number of discretizations to use to generate a discretized representation of the environment; determining a plurality of planning graphs; storing the determined plurality of planning graphs and respective sets of edge information; generating information that represents a volume swept by at least a portion of the robot 102 in transitioning between the states represented by the nodes of the planning graphs; performing a collision assessment on edges of a planning graph; providing sets of edge information for the planning graphs; identifying one or more optimized results from planning graphs; collision checking for collisions between discretized representations of swept volumes associated with edges of planning graphs and discretized representations of obstacles in the environment in which the robot 102 will operate; determining whether the optimization produces any collision-free paths for the robot 102; and implementing a motion plan for the robot 102.

The robot 102 of FIG. 1 has sensors, such as sensors 282 shown in FIG. 2, which send perception data to one or more processors, such as processor 212a. The perception data is a stream of which voxels or boxes are present in the current environment. This data is generated by (or provided to) one or more processors, such a processor 212a, in the form of an occupancy grid. In particular, when representing either a robot or an object in the environment 100 (e.g., an obstacle), one may represent their surfaces as either voxels (3D pixels) or meshes of polygons (often triangles). Each discretized region of space is termed a "voxel," equivalent to a 3D (volumetric) pixel. In some cases, it is advantageous to represent the objects instead as boxes (rectangular prisms). Due to the fact that objects are not randomly shaped, there may be a significant amount of structure in how the voxels are organized; many voxels in an object are immediately next to each other in 3D space. Thus, representing objects as boxes may require far fewer bits (i.e., may require just the x, y, z Cartesian coordinates for two opposite corners of the box). Also, doing intersection tests for boxes is comparable in complexity to doing so for voxels.

Many embodiments may combine the outputs of multiple sensors and the sensors may provide a very fine granularity voxelization. However, in order for the robot 102 to efficiently perform motion planning, the processor 212a of the robot 102 may use coarser voxels (i.e., "processor voxels") to represent the environment and the volume in 3D space swept by the robot 102 when making transitions between various states. Thus, the system 200 may transform the output of the sensors 282 accordingly. For example, the output of the sensors 282 may use 10 bits of precision on each axis, so each voxel originating directly from the sensors 282 (i.e., a "sensor voxel") has a 30-bit ID, and there are $2^{30}$ sensor voxels. The system 200 uses (at design time and runtime) 6 bits of precision on each axis for an 18-bit processor voxel ID, and there are $2^{18}$ processor voxels. Thus there are $2^{12}$ sensor voxels per processor voxel. At runtime, if the system 200 determines any of the sensor voxels within a processor voxel is occupied, the system 200 considers the processor voxel to be occupied and generates the occupancy grid accordingly.

Each edge of a planning graph for the robot 102 also has some number of voxels (or boxes) corresponding to the volume in 3D space swept by the robot 102 when making the transition in the planning graph from one state to another state represented by that edge. Those voxels or boxes swept by the robot 102 when making the transition in the planning graph from one state to another state represented by that edge may be stored for each edge of the planning graph in off-chip memory devoted to the planning graph, such as in planning graph edge information memory 284. In various other embodiments, the voxels or boxes swept by the robot 102 when making the transition in the planning graph from one state to another state represented by that edge may be stored for each edge of the planning graph in other locations, such as in on-chip memory in one or more application specific integrated circuits (ASIC), for example.

In one embodiment, the collision assessment is performed by first streaming in all of the obstacle voxels (or boxes) onto a processor, such as processor 212a. For example, the obstacle voxels (or boxes) representing environment 100, including obstacle A 112 and obstacle B 104, may be streamed into processor 212*a* and stored on environment memory 294. The environment memory 294 is on-chip memory of processor 212*a*. In some embodiments, the environment memory 294 may be block RAM (BRAM) in a field programmable gate array (FPGA). In some embodiments, the BRAM may be a dedicated, configurable two-port memory unit containing several kilobits of random access memory (RAM). The FPGA contains several of these blocks. Then the edge information for each edge of the planning graph for the robot 102 is streamed from the off-chip memory devoted to the planning graph, such as from planning graph edge information memory 284. For each edge voxel (or box), when it is streamed in from the swept volume of an edge, if it collides with any of the obstacle voxels (or boxes), the processor 212*a* determines a collision with that edge in the planning graph.

For example, when an edge voxel is streamed in from the swept volume of edge x of the planning graph, the processor 212*a* may use Boolean circuitry to compare the edge voxel with all of the obstacle voxels (or boxes) stored on environment memory 294. If the system 200 determines the edge voxel collides with any of the obstacle voxels (or boxes) based on the comparison, the system 200 notes a collision with edge x. This embodiment improves on the technology of collision assessment because it enables much larger planning graphs to be used in the collision assessment as compared to other designs in which the collision assessment is performed in parallel on all the edges of the planning graph. In particular, this helps overcome the disadvantage of other designs with respect to a limited amount of planning graph information that could be stored on processor chip circuitry. Using the collision assessment method described herein, on-chip storage, such as environment memory 294, is often more than sufficient for storing all the obstacle boxes (although it may be less so with using voxels). This provides the ability to store large planning graphs and/or multiple planning graphs in less expensive, off-chip storage. For example, this provides the ability to store large planning graphs and/or multiple planning graphs in planning graph edge information memory 284 which, in some embodiments, is a less expensive type of memory, such as dynamic random access memory (DRAM).

In various embodiments, such operations may be performed entirely in hardware circuitry or as software stored in a memory storage, such as system memory 214, and executed by one or more hardware processors 212*a*, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage.

Also, implementation of various relevant aspects of perception, planning graph construction, collision detection, and path search are also described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME," U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS" and U.S. Patent Application No. 62/646,102, filed Mar. 21, 2018, entitled "MOTION PLANNING OF A ROBOT FOR VARIOUS ENVIRONMENTS AND TASKS AND IMPROVED OPERATION OF SAME" are incorporated herein by reference, in their entirety. Those skilled in the relevant art will appreciate that the illustrated embodiments, as well as other embodiments, can be practiced with other system structures and arrangements and/or other computing system structures and arrangements, including those of robots, hand-held devices, multiprocessor systems, microprocessor-based or programmable consumer electronics, personal computers ("PCs"), networked PCs, mini computers, mainframe computers, and the like. The embodiments or portions thereof (e.g., at design time and pre-runtime) can be practiced in distributed computing environments where tasks or modules are performed by remote processing devices, which are linked through a communications network. In a distributed computing environment, program modules may be located in both local and remote memory storage devices or media. However, where and how certain types of information are stored is important to help improve motion planning.

For example, various motion planning solutions "bake in" a roadmap (i.e., a planning graph) into the processor, and each edge in the roadmap corresponds to a non-reconfigurable Boolean circuit of the processor. The design in which the planning graph is "baked in" to the processor, poses a problem of having limited processor circuitry to store multiple or large planning graphs.

One solution provides a reconfigurable design that places the planning graph information into memory storage. With such a solution, once again there is information for each edge of the planning graph, but this information is stored in memory instead of being baked into a circuit. Each edge corresponds to a motion of the robot 102, and each motion sweeps a volume in 3D space. This swept volume collides with some number of obstacle voxels (or boxes, or however it may be decided to represent obstacles in various embodiments). With such a solution, the voxels that this edge collides with is the information that is stored in memory.

The present disclosure provides a solution that provides for dynamically switching between multiple planning graphs at runtime (i.e., reconfiguring the processor) in a more efficient manner, providing several improvements over other designs. For example, consider a robot with an end effector that can grasp objects. The robot arm collides with different parts of 3D space when holding something than when not holding something. One example is the robot arm 106 holding a big ball at the end of the arm with the end effector. The planning graph corresponding to when the robot 102 is "holding nothing" doesn't work if the robot 102 is holding something. Conversely, one could very conservatively use the "holding something" planning graph even if the robot 102 isn't holding anything, but that is both inefficient and would require the use of a single planning graph corresponding to the scenario in which the robot 102 is holding the largest possible object. Instead, in various embodiments, the system 200 builds a family of planning graphs corresponding to different possible characteristics, e.g., "holding nothing", "holding a small sphere of size x", "holding a rectangular prism of size y", etc. These planning graphs may be swapped in and out from the planning graph edge information memory 284 by the processor 212*a* as the robot 102 picks things up and puts them down. This solution also applies to a robot whose end effector changes at times. For example, the robot 102 may be in an arrangement having a first end effector with a first set of dimensions. This first end effector may be swapped for a second end effector with a second set of dimensions. When the first end effector is swapped for a second end effector with a second set of dimensions the robot 102 will be in a different arrangement having the second end effector. Where the dimensions of the second set of dimensions are different from the dimensions of the first set of dimensions, the volume swept by the robot changes when the end effectors are swapped. Also for example, where the robot is an autonomous or partially autonomous vehicle, the vehicle may have a first set of dimensions in a first arrangement during a first period and the same vehicle may have a second set of dimensions in a second arrangement during a second period. For instance, a vehicle may be empty in a first arrangement and fully loaded in a second arrangement, changing the weight of the vehicle and potentially changing a height of the vehicle above a road, a clearance under the vehicle, or even a trajectory of a vehicle, for instance as it corners around a turn or curve. Where the dimensions of the second set of dimensions are different from the dimensions of the first set of dimensions, the volume swept by the vehicle changes between the first and the second arrangements. Likewise, where the trajectory changes between the first and the second arrangements the volume swept by the vehicle changes between the arrangements. The system 200 thus stores different planning graphs in planning graph edge information memory 284 for different end effectors.

Planning graphs take significant time and resources to build, but with the solutions provided herein, one would only have to do that once, for example, prior to runtime. Once the planning graphs are generated, they may all be stored in planning graph edge information memory 284 and it is relatively quick and efficient for the processor 212a to swap them in and out, or select which one to use based on the current characteristic of the robot 102, such as when the robot is grasping an object of a particular size.

As noted above, some pre-processing activities may be performed before runtime and thus, in some embodiments, these operations may be performed by remote processing devices, which are linked through a communications network to the robot control system 200 via network interface 260. For example, a programming phase allows preparation of the robot for the problem of interest. In such embodiments, extensive preprocessing is leveraged to avoid runtime computation. Precomputed data regarding the volume in 3D space swept by the robot 102 when making the transition in the planning graph from one state to another state represented by edges in the roadmap may be stored in planning graph edge information memory 284 and accessed by the processor 212a during runtime. The system 200 may also build a family of planning graphs prior to runtime corresponding to different possible changing dimensional characteristics of the robot that may occur during runtime. The system 200 then stores such planning graphs in planning graph edge information memory 284.

During the runtime phase, the sensors 282 send perception data to processor 212a. The perception data may be a stream of which voxels or boxes that are present in the current environment and are stored in on-chip environment memory 294. Using Boolean circuitry to compare the perception data retrieved from the environment memory 294 to the information stored in the planning graph edge information memory 284, the processor 212a calculates which motions avoid collision and selects a corresponding path in the planning graph for the robot 102 to follow. The processor 212a then runs and returns the resulting path to the actuator system 266.

FIG. 2 shows a robot control system 200, such as that for robot 102, comprising one or more processor(s), represented by processor 212a, and one or more associated nontransitory machine-readable storage media, such as system memory 214, planning graph edge information memory 284 and computer-readable media 226 associated with disk drive 224. The associated nontransitory computer- or processor-readable storage media, including system memory 214, planning graph edge information memory 284 and computer-readable media 226 associated with disk drive 224, are communicatively coupled to the processor 212a via one or more communications channels, such as system bus 216. The system bus 216 can employ any known bus structures or architectures, including a memory bus with memory controller, a peripheral bus, and/or a local bus. One or more sensors 282 and an actuator system 266 are also communicatively coupled to the processor 212a via system bus 216. One or more of such components may also or instead be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The robot control system 200 may also be communicably coupled to remote systems, e.g., desktop computer, laptop computer, ultraportable computer, tablet computer, smartphone, wearable computer (not shown) that are directly communicably coupled or indirectly communicably coupled to the various components of the robot control system 200 via the network interface 260. Such remote systems may be used to program, configure, control or otherwise interface with or input data to the robot control system 200 and various components within the robot control system 200. Such a connection may be through one or more communications channels, for example, one or more wide area networks (WANs), for instance, the Internet, using Internet protocols. As noted above, pre-runtime calculations (e.g., generation of the family of planning graphs) may be performed by a system that is separate from the robot 102 or other robot, while runtime calculations may be performed on the processor 212 that is on the robot 102 since it is important for the system 200 to be able to change planning graphs to react in real time to changing physical dimensions of the robot 102.

Unless described otherwise, the construction and operation of the various blocks shown in FIG. 2 are of conventional design or are described in International Patent Application No. PCT/US2017/036880, filed Jun. 9, 2017, entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME," U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS" and U.S. Patent Application No. 62/646,102, filed Mar. 21, 2018, entitled "MOTION PLANNING OF A ROBOT FOR VARIOUS ENVIRONMENTS AND TASKS AND IMPROVED OPERATION OF SAME" are incorporated herein by reference, in their entirety. As a result, such blocks need not be described in further detail, as they will be understood by those skilled in the relevant art in view of the references incorporated by reference herein.

The robot control system 200 may include one or more processing units 212, the system memory 214, the planning graph edge information memory 284 and the system bus 216 that couples various system components including the system memory 214 and the planning graph edge information memory 284 to the processing units 212. In some embodiments, the planning graph edge information memory 284 may be, or be part of, the system memory 214. The processing units may be any logic processing unit, such as one or more central processing units (CPUs) 212a, digital signal processors (DSPs) 212b, application-specific integrated circuits (ASICs), field programmable gate arrays (FPGAs), etc. The system memory 214 may include read-only memory ("ROM") 218 and random access memory ("RAM") 220. The planning graph edge information memory 284 may include RAM, such as DRAM. A basic input/output system ("BIOS") 222, which can form part of the ROM 218, contains basic routines that help transfer information between elements within the robot control system 200, such as during start-up.

The robot control system 200 may include a disk drive 224, which may be, for example, a hard disk drive for reading from and writing to a hard disk, a flash memory drive for reading from and writing to removable flash memory devices, an optical disk drive for reading from and writing to removable optical disks, or a magnetic disk drive for reading from and writing to magnetic disks. The robot control system 200 may also include any combination of such disk drives in various different embodiments. The disk drive 224 may communicate with the processing units 212 via the system bus 216. The disk drive 224 may include interfaces or controllers (not shown) coupled between such drives and the system bus 216, as is known by those skilled in the relevant art. The disk drive 224 and its associated computer-readable media 226 provide nonvolatile storage of computer-readable instructions, data structures, program modules and other data for the robot control system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to perform one or more of: generating one or more discretized representations of robot swept volumes associated with edges of planning graphs; determining which of a number of discretizations to use to generate discretized representations of robot swept volumes; generating discretized representations of the environment 100 in which the robot will operate, including obstacles in the environment 100; determining which of a number of discretizations to use to generate a discretized representation of the environment 100; determining a plurality of planning graphs; storing the determined plurality of planning graphs and respective sets of edge information; generating information that represents a volume swept by at least a portion of the robot in transitioning between the states represented by the nodes of the planning graphs; performing a collision assessment on edges of a planning graph; providing sets of edge information for the planning graphs; identifying one or more optimized results from planning graphs; collision checking for collisions between discretized representations of swept volumes associated with edges of planning graphs and discretized representations of obstacles in the environment 100 in which the robot 102 will operate; determining whether the optimization produces any collision-free paths for the robot; and implementing a motion plan for the robot. Application programs 238 may additionally include one or more machine-readable instruction sets that cause the processor(s) 212 to perform other operations of perception (via sensors 282), planning graph construction, collision detection, and path search as described herein and in the references incorporated herein by reference.

Application programs 238 may additionally include one or more machine-readable instruction sets that cause the processor(s) 212 to generate respective sets of planning graph edge information that represent different volumes swept by the robot 102 in transitioning between states corresponding to when the robot 102 has different dimensions and store a plurality of planning graphs in planning graph edge information memory 284 corresponding to the respective sets of planning graph edge information.

Application programs 238 may additionally include one or more machine-readable instruction sets that cause the processor(s) 212 to, for a first discretized representation of an environment 100 in which the robot 102 will operate, supply and store in environment memory 294 at least a portion of the first discretized representation of the environment 100; for each edge of the planning graph, provide and store a respective set of edge information in planning graph edge information memory 284; and identify any of the edges of the planning graph that the corresponding transition would result in a collision between at least a portion of the robot 102 and at least a portion of at least one of the one or more obstacles, such as obstacle A 112 and obstacle B 104 in the environment 100.

The term "environment" is used in the present example to refer to the robot's current workspace, including obstacles. The term "task" is used in the present example to refer to a robot task in which the robot 102 must get from Pose A to Pose B (perhaps grasping or dropping something) without colliding with obstacles in its environment. The term "scenario" is used in the present example to refer to a class of environment/task pairs. For example, a scenario could be "pick-and-place tasks in an environment with a 3-foot table and between x and y obstacles with sizes and shapes in a given range." There may be many different task/environment pairs that fit into such criteria, depending on the locations of goals and the sizes and shapes of obstacles. The system 200 may include one or more remote processing devices, which are linked through a communications network via network interface 260. Such one or more remote processing devices may execute one or more machine-readable instruction sets that cause the system 200 to generate a respective discretization of a representation of an environment 100 in which the robot 102 will operate for pairs of tasks and environments of various different scenarios. In an example embodiment, at least two of the respective discretizations comprise a respective set of voxels. The voxels of the respective discretizations may be non-homogenous in at least one of size and shape within the respective discretization. Also, a respective distribution of the non-homogeneousness of the voxels of the respective discretizations may be different from one another. In particular, the discretizations may comprise a respective set of voxels, where the voxels of at least two of the respective discretizations are non-homogenous in at least one of size and shape within the respective discretization, and a respective distribution of the non-homogeneousness of the voxels of at least two of the respective discretizations is different from one another. The Application programs 238 may include one or more machine-readable instruction sets that cause the processor(s) 212 to then assess an effectiveness of the generated respective discretizations of the representation of the environment 100 in which the robot will operate and store the generated respective discretizations that are assessed to be the most effective for particular scenarios.

Application programs 238 may additionally include one or more machine-readable instruction sets that cause the processor(s) 212 to, based at on an identified scenario that classifies a pair of a task which the robot 102 will perform and the environment 100 in which the robot will operate, determine which of a number of discretizations to use to generate a number of swept volumes that represent respective regions through which the robot 102 will pass when transitioning between one state of the robot and another state of the robot 102; and for each of a plurality of edges in a planning graph, determine a respective swept volume of the edge using the determined discretization. The application programs 238 may additionally include one or more machine-readable instruction sets that cause the processor(s) 212 to store the determined swept volume's respective discretizations of the representation of the environment 100 in which the robot 102 will operate that is assessed to be the most effective for the identified scenario.

Application programs 238 may additionally include one or more machine-readable instruction sets that cause the processor(s) 212 to, based at least in part on an identified scenario that classifies a pair of tasks which the robot 102 will perform and an environment 100 in which the robot operates, determine which of a number of discretizations to use to generate a discretized representation of the environment 100. Application programs 238 may additionally include one or more machine-readable instruction sets that cause the processor(s) 212 to receive sensor information produced by one or more sensors 282 that sense the environment 100 and generate a discretized representation of the environment, including obstacles, if any, in the environment using the determined discretization. A plurality of voxels of the determined discretization may be non-homogenous in at least one of size and shape within the respective discretization, and a respective distribution of the non-homogeneousness of the voxels of the determined discretization may be different from that of another one of the number of discretizations.

Application programs 238 may additionally include one or more machine-readable instruction sets that cause the processor(s) 212 to perform collision checking for multiple planning graphs between edges of the planning graphs and any obstacles in an environment in which the robot will operate. The processor(s) 212 may perform such collision checking on each planning graph, temporarily update the planning graph accordingly, and perform an optimization and determine whether the optimized results, if any, from the updated planning graph meet a satisfaction condition. If the satisfaction condition is not met, then the processor(s) 212 may move to the next planning graph and perform the same operation. Once a planning graph is found in which the satisfaction condition is met, the processor(s) 212 apply a transition identified by one of the optimized results from the planning graph which met the satisfaction condition to the robot 102.

Application programs 238 may additionally include one or more machine-readable instruction sets that cause the processor(s) 212 to perform various other methods described herein, including, but not limited to, those illustrated in FIGS. 5 through 36.

In various embodiments, one or more of the operations described above may be performed by one or more remote processing devices of the system 200, which are linked through a communications network via network interface 260 or by one or more processor(s) 212 that are located on the robot 102.

While shown in FIG. 2 as being stored in the system memory 214, the operating system 236, application programs 238, other programs/modules 240, and program data 242 can be stored on associated computer-readable media 226 of the disk drive 224.

The processor(s) 212 may be any logic processing units, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. Unless described otherwise, the construction and operation of the various blocks shown in FIG. 2 are of conventional design. As a result, such blocks need not be described in further detail herein, as they will be understood by those skilled in the relevant art.

Figure 3:
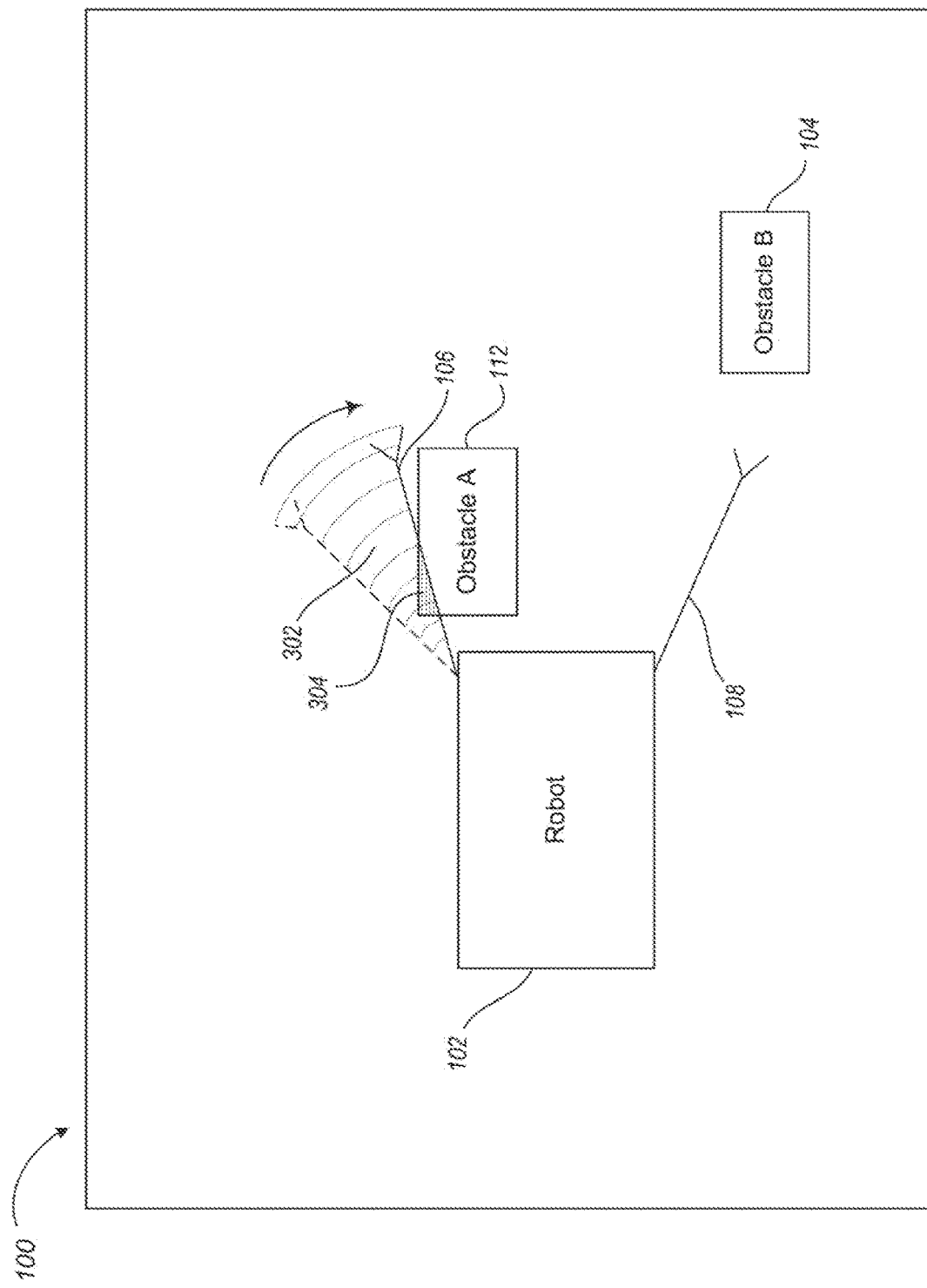
FIG. 3 is a schematic view of the environment of FIG. 1 in which the robot may operate, illustrating the robot transitioning from one position in three dimensional (3D) space to another position in 3D space in the environment and a representation of a volume swept by an appendage of the robot in transitioning between one position in 3D space to another position in 3D space, according to one illustrated embodiment.

FIG. 3 is a schematic view of the environment 100 of FIG. 1 in which the robot 102 may operate, illustrating the robot 102 transitioning from one position in 3D space to another position in 3D space in the environment 100 and a representation of a volume swept by an appendage of the robot when making the transition from one position in 3D space to another position in 3D space, according to one illustrated embodiment. For example, the robot 102 may make such transitions when performing various tasks in various environments described herein. For example, such various environments and tasks may involve, but are not limited to: kitting, conveyors, threaded fasteners, inspections, self-calibration, a volume of space which is inhabitable by static objects and dynamic objects including humans, multi-manual grasping, grasping by touch, information collected by a sensor carried by an appendage, box packing, shelf inspection, baggage handling, recycling, medical procedures, dental procedures, drones, construction, painting, inspection of lines, fruit picking, interaction with plants, packaging fruit in boxes and an environment populated by humans.

In the example illustrated in FIG. 3, the robot 102 is shown as having two appendages, arm 106 and arm 108. In one example, the robot may change a position in 3D space by moving arm 106 from a first position to a second position as shown in FIG. 3. The volume in 3D space swept by the robot 102 when making the transition between one position in 3D space and another position in 3D space by moving arm 106 from a first position to a second position as shown in FIG. 3 is represented by region 302. However, as shown in FIG. 3, such a transition would cause the robot arm 106 to collide with obstacle A 112 in region 304.

Thus, to facilitate avoiding collisions, at design time (prior to runtime), one or more planning graphs are generated by the system 200 to determine which areas are occupied by the robot 102 when making various transitions from one state to another state. For example, an edge of a planning graph for the robot 102 has some number of voxels (or boxes) corresponding to the volume in 3D space swept by the robot 102 corresponding to region 302. Those voxels or boxes swept by the robot 102 corresponding to region 302 when making the corresponding transition in the planning graph may be stored as corresponding to an edge of the planning graph in off-chip memory devoted to the planning graph, such as in planning graph edge information memory 284. Then, at runtime, the obstacle voxels (or boxes) representing environment 100, including obstacle A 112 (and also obstacle B 104) are streamed into processor 212a in the form of an occupancy grid and stored on the on-chip environment memory 294. The system 200 determines which voxels are occupied (based on the occupancy grid), and determines to not use any motion that would collide with any currently occupied voxel. In particular, for each edge voxel (or box) representing a portion of the swept volume of an edge, when it is streamed in from planning graph edge information memory 284, the processor determines whether it collides with any of the obstacle voxels (or boxes) that have been stored in environment memory 294 based on the occupancy grid. If the edge voxel (or box) collides with any of the obstacle voxels (or boxes), the system 200 determines a collision with that edge in the planning graph and will determine to not use the motion of the robot 102 associated with that edge in the planning graph.

For example, prior to executing the motion of the robot arm 106 depicted in FIG. 3, the system 200 would start to stream in the edge voxels (or boxes) of all the edges of the applicable planning graph from planning graph edge memory 284. For each edge, as the processor 212a encounters each edge voxel (or box), it would check to see if any edge voxel (or box) collides with any of the obstacle voxels (or boxes) stored in environment memory 294 (including those for obstacle A 112). As shown in FIG. 3, any edge voxel (or box) within region 304 would result in such a collision because obstacle voxels (or boxes) of obstacle A 112 stored in environment memory 294 occupy that same region according to the occupancy grid. As soon as the processor 212a encounters an edge voxel (or box) that collides with any of the obstacle voxels (or boxes), the processor 212a then determines to not use that edge of the planning graph. Once finished processing the edges of the planning graph, the processor 212a determines a path within the planning graph that would cause the robot to move from the initial position to the goal position using the remaining edges that have not been determined to collide with the obstacle voxels (or boxes) stored in environment memory 294.

The system 200 may also make decisions regarding how to represent the swept volume represented by each of the planning graphs as well as how to represent the obstacles in the environment 100. Such decisions may include decisions made by the processor 212a regarding how the discretization is to be performed, such as, for example, whether to represent the swept volume with voxels or boxes, the shape and size of the voxels or boxes to use, whether to use a discretization that is non-uniform in size and/or shape of the voxels or boxes used, and in which scenarios to use different shapes and/or sizes of voxels or boxes. In various embodiments, one or more of such operations described above to make decisions regarding how to represent the swept volume represented by each of the planning graphs as well as how to represent the obstacles in the environment 100 may be performed by one or more remote processing devices of the system 200, which are linked through a communications network via network interface 260 or by one or more processor(s) 212 that are located on the robot 102.

In particular, the system 200 may decide that the working space of the robot 102 will be discretized into voxels (which may later be grouped into boxes). One example implementation performs uniform quantization in each of the 3 dimensions. However, it may be advantageous to have non-cube-shaped voxels and/or voxels that are smaller/larger in different parts of the robot's workspace. For example, one embodiment uses smaller voxels (finer resolution) in the space right in front of the robot 102 and larger voxels (coarser resolution) at the extreme end of the robot's reach. Thus, various embodiments may use non-uniform quantization and/or use of non-cube-shaped voxels. The present disclosure also provides an algorithm for how the system 200 chooses the voxel sizes and/or shapes.

One example embodiment uses a training algorithm for execution prior to runtime to determine which voxel sizes and shapes may be better to use for various different scenarios. The system 200 is trained by using a given or generated large set of task/environment pairs from one or more scenarios. The system 200 then chooses the discretization that is assessed to be most effective over the large set of training samples.

For example, for any given environment/task pair, there is an optimal discretization (or multiple discretizations that are equally optimal). The system 200 may test/train on T environment/task pairs, where T is a large number, and then record the optimal discretization for each. This may result in many different discretizations, each of which is optimal for only one or a small number of environment/task pairs. After testing all T environment/task pairs, the system selects the discretization that is assessed to be most effective over the whole set of samples. This approach would also involve trying every possible discretization on every possible environment/task pair, which would be intractable.

To overcome the above problem, the system 200 performs training like that explained above, except that the system 200 considers a finite number of possible discretizations, G. For each environment/task pair, the system records which of the G discretizations provided is assessed to be most effective. After processing all T environment/task pairs, the system 200 selects the discretization that is assessed to be most effective in the most environment/task pairs.

As an example, the robot 102 may be facing a box of space in front of it. The system may determine to discretize the space such that 6-bits are used to describe the position in each dimension (i.e., there are $2^6$ possible positions on each axis). This results in $2^{18}$ voxels, each of which has a unique 18-bit ID. At design time, the system 200 precomputes the swept volume for every edge's motion, and records it as the collection of voxel IDs in that swept volume. If the swept volume even partially intersects a voxel, it is included in the collection of voxel IDs in that swept volume. This is why using a finer resolution is better. Then, at runtime, the sensors 282 tell the processor 212a what is in front of the robot 102, but at a much finer granularity than the voxels representing the precomputed swept volume, so the system 200 processes the sensor input and communicates to the processor 212a which of the voxels are currently occupied. In some embodiments, the processor 212a processes the sensor input and in other embodiments, there are separate processors, such as those of the sensors 282, which processes the sensor input and communicates to the processor 212a. The processor 212a compares the voxels or boxes currently in the environment based on the information stored in environment memory 294 to the voxels or boxes listed for each edge of the planning graph edge information stored in planning graph edge information memory 284 to determine which edges are currently in collision. In such embodiments, it is important that the same discretization is used at design time as at runtime in order to enable the comparison.

When the system 200 selects to use non-uniform discretization, the system 200 may still use 18-bit voxel IDs and $2^{18}$ voxels, but the voxels need not be cubes (or they could be cubes but not of all the same size). Once again, it is important in this embodiment that the system uses the same discretization at design time as at runtime. When using a non-uniform discretization, the system 200 selects what each voxel's size and shape is, using training such as that described above, such that the system picks the voxel sizes and shapes that will be used at design time and at runtime that are assessed to be most effective. The evaluation criteria used in such training may include criteria regarding the fraction of tasks that can be solved (e.g., the system 200 can find some collision-free path to accomplish the goal of the robot 102) and the quality of the paths that are found.

Figure 4A:
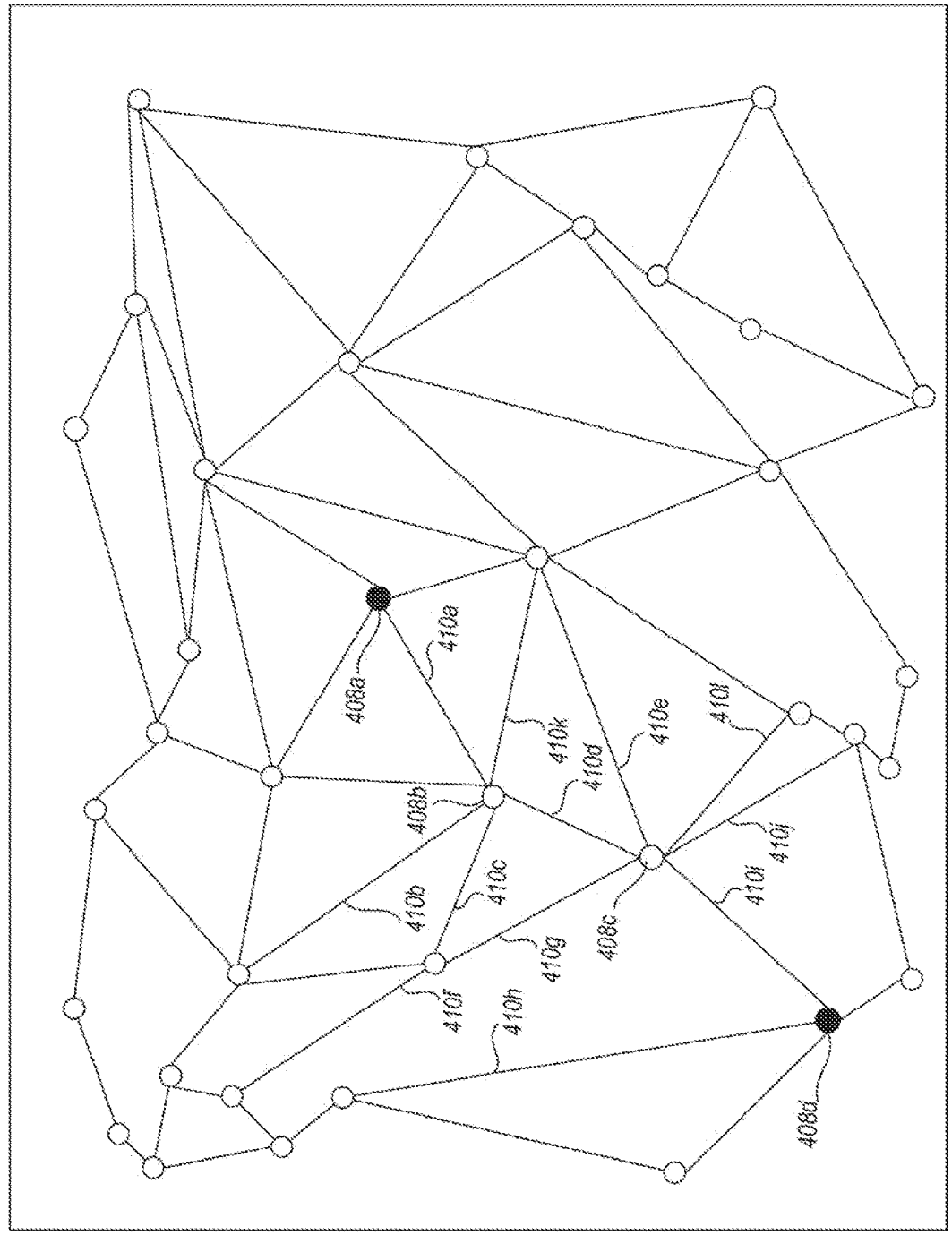
FIG. 4A is an example motion planning graph for the robot of FIG. 1, including edges of the planning graph for which it has been determined the corresponding transition would result in a collision between the robot and one or more obstacles in the environment, according to one illustrated embodiment.
Figure 4B:
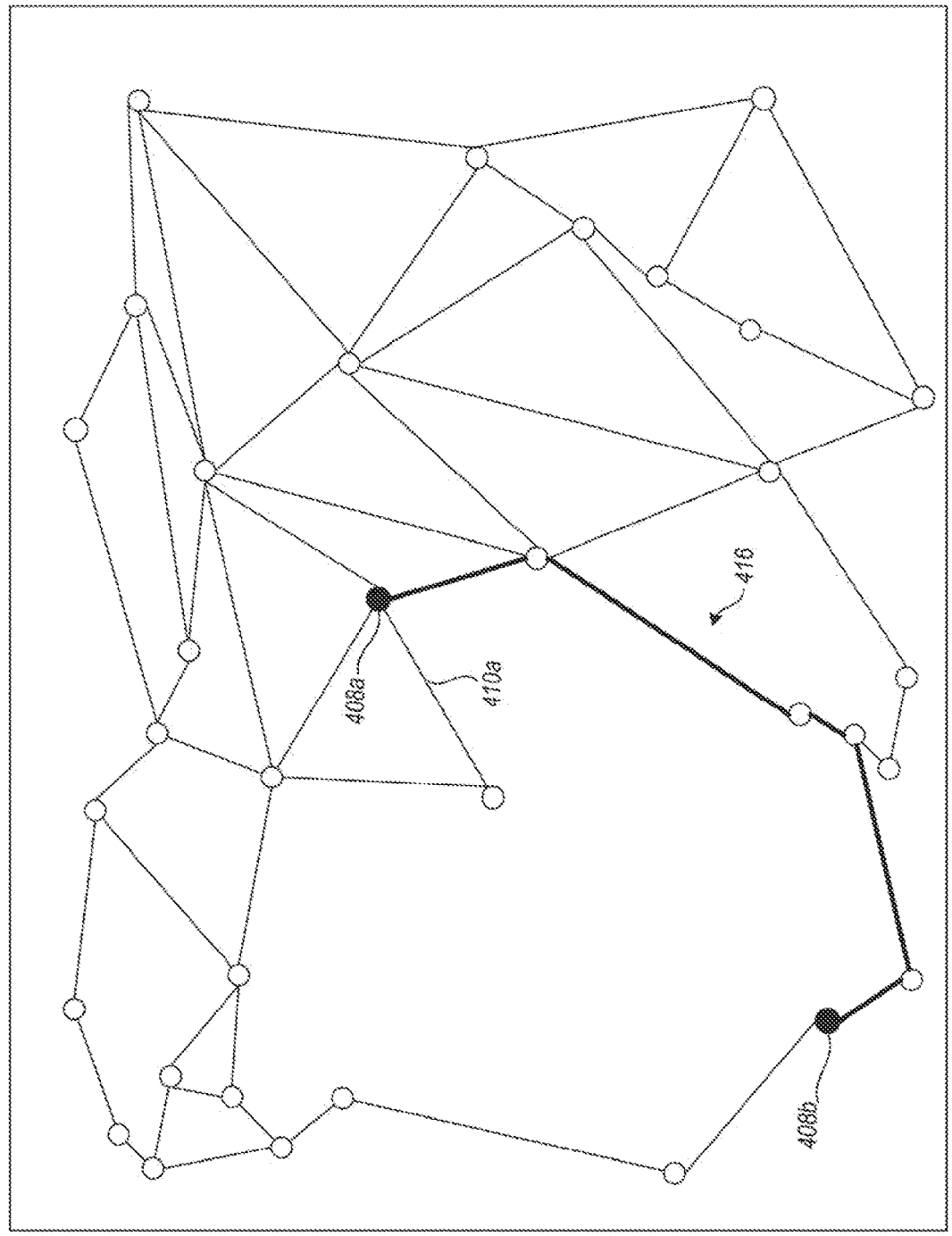
FIG. 4B is an example motion planning graph for the robot of FIG. 1 in which edges of the planning graph have been removed for which it has been determined the corresponding transition would result in a collision between the robot and one or more obstacles in the environment, according to one illustrated embodiment.

FIG. 4A is an example motion planning graph 400 for the robot 102 of FIGS. 1 and 3, including edges of the planning graph 400 for which it has been determined the corresponding transition would result in a collision between the robot 102 and one or more obstacles in the environment 100, according to one illustrated embodiment. FIG. 4B is an example motion planning graph 400 in which edges of the planning graph 400 have been removed for which it has been determined the corresponding transition would result in a collision between the robot 102 and one or more obstacles in the environment 100, according to one illustrated embodiment. Each node of the planning graph 400 represents a state of the robot 102 and each edge of the planning graph 400 represents a transition of the robot 102 from one state to another state. For example, edge 410a represents a transition between a state of the robot 102 represented by node 408a and a state of the robot 102 represented by node 408b. Edge 410i represents a transition between a state of the robot 102 represented by node 408c and a state of the robot 102 represented by node 408d. In various embodiments, the robot 102 may make such transitions when performing various tasks in various environments described herein. For example, such various environments and tasks may involve, but are not limited to: kitting, conveyors, threaded fasteners, inspections, self-calibration, a volume of space which is inhabitable by static objects and dynamic objects including humans, multi-manual grasping, grasping by touch, information collected by a sensor carried by an appendage, box packing, shelf inspection, baggage handling, recycling, medical procedures, dental procedures, drones, construction, painting, inspection of lines, fruit picking, interaction with plants, packaging fruit in boxes and an environment populated by humans.

Each edge of the planning graph 400 for the robot 102 has some number of voxels (or boxes) corresponding to the volume in 3D space swept by the robot 102 when making the transition in the planning graph 400 from one state to another state represented by that edge. Such information may be stored as planning graph edge information in off-chip planning graph edge information memory 284, such that the system 200 can swap out different planning graphs to accommodate changing dimensions of the robot 102. Using information received from the sensors 282 representing the current environment at runtime, the system 200 determines which voxels (or boxes) are currently occupied, and the system 200 determines to not use any motion that would collide with any currently occupied voxel (or box).

In some embodiments, the system determines to not use any motion that would collide with any occupied voxel (or box) by comparing at runtime the information received from the sensors 282 and stored in on-chip environment memory 294 representing the current environment (and obstacles therein) with the planning graph edge information stored in planning graph edge information memory 284. Based on this comparison, the system 200 determines which planning graph edges represent transitions (and thus which corresponding motions) that would result in a collision between the robot 102 and one or more obstacles in the environment 100. As an example, FIG. 4A shows edges 410b, 410c, 410d, 410e, 410f, 410g, 410h, 410i, 410j, 410k and 410l have been determined to represent transitions (and thus which corresponding motions) that would result in a collision between the robot 102 and one or more obstacles in the environment 100.

For example, in order for the robot 102 to achieve a goal of moving from a state represented by node 408a to a state represented by node 408d, the robot 102 would have to avoid transitions represented by edges 410b, 410c, 410d, 410e, 410f, 410g, 410h, 410i, 410j, 410k and 410l that have been determined to represent transitions that would result in a collision between the robot 102 and one or more obstacles in the environment 100. Thus, FIG. 4B shows the planning graph with such edges removed and a potential path 416 in planning graph 400 identified by the system 200 in which the robot 102 may follow to achieve a goal of moving from the state represented by node 408a to the state represented by node 408d without colliding with one or more obstacles in the environment 100. I In various embodiments, the graph of FIGS. 4A and 4B is a motion planning graph for a particular environment in which the robot 102 performs various tasks. Examples of such particular environments and tasks may involve, but are not limited to: kitting, conveyors, threaded fasteners, inspections, self-calibration, a volume of space which is inhabitable by static objects and dynamic objects including humans, multi-manual grasping, grasping by touch, information collected by a sensor carried by an appendage, box packing, shelf inspection, baggage handling, recycling, medical procedures, dental procedures, drones, construction, painting, inspection of lines, fruit picking, interaction with plants, packaging fruit in boxes and an environment populated by humans.

The robotic systems described below may comprise all or a part of the system 200 described herein with respect to FIG. 2. A method of operation in a robotic system, the robotic system including at least one motion planning processor and at least one robot, the at least one robot having at least one appendage, the at least one appendage having at least one joint and at least one end effector, may include: receiving information or data that represents a respective position and orientation of each of a plurality of like parts of a first type in a first bulk parts container, the like parts of the first type in the first bulk parts container being like one another, the first bulk parts container accessible by the at least one end effector; determining a first one of the like parts of the first type to retrieve from the first bulk parts container; processing by a plurality of logic circuits of the at least one motion planning processor where at least one wall of the container is represented and removed from the data, to determine at least one motion plan for the at least one appendage of the at least one robot that moves the at least one appendage from a first pose to a second pose without collisions and from the second pose to a third pose without collisions, the second pose being a position and an orientation in which the determined first one of the like parts of the first type in the first bulk parts container is graspable/engageable by the at least one end effector and the third pose being a position and orientation in which the at least one end effector with the determined first one of the like parts of the first type is positioned at least one of over or in a kit container to at least partially form a kit of parts which includes at least one part that is unlike the like parts of the first type; and causing the at least one robot to execute at least one of the determined motion plans by moving the at least one appendage from the first pose to the third pose without collisions.

The method may further include: receiving information that represents a respective position and orientation of each of a plurality of like parts of a second type in a second bulk parts container, the like parts of the second type in the second bulk parts container being like each other and unlike the like parts of the first type in the first bulk parts container, the second bulk parts container accessible by the at least one end effector; determining a first one of the like parts of the second type to retrieve from the second bulk parts container; processing by a plurality of logic circuits of the at least one motion planning processor, to determine at least one motion plan for the at least one appendage of the at least one robot that moves the at least one appendage from a fourth pose to a fifth pose without collisions and from the fifth pose to a sixth pose without collisions, the fifth pose being a position and an orientation in which the determined first one of the like parts of the second type in the second bulk parts container is graspable/engageable by the at least one end effector and the sixth pose being a position and an orientation in which the at least one end effector with the determined first one of the like parts of the second type is positioned at least one of over or in the kit container to at least partially form the kit of parts; and causing the at least one robot to execute at least one of the determined motion plans by moving the at least one appendage from the fifth pose to the sixth pose without collisions. The method may further include: after causing the at least one robot to execute at least one of the determined motion plans by moving the at least one appendage from the first pose to the third pose without collisions, causing the at least one robot to deposit the determined first one of the like parts of the first type into a first defined space in the kit container; and after causing the at least one robot to execute at least one of the determined motion plans by moving the at least one appendage from the fourth pose to the sixth pose without collisions, causing the at least one robot to deposit the determined first one of the like parts of the second type into a second defined space in the kit container. The kit container may be an additive manufactured kit container, and the method may further include: after causing the at least one robot to execute at least one of the determined motion plans by moving the at least one appendage from the first pose to the third pose without collisions, causing the at least one robot to deposit the determined first one of the like parts of the first type into a defined space in the additive manufactured kit container. Receiving information that represents a respective position and orientation of each of a plurality of like parts in a container may include receiving one or more images of the first bulk parts container. Receiving information that represents a respective position and orientation of each of a plurality of like parts in a first bulk parts container may include receiving one or more images of at least a subset of all of the like parts in at least a portion of the first bulk parts container, and the method may further include: performing image recognition on at least some of the received images to identify individual ones of the like parts and a position and an orientation of the individual ones of the like parts in the first bulk parts container. A first appendage of the at least one appendage may carry at least one sensor, and the method may further include capturing information that represents a respective position and orientation of each of a plurality of like parts of the first type in a the first bulk parts container by the at least one sensor carried by the first appendage, and generating a first motion plan may include generating a first motion plan based at least in part on the captured information. Generating a first motion plan based at least in part on the received information may include generating the first motion plan in which the first appendage moves from a respective first pose to a respective second pose, the respective second pose which positions the at least one sensor carried by the first appendage to operatively sense a portion of an environment. A second appendage of the at least one appendage may carry at least one end effector and the method may further include: generating a second motion plan based at least in part on the received information, the second motion plan in which the second appendage moves from a respective first pose to a respective second pose, the respective second pose which positions the end effector of the second appendage to operatively engage an object within the portion of the environment that is sensed by the at least one sensor. A first appendage of the at least one appendage may carry at least one image sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. A first appendage of the at least one appendage may carry at least one contact sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. A first appendage of the at least one appendage may carry at least one capacitive sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one capacitive sensor carried by the first appendage to operatively sense a portion of an environment. A first appendage of the at least one appendage may carry at least one force sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one force sensor carried by the first appendage to operatively sense a portion of an environment. A first appendage of the at least one appendage may carry at least one proximity sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one proximity sensor carried by the first appendage to operatively sense a portion of an environment. The robotic system may include at least a first appendage and a second appendage, and motion planning may include determining motion plans for each of the first and the second appendages to pass the determined first one of the like parts of the first type between the first and the second appendages. The robotic system may perform the acts autonomously.

A robotic system may include: at least one robotic appendage, the at least one appendage having at least one joint and at least one end effector; at least one motion planning processor; and at least one nontransitory processor-readable medium that stores at least one of processor-executable instructions or data which, when executed by the at least one motion planning processor, causes the at least one motion planning processor to: receive captured information that represents a respective position and orientation of each of a plurality of like parts of a first type in a first bulk parts container, the like parts of the first type in the first bulk parts container being like one another, the first bulk parts container accessible by the at least one end effector; determine a first one of the like parts of the first type to retrieve from the first bulk parts container; process by a plurality of logic circuits of the at least one motion planning processor where at least one wall of the container is represented and removed from the data, to determine at least one motion plan for the at least one appendage of the at least one robot that moves the at least one appendage from a first pose to a second pose without collisions and from the second pose to a third pose without collisions, the second pose being a position and an orientation in which the determined first one of the like parts of the first type in the first bulk parts container is graspable/engageable by the at least one end effector and the third pose being a position and orientation in which the at least one end effector with the determined first one of the like parts of the first type is positioned at least one of over or in a kit container to at least partially form a kit of parts which includes at least one part that is unlike the like parts of the first type; and cause the at least one robot to execute at least one of the determined motion plans by moving the at least one appendage from the first pose to the third pose without collisions.

A method of operation in a robotic system on an assembly line that includes at least one conveyor that transports a plurality of objects being assembled along an assembly line, the robotic system including at least one motion planning processor and at least one robot, the at least one robot having at least one appendage, the at least one appendage having at least one joint and at least one end effector, the method may include: for each of the objects being assembled, receiving information that represents a respective position and orientation of the respective object; processing by a plurality of logic circuits of the at least one motion planning processor to determine at least one motion plan for the at least one appendage of the at least one robot that moves the at least one appendage from a first pose to a second pose without collisions, the second pose being a defined position and a defined orientation of a portion of the at least one appendage relative to one of the objects being assembled; and causing the at least one robot to execute at least one of the determined motion plans by moving the at least one appendage from the first pose to the second pose without collisions.

Processing by a plurality of logic circuits of the at least one motion planning processor to determine at least one motion plan for the at least one appendage of the at least one robot may include a motion plan that moves the at least one appendage from the first pose to the second pose passing through at least a third pose all without collisions, the third pose being a defined position and a defined orientation with respect to a part to be assembled on one of the objects being assembled. The at least one robot may include a base that is at a fixed position and the objects being assembled move relative to the base, and processing by a plurality of logic circuits of the at least one motion planning processor to determine at least one motion plan for the at least one appendage may include processing to account for both a motion of the conveyor and a motion of the respective object to be assembled with respect to the conveyor. The at least one robot may include a base that moves in sequence and in parallel with movement of the objects being assembled, and processing by a plurality of logic circuits of the at least one motion planning processor to determine at least one motion plan for the at least one appendage may include processing to account for both a motion of the conveyor and a motion of the respective object to be assembled with respect to the conveyor. The at least one appendage may be removably coupleable to at least one of a moving portion of the conveyor, to a fixture carried by a portion of the conveyor or to the objects to be assembled to move along therewith, and processing by a plurality of logic circuits of the at least one motion planning processor to determine at least one motion plan for the at least one appendage may include processing to account for a motion of the respective object to be assembled with respect to the conveyor. Processing by a plurality of logic circuits of the at least one motion planning processor to determine at least one motion plan for the at least one appendage may include processing to determine a motion plan for a first appendage of the at least one appendage to detachably couple a second appendage of the at least one appendage to at least one of: a moving portion of the conveyance, a fixture carried by the moving portion of the conveyance, or the object being assembled and transported by the moving portion of the conveyance. Processing by a plurality of logic circuits of the at least one motion planning processor to determine at least one motion plan for the at least one appendage may include processing to determine a motion plan for the first appendage of the at least one appendage to uncouple the second appendage of the at least one appendage from at least one of: the moving portion of the conveyance, the fixture carried by the moving portion of the conveyance, or the object being assembled and transported by the moving portion of the conveyance. Processing by a plurality of logic circuits of the at least one motion planning processor to determine at least one motion plan for the at least one appendage may include processing to determine a motion plan for a first appendage of the at least one appendage to uncouple a second appendage of the at least one appendage from at least one of: a moving portion of the conveyance, a fixture carried by the moving portion of the conveyance, or the object being assembled and transported by the moving portion of the conveyance. Receiving information that represents a respective position and orientation of the respective object may include capturing image information from at least one camera carried by the at least one appendage. The at least one appendage may include a first appendage and at least a second appendage, the second appendage is separately moveable from the first appendage, and processing by a plurality of logic circuits of the at least one motion planning processor to determine at least one motion plan for the at least one appendage may include processing by the plurality of logic circuits of the at least one motion planning processor to determine at least one motion plan for the first appendage, and may further include capturing image information from at least one camera carried by the second appendage, wherein receiving information that represents a respective position and orientation of the respective object may include receiving the information from at least one camera carried by the second appendage. The method may further include: processing by a plurality of logic circuits of the at least one motion planning processor to determine at least one motion plan for the second appendage which carries the at least one camera between at least two different poses without collisions. The at least one robot may include one or more external cables, and the processing by a plurality of logic circuits of the motion planning processor may include processing by a plurality of logic circuits of by the motion planning processor to produce a motion plan where at least a portion of one or more external cables that are part of the at least one robot are modeled. The at least one robot may include one or more external cables, and the processing by a plurality of logic circuits of the motion planning processor may include processing by a plurality of logic circuits of by the motion planning processor to produce a motion plan where at least a portion of one or more external cables that are part of the at least one robot are modeled including a representation of a relative flexibility of the respective cable. The processing by a plurality of logic circuits of the motion planning processor may include processing by a plurality of logic circuits of the motion planning processor to produce a motion plan based on a predicted future position and a future orientation of a given one of the objects being assembled. The robotic system may include a collection of end effectors that are interchangeably detachably coupleable to a same one of the at least one appendage, and the processing by a plurality of logic circuits of the motion planning processor may include processing by a plurality of logic circuits of the motion planning processor to produce a motion plan based on a given one of the end effectors that is or that will be coupled to the appendage. At least some of the end effectors may be end of arm tools selected from a welding head, a riveter, a drill, a miller, a reamer, or a screwdriver. The robotic system may include a collection of end effectors that are interchangeably detachably coupleable to a same one of the at least one appendage, and the processing by a plurality of logic circuits of the motion planning processor may include processing by a plurality of logic circuits of the motion planning processor to produce a motion plan that moves a first one of the at least one appendage to the collection of end effectors to exchange an end effector carried by the first appendage. The robotic system may include a first appendage and a second appendage, and a collection of end effectors that are interchangeably detachably coupleable to a same one of the at least one appendage, and the processing by a plurality of logic circuits of the motion planning processor may include processing by a plurality of logic circuits of the motion planning processor to produce a motion plan that moves the first appendage to the collection of end effectors to pick up one of the end effectors, and to subsequently move a distal end of the first appendage toward a distal end of the second appendage to attach to the distal end of the second appendage the one of the end effectors picked up by the first appendage. The robotic system may include at least a first appendage and a second appendage, and motion planning may include determining motion plans for each of the first and the second appendages to pass one of the end effectors between the first and the second appendages. The robotic system may perform the acts autonomously.

A robotic system for use on an assembly line that includes at least one conveyor that transports a plurality of objects being assembled along an assembly line, the robotic system may include: at least one robotic appendage, the at least one appendage having at least one joint and at least one end effector; at least one motion planning processor; and at least one nontransitory processor-readable medium that stores at least one of processor-executable instructions or data which, when executed by the at least one motion planning processor, causes that at least one motion planning processor to: for each of the objects being assembled, receive information that represents a respective position and orientation of the respective object; and process by a plurality of logic circuits of the at least one motion planning processor to determine at least one motion plan for the at least one appendage of the at least one robot that moves the at least one appendage from a first pose to a second pose without collisions, the second pose being a defined position and a defined orientation of a portion of the at least one appendage relative to one of the objects being assembled.

A method of operation in a robotic system on an assembly line that includes at least one conveyor that transports a plurality of objects being assembled along an assembly line, the robotic system including at least one motion planning processor and at least one robot, the at least one robot having at least one appendage, the at least one appendage having at least one joint and at least one end effector, the method may include: for each of the objects being assembled, receiving information that represents a respective position and orientation of the respective object; processing by a plurality of logic circuits of the at least one motion planning processor to determine at least one motion plan for the at least one appendage of the at least one robot that moves the at least one appendage from a first pose to a second pose without collisions and from the second pose to a third pose without collisions, the second pose being a position and an orientation in which a threaded fastener is positioned with respect to a threaded hole; causing the at least one robot to execute at least one of the determined motion plans by moving the at least one appendage from the first pose to the third pose without collisions; causing the end effector to rotate in a first rotational direction; detecting a seating of the threaded fastener with a thread of the threaded hole; and causing the end effector to rotate in a second rotational direction, the second rotational direction opposite the first rotational direction.

Causing the end effector to rotate in a first rotational direction may include causing the end effector to rotate in a rotational direction opposite to a rotational direction in which the threaded fastener is threaded into the threaded hole. The method may further include: sensing information that represents a physical engagement of the threaded fastener with the threaded hole. Detecting a seating of the threaded fastener with a thread of the threaded hole may be based on the sensed information. The robotic system may include at least a first appendage and a second appendage, and motion planning may include determining motion plans for each of the first and the second appendages to pass threaded fastener between the first and the second appendages. The method may further include: causing the at least one appendage to change an orientation of the object as gripped by an end effector of the at least one end effector. Causing the at least one appendage to change an orientation of the object as gripped by an end effector of the at least one end effector may include: generating at least a first motion plan for a first appendage that moves the first appendage between at least a respective first pose and a respective second pose within the first operational volume without collisions at least between the first and the second appendages; generating at least a second motion plan for a second appendage that moves the second appendage between at least a respective first pose and a respective second pose within the second operational volume without collisions at least between the first and the second appendages, wherein generating a first motion plan and a second motion plan may include generating a first motion plan and a second motion plan in which the second pose of at least one of the first appendage or the second appendage is a pose in which an object is transferrable from a portion of one of the first or the second appendages to a portion of the other one of the first or the second appendages; causing the first appendage to move according to the first motion plan; and causing the second appendage to move according to the second motion plan. The robotic system may perform the acts autonomously.

A robotic system for use on an assembly line that includes at least one conveyor that transports a plurality of objects being assembled along an assembly line, the robotic system may include: at least one robotic appendage, the at least one appendage having at least one joint and at least one end effector; at least one motion planning processor; and at least one nontransitory processor-readable medium that stores at least one of processor-executable instructions or data which, when executed by the at least one motion planning processor, causes that at least one motion planning processor to: for each of the objects being assembled, receive information that represents a respective position and orientation of the respective object; process by a plurality of logic circuits of the at least one motion planning processor to determine at least one motion plan for the at least one appendage of the at least one robot that moves the at least one appendage from a first pose to a second pose without collisions and from the second pose to a third pose without collisions, the second pose being a position and an orientation in which a threaded fastener is positioned with respect to a threaded hole; cause the at least one robot to execute at least one of the determined motion plans by moving the at least one appendage from the first pose to the third pose without collisions; cause the end effector to rotate in a first rotational direction; detect a seating of the threaded fastener with a thread of the threaded hole; and cause the end effector to rotate in a second rotational direction, the second rotational direction opposite the first rotational direction.

A method of operation in a robotic system to perform an inspection of each of a plurality of assembled objects as the assembled objects are transported past one or more inspection stations, the robotic system including at least one motion planning processor and at least one robot, the at least one robot having at least one appendage, the at least one appendage having at least one joint and at least one sensor, the method may include: for each of the objects, capturing information that represents a respective position and orientation of the respective object; processing by a plurality of logic circuits of the at least one motion planning processor to determine at least one motion plan for the at least one appendage of the at least one robot that moves the at least one appendage from a first pose to a second pose without collisions, the first pose being a first defined position and a first defined orientation of the at least one sensor carried by the at least one appendage, the second pose being a second defined position and a second defined orientation of the at least one sensor carried by the at least one appendage relative to one of the assembled objects being inspected; and causing the at least one robot to execute at least one of the determined motion plans by moving the at least one appendage from the first pose to the second pose without collisions.

Processing by a plurality of logic circuits of the at least one motion planning processor to determine at least one motion plan for the at least one appendage of the at least one robot may include a motion plan that moves the at least one appendage from the first pose to the second pose passing through at least a third pose all without collisions, the third pose being a third defined position and a third defined orientation of the at least one sensor carried by the at least one appendage relative to one of the assembled objects being inspected, at least one of the third defined position and the third defined orientation different from a respective one of the second defined position and the second defined orientation. The at least one robot may include a base that is at a fixed position and the assembled objects move relative to the base, and processing by a plurality of logic circuits of the at least one motion planning processor to determine at least one motion plan for the at least one appendage may include processing to account for both a motion of travel of the assembled object in a real world reference frame and a motion of the respective object to be assembled with respect to a conveyor. The at least one robot a base that moves in sequence and in parallel with movement of the assembled objects, and processing by a plurality of logic circuits of the at least one motion planning processor to determine at least one motion plan for the at least one appendage may include processing to account for both a motion of a conveyor and a motion of the respective object to be assembled with respect to the conveyor. The at least one appendage may be removably coupleable to at least one of a moving portion of a conveyor, to a fixture carried by a portion of the conveyor or to the objects to be assembled to move along therewith, and processing by a plurality of logic circuits of the at least one motion planning processor to determine at least one motion plan for the at least one appendage may include processing to account for a motion of the respective object to be assembled with respect to the conveyor. Processing by a plurality of logic circuits of the at least one motion planning processor to determine at least one motion plan for the at least one appendage may include processing to determine a motion plan for a first appendage of the at least one appendage to detachably couple a second appendage of the at least one appendage to at least one of: a moving portion of a conveyance, a fixture carried by the moving portion of the conveyance, or the object being assembled and transported by the moving portion of the conveyance. Processing by a plurality of logic circuits of the at least one motion planning processor to determine at least one motion plan for the at least one appendage may include processing to determine a motion plan for the first appendage of the at least one appendage to uncouple the second appendage of the at least one appendage from at least one of: the moving portion of the conveyance, the fixture carried by the moving portion of the conveyance, or the object being assembled and transported by the moving portion of the conveyance. Processing by a plurality of logic circuits of the at least one motion planning processor to determine at least one motion plan for the at least one appendage may include processing to determine a motion plan for a first appendage of the at least one appendage to uncouple a second appendage of the at least one appendage from at least one of: a moving portion of a conveyance, a fixture carried by the moving portion of the conveyance, or the object being assembled and transported by the moving portion of the conveyance. Capturing information that represents a respective position and orientation of the respective object may include capturing image information from at least one camera carried by the at least one appendage. The at least one appendage may include a first appendage and at least a second appendage, the second appendage is separately moveable from the first appendage, and processing by a plurality of logic circuits of the at least one motion planning processor to determine at least one motion plan for the at least one appendage may include processing by the plurality of logic circuits of the at least one motion planning processor to determine at least one motion plan for the first appendage and capturing information that represents a respective position and orientation of the respective object may include capturing image information from at least one camera carried by the second appendage. The method may further include: processing by a plurality of logic circuits of the at least one motion planning processor to determine at least one motion plan for the second appendage which carries the at least one camera between at least two different poses without collisions. The at least one robot may include one or more external cables, and the processing by a plurality of logic circuits of the motion planning processor may include processing by a plurality of logic circuits of by the motion planning processor to produce a motion plan where at least a portion of one or more external cables that are part of the at least one robot are modeled. The at least one robot may include one or more external cables, and the processing by a plurality of logic circuits of the motion planning processor may include processing by a plurality of logic circuits of by the motion planning processor to produce a motion plan where at least a portion of one or more external cables that are part of the at least one robot are modeled including a representation of a relative flexibility of the respective cable. The processing by a plurality of logic circuits of the motion planning processor may include processing by a plurality of logic circuits of the motion planning processor to produce a motion plan based on a predicted future position and a future orientation of a given one of the assembled objects. A first appendage of the at least one appendage may carry at least one image sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. A first appendage of the at least one appendage may carry at least one contact sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. A first appendage of the at least one appendage may carry at least one capacitive sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one capacitive sensor carried by the first appendage to operatively sense a portion of an environment. A first appendage of the at least one appendage may carry at least one force sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one force sensor carried by the first appendage to operatively sense a portion of an environment. A first appendage of the at least one appendage may carry at least one proximity sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one proximity sensor carried by the first appendage to operatively sense a portion of an environment. The at least one appendage may include two or more appendages, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and capturing information that represents a respective position and orientation of the respective object may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The robotic system may include at least a first appendage and a second appendage, and motion planning may include determining motion plans for each of the first and the second appendages to pass one of the end effectors between the first and the second appendages. The robotic system may perform the acts autonomously.

A robotic system to perform an inspection of each of a plurality of assembled objects as the assembled objects are transported past one or more inspection stations, the robotic system may include: at least one robot, the at least one robot having at least one appendage, the at least one appendage having at least one joint and at least one sensor; at least one motion planning processor; and at least one nontransitory processor-readable medium that stores at least one of processor-executable instructions or data which, when executed by the at least one motion planning processor, causes that at least one motion planning processor to: for each of the objects, capture information that represents a respective position and orientation of the respective object; process by a plurality of logic circuits of the at least one motion planning processor to determine at least one motion plan for the at least one appendage of the at least one robot that moves the at least one appendage from a first pose to a second pose without collisions, the first pose being a first defined position and a first defined orientation of the at least one sensor carried by the at least one appendage, the second pose being a second defined position and a second defined orientation of the at least one sensor carried by the at least one appendage relative to one of the assembled objects being inspected; and cause the at least one robot to execute at least one of the determined motion plans by moving the at least one appendage from the first pose to the second pose without collisions.

A method of operation in a robotic system, the robotic system including at least one motion planning processor, at least one sensor, and at least one robot, the at least one robot having at least one appendage, the at least one appendage having at least one joint and at least one end effector may include: successively causing the at least one appendage to move to each of a plurality of successive poses; for the at least one sensor, successively capturing information that represents a respective position and orientation of the respective sensor with respect to a respective portion of the at least one appendage at each of the successive poses; for the at least one sensor, determining a respective set of calibration values from the successively captured information; processing by a plurality of logic circuits of the at least one motion planning processor to determine at least one calibrated motion plan for the at least one appendage of the at least one robot that moves the at least one appendage from a first pose to a second pose without collisions; and causing the at least one robot to execute at least one of the determined motion plans by moving the at least one appendage from the first pose to the second pose without collisions.

A method of operation in a robotic system, the robotic system including at least one motion planning processor, at least one sensor, and at least one robot, the at least one robot having at least one appendage, the at least one appendage having at least one joint and at least one end effector, the method may include: successively capturing information that represents a volume of space in which the at least one appendage operates, the volume of space which is inhabitable by static objects and dynamic objects including humans; based at least in part on the captured information, processing by a plurality of logic circuits of the at least one motion planning processor to determine at least a first motion plan that provides a first trajectory through a portion of the volume of space for the at least one appendage that moves the at least one appendage between a number of successive poses; based at least in part on the captured information, processing by a plurality of logic circuits of the at least one motion planning processor to determine at least a subsequent motion plan that provides a subsequent trajectory through a portion of the volume of space for the at least one appendage that moves the at least one appendage between a number of successive poses and that avoids a dynamic object that would otherwise present a risk of collision above a defined threshold for the previous first trajectory; and successively causing the at least one appendage to move to each of a plurality of successive poses according to a current one of the motion plan.

The robotic system may include a first number of sensors at respective fixed locations that monitor the volume of space, the first number of sensors not carried by the appendages, and successively capturing information that represents a volume of space in which the at least one appendage operates may include successively capturing information via the first number of sensors at the respective fixed locations. The robotic system may include a second number of sensors carried by the appendages that monitor the volume of space, and successively capturing information that represents a volume of space in which the at least one appendage operates may include successively capturing information via the second number of sensors carried by the appendages. The robotic system may include a number of sensors carried by the appendages that monitor the volume of space, and successively capturing information that represents a volume of space in which the at least one appendage operates may include successively capturing information via the number of sensors carried by the appendages. The at least one sensor may include at least one image sensor, and processing by a plurality of logic circuits of the at least one motion planning processor to determine at least a subsequent motion plan for the at least one appendage may include processing by a plurality of logic circuits of the at least one motion planning processor to determine the subsequent motion plan based on image information captured via the at least one sensor. The at least one sensor may include at least one image sensor, and processing by a plurality of logic circuits of the at least one motion planning processor to determine at least a subsequent motion plan for the at least one appendage may include processing by a plurality of logic circuits of the at least one motion planning processor to determine the subsequent motion plan based on image information captured via the at least one sensor, the subsequent motion plan that employs a momentum of the at least one appendage to follow a trajectory that minimizes a probability of a collision with the dynamic object. The at least one sensor may include at least one image sensor, and processing by a plurality of logic circuits of the at least one motion planning processor to determine at least a subsequent motion plan for the at least one appendage may include processing by a plurality of logic circuits of the at least one motion planning processor to determine the subsequent motion plan based on image information captured via the at least one sensor. The at least one sensor may include at least one image sensor, and processing by a plurality of logic circuits of the at least one motion planning processor to determine at least a subsequent motion plan for the at least one appendage may include processing by a plurality of logic circuits of the at least one motion planning processor to determine the subsequent motion plan based on image information captured via the at least one sensor, the subsequent motion plan that employs a momentum of the at least one appendage to follow a trajectory that minimizes a probability of a collision with the dynamic object without stopping a motion of the at least one appendage in response to a presence of the dynamic object in the volume of space. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and processing by a plurality of logic circuits of the at least one motion planning processor to determine at least a subsequent motion plan for the at least one appendage may include processing by a plurality of logic circuits of the at least one motion planning processor to determine the subsequent motion plan based on the information captured via the at least one sensor, the subsequent motion plan that employs a momentum of the at least one appendage to follow a trajectory that minimizes a probability of a collision with the dynamic object. The at least one sensor may include a plurality of at least one type of sensor that provides a high level of redundancy, and processing by a plurality of logic circuits of the at least one motion planning processor to determine at least a subsequent motion plan for the at least one appendage may include processing by a plurality of logic circuits of the at least one motion planning processor to determine the subsequent motion plan based on the information captured via the at least one sensor that is operating, the subsequent motion plan that employs a momentum of the at least one appendage to follow a trajectory that minimizes a probability of a collision with the dynamic object. The robotic system may perform the acts autonomously.

A robotic system may include: at least one robot, the at least one robot having at least one appendage, the at least one appendage having at least one joint and at least one end effector; at least one motion planning processor; and at least one nontransitory processor-readable medium that stores at least one of processor-executable instructions or data which, when executed by the at least one motion planning processor, causes that at least one motion planning processor to: successively capture information that represents a volume of space in which the at least one appendage operates, the volume of space which is inhabitable by static objects and dynamic objects including humans; based at least in part on the captured information, process by a plurality of logic circuits of the at least one motion planning processor to determine at least a first motion plan that provides a first trajectory through a portion of the volume of space for the at least one appendage that moves the at least one appendage between a number of successive poses; based at least in part on the captured information, process by a plurality of logic circuits of the at least one motion planning processor to determine at least a subsequent motion plan that provides a subsequent trajectory through a portion of the volume of space for the at least one appendage that moves the at least one appendage between a number of successive poses and that avoids a dynamic object that would otherwise present a risk of collision above a defined threshold for the previous first trajectory; and successively cause the at least one appendage to move to each of a plurality of successive poses according to a current one of the motion plan.

A method of operation in a robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another, the method may include: generating at least a first motion plan for a first appendage that moves the first appendage between at least a respective first pose and a respective second pose within the first operational volume without collisions at least between the first and the second appendages; generating at least a second motion plan for a second appendage that moves the second appendage between at least a respective first pose and a respective second pose within the second operational volume without collisions at least between the first and the second appendages; causing the first appendage to move according to the first motion plan; and causing the second appendage to move according to the second motion plan.

Generating a first motion plan and a second motion plan may include generating a first motion plan and a second motion plan in which the second pose of at least one of the first appendage or the second appendage is a pose in which an object is transferrable from a portion of one of the first or the second appendages to a portion of the other one of the first or the second appendages. Generating a first motion plan may include generating a first motion plan in which the second pose of the first appendage positions a portion of the first appendage to operatively engage a first object in an environment, and generating a second motion plan may include generating a second motion plan in which the second pose of the second appendage positions a portion of the second appendage to operatively engage the first object in the environment. Generating a first motion plan may include generating a first motion plan in which the second pose of the first appendage positions a portion of the first appendage to operatively engage a drawer in an environment, and generating a second motion plan may include generating a second motion plan in which the second pose of the second appendage positions a portion of the second appendage to at least one of place or retrieve an object from the drawer. The first appendage may carry at least one sensor, and generating a first motion plan may include generating a first motion plan in which the second pose of the first appendage positions the at least one sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one sensor. The first appendage may carry at least one image sensor, and generating a first motion plan may include generating a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. The first appendage may carry at least one contact sensor, and generating a first motion plan may include generating a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. The first appendage may carry at least one capacitive sensor, and generating a first motion plan may include generating a first motion plan in which the second pose of the first appendage positions the at least one capacitive sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one capacitive sensor. The first appendage may carry at least one force sensor, and generating a first motion plan may include generating a first motion plan in which the second pose of the first appendage positions the at least one force sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one force sensor. The first appendage may carry at least one proximity sensor, and generating a first motion plan may include generating a first motion plan in which the second pose of the first appendage positions the at least one proximity sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one proximity sensor. Generating a first motion plan may include generating a first motion plan in which the second pose of the first appendage positions a portion of the first appendage to grasp a first object in an environment, and generating a second motion plan may include generating a second motion plan in which the second pose of the second appendage positions a portion of the second appendage to grasp the first object in the environment. Generating a first motion plan may include generating a first motion plan in which the second pose of the first appendage positions a portion of the first appendage to grasp a first object in an environment, and generating a second motion plan may include generating a second motion plan in which the second pose of the second appendage positions a portion of the second appendage to grasp the first object in the environment while the first appendage grasps the first object. Causing the first appendage to move according to the first motion plan may include causing the first appendage to move to be in the respective second pose during a first period and causing the second appendage to move according to the second motion plan may include causing the second appendage to move to be in the respective second pose during the first period. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The method may further include: dynamically generating a plurality of updated first motion plans while causing the first appendage to move at least partially between the respective first and the respective second poses. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The second appendage may also carry a respective sensor in addition to the respective end effector carried by the second appendage, and the method may further include: receiving information collected by the sensor carried by the second appendage; and dynamically generating a plurality of updated second motion plans based at least in part on the received information collected by the sensor carried by the second appendage. The first appendage may also carry a respective end effector in addition to the respective at least one sensor carried by the first appendage, and the method may further include: dynamically generating a plurality of updated first motion plans based at least in part on the received information collected by at least one of the sensors carried by the second appendage, the updated first motion plans which position the respective end effector carried by the first appendage to physically engage an object in an environment in cooperation with the respective end effector of the second appendage. Generating at least a first motion plan for a first appendage may include generating a first motion plan that further moves the first appendage between at least the respective second pose and a respective third pose within the first operational volume without collisions at least between the first and the second appendages. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; causing the third appendage to move according to the third motion plan. The robotic system may perform the acts autonomously.

A robotic system may include: a first appendage moveable within a first operational volume; at least a second appendage moveable within a second operational volume, at least a portion of the second operational volume overlaps with at least a portion of the first operational volume such that the first and second appendages are capable of physically colliding with one another; at least one motion planning processor; and at least one nontransitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions at least between the first and the second appendages; generate at least a second motion plan for a second appendage that moves the second appendage between at least a respective first pose and a respective second pose within the second operational volume without collisions at least between the first and the second appendages; cause the first appendage to move according to the first motion plan; and cause the second appendage to move according to the second motion plan.

A method of operation in a robotic system including a first appendage that carries at least one sensor and at least a second appendage that carries at least one end effector, the first and the second appendages moveable within a first operational volume and a second operational volume, respectively, at least a portion of the second operational volume overlapping with at least a portion of the first operational volume such that the first and the second appendages are capable of physically colliding with one another, the method may include: generating at least a first motion plan for the first appendage that moves the first appendage between at least a respective first pose and a respective second pose within the first operational volume without collisions at least between the first and the second appendages, the respective second pose which positions the at least one sensor carried by the first appendage to operatively sense a portion of an environment; generating at least a second motion plan for the second appendage that moves the second appendage between at least a respective first pose and a respective second pose within the second operational volume without collisions at least between the first and the second appendages, the respective second pose in which the end effector carried by the second appendage is positioned to operatively engage an object within the portion of the environment that is sensed by the at least one sensor; causing the first appendage to move according to the first motion plan; receiving information collected by the at least one sensor carried by the first appendage; and causing the second appendage to move according to the second motion plan.

The method may further include: dynamically generating a plurality of updated second motion plans based on the received information collected by the at least one sensor carried by the first appendage. The method may further include: dynamically generating a plurality of updated second motion plans based on the received information collected by the at least one sensor carried by the first appendage while causing the first appendage to move. The at least one sensor carried by the first appendage may include at least one image sensor, and receiving information collected by the at least one sensor carried by the first appendage may include receiving image information. The at least one sensor carried by the first appendage may include at least one contact sensor, and receiving information collected by the at least one sensor carried by the first appendage may include receiving contact information. The at least one sensor carried by the first appendage may include at least one capacitive sensor, and receiving information collected by the at least one sensor carried by the first appendage may include receiving capacitive information. The at least one sensor carried by the first appendage may include at least one force sensor, and receiving information collected by the at least one sensor carried by the first appendage may include receiving force information. The at least one sensor carried by the first appendage may include at least one proximity sensor, and receiving information collected by the at least one sensor carried by the first appendage may include receiving proximity information. Generating a first motion plan may include generating a first motion plan in which the second pose of the first appendage positions a portion of the first appendage to touch a first object in an environment, and generating a second motion plan may include generating a second motion plan in which the second pose of the second appendage positions a portion of the second appendage to grasp the first object in the environment. Generating a first motion plan may include generating a first motion plan in which the second pose of the first appendage positions a portion of the first appendage to touch a first object in a container, and generating a second motion plan may include generating a second motion plan in which the second pose of the second appendage positions a portion of the second appendage to grasp the first object in the container. Generating a first motion plan may include generating a first motion plan in which the second pose of the first appendage positions a portion of the first appendage to touch a first object in a drawer, and generating a second motion plan may include generating a second motion plan in which the second pose of the second appendage positions a portion of the second appendage to grasp the first object in the drawer. The second appendage may also carry a respective sensor in addition to the respective end effector carried by the second appendage, and the method may further include: receiving information collected by the sensor carried by the second appendage; and dynamically generating a plurality of updated second motion plans based at least in part on the received information collected by the sensor carried by the second appendage. The first appendage may also carry a respective end effector in addition to the respective at least one sensor carried by the first appendage, and the method may further include: dynamically generating a plurality of updated first motion plans based at least in part on the received information collected by at least one of the sensors carried by the second appendage, the updated first motion plans which position the respective end effector carried by the first appendage to physically engage an object in an environment in cooperation with the respective end effector of the second appendage. Generating at least a first motion plan for a first appendage may include generating a first motion plan that further moves the first appendage between at least the respective second pose and a respective third pose within the first operational volume without collisions at least between the first and the second appendages. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; and causing the third appendage to move according to the third motion plan. The robotic system may perform the acts autonomously.

A robotic system may include: a first appendage that carries at least one sensor and that is moveable within a first operational volume; at least a second appendage that carries at least one end effector and that is moveable within a second operational volume, at least a portion of the second operational volume overlaps with at least a portion of the first operational volume such that the first and second appendages are capable of physically colliding with one another; at least one motion planning processor; and at least one non-transitory processor-readable medium that stores at least one of processor-executable instructions or data which, when executed by the at least one motion planning processor, causes the at least one motion planning processor to: generate at least a first motion plan for the first appendage that moves the first appendage between at least a respective first pose and a respective second pose within the first operational volume without collisions at least between the first and the second appendages, the respective second pose which positions the at least one sensor carried by the first appendage to operatively sense a portion of an environment;

generate at least a second motion plan for the second appendage that moves the second appendage between at least a respective first pose and a respective second pose within the second operational volume without collisions at least between the first and the second appendages, the respective second pose in which the end effector carried by the second appendage is positioned to operatively engage an object within the portion of the environment that is sensed by the at least one sensor; cause the first appendage to move according to the first motion plan; receive information collected by the at least one sensor carried by the first appendage; and cause the second appendage to move according to the second motion plan.

A method of operation in a robotic system including a first appendage that carries at least one sensor and at least one end effector, the first appendage moveable within a first operational volume, the method may include: receiving information collected by the at least one sensor carried by the first appendage; dynamically generating at a plurality of successive intervals of time a plurality of updated motion plans for the first appendage that moves the first appendage between at least a respective first pose and a respective second pose within the first operational volume without collisions based at least in part on the received information collected by the at least one sensor carried by the first appendage; and causing the first appendage to move according to the dynamically generated motion plans for the first appendage.

Dynamically generating at a plurality of successive intervals of time a plurality of updated motion plans for the first appendage may include dynamically generating the plurality of updated motion plans for the first appendage while causing the first appendage to move. The at least one sensor carried by the first appendage may include at least one image sensor, and receiving information collected by the at least one sensor carried by the first appendage may include receiving image information. The at least one sensor carried by the first appendage may include at least one contact sensor, and receiving information collected by the at least one sensor carried by the first appendage may include receiving contact information. The at least one sensor carried by the first appendage may include at least one capacitive sensor, and receiving information collected by the at least one sensor carried by the first appendage may include receiving capacitive information. The at least one sensor carried by the first appendage may include at least one force sensor, and receiving information collected by the at least one sensor carried by the first appendage may include receiving force information. The at least one sensor carried by the first appendage may include at least one proximity sensor, and receiving information collected by the at least one sensor carried by the first appendage may include receiving proximity information. Dynamically generating at a plurality of successive intervals of time a plurality of updated motion plans for the first appendage may include generating a first motion plan in which the second pose of the first appendage positions the end effector carried by the first appendage to touch a first object in an environment. Dynamically generating at a plurality of successive intervals of time a plurality of updated motion plans for the first appendage may include generating a first motion plan in which the second pose of the first appendage positions a portion of the first appendage to touch a first object in a container. Dynamically generating at a plurality of successive intervals of time a plurality of updated motion plans for the first appendage may include generating a first motion plan in which the second pose of the first appendage positions a portion of the first appendage to touch a first object in a drawer. Dynamically generating at a plurality of successive intervals of time a plurality of updated motion plans for the first appendage may include generating a first motion plan in which the second pose of the first appendage positions the end effector carried by the first appendage to grasp a first object in a drawer. Dynamically generating at a plurality of successive intervals of time a plurality of updated motion plans for the first appendage may include generating a first motion plan that further moves the first appendage between at least the respective second pose and a respective third pose within the first operational volume without collisions at least between the first and the second appendages. The robotic system may further include at least a second appendage, the second appendage moveable within a second operational volume at least a portion of the second operational volume overlapping with at least a portion of the first operational volume such that the first and the second appendages are capable of physically colliding with one another, the method may include: dynamically generating at a plurality of successive intervals of time a plurality of updated motion plans for the second appendage that moves the second appendage between at least a respective first pose and a respective second pose within the second operational volume without collisions; and causing the second appendage to move according to the dynamically generated updated motion plans for the second appendage. The robotic system may perform the acts autonomously.

A robotic system may include: a first appendage that carries at least one sensor and at least one end effector, and that is moveable within a first operational volume; at least one motion planning processor; and at least one nontransitory processor-readable medium that stores at least one of processor-executable instructions or data which, when executed by the at least one motion planning processor, causes that at least one motion planning processor to: receive information collected by the at least one sensor carried by the first appendage; dynamically generate at a plurality of successive intervals of time a plurality of updated motion plans for the first appendage that moves the first appendage between at least a respective first pose and a respective second pose within the first operational volume without collisions based at least in part based on the received information collected by the at least one sensor carried by the first appendage; cause the first appendage to move according to the dynamically generated motion plans for the first appendage.

A method of operation in a robotic system to package items in boxes, the robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another, the method may include: generating at least a first motion plan for the first appendage that moves the first appendage between at least a respective first pose and a respective second pose within the first operational volume without collisions at least between the first and the second appendages, the second pose locating a portion of the first appendage at least one of above or within a box; generating at least a second motion plan for the second appendage that moves the second appendage between at least a respective first pose and a respective second pose within the second operational volume without collisions at least between the first and the second appendages; causing the first appendage to move according to the first motion plan; and causing the second appendage to move according to the second motion plan.

Generating a first motion plan and a second motion plan may include generating a first motion plan and a second motion plan in which the second pose of at least one of the first appendage or the second appendage may be a pose in which an item is transferrable from a portion of one of the first or the second appendages into the box. Generating a first motion plan may include generating a first motion plan in which the second pose of the first appendage positions a portion of the first appendage to transfer the item into the box, and generating a second motion plan may include generating a second motion plan in which the second pose of the second appendage positions a portion of the second appendage to operatively engage a portion of the box. Generating a first motion plan may include generating a first motion plan in which the second pose of the first appendage positions a portion of the first appendage to transfer the item into the box, and generating a second motion plan may include generating a second motion plan in which the second pose of the second appendage positions a portion of the second appendage to operatively engage a flap of the box. Generating a first motion plan may include generating a first motion plan in which the first pose of the first appendage positions a portion of the first appendage to operatively engage a drawer in an environment, and generating a second motion plan may include retrieve the object from a container and the second pose of the first appendage positions a portion of the first appendage to place the item in the box. The second appendage may carry at least one sensor, and generating a second motion plan may include generating a second motion plan in which the second pose of the second appendage positions the at least one sensor carried by the second appendage to operatively sense a portion of an interior of the box, and generating a first motion plan may include generating a first motion plan in which the second pose of the first appendage positions a portion of the first appendage to transfer the item in the interior of the box while the interior of the box is sensed by the at least one sensor. The second appendage may carry at least one image sensor, and generating a second motion plan may include generating a second motion plan in which the second pose of the second appendage positions the at least one image sensor carried by the first appendage to operatively sense a portion of an interior of the box, and generating a first motion plan may include generating a first motion plan in which the second pose of the first appendage positions a portion of the first appendage to transfer the item in the interior of the box. Generating a first motion plan may include generating a first motion plan in which the second pose of the first appendage positions a portion of the first appendage to transfer the item into the box, and generating a second motion plan may include generating a second motion plan in which the first pose of the second appendage positions a portion of the second appendage to retrieve packaging materials and the second pose of the second appendage positions a portion of the second appendage to transfer the retrieved packaging material into an interior of the box. The method may further include: generating a third motion plan in which a first pose of at least one of the appendages positions the at least one appendage to retrieve packaging materials, a second pose of at least one of the appendages positions the at least one appendage to wrap an item, and a third pose of at least one of the appendages positions the at least one appendage to transfer the wrapped item into an interior of the box. The at least one appendage may include two or more appendages, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The method may further include: dynamically generating a plurality of updated first motion plans while causing the first appendage to move at least partially between the respective first and the respective second poses. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; causing the third appendage to move according to the third motion plan. The robotic system may perform the acts autonomously.

A robotic system to package items in boxes, the robotic system may include: a first appendage that is moveable within a first operational volume; a second appendage that is moveable within a second operational volume, at least a portion of the second operational volume overlaps with at least a portion of the first operational volume such that the first and second appendages are capable of physically colliding with one another; at least one motion planning processor; and at least one nontransitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions at least between the first and the second appendages, the second pose locating a portion of the first appendage at least one of above or within a box; generate at least a second motion plan for a second appendage that moves the second appendage between at least a respective first pose and a respective second pose within the second operational volume without collisions at least between the first and the second appendages; cause the first appendage to move according to the first motion plan; and cause the second appendage to move according to the second motion plan.

A method of operation in a robotic system to handle shelf stocking and arrangement of items on shelves, the robotic system including at least one robot that carries at least one sensor, the method may include: generating at least a first motion plan for a first robot of the at least one robotic system, the first motion plan that moves at least a portion of the first robot between at least a respective first pose and a respective second pose with respect to a first set of shelves to sense at least one of a quantity and arrangement of items on the shelves; causing the at least a portion of the first robot to move according to the first motion plan; and successively capturing information that represents stocking and arrangement of items on shelves in at least one of the first pose, the second pose or an intermediary pose between the first and the second poses.

The first robot may be a self-propelled robot, and generating at least a first motion plan for a first robot may include generating at least a first motion plan that specifies a trajectory for the self-propelled robot with respect to an aisle along which the first set of shelves extends. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and successively capturing information that represents a stocking and arrangement of items on shelves may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: successively capturing information that represents an operational volume of space of an aisle along which the first set of shelves extends, and wherein generating at least a first motion plan for a first robot may include generating at least a first motion plan that specifies a trajectory for the self-propelled robot with respect to an aisle that minimizes a risk of collision with objects in the aisle. The method may further include: successively capturing information that represents an operational volume of space of an aisle along which the first set of shelves extends, and wherein generating at least a first motion plan for a first robot may include generating at least a first motion plan that specifies a trajectory for the self-propelled robot with respect to an aisle that stops the self-propelled robot if a human-like object is detected in the trajectory of the self-propelled robot. The method may further include: successively capturing information that represents an operational volume of space of an aisle along which the first set of shelves extends, and wherein generating at least a first motion plan for a first robot may include generating at least a first motion plan that specifies a trajectory for the self-propelled robot with respect to an aisle that changes the trajectory of the self-propelled robot to avoid a human-like object that is detected in the trajectory of the self-propelled robot, without stopping a movement of the self-propelled robot. The first robot may include a first appendage with at least one joint and which carries at least one sensor, and generating at least a first motion plan for a first robot may include generating at least a first motion plan that specifies a trajectory for the first appendage with respect to the first set of shelves. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and successively capturing information that represents a stocking and arrangement of items on shelves may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The first robot may include a second appendage with at least one joint, and generating at least a first motion plan for a first robot may include generating at least a second motion plan that specifies a trajectory for the second appendage with respect to the first set of shelves. The second appendage may carry at least one sensor, and generating at least a first motion plan for a first robot may include generating at least a second motion plan that specifies a trajectory for the second appendage with respect to a second set of shelves that extend along the aisle. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and successively capturing information that represents a stocking and arrangement of items on shelves may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The second appendage may carry at least one end effector, and generating at least a second motion plan for a first robot may include generating at least a second motion plan that specifies a trajectory for the second appendage with respect to the first set of shelves that extend along the aisle. The second appendage may carry at least one end effector, and generating at least a second motion plan for a first robot may include generating at least a second motion plan that specifies a trajectory for the second appendage with respect to a second set of shelves that extend along the aisle. The at least one end effector may include a gripper, a hook, or a claw, and generating at least a second motion plan for a first robot may include generating at least a second motion plan that specifies a trajectory for the second appendage with respect to the first set of shelves that extend along the aisle. The at least one end effector may include a gripper, a hook, or a claw, and generating at least a second motion plan for a first robot may include generating at least a second motion plan that specifies a trajectory for the second appendage with respect to a second set of shelves that extend along the aisle. Generating at least a second motion plan for a first robot may include generating at least a second motion plan that specifies a trajectory for the second appendage between a first pose and a second pose, the first pose which positions and orients the second appendage to retrieve an item from a supply of items to replenish a shelf of the first set of shelves and the second pose which positions and orients the second appendage to place the retrieved item on the shelf of the first set of shelves. Generating at least a second motion plan for a first robot may include generating at least a second motion plan that specifies a trajectory for the second appendage between a first pose and a second pose, the first pose which positions and orients the second appendage to operatively engage one or more items on a shelf of the first set of shelves and the second pose which positions and orients the second appendage to reposition the operatively engaged one or more items on the shelf of the first set of shelves. Generating at least a second motion plan for a first robot may include generating at least a second motion plan that specifies a trajectory for the second appendage between a first pose and a second pose, the first pose which positions and orients the second appendage to retrieve an item from a shelf of the first set of shelves and the second pose which positions and orients the second appendage to place the retrieved item on a second shelf of the first set of shelves. Generating at least a second motion plan for a first robot may include generating at least a second motion plan that specifies a trajectory for the second appendage between a first pose and a second pose, the first pose which positions and orients the second appendage to retrieve an item from a shelf of the first set of shelves and the second pose which positions and orients the second appendage to place the retrieved item in a container carried by the first robot. The method may further include generating at least a third motion plan for the first robot that specifies a trajectory for the second appendage between a third pose and a fourth pose, the third pose which positions and orients the second appendage to retrieve the item from the container carried by the first robot and the second pose which positions and orients the second appendage to place the retrieved item from the container on a shelf of a second set of shelves, the second set of shelves exclusive of the first set of shelves. The first robot is a self-propelled robot, the method may further include: generating at least a fourth motion plan for the self-propelled robot that specifies a trajectory for the self-propelled robot between the first set of shelves and the second set of shelves; and causing the self-propelled robot to traverse the trajectory defined by the fourth motion plan; subsequently, causing the second appendage to move along the trajectory defined by the third motion plan. The method may further include: causing the second appendage to move according to the second motion plan. Generating at least a first motion plan for a first robot of the at least one robot may include processing by a plurality of logic circuits of the at least one motion planning processor to determine at least one motion plan. The robotic system may perform the acts autonomously.

A robotic system to handle shelf stocking and arrangement of items on shelves may include: at least one robot; at least one sensor, the at least one sensor carried by that at least one robot; at least one motion planning processor; and at least one nontransitory processor-readable medium that stores at least one of processor-executable instructions or data which, when executed by the at least one motion planning processor, causes the at least one motion planning processor to: generate at least a first motion plan for the at least one robot, the first motion plan that moves the first robot between at least a respective first pose and a respective second pose with respect to a first set of shelves to sense at least one of a quantity and arrangement of items on the shelves; cause the at least one robot to move according to the first motion plan; and successively capture information that represents stocking and arrangement of items on shelves in at least one of the first pose, the second pose or an intermediary pose between the first and the second poses.

A method of operation in a robotic system to handle baggage, the robotic system including at least one robot and at least one sensor, the method may include: receiving information that represents an environment which includes a plurality of pieces of baggage; generating at least a first motion plan for a first robot of the at least one robot, the first motion plan that moves at least a portion of the first robot between at least a respective first pose and a respective second pose with respect to the plurality of pieces of baggage; and causing the at least a portion of the first robot to move according to the first motion plan.

The first robot may be a self-propelled robot, and generating at least a first motion plan for a first robot may include generating at least a first motion plan that specifies a trajectory for the self-propelled robot with respect to the pieces of baggage. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and receiving information that represents an environment which includes a plurality of pieces of baggage may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. Generating at least a first motion plan for a first robot may include generating at least a first motion plan that specifies a trajectory for at least the portion of the first robot with respect to the environment that minimizes a risk of collision with objects in the environment. Generating at least a first motion plan for a first robot may include generating at least a first motion plan that specifies a trajectory for at least the portion of the first robot with respect to the first environment that stops the at least the portion of the first robot if a human-like object is detected in the trajectory of the self-propelled robot. Generating at least a first motion plan for a first robot may include generating at least a first motion plan that specifies a trajectory for the at least the portion of the first robot that changes the trajectory of the at least the portion of the first robot to avoid a human-like object that is detected in the trajectory of the at least the portion of the robot, without stopping a movement of the at least the portion of the first robot. The first robot may include a first appendage with at least one joint and which carries at least one sensor, and generating at least a first motion plan for a first robot may include generating at least a first motion plan that specifies a trajectory for the first appendage with respect to at least one piece of baggage of the plurality of pieces of baggage. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and receiving information that represents an environment which includes a plurality of pieces of baggage may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The environment may include at least one conveyor, and the first robot may include a first appendage with at least one joint and which carries at least one sensor, and generating at least a first motion plan for a first robot may include generating at least a first motion plan that specifies a trajectory for the first appendage with respect to the at least one conveyor or piece of baggage of the plurality of pieces of baggage. The environment may include at least one conveyor, and the first robot may include a first appendage with at least one joint and which carries at least one sensor, and generating at least a first motion plan for a first robot may include generating at least a first motion plan that specifies a trajectory for the first appendage to pick up a first piece of baggage of the plurality of pieces of baggage and place the picked up piece of baggage on a first conveyor of the at least one conveyor. The environment may include at least one conveyor, and the first robot may include a first appendage with at least one joint and which carries at least one sensor, and generating at least a first motion plan for a first robot may include generating at least a first motion plan that specifies a trajectory for the first appendage to pick up a first piece of baggage of the plurality of pieces of baggage from a first conveyor of the at least one conveyor. Generating at least a first motion plan for a first robot may include generating at least a first motion plan that specifies a trajectory for the first appendage to deposit the first piece of baggage of the plurality of pieces of baggage in a defined location. Generating at least a first motion plan for a first robot may include generating at least a first motion plan that specifies a trajectory for the first appendage to deposit the first piece of baggage of the plurality of pieces of baggage on a second conveyor of the at least one conveyor, the second conveyor being a different conveyor from the first conveyor and unconnected thereto. Generating a first motion plan may include generating at least a first motion plan that specifies a trajectory for the first appendage first to retrieve the first piece of baggage of the plurality of pieces of baggage from a first conveyor and second to deposit the first piece of baggage on the second conveyor. Generating a first motion plan may include generating at least a first motion plan that specifies a trajectory for the first appendage first to retrieve the first piece of baggage of the plurality of pieces of baggage from the first conveyor, matching a first speed of the first conveyor, and second to deposit the first piece of baggage on the second conveyor, matching a second speed of the second conveyor, the second speed different than the first speed. The first robot may include a second appendage with at least one joint, and generating at least a first motion plan for a first robot may include generating at least a second motion plan that specifies a trajectory for the second appendage with respect to at least one piece of baggage of the plurality of pieces of baggage. The second appendage may carry at least one sensor, and generating at least a first motion plan for a first robot may include generating at least a second motion plan that specifies a trajectory for the second appendage with respect to at least one piece of baggage of the plurality of pieces of baggage or a conveyor. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and receiving information that represents a stocking and arrangement of items on shelves may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The second appendage may carry at least one end effector, and generating at least a second motion plan for a first robot may include generating at least a second motion plan that specifies a trajectory for the second appendage with respect to at least one piece of baggage of the plurality of pieces of baggage. The second appendage may carry at least one end effector, and generating at least a second motion plan for a first robot may include generating at least a second motion plan that specifies a trajectory for the second appendage with respect to at least one conveyor or baggage trolley. The at least one end effector may include a gripper, a hook, or a claw, and generating at least a second motion plan for a first robot may include generating at least a second motion plan that specifies a trajectory for the second appendage to at least one piece of baggage of the plurality of pieces of baggage. The at least one end effector may include a gripper, a hook, or a claw, and generating at least a second motion plan for a first robot may include generating at least a second motion plan that specifies a trajectory for the second appendage with respect to a baggage conveyor. Generating at least a second motion plan for a first robot may include generating at least a second motion plan that specifies a trajectory for the second appendage between a first pose and a second pose, the first pose which positions and orients the second appendage to retrieve a piece of baggage from a first area and the second pose which positions and orients the second appendage to place the retrieved piece of baggage in a second area, the second area spaced from the first area. Generating at least a second motion plan for a first robot may include generating at least a second motion plan that specifies a trajectory for the second appendage between a first pose and a second pose, the first pose which positions and orients the second appendage to retrieve a piece of baggage from a first area and the second pose which positions and orients the second appendage to place the retrieved piece of baggage on a baggage conveyor. Generating at least a second motion plan for a first robot may include generating at least a second motion plan that specifies a trajectory for the second appendage between a first pose and a second pose, the first pose which positions and orients the second appendage to retrieve a piece of baggage from a conveyor and the second pose which positions and orients the second appendage to place the retrieved piece of baggage in an area that is not a conveyor. Generating at least a second motion plan for a first robot may include generating at least a second motion plan that specifies a trajectory for the second appendage between a first pose and a second pose, the first pose which positions and orients the second appendage to retrieve a piece of baggage from a conveyor and the second pose which positions and orients the second appendage to place the retrieved piece of baggage on a luggage trolley. Generating at least a second motion plan for a first robot may include generating at least a second motion plan that specifies a trajectory for the second appendage between a first pose and a second pose, the first pose which positions and orients the second appendage to retrieve a piece of baggage from a luggage trolley and the second pose which positions and orients the second appendage to place the retrieved piece of baggage on a luggage conveyor. Generating at least a second motion plan for a first robot may include generating at least a second motion plan that specifies a trajectory for the second appendage between a first pose and a second pose, the first pose which positions and orients the second appendage to retrieve a piece of baggage from a first conveyor and the second pose which positions and orients the second appendage to place the retrieved piece of baggage on a second conveyor, the second conveyor different than the first conveyor. The method may further include: generating at least a third motion plan for the first robot that specifies a trajectory for the second appendage between a third pose and a fourth pose, the third pose which positions and orients the second appendage to retrieve the baggage from a first luggage trolley and the fourth pose which positions and orients the second appendage to place the retrieved baggage on a second luggage trolley. The first robot may be a self-propelled robot, the method may further include: generating at least a fourth motion plan for the self-propelled robot that specifies a trajectory for the self-propelled robot through at least a portion of the environment; and causing the self-propelled robot to traverse the trajectory defined by the fourth motion plan; subsequently, causing the second appendage to move along the trajectory defined by the third motion plan. The method may further include: causing the second appendage to move according to the second motion plan. Generating at least a first motion plan for a first robot of the at least one robot may include processing by a plurality of logic circuits of the at least one motion planning processor to determine at least one motion plan. Generating at least a first motion plan for a first robot of the at least one robot may include processing by a plurality of logic circuits of the at least one motion planning processor to determine at least one motion plan. The robotic system may perform the acts autonomously.

A robotic system to handle baggage may include: at least one robot, including a first robot; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes a plurality of pieces of baggage; generate at least a first motion plan for a first robot of the at least one robot, the first motion plan that moves at least a portion of the first robot between at least a respective first pose and a respective second pose with respect to the plurality of pieces of baggage; and cause the at least a portion of the first robot to move according to the first motion plan.

A method of operation in a robotic system to handle materials to be recycled, the robotic system including at least one robot and at least one sensor, the method may include: receiving information that represents an environment which includes a plurality of pieces of materials for recycling; generating at least a first motion plan for a first robot of the at least one robot, the first motion plan that moves at least a portion of the first robot between at least a respective first pose and a respective second pose with respect to the plurality of pieces of materials for recycling; and causing the at least a portion of the first robot to move according to the first motion plan.

The first robot may be a self-propelled robot, and generating at least a first motion plan for a first robot may include generating at least a first motion plan that specifies a trajectory for the self-propelled robot with respect to the pieces of material for recycling. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and/or one or more proximity sensors mounted to a non-appendage portion of the self-propelled robot, and receiving information that represents an environment which includes a plurality of pieces of materials for recycling may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and/or one or more proximity sensors. Generating at least a first motion plan for a first robot may include generating at least a first motion plan that specifies a trajectory for at least the portion of the first robot with respect to the environment that minimizes a risk of collision with objects in the environment. Generating at least a first motion plan for a first robot may include generating at least a first motion plan that specifies a trajectory for at least the portion of the first robot with respect to the first environment that stops the at least the portion of the first robot if a human-like object is detected in the trajectory of the self-propelled robot. Generating at least a first motion plan for a first robot may include generating at least a first motion plan that specifies a trajectory for the at least the portion of the first robot that changes the trajectory of the at least the portion of the first robot to avoid a human-like object that is detected in the trajectory of the at least the portion of the robot, without stopping a movement of the at least the portion of the first robot. The first robot may include a first appendage with at least one joint and which carries at least one sensor, and generating at least a first motion plan for a first robot may include generating at least a first motion plan that specifies a trajectory for the first appendage with respect to at least one piece of material of the plurality of pieces of material for recycling. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment which includes a plurality of pieces of material for recycling may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The environment may include at least one conveyor, and the first robot may include a first appendage with at least one joint and which carries at least one sensor, and generating at least a first motion plan for a first robot may include generating at least a first motion plan that specifies a trajectory for the first appendage with respect to the at least one conveyor or a piece of material of the plurality of pieces of material for recycling. The environment may include at least one conveyor, and the first robot may include a first appendage with at least one joint and which carries at least one sensor, and generating at least a first motion plan for a first robot may include generating at least a first motion plan that specifies a trajectory for the first appendage to pick up a first piece of material of the plurality of pieces of material for recycling and place the picked up piece of material on a first conveyor of the at least one conveyor. The environment may include at least one conveyor, and the first robot may include a first appendage with at least one joint and which carries at least one sensor, and generating at least a first motion plan for a first robot may include generating at least a first motion plan that specifies a trajectory for the first appendage to pick up a first piece of material of the plurality of pieces of material for recycling from a first conveyor of the at least one conveyor. Generating at least a first motion plan for a first robot may include generating at least a first motion plan that specifies a trajectory for the first appendage to deposit the first piece of material of the plurality of pieces of material for recycling in a defined location. Generating at least a first motion plan for a first robot may include generating at least a first motion plan that specifies a trajectory for the first appendage to deposit the first piece of material of the plurality of pieces of material for recycling on a second conveyor of the at least one conveyor, the second conveyor being a different conveyor from the first conveyor and unconnected thereto. Generating a first motion plan may include generating at least a first motion plan that specifies a trajectory for the first appendage first to retrieve the first piece of material of the plurality of pieces of material for recycling from a first conveyor and second to deposit the first piece of material on the second conveyor. Generating a first motion plan may include generating at least a first motion plan that specifies a trajectory for the first appendage first to retrieve the first piece of material of the plurality of pieces of material for recycling from the first conveyor, matching a first speed of the first conveyor, and second to deposit the first piece of material on the second conveyor, matching a second speed of the second conveyor, the second speed different than the first speed. The first robot may include a second appendage with at least one joint, and generating at least a first motion plan for a first robot may include generating at least a second motion plan that specifies a trajectory for the second appendage with respect to at least one piece of material of the plurality of pieces of material for recycling. The second appendage may carry at least one sensor, and generating at least a first motion plan for a first robot may include generating at least a second motion plan that specifies a trajectory for the second appendage with respect to at least one piece of material of the plurality of pieces of material for recycling or a conveyor. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors, and receiving information that represents an environment which includes a plurality of pieces of materials for recycling may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The second appendage may carry at least one end effector, and generating at least a second motion plan for a first robot may include generating at least a second motion plan that specifies a trajectory for the second appendage with respect to at least one piece of material of the plurality of pieces of material for recycling. The second appendage may carry at least one end effector, and generating at least a second motion plan for a first robot may include generating at least a second motion plan that specifies a trajectory for the second appendage with respect to at least one conveyor or container or pallet. The at least one end effector may include a gripper, a hook, or a claw, and generating at least a second motion plan for a first robot may include generating at least a second motion plan that specifies a trajectory for the second appendage to at least one piece of material of the plurality of pieces of material for recycling. The at least one end effector may include a gripper, a hook, or a claw, and generating at least a second motion plan for a first robot may include generating at least a second motion plan that specifies a trajectory for the second appendage with respect to a conveyor. Generating at least a second motion plan for a first robot may include generating at least a second motion plan that specifies a trajectory for the second appendage between a first pose and a second pose, the first pose which positions and orients the second appendage to retrieve a piece of material from a first area and the second pose which positions and orients the second appendage to place the retrieved piece of material in a second area, the second area spaced from the first area. Generating at least a second motion plan for a first robot may include generating at least a second motion plan that specifies a trajectory for the second appendage between a first pose and a second pose, the first pose which positions and orients the second appendage to retrieve a piece of material from a first area and the second pose which positions and orients the second appendage to place the retrieved piece of material on a conveyor. Generating at least a second motion plan for a first robot may include generating at least a second motion plan that specifies a trajectory for the second appendage between a first pose and a second pose, the first pose which positions and orients the second appendage to retrieve a piece of material from a conveyor and the second pose which positions and orients the second appendage to place the retrieved piece of material in an area that is not a conveyor. Generating at least a second motion plan for a first robot may include generating at least a second motion plan that specifies a trajectory for the second appendage between a first pose and a second pose, the first pose which positions and orients the second appendage to retrieve a piece of material from a conveyor and the second pose which positions and orients the second appendage to place the retrieved piece of material in a container or on a pallet. Generating at least a second motion plan for a first robot may include generating at least a second motion plan that specifies a trajectory for the second appendage between a first pose and a second pose, the first pose which positions and orients the second appendage to retrieve a piece of material from a container or pallet and the second pose which positions and orients the second appendage to place the retrieved piece of material on a conveyor. Generating at least a second motion plan for a first robot may include generating at least a second motion plan that specifies a trajectory for the second appendage between a first pose and a second pose, the first pose which positions and orients the second appendage to retrieve a piece of material from a first conveyor and the second pose which positions and orients the second appendage to place the retrieved piece of material on a second conveyor, the second conveyor different than the first conveyor. The method may further include: generating at least a third motion plan for the first robot that specifies a trajectory for the second appendage between a third pose and a fourth pose, the third pose which positions and orients the second appendage to retrieve the item from a first container or pallet and the second pose which positions and orients the second appendage to place the retrieved piece of material in a second container or on a second pallet. The first robot may be a self-propelled robot, the method may further include: generating at least a fourth motion plan for the self-propelled robot that specifies a trajectory for the self-propelled robot through at least a portion of the environment; and causing the self-propelled robot to traverse the trajectory defined by the fourth motion plan; subsequently, causing the second appendage to move along the trajectory defined by the third motion plan. The method may further include: causing the second appendage to move according to the second motion plan. Generating at least a first motion plan for a first robot of the at least one robot may include processing by a plurality of logic circuits of the at least one motion planning processor to determine at least one motion plan. The robotic system may perform the acts autonomously.

A robotic system to handle materials to be recycled may include: at least one robot, including a first robot; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes a plurality of pieces of materials for recycling; generate at least a first motion plan for a first robot of the at least one robot, the first motion plan that moves at least a portion of the first robot between at least a respective first pose and a respective second pose with respect to the plurality of pieces of materials for recycling; and cause the at least a portion of the first robot to move according to the first motion plan.

A method of operation in a robotic medical system, the robotic medical system including at least one robot and at least one sensor, the method may include: receiving information that represents an environment which includes bodily tissue; generating at least a first motion plan for a first robot of the at least one robot, the first motion plan moves at least a portion of the first robot between at least a respective first pose and a respective second pose with respect to the bodily tissue; and causing the at least a portion of the first robot to move according to the first motion plan.

The first robot may be a self-propelled robot, and generating at least a first motion plan for a first robot may include generating at least a first motion plan that specifies a trajectory for the self-propelled robot with respect to the bodily tissue. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors mounted to a non-appendage portion of the self-propelled robot, and receiving information that represents the environment which includes the bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. Generating at least a first motion plan for a first robot may include generating at least a first motion plan that specifies a trajectory for at least the portion of the first robot with respect to the environment that minimizes a risk of collision with objects in the environment. Generating at least a first motion plan for a first robot may include generating at least a first motion plan that specifies a trajectory for at least the portion of the first robot with respect to the first environment that stops the at least the portion of the first robot if a human-like object other than a patient or subject is detected in the trajectory of the self-propelled robot. Generating at least a first motion plan for a first robot may include generating at least a first motion plan that specifies a trajectory for the at least the portion of the first robot that changes the trajectory of the at least the portion of the first robot to avoid a human-like object other than a patient or subject that is detected in the trajectory of the at least the portion of the robot, without stopping a movement of the at least the portion of the first robot. The first robot may include a first appendage with at least one joint and which carries at least one sensor, and generating at least a first motion plan for a first robot may include generating at least a first motion plan that specifies a trajectory for the first appendage with respect to at least one piece of bodily tissue. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment which includes bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a first appendage with at least one joint and which carries at least one medical implement, and generating at least a first motion plan for a first robot may include generating at least a first motion plan that specifies a trajectory for the first appendage with respect to the bodily tissue. The first robot may include a first appendage with at least one joint and which carries at least one surgical tool, and generating at least a first motion plan for a first robot may include generating at least a first motion plan that specifies a trajectory for the first appendage to position the surgical tool with respect to the bodily tissue. The first robot may include a first appendage with at least one joint and which carries at least one biopsy needle, and generating at least a first motion plan for a first robot may include generating at least a first motion plan that specifies a trajectory for the first appendage to position the biopsy needle with respect to the bodily tissue. Generating at least a first motion plan for a first robot may include generating at least a first motion plan that specifies a trajectory for the first appendage to position a surgical tool having at least one flexible or deformable portion in a defined location within the bodily tissue. Generating at least a first motion plan for a first robot may include generating at least a first motion plan that specifies a trajectory for the first appendage to position a biopsy needle having at least one flexible portion at a defined location within the bodily tissue and cause the biopsy needle to capture a sample of the bodily tissue at the defined location. Generating a first motion plan may include generating at least a first motion plan that specifies a trajectory for the first appendage first to position a biopsy needle having at least one flexible portion at a defined location within the bodily tissue, then to cause the biopsy needle to capture a sample of the bodily tissue at the defined location, and then to retrieve the captured sample of bodily tissue from the defined location. The first robot may include a first appendage with at least one joint and which carries at least one surgical cutting instrument, and generating at least a first motion plan for a first robot may include generating at least a first motion plan that specifies a trajectory for the first appendage to position the at least one surgical cutting instrument at a position to start a cut in the bodily tissue, to then cut a portion of the bodily tissue, and then to retract from the bodily tissue. The first robot may include a first appendage with at least one joint and which carries at least one surgical cutting instrument, and generating at least a first motion plan for a first robot may include generating at least a first motion plan that specifies a trajectory for the first appendage to position the at least one surgical cutting instrument at a position to start a cut in the bodily tissue taking into account a cutting depth of the surgical cutting instrument, and to then cut a portion of the bodily tissue. The first robot may include a first appendage with at least one joint and which carries at least one non-contact surgical cutting instrument that emits a beam of energy, and generating at least a first motion plan for a first robot may include generating at least a first motion plan that specifies a trajectory for the first appendage to position the at least one surgical cutting instrument at a defined position relative to the bodily tissue and that steers the beam of energy. The first robot may include a first appendage with at least one joint and which carries at least one surgical cutting instrument, and generating at least a first motion plan for a first robot may include generating at least a first motion plan that specifies a trajectory for the first appendage to position the at least one surgical cutting instrument at a defined position relative to the bodily tissue taking into account a movement of at least one organ. The first robot may include a first appendage with at least one joint and which carries at least one surgical cutting instrument, and generating at least a first motion plan for a first robot may include predicting a movement of at least one organ; and generating at least a first motion plan that specifies a trajectory for the first appendage to position the at least one surgical cutting instrument at a defined position relative to the bodily tissue taking into account the predicted movement of at least one organ. Generating at least a first motion plan that specifies a trajectory for the first appendage to position the at least one surgical cutting instrument at a defined position relative to the bodily tissue taking into account a movement of at least one organ may include generating at least a first motion plan that specifies a trajectory for the first appendage to position the at least one surgical cutting instrument at a defined position relative to the bodily tissue taking into account a movement of at least one of a heart or diaphragm or lungs. The first appendage may carry at least one surgical instrument that is responsive to at least one physical characteristic of the bodily tissue, and the method may further include: detecting the at least one physical characteristic of the bodily tissue via the at least one surgical instrument, and receiving information that represents an environment which includes bodily tissue may include receiving information that represents the at least one physical characteristic of the bodily tissue via the at least one surgical instrument carried by the first appendage. Generating a first motion plan may include generating at least a first motion plan that specifies a trajectory for the first appendage first to position a first instrument with respect to the bodily tissue, the first trajectory includes a number of rotations of at least a portion of the first instrument as the first instrument passes through at least of portion of the bodily tissue. The first robot may include a second appendage with at least one joint, and generating at least a first motion plan for a first robot may include generating at least a second motion plan that specifies a trajectory for the second appendage with respect to the bodily tissue. The second appendage may carry at least one sensor, and generating at least a first motion plan for a first robot may include generating at least a second motion plan that specifies a trajectory for the second appendage with respect to the bodily tissue. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors, and receiving information that represents the environment which includes bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a second appendage with at least one joint, and the second appendage carries at least one end effector, and generating at least a second motion plan for a first robot may include generating at least a second motion plan that specifies a trajectory for the second appendage with respect to the bodily tissue. The first robot may include a second appendage with at least one joint, and the second appendage carries at least one surgical instrument, and generating at least a second motion plan for a first robot may include generating at least a second motion plan that specifies a trajectory for the second appendage with respect to the bodily tissue. The surgical instrument may be a biopsy needle, and generating at least a second motion plan for a first robot may include generating at least a second motion plan that specifies a trajectory for the second appendage to position the biopsy needle at a defined location within the bodily tissue. Receiving information that represents an environment which includes bodily tissue may include receiving information that represents a physical characteristic of one or more portions of bodily tissue, and generating at least a second motion plan for a first robot may include generating at least a second motion plan that specifies a trajectory for the second appendage with respect to the bodily tissue based at least in part on information that represents the physical characteristic of one or more portions of bodily tissue. Receiving information that represents an environment which includes bodily tissue may include receiving information that represents a physical characteristic of one or more portions of bodily tissue, and generating at least a second motion plan for a first robot may include generating at least a second motion plan that specifies a trajectory for the second appendage between a first pose and a second pose based on the physical characteristic of one or more portions of bodily tissue, the first pose which positions and orients the second appendage to retrieve a piece of material from a first area and the second pose which positions and orients the second appendage to place the retrieved piece of material in a second area, the second area spaced from the first area. The first robot is a self-propelled robot, the method may further include: generating at least one motion plan for the self-propelled robot that specifies a trajectory for the self-propelled robot through at least a portion of the environment; and causing the self-propelled robot to traverse the trajectory defined by the generated at least one motion plan. Generating at least a first motion plan for a first robot of the at least one robot may include processing by a plurality of logic circuits of the at least one motion planning processor to determine at least one motion plan. The robotic medical system may perform the acts autonomously.

A robotic medical system may include: at least one robot, including a first robot; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes bodily tissue; generate at least a first motion plan for a first robot of the at least one robot, the first motion plan moving at least a portion of the first robot between at least a respective first pose and a respective second pose with respect to the bodily tissue; and cause the at least a portion of the first robot to move according to the first motion plan.

A method of operation in a robotic medical system, the robotic medical system including at least one robot and at least one sensor, the at least one robot including at least one source that is operable to emit at least one beam of energy, the method may include: receiving information from the at least one sensor, the information representing an environment which includes bodily tissue; generating at least a first motion plan for a first robot of the at least one robot, the first motion plan defines a trajectory for the beam of energy emitted by the at least one source; and causing the beam of energy to interact with the bodily tissue along the defined trajectory.

The first robot may include a first appendage with at least one head via which the beam of energy is emitted, and generating at least a first motion plan for a first robot may include generating at least a first motion plan that specifies a trajectory for the first appendage with respect to the bodily tissue. The first robot may include a first appendage with at least one joint and which carries at least one surgical cutting instrument that emits the beam of energy, and generating at least a first motion plan for a first robot may include generating at least a first motion plan that specifies a trajectory for the first appendage to position the at least one surgical cutting instrument at a defined position relative to the bodily tissue and that steers the beam of energy. The first robot may include a first appendage with at least one joint and which carries at least one surgical cutting instrument that emits the beam of energy, and generating at least a first motion plan for a first robot may include generating at least a first motion plan that specifies a trajectory for the first appendage to position the at least one surgical cutting instrument at a defined position relative to the bodily tissue taking into account a movement of at least one organ. The first robot may include a first appendage with at least one joint and which carries at least one surgical cutting instrument that emits the beam of energy, and generating at least a first motion plan for a first robot may include predicting a movement of at least one organ; and generating at least a first motion plan that specifies a trajectory for the first appendage to position the at least one surgical cutting instrument at a defined position relative to the bodily tissue taking into account the predicted movement of at least one organ. Generating at least a first motion plan that specifies a trajectory for the first appendage to position the at least one surgical cutting instrument that emits the beam of energy at a defined position relative to the bodily tissue taking into account a movement of at least one organ may include generating at least a first motion plan that specifies a trajectory for the first appendage to position the at least one surgical cutting instrument at a defined position relative to the bodily tissue taking into account a movement of at least one of a heart or diaphragm or lungs over time. The first appendage may carry at least one surgical instrument that is responsive to at least one physical characteristic of the bodily tissue, and the method may further include: detecting the at least one physical characteristic of the bodily tissue via the at least one surgical instrument, and receiving information that represents an environment which includes bodily tissue may include receiving information that represents the at least one physical characteristic of the bodily tissue via the at least one surgical instrument carried by the first appendage. The first robot may include a first appendage with at least one joint and which carries at least one sensor, and generating at least a first motion plan for a first robot may include generating at least a first motion plan that specifies a trajectory for the first appendage with respect to at least one piece of bodily tissue. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment which includes bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a second appendage with at least one joint, and generating at least a first motion plan for a first robot may include generating at least a second motion plan that specifies a trajectory for the second appendage with respect to the bodily tissue. The second appendage may carry at least one sensor, and generating at least a first motion plan for a first robot may include generating at least a second motion plan that specifies a trajectory for the second appendage with respect to the bodily tissue. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors, and receiving information that represents the environment which includes bodily tissue may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The second appendage may carry at least one end effector, and generating at least a second motion plan for a first robot may include generating at least a second motion plan that specifies a trajectory for the second appendage with respect to the bodily tissue and which does not collide with the first appendage. The second appendage may carry at least one surgical instrument, and generating at least a second motion plan for a first robot may include generating at least a second motion plan that specifies a trajectory for the second appendage with respect to the bodily tissue and which does not collide with the first appendage. The second appendage may carry at least one target, and generating at least a second motion plan for a first robot may include generating at least a second motion plan that specifies a trajectory for the second appendage with respect to the bodily tissue and which does not collide with the first appendage. The first robot is a self-propelled robot, and generating at least a first motion plan for a first robot may include generating at least a first motion plan that specifies a trajectory for the self-propelled robot with respect to the bodily tissue. Generating at least a first motion plan for a first robot of the at least one robot may include processing by a plurality of logic circuits of the at least one motion planning processor to determine at least one motion plan. The robotic medical system may perform the acts autonomously.

A robotic medical system may include: at least one robot, including a first robot including at least one source that is operable to emit at least one beam of energy; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes bodily tissue; generate at least a first motion plan for a first robot of the at least one robot, the first motion plan defines a trajectory for the beam of energy emitted by at least one source; and cause the beam of energy to interact with the bodily tissue along the defined trajectory.

A method of operation in a robotic dental system, the robotic dental system including at least one robot and at least one sensor, the method may include: receiving information that represents an environment which includes one or more of: gums and a number of teeth in a mouth; generating at least a first motion plan for a first robot of the at least one robot, the first motion plan that moves at least a portion of the first robot between at least a respective first pose and a respective second pose with respect to the number of teeth; and causing the at least a portion of the first robot to move according to the first motion plan.

The first robot may be a self-propelled robot, and generating at least a first motion plan for a first robot may include generating at least a first motion plan that specifies a trajectory for the self-propelled robot with respect to the number of teeth. The at least one sensor may be carried by the self-propelled robot and may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors mounted to a non-appendage portion of the self-propelled robot, and receiving information that represents the environment which includes the one or more of: gums and a number of teeth may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. Generating at least a first motion plan for a first robot may include generating at least a first motion plan that specifies a trajectory for at least the portion of the first robot with respect to the environment that minimizes a risk of collision with objects in the environment. The first robot may include a first appendage with at least one joint and which carries at least one sensor, and generating at least a first motion plan for a first robot may include generating at least a first motion plan that specifies a trajectory for the first appendage with respect to at least one piece of number of teeth. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment which includes number of teeth may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a first appendage with at least one joint and which carries at least one dental instrument, and generating at least a first motion plan for a first robot may include generating at least a first motion plan that specifies a trajectory for the first appendage with respect to the number of teeth to locate the dental instrument relative to at least one tooth. The first robot may include a first appendage with at least one joint and which carries at least one dental drill, and generating at least a first motion plan for a first robot may include generating at least a first motion plan that specifies a trajectory for the first appendage to position the dental drill with respect relative to at least one tooth. The first robot may include a first appendage with at least one joint and which carries at least one dental polisher, and generating at least a first motion plan for a first robot may include generating at least a first motion plan that specifies a trajectory for the first appendage to position the dental polisher with respect to the number of teeth. The first robot may include a first appendage with at least one joint and which carries at least one ultraviolet light source, and generating at least a first motion plan for a first robot may include generating at least a first motion plan that specifies a trajectory for the first appendage to position the at least one ultraviolet light source with respect to the number of teeth. The first robot may include a first appendage with at least one joint and which carries at least one x-ray source, and generating at least a first motion plan for a first robot may include generating at least a first motion plan that specifies a trajectory for the first appendage to position the at least one x-ray source with respect to the number of teeth. The first robot may include a first appendage with at least one joint and which carries at least one sensor, and generating at least a first motion plan for a first robot may include generating at least a first motion plan that specifies a trajectory for the first appendage to position the at least one imager sensor with respect to the number of teeth. Generating at least a first motion plan for a first robot may include generating at least a first motion plan that specifies a trajectory for the first appendage to position a dental instrument having at least one flexible or deformable portion in a defined location relative to at least one of the teeth. Generating at least a first motion plan for a first robot may include generating at least a first motion plan that specifies a trajectory for the first appendage to position a needle at a defined location relative to at least one of the teeth. The first appendage may carry at least one surgical instrument that is responsive to at least one physical characteristic of the number of teeth, and the method may further include: detecting the at least one physical characteristic of the number of teeth via the at least one surgical instrument, and receiving information that represents an environment which includes number of teeth may include receiving information that represents the at least one physical characteristic of the number of teeth via the at least one surgical instrument carried by the first appendage. The first robot may include a second appendage with at least one joint, and generating at least a first motion plan for a first robot may include generating at least a second motion plan that specifies a trajectory for the second appendage with respect to the number of teeth. The second appendage may carry at least one sensor, and generating at least a first motion plan for a first robot may include generating at least a second motion plan that specifies a trajectory for the second appendage with respect to the number of teeth. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors, and receiving information that represents the environment which includes number of teeth may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first robot may include a second appendage with at least one joint, the second appendage carries at least one end effector, and generating at least a second motion plan for a first robot may include generating at least a second motion plan that specifies a trajectory for the second appendage with respect to the number of teeth. The first robot may include a second appendage with at least one joint, the second appendage carries at least one dental instrument, and generating at least a second motion plan for a first robot may include generating at least a second motion plan that specifies a trajectory for the second appendage with respect to the number of teeth. The dental instrument may be at least one of a dental drill, a needle, a dental polisher, an ultraviolet source, or an x-ray source, and generating at least a second motion plan for a first robot may include generating at least a second motion plan that specifies a trajectory for the second appendage to position the dental instrument at a defined location with respect to at least one of the teeth. Receiving information that represents an environment which includes number of teeth may include receiving information that represents a physical characteristic of one or more portions of at least one of the teeth, and generating at least a second motion plan for a first robot may include generating at least a second motion plan that specifies a trajectory for the second appendage with respect to the number of teeth based at least in part on information that represents the physical characteristic of one or more portions of the at least one of the teeth. Receiving information that represents an environment which includes number of teeth may include receiving information that represents a physical characteristic of one or more portions of number of teeth, and generating at least a second motion plan for a first robot may include generating at least a second motion plan that specifies a trajectory for the second appendage between a first pose and a second pose based on the physical characteristic of one or more portions of number of teeth, the first pose which positions and orients the second appendage to perform work on one of the teeth from each of at least two different poses. The first robot may be a self-propelled robot, the method may further include: generating at least one motion plan for the self-propelled robot that specifies a trajectory for the self-propelled robot through at least a portion of the environment; and causing the self-propelled robot to traverse the trajectory defined by the generated at least one motion plan. Generating at least a first motion plan for a first robot of the at least one robot may include processing by a plurality of logic circuits of the at least one motion planning processor to determine at least one motion plan. The robotic dental system may perform the acts autonomously.

A robotic dental system may include: at least one robot, including a first robot; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment which includes one or more of: gums and a number of teeth; generate at least a first motion plan for a first robot of the at least one robot, the first motion plan moving at least a portion of the first robot between at least a respective first pose and a respective second pose with respect to the number of teeth; and cause the at least a portion of the first robot to move according to the first motion plan.

A method of operation in a drone system including at least one drone and at least one sensor, the method may include: receiving information that represents an environment in which the at least one drone operates; generating at least a first motion plan for a first drone of the at least one drone, the first motion plan moving at least a portion of the first drone between at least a respective first pose and a respective second pose with respect to the environment; and causing at least the first drone to move according to the first motion plan.

The first drone may be at least one of a self-propelled flying drone, a self-propelled land drone, a self-propelled waterborne drone, a self-propelled underwater drone, or a self-propelled amphibious drone, and generating at least a first motion plan for a first drone may include generating at least a first motion plan that specifies a trajectory for the first drone with respect to the environment. The at least one sensor may be carried by the first drone and may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, one or more magnetic or ferrous metal sensors, and, or, one or more proximity sensors mounted to a non-appendage portion of the first drone, and receiving information that represents the environment may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. Generating at least a first motion plan for a first drone may include generating at least a first motion plan that specifies a trajectory for at least the portion of the first drone with respect to the environment that minimizes a risk of collision with objects in the environment. The first drone may include a first appendage with at least one joint and which carries at least one sensor, and generating at least a first motion plan for a first drone may include generating at least a first motion plan that specifies a trajectory for the first appendage with respect to the environment in which the first drone operates. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors, and receiving information that represents an environment may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors one or more magnetic or ferrous metal sensors, and, or, one or more proximity sensors. The first drone may include a first grip that is selectively operable to releasably retain an item carried by the first drone, and generating at least a first motion plan for a first drone may include generating at least a first motion plan that specifies a trajectory for the first drone with respect to the environment to a pose at which the first grip is selectively controlled to release the item carried by the first drone. The first drone may include a first grip which carries at least one item with an associated parachute, and generating at least a first motion plan for a first drone may include generating at least a first motion plan that specifies a trajectory for the first drone with respect to the environment to a pose at which the first grip is selectively controlled to release the item carried by the first drone with the associated parachute. The first drone may include a first winch with a cable, the first winch operable selectively retract and payout the cable, and generating at least a first motion plan for a first drone may include generating at least a first motion plan that specifies a trajectory for the first drone with respect to the environment to a pose at which the first winch is selectively controlled to payout the cable. Generating at least a first motion plan for a first drone may include generating at least a first motion plan that accommodates for at least one physical characteristic of a payload carried by the first drone. Generating at least a first motion plan for a first drone may include generating at least a first motion plan that accommodates for an external force experienced by the first drone as the first drone traverses at least a portion of the environment. Generating at least a first motion plan for a first drone may include generating at least a first motion plan that accommodates for a wind velocity, a wave velocity, current velocity, or a tidal velocity that will be experienced by the first drone as the first drone traverses at least a portion of the environment. The first drone may carry at least one sensor that is responsive to at least one physical characteristic of in the environment, and generating at least a first motion plan for a first drone may include generating at least a first motion plan that moves the first drone with respect to an item to be inspected, to sense information from a plurality of successive poses with respect to the item to be inspected. Generating at least a first motion plan for a first drone may include generating at least a first motion plan that accommodates for one or more obstacles in the environment. Generating at least a first motion plan for a first drone may include generating at least a first motion plan that accommodates for one or more of kelp, coral, rocks, or vehicles. The generating at least a first motion plan for a first drone may include generating at least a first motion plan that specifies a first trajectory that moves the first drone from a first location to a first target location and a second motion plan that specifies a second trajectory about the first target location. The generating at least a first motion plan for a first drone may further include generating at least a third motion plan that specifies a third trajectory that moves the first drone from a first target to a second target location. The generating at least a first motion plan for a first drone may further include generating at least a fourth motion plan that specifies a fourth trajectory that moves the first drone from the second target location to the first location. The generating at least a first motion plan for a first drone may further include generating at least a third motion plan that specifies a third trajectory that moves the first drone from the first target location to the first location. The first drone may be a self-propelled, autonomous vehicle, the method may further include: generating at least one motion plan for the self-propelled, autonomous vehicle that specifies a trajectory for self-propelled, autonomous vehicle through at least a portion of the environment; and causing the self-propelled, autonomous vehicle to traverse the trajectory defined by the generated at least one motion plan. The first drone may be an aquatic vehicle and generating at least a first motion plan for a first drone may include generating at least a first motion plan that docks the aquatic drone in a desired pose at a dock. The first drone may be an airborne vehicle and generating at least a first motion plan for a first drone may include generating at least a first motion plan that docks the airborne vehicle in a desired pose at a dock. Generating at least a first motion plan for a first drone of the at least one drone may include processing by a plurality of logic circuits of the at least one motion planning processor to determine at least one motion plan. The drone system may perform the acts autonomously.

A drone system may include: at least one drone; at least one sensor; at least one motion planning processor; and at least one nontransitory processor-readable medium that stores at least one of processor-executable instructions or data which, when executed by the at least one motion planning processor, causes that at least one motion planning processor to: receive information that represents an environment in which the at least one drone operates; generate at least a first motion plan for a first drone of the at least one robot, the first motion plan moving at least a portion of the first drone between at least a respective first pose and a respective second pose with respect to the environment; and cause the at least a portion of the first drone to move according to the first motion plan.

A method of operation in a robotic system, the robotic system including at least one motion planning processor and at least one robot, the at least one robot having at least one appendage, the at least one appendage having at least one joint and at least one end effector, the method may include: receiving information that represents a respective position and orientation of each of a plurality of like pieces of building material of a first type, the like pieces of building material of the first type accessible by the at least one end effector; determining a first one of the like pieces of building material of the first type to retrieve; processing by a plurality of logic circuits of the at least one motion planning processor to determine at least one motion plan for the at least one appendage of the at least one robot that moves the at least one appendage from a first pose to a second pose without collisions, the first pose being a position and an orientation in which the determined first one of like pieces of building material of the first type is graspable/engageable by the at least one end effector and the second pose being a position and orientation in which the at least one end effector places the first one of the like pieces of building material of the first type in physical engagement with at least one other piece of building material; and causing the at least one robot to execute at least one of the determined motion plans by moving the at least one appendage from the first pose to the second pose without collisions.

The method may further include: receiving information that represents a respective position and orientation of each of a plurality of like pieces of building material of a second type, the like pieces of building material of the second type being like each other and unlike the like pieces of building material of the first type, the like pieces of building material of the second type accessible by the at least one end effector; determining a first one of the like pieces of building material of the second type to retrieve; processing by a plurality of logic circuits of the at least one motion planning processor, to determine at least one motion plan for the at least one appendage of the at least one robot that moves the at least one appendage from a third pose to a fourth pose without collisions, the third pose being a position and orientation in which the determined first one of the like parts of pieces of building material the second type is graspable/engageable by the at least one end effector and the fourth pose being a position and orientation in which the at least one end effector places the first one of the like pieces of building material of the second type in physical engagement with at least one other piece of building material; and causing the at least one robot to execute at least one of the determined motion plans by moving the at least one appendage from the third pose to the fourth pose without collisions. The method may further include: after causing the at least one robot to execute at least one of the determined motion plans by moving the at least one appendage from the first pose to the second pose without collisions, causing the at least one robot to secure the determined the first one of the like pieces of building material of the first type with at least one other piece of building material. The pieces of building material of the first type may be bricks, and processing by a plurality of logic circuits of the at least one motion planning processor, to determine at least one motion plan for the at least one appendage may include processing by a plurality of logic circuits of the at least one motion planning processor, to determine at least one motion plan for the at least one appendage that positions the at least one appendage to retrieve bricks from a supply of bricks and that positions the at least one appendage to deposit the retrieved bricks as a wall. The pieces of building material of the first type may be pieces of dimensional lumber, and processing by a plurality of logic circuits of the at least one motion planning processor, to determine at least one motion plan for the at least one appendage may include processing by a plurality of logic circuits of the at least one motion planning processor, to determine at least one motion plan for the at least one appendage that positions the at least one appendage to retrieve the pieces of dimensional lumber from a supply of dimensional lumber and that positions the at least one appendage to deposit the retrieved pieces of dimensional lumber as at least one of a wall, a floor or a roof. The pieces of building material of the first type may be metal studs or metal trusses, and processing by a plurality of logic circuits of the at least one motion planning processor, to determine at least one motion plan for the at least one appendage may include processing by a plurality of logic circuits of the at least one motion planning processor, to determine at least one motion plan for the at least one appendage that positions the at least one appendage to retrieve metal studs or metal trusses from a supply of metal studs or metal trusses and that positions the at least one appendage to deposit the retrieved metal studs or metal trusses as a wall. The pieces of building material of the first type may be parts of a piece of furniture, and processing by a plurality of logic circuits of the at least one motion planning processor, to determine at least one motion plan for the at least one appendage may include processing by a plurality of logic circuits of the at least one motion planning processor, to determine at least one motion plan for the at least one appendage that positions the at least one appendage to retrieve parts of a piece of furniture from a supply of parts of a piece of furniture and that positions the at least one appendage to deposit the retrieved parts of a piece of furniture as a piece of furniture. The method may further include receiving information that represents a respective position and orientation of each of the like pieces of building material of the first type. Receiving information that represents a respective position and orientation of each of a plurality of like pieces of building material may include receiving one or more images of at least a subset of all of the like pieces of building material of the first type in at least a portion of a collection of the like pieces of building material of the first type, and the method may further include: performing image recognition on at least some of the captured images to identify individual ones of the like pieces of building material of the first type and a position and an orientation of the individual like pieces of building material of the first type in the collection of pieces of building material of the first type. A first appendage of the at least one appendage may carry at least one sensor, and the method may further include capturing information that represents a respective position and orientation of each of the plurality of like pieces of building material of the first type in a first bulk parts container by the at least one sensor carried by the first appendage, and generating a first motion plan may include generating a first motion plan based at least in part on the captured information. Generating a first motion plan based at least in part on the captured information may include generating the first motion plan in which the first appendage moves from a respective first pose to a respective second pose, the respective second pose which positions the at least one sensor carried by the first appendage to operatively sense a portion of an environment. A second appendage of the at least one appendage may carry at least one end effector and the method may further include: generating a second motion plan based at least in part on the captured information, the second motion plan in which the second appendage moves from a respective first pose to a respective second pose, the respective second pose which positions the end effector of the second appendage to operatively engage an object within the portion of the environment that is sensed by the at least one sensor. A first appendage of the at least one appendage may carry at least one image sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. A first appendage of the at least one appendage may carry at least one contact sensor, and processing by a plurality of logic circuits of the at least one motion planning processor to determine at least one motion plan for the at least one appendage may include processing by a plurality of logic circuits of the at least one motion planning processor, to determine at least a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. A first appendage of the at least one appendage may carry at least one capacitive sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one capacitive sensor carried by the first appendage to operatively sense a portion of an environment. A first appendage of the at least one appendage may carry at least one force sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one force sensor carried by the first appendage to operatively sense a portion of an environment. A first appendage of the at least one appendage may carry at least one proximity sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one proximity sensor carried by the first appendage to operatively sense a portion of an environment. The robotic system may include at least a first appendage and a second appendage, and motion planning may include determining motion plans for each of the first and the second appendages to pass the determined first one of the like pieces of building material of the first type between the first and the second appendages. The robotic system may perform the acts autonomously.

A robotic system may include: at least one robotic appendage, the at least one appendage having at least one joint and at least one end effector; at least one motion planning processor; and at least one nontransitory processor-readable medium that stores at least one of processor-executable instructions or data which, when executed by the at least one motion planning processor, causes that at least one motion planning processor to: receive captured information that represents a respective position and orientation of each of a plurality of like pieces of building material of a first type, the like pieces of building material of the first type accessible by the at least one end effector; determine a first one of the like pieces of building material of the first type to retrieve; process by a plurality of logic circuits of the at least one motion planning processor to determine at least one motion plan for the at least one appendage of the at least one robot that moves the at least one appendage from a first pose to a second pose without collisions, the first pose being a position and an orientation in which the determined first one of like pieces of building material of the first type is graspable/engageable by the at least one end effector and the second pose being a position and orientation in which the at least one end effector places the first one of the like pieces of building material of the first type in physical engagement with at least one other piece of building material; and cause the at least one robot to execute at least one of the determined motion plans by moving the at least one appendage from the first pose to the second pose without collisions.

A method of operation in a robotic system, the robotic system including at least one motion planning processor and at least one robot, the at least one robot having at least one appendage, the at least one appendage having at least one joint and at least one end effector, the at least one end effector including at least one of a brush or a nozzle, the method may include: receiving information that represents a respective position and orientation of the end effector relative to a structure; determining at least one motion plan for the at least one appendage of the at least one robot that moves the at least one appendage from a first pose to a second pose without collisions, in the second pose the first end effector in a position and an orientation to deposit a material on at least a portion of the structure; and causing the at least one robot to execute at least one of the determined motion plans by moving the at least one appendage from the first pose to the second pose without collisions.

The method may further include: after causing the at least one robot to execute at least one of the determined motion plans by moving the at least one appendage from the first pose to the second pose without collisions, causing the at least one robot to deposit the material on the at least a portion of the structure. The material may be paint, and the method may further include: after causing the at least one robot to execute at least one of the determined motion plans by moving the at least one appendage from the first pose to the second pose without collisions, causing the at least one robot to deposit the paint on the at least a portion of the structure. The material may be stucco and the structure includes a lath, and the method may further include: after causing the at least one robot to execute at least one of the determined motion plans by moving the at least one appendage from the first pose to the second pose without collisions, causing the at least one robot to deposit the stucco on the at least a portion of the lath. The material may be thermal insulation, and the method may further include: after causing the at least one robot to execute at least one of the determined motion plans by moving the at least one appendage from the first pose to the second pose without collisions, causing the at least one robot to deposit the thermal insulation on the at least a portion of the structure. The material may be a sealant, and the method may further include: after causing the at least one robot to execute at least one of the determined motion plans by moving the at least one appendage from the first pose to the second pose without collisions, causing the at least one robot to deposit the sealant on the at least a portion of the structure. Receiving information that represents a respective position and orientation of the end effector relative to a structure may include receiving information that represents the position and orientation of a first end effector with respect to a wall. Receiving information that represents the position and orientation of a first end effector with respect to a wall may include receiving one or more images of at least a portion of the wall, and the method may further include: performing image recognition on at least some of the captured images to identify a position and an orientation of the first end effector with respect to the wall. Determining a first motion plan may include determining at least one motion plan includes generating at least one motion plan based at least in part on the received information that represents a respective position and orientation of the end effector relative to a structure. Generating a first motion plan based at least in part on the captured information may include generating the first motion plan in which the first appendage moves from a respective first pose to a respective second pose, the respective second pose which positions the at least one sensor carried by the first appendage to operatively sense a portion of an environment. A second appendage of the at least one appendage may carry at least one end effector and the method may further include: generating a second motion plan based at least in part on the captured information, the second motion plan in which the second appendage moves from a respective first pose to a respective second pose, the respective second pose which positions the end effector of the second appendage to operatively engage an object within the portion of the environment that is sensed by the at least one sensor. A first appendage of the at least one appendage may carry at least one image sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one image sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one image sensor. A first appendage of the at least one appendage may carry at least one contact sensor, and processing by a plurality of logic circuits of the at least one motion planning processor to determine at least one motion plan for the at least one appendage may include processing by a plurality of logic circuits of the at least one motion planning processor to determine at least a first motion plan in which the second pose of the first appendage positions the at least one contact sensor carried by the first appendage to operatively sense a portion of an environment, and generating a second motion plan may include generating a second motion plan in which the second pose of the second appendage positions a portion of the second appendage to operatively engage an object within the portion of the environment that is sensed by the at least one contact sensor. A first appendage of the at least one appendage may carry at least one capacitive sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one capacitive sensor carried by the first appendage to operatively sense a portion of an environment. A first appendage of the at least one appendage may carry at least one force sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one force sensor carried by the first appendage to operatively sense a portion of an environment. A first appendage of the at least one appendage may carry at least one proximity sensor, and processing by a plurality of logic circuits of the at least one motion planning processor to determine at least one motion plan for the at least one appendage may include processing by a plurality of logic circuits of the at least one motion planning processor to determine at least a first motion plan in which a respective second pose of the first appendage positions the at least one proximity sensor carried by the first appendage to operatively sense a portion of an environment. The robotic system may include at least a first appendage and a second appendage, and motion planning may include determining motion plans for each of the first and the second appendages to pass the determined first one of the like pieces of building material of the first type between the first and the second appendages. The robotic system may perform the acts autonomously.

A robotic system may include: at least one robot, the at least one robot having at least one appendage, the at least one appendage having at least one joint and at least one end effector, the at least one end effector including at least one of a brush or a nozzle; at least one motion planning processor; and at least one nontransitory processor-readable medium that stores at least one of processor-executable instructions or data which, when executed by the at least one motion planning processor, causes that at least one motion planning processor to: receive information that represents information that represents a respective position and orientation of the end effector relative to a structure; determine at least one motion plan for the at least one appendage of the at least one robot that moves the at least one appendage from a first pose to a second pose without collisions, in the second pose the first end effector in a position and an orientation to deposit a material on at least a portion of the structure; and cause the at least one robot to execute at least one of the determined motion plans by moving the at least one appendage from the first pose to the third pose without collisions.

A method of operation in a robotic system to perform line inspection, the robotic system including at least one robot that carries at least one sensor, the method may include: generating at least a first motion plan for a first robot of the at least one robot, the first motion plan moving at least a portion of the first robot between at least a respective first pose and a respective second pose with respect to a first line to be inspected to sense at least one physical characteristic of the line; causing the at least a portion of the first robot to move according to the first motion plan; and successively capturing information that represents at least one physical characteristic of the first line in at least one of the first pose, the second pose or an intermediary pose between the first and the second poses.

The first robot may be a self-propelled robot, and generating at least a first motion plan for a first robot may include generating at least a first motion plan that specifies a trajectory for the self-propelled robot with respect to a path along which the first line extends. The at least one sensor carried by the self-propelled robot may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and successively capturing information that represents at least one physical characteristic of the first line may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: successively capturing information that represents a location of the first robot as the first robot moves along the path along which the first line extends. The method may further include: successively capturing information that represents at least one physical characteristic of the first line, and generating at least a first motion plan for a first robot may include generating at least a first motion plan that specifies a trajectory for the self-propelled robot with respect to the path along which the first line extends if a human-like object is detected in the trajectory of the self-propelled robot. The method may further include: successively capturing information that represents at least one physical characteristic of the first line, and generating at least a first motion plan for a first robot may include generating at least a first motion plan that specifies a trajectory for the self-propelled robot with respect to the path along which the first line extends that changes the trajectory of the self-propelled robot to avoid a human-like object that is detected in the trajectory of the self-propelled robot, without stopping a movement of the self-propelled robot. The first robot may include a first appendage with at least one joint and which carries at least one sensor, and generating at least a first motion plan for a first robot may include generating at least a first motion plan that specifies a trajectory for the first appendage with respect to the first line. The at least one appendage may carry at least one of the at least one sensor, and the at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and successively capturing information that represents at least one physical characteristic of the first line may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The first robot may include a second appendage with at least one joint, and generating at least a first motion plan for a first robot may include generating at least a second motion plan that specifies a trajectory for the second appendage with respect to the first line. The second appendage may carry at least one sensor, and generating at least a first motion plan for a first robot may include generating at least a second motion plan that specifies a trajectory for the second appendage with respect to a second line. The at least one sensor carried by the second appendage may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and successively capturing information that represents at least one physical characteristic of the first line may include capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The second appendage may carry at least one end effector, and generating at least a second motion plan for a first robot may include generating at least a second motion plan that specifies a trajectory for the second appendage with respect to the first line. The second appendage may carry at least one end effector, and generating at least a second motion plan for a first robot may include generating at least a second motion plan that specifies a trajectory for the second appendage with respect to a second line. The at least one end effector may include a gripper, a hook, or a claw, and generating at least a second motion plan for a first robot may include generating at least a second motion plan that specifies a trajectory for the second appendage with respect to the first line. The at least one end effector may include a gripper, a hook, or a claw, and generating at least a second motion plan for a first robot may include generating at least a second motion plan that specifies a trajectory for the second appendage with respect to the first line. The first line may be an electrical line, and generating at least a second motion plan for a first robot may include generating at least a second motion plan that specifies a trajectory for the second appendage between a first pose and a second pose, the first pose which positions and orients the second appendage to engage the electrical line. The first line may be a gas line, and generating at least a second motion plan for a first robot may include generating at least a second motion plan that specifies a trajectory for the second appendage between a first pose and a second pose, the first pose which positions and orients the second appendage to operatively engage the gas line. The first line may be a water line, and generating at least a second motion plan for a first robot may include generating at least a second motion plan that specifies a trajectory for the second appendage between a first pose and a second pose, the first pose which positions and orients the second appendage to operatively engage the water line. The first line may be a communications line, and generating at least a second motion plan for a first robot may include generating at least a second motion plan that specifies a trajectory for the second appendage between a first pose and a second pose, the first pose which positions and orients the second appendage to operatively engage the communications line. The method may further include: generating at least a third motion plan for the first robot that specifies a trajectory for the second appendage between a third pose and a fourth pose, the fourth pose which positions and orients the second appendage to retrieve the item from the first appendage. The first robot may be a self-propelled robot, the method may further include: generating at least a fourth motion plan for the self-propelled robot that specifies a trajectory for the self-propelled robot between the first line and the second line; causing the self-propelled robot to traverse the trajectory defined by the fourth motion plan; and subsequently, causing the second appendage to move along the trajectory defined by the third motion plan. The method may further include: causing the second appendage to move according to the second motion plan. Generating at least a first motion plan for a first robot of the at least one robot may include processing by a plurality of logic circuits of the at least one motion planning processor to determine at least one motion plan. The robotic system may perform the acts autonomously.

A robotic system to perform line inspection may include: at least one robot, including a first robot; at least one sensor, the at least one sensor carried by that at least one robot; at least one motion planning processor; and at least one non-transitory processor-readable medium that stores at least one of processor-executable instructions or data which, when executed by the at least one motion planning processor, causes that at least one motion planning processor to: generate at least a first motion plan for a first robot of the at least one robot, the first motion plan that moves at least a portion of the first robot between at least a respective first pose and a respective second pose with respect to a first line to be inspected to sense at least one physical characteristic of the line; cause the first robot to move according to the first motion plan; and successively capture information that represents at least one physical characteristic of the first line in at least one of the first pose, the second pose or an intermediary pose between the first and the second poses.

A method of operation in a robotic system to pick fruit, the robotic system including at least a first appendage, the first appendage moveable within a first operational volume, the first appendage carrying a respective end effector, the method may include: generating at least a first motion plan for the first appendage that moves the first appendage between at least a respective first pose and a respective second pose within the first operational volume without collisions, the first pose locating a portion of the first appendage with respect to a branch bearing one or more pieces of fruit and the second pose locating the end effector carried by the first appendage to physically engage one of the pieces of fruit to move the one of the pieces of fruit from the branch; and causing the first appendage to move according to the first motion plan.

The respective end effector carried by the first appendage may be a gripper and the second pose positions and orients the gripper to grip the piece of fruit. The respective end effector carried by the first appendage may be a blade and the second pose positions and orients the gripper to cut a portion of the piece of fruit that attaches the piece of fruit to the branch. The respective end effector carried by the first appendage may be a blade and the second pose positions and orients the blade to cut a portion of the branch that bears the piece of fruit. The respective end effector carried by the first appendage may be a pruning shears and the second pose positions and orients the pruning shears to cut a portion of the piece of fruit that attaches the piece of fruit to the branch or a portion of the branch that bears the piece of fruit. The respective end effector carried by the first appendage may be a gripper and the second pose positions and orients the gripper to grip the branch that bears the piece of fruit and oscillate the gripped branch that bears the piece of fruit. The first appendage may further carry at least one sensor, and the method may further include: receiving information via the at least one sensor. The first appendage may further carry at least one sensor, and the method may further include: receiving information via the at least one sensor, wherein generating at least a first motion plan may include generating at least a first motion plan based at least in part on the information received via the at least one sensor carried by the first appendage. The first appendage may further carry at least one image sensor, and the method may further include: receiving image information via the at least one image sensor when the first appendage is in the respective first pose, wherein generating at least a first motion plan may include generating at least a first motion plan where the second pose is based at least in part on the image information received via the at least one image sensor carried by the first appendage in the first pose. Generating a first motion plan may include generating a first motion in which in at least one pose of at least the first appendage the piece of fruit is transferrable into a collection bin. The robotic system may include at least a second appendage, the second appendage moveable within a second operational volume, at least a portion of the second operational volume overlapping with at least a portion of the first operational volume such that the first and second appendages are capable of physically colliding with one another, the method may further include: generating at least a second motion plan for the second appendage that moves the second appendage between at least a respective first pose and a respective second pose within the second operational volume without collisions at least between the first and the second appendages; and causing the second appendage to move according to the second motion plan. The second appendage may carry a collection bin, and generating a second motion plan may include generating a second motion plan in which the respective second pose of the second appendage is a pose in which the collection bin is positioned and oriented to receive the piece of fruit physically engaged by the end effector carried by the first appendage. The second appendage may carry a collection bin, and generating a second motion plan may include generating a second motion plan in which the respective second pose of the second appendage is a pose in which the collection bin is positioned and oriented relatively below the piece of fruit physically engaged by the end effector carried by the first appendage, with an opening of the collection bin facing up to receive the piece of fruit as the piece of fruit falls under an influence of gravity. The second appendage may further carry at least one sensor, and the method may further include: receiving information via the at least one sensor carried by the second appendage when the second appendage is in the respective first pose, wherein generating at least a second motion plan may include generating at least a second motion plan where the second pose is based at least in part on the information received via the at least one sensor carried by the second appendage in the second pose. The second appendage may further carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The second appendage may carry at least one sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The second appendage may carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The second appendage may carry a respective end effector, and generating a second motion plan may include generating a second motion plan in which the second pose of at least one of the second appendage is a pose in which the piece of fruit is transferrable into a collection bin from the respective end effector of carried by one of the first or the second appendages. The second appendage may carry a respective end effector, and generating a first motion plan and a second motion plan may include generating a first motion plan and a second motion plan in which the second pose of at least one of the first appendage or the second appendage is a pose in which the piece of fruit is transferrable from the respective end effector carried by one of the first or the second appendages to the respective end effector carried by the other one of the first or the second appendages. The second appendage may carry a respective end effector, and generating a second motion plan may include generating a second motion plan in which the respective second pose of the second appendage positions the end effector carried by the second appendage to operatively engage the branch bearing a first piece of fruit, and generating a first motion plan includes generating a first motion plan in which the respective second pose of the first appendage positions the respective end effector carried by the first appendage to operatively engage the first piece of fruit while the respective end effector carried by the second appendage operatively engages the branch which bears the first piece of fruit. The second appendage may further carry at least one sensor, and the method may further include: receiving information via the at least one sensor carried by the second appendage when the second appendage is in the respective first pose, wherein generating at least a second motion plan may include generating at least a second motion plan where the second pose is based at least in part on the information received via the at least one sensor carried by the second appendage in the second pose. The second appendage may further carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and receiving information via that at least one sensor may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: dynamically generating a plurality of updated first motion plans while causing the first appendage to move at least partially between the respective first and the respective second poses. The robotic system may include a first self-propelled robot, and generating at least a first motion plan may include generating at least a first motion plan that specifies a trajectory for the first self-propelled robot through at least a portion of an orchard. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; and causing the third appendage to move according to the third motion plan. The robotic system may perform the acts autonomously.

A robotic system to pick fruit may include: at least a first appendage that is moveable within a first operational volume, the first appendage carrying a respective end effector; at least one motion planning processor; and at least one nontransitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions, the first pose locating a portion of the first appendage with respect to a branch bearing one or more pieces of fruit and the second pose locating the end effector carried by the first appendage to physically engage one of the pieces of fruit to move the one of the pieces of fruit from the branch; and cause the first appendage to move according to the first motion plan.

A method of operation in a robotic system to interact with plants, the robotic system including at least a first appendage, the first appendage moveable within a first operational volume, the first appendage carrying at least one sensor, the method may include: generating at least a first motion plan for the first appendage that moves the first appendage between at least a respective first pose and a respective second pose within the first operational volume without collisions, the first pose locating a portion of the first appendage with respect to a branch bearing one or more pieces of fruit and the second pose locating the at least one sensor carried by the first appendage with respect to at least one portion of at least one plant; causing the first appendage to move according to the first motion plan; and receiving information via the at least one sensor.

Generating at least a first motion plan may include generating at least a first motion plan based at least in part on the information received via the at least one sensor carried by the first appendage. The at least one sensor carried by the first appendage may include at least one image sensor, and generating at least a first motion plan may include generating at least a first motion plan based at least in part on the image information received via the at least one image sensor carried by the first appendage. The first appendage may further carry at least one end effector, and generating at least a first motion plan for the first appendage may include generating at least a first motion plan that positions and orients the at least one end effector carried by the first appendage in contact with the portion of the plant. The plant may be a tree and the first appendage may further carry at least one end effector, and generating at least a first motion plan for the first appendage may include generating at least a first motion plan that positions and orients the at least one end effector carried by the first appendage in contact with the portion of the tree. The plant may be a tree and the first appendage may further carry at least one end effector, and generating at least a first motion plan for the first appendage may include generating at least a first motion plan that positions and orients the at least one end effector carried by the first appendage in contact with a branch of the tree. The at least one end effector carried by the first appendage may be a gripper, and generating at least a first motion plan for the first appendage may include generating at least a first motion plan that positions and orients the at least one gripper to grip the portion of the plant. The at least one end effector carried by the first appendage may be a saw blade, and generating at least a first motion plan for the first appendage may include generating at least a first motion plan that positions and orients the at least one saw blade to cut the portion of the plant and to oscillate the saw blade. The at least one end effector carried by the first appendage may be a saw blade, and generating at least a first motion plan for the first appendage may include generating at least a first motion plan that positions and orients the at least one saw blade to cut the portion of the plant. The at least one end effector carried by the first appendage may be a pruning shears, and generating at least a first motion plan for the first appendage may include generating at least a first motion plan that positions and orients the at least one pruning shears to cut the portion of the plant. The robotic system may include at least a second appendage, the second appendage moveable within a second operational volume, at least a portion of the second operational volume overlapping with at least a portion of the first operational volume such that the first and second appendages are capable of physically colliding with one another, the method may further include: generating at least a second motion plan for the second appendage that moves the second appendage between at least a respective first pose and a respective second pose within the second operational volume without collisions at least between the first and the second appendages; and causing the second appendage to move according to the second motion plan. The second appendage may carry a respective end effector, and generating a second motion plan may include generating a second motion plan in which the second pose of at least one of the second appendage is a pose in which the portion of the plant is transferrable into a collection bin from the respective end effector of carried by one of the first or the second appendages. The second appendage may carry a respective end effector, and generating a first motion plan and a second motion plan may include generating a first motion plan and a second motion plan in which the second pose of at least one of the first appendage or the second appendage is a pose in which the portion of the plant is transferrable from the respective end effector carried by one of the first or the second appendages to the respective end effector carried by the other one of the first or the second appendages. The second appendage may carry a respective end effector, and generating a second motion plan may include generating a second motion plan in which the respective second pose of the second appendage positions the end effector carried by the second appendage to operatively engage a first branch of a first tree, and generating a first motion plan may include generating a first motion plan in which the respective second pose of the first appendage positions the respective end effector carried by the first appendage to operatively engage the first branch of the first tree while the respective end effector carried by the second appendage operatively engages the first branch of the first tree. The second appendage may carry a respective end effector, and generating a second motion plan may include generating a second motion plan in which the respective second pose of the second appendage positions the end effector carried by the second appendage to operatively engage a second branch of a first tree, and generating a first motion plan may include generating a first motion plan in which the respective second pose of the first appendage positions the respective end effector carried by the first appendage to operatively engage a first branch of the first tree while the respective end effector carried by the second appendage operatively engages the second branch of the first tree. The second appendage may carry a respective end effector, and generating a second motion plan may include generating a second motion plan in which the respective second pose of the second appendage positions the end effector carried by the second appendage to operatively engage a first branch of a first tree, and generating a first motion plan may include generating a first motion plan in which the respective second pose of the first appendage positions the respective end effector carried by the first appendage to operatively engage a first branch of a second tree while the respective end effector carried by the second appendage operatively engages the first branch of the first tree. The second appendage may further carry at least one sensor, and the method may further include: receiving information via the at least one sensor carried by the second appendage when the second appendage is in the respective first pose, wherein generating at least a second motion plan may include generating at least a second motion plan where the second pose is based at least in part on the information received via the at least one sensor carried by the second appendage in the second pose. The second appendage may further carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and receiving information via that at least one sensor may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: dynamically generating a plurality of updated first motion plans while causing the first appendage to move at least partially between the respective first and the respective second poses. The robotic system may include a first self-propelled robot, and generating at least a first motion plan may include generating at least a first motion plan that specifies a trajectory for the first self-propelled robot through at least a portion of an orchard. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; and causing the third appendage to move according to the third motion plan. Generating at least a first motion plan for the first appendage may include generating at least a first motion plan for the first appendage based on a location of at least one human and that eliminates or reduces a probability of a collision between the at least the first appendage and the at least one human. Generating at least a first motion plan for the first appendage may include generating at least a first motion plan for the first appendage based on a location of at least one human and that eliminates or reduces a probability of a collision between a falling portion of the plant and the at least one human. Generating at least a first motion plan for the first appendage may include generating at least a first motion plan for the first appendage based on a location of at least one human and that eliminates or reduces a probability of a cutting a portion of the plant which portion supports the at least one human or to which the at least one human is anchored. Generating at least a first motion plan for the first appendage may include generating at least a first motion plan for the first appendage based on a canopy of a plurality of trees that eliminates or reduces a probability of a collision between the appendage and the canopy of the plurality of trees. The robotic system may perform the acts autonomously.

A robotic system to interact with plants may include: a first appendage that is moveable within a first operational volume, the first appendage carrying at least one sensor; at least one motion planning processor; and at least one non-transitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions, the first pose locating a portion of the first appendage with respect to a branch bearing one or more pieces of fruit and the second pose locating the at least one sensor carried by the first appendage with respect to at least one portion of at least one plant; cause the first appendage to move according to the first motion plan; and receiving information via the at least one sensor.

A method of operation in a robotic system to package fruit in boxes, the robotic system including a first appendage, the first appendage having at least one end effector and moveable within a first operational volume, the method may include: generating at least a first motion plan for the first appendage that moves the first appendage between at least a respective first pose and a respective second pose within the first operational volume without collisions, the second pose locating the at least one end effector carried by the first appendage at least one of above or within a box to place a piece of fruit in the box; and causing the first appendage to move according to the first motion plan.

Generating at least a first motion plan may include generating at least a first motion plan in which the second pose of the first appendage is a pose in which a the piece of fruit is transferrable from the end effector carried by the first into the box without damage to the piece of fruit. Generating at least a first motion plan may include generating at least a first motion plan in which the first pose of the first appendage positions the at least one end effector carried by the first appendage to retrieve the piece of fruit from a conveyor or a bin. Generating at least a first motion plan for the first appendage may include generating at least a first motion plan that moves the first appendage between the respective second pose and at least a respective third pose, the third pose which positions and orients a portion of the first appendage to operatively engage a portion of the box. Generating at least a first motion plan for the first appendage may include generating at least a first motion plan that moves the first appendage between the respective second pose and at least a respective third pose, the third pose which positions and orients a portion of the first appendage to operatively engage a flap of the box. Generating at least a first motion plan for the first appendage may include generating at least a first motion plan that moves the first appendage between the respective second pose and at least a respective third pose, the third pose which positions and orients a portion of the first appendage to close a flap of the box. The first appendage may further carry at least one sensor, and the method may further include: receiving information via the at least one sensor carried by the first appendage, and generating at least a first motion plan may include generating at least a first motion plan where the respective second pose is based at least in part on the information received via the at least one sensor carried by the first appendage. The robotic system may include at least a second appendage, the second appendage moveable within a second operational volume, at least a portion of the second operational volume overlapping with at least a portion of the first operational volume such that the first and second appendages are capable of physically colliding with one another, the method may further include: generating at least a second motion plan for the second appendage that moves the second appendage between at least a respective first pose and a respective second pose within the second operational volume without collisions at least between the first and the second appendages; and causing the second appendage to move according to the second motion plan. The second appendage may carry a respective end effector, and generating a second motion plan may include generating a second motion plan in which the second pose of at least one of the second appendage is a pose in which at least one piece of fruit is transferrable into the box from the respective end effector of carried by one of the first or the second appendages. The second appendage may carry a respective end effector, and generating a first motion plan and a second motion plan may include generating a first motion plan and a second motion plan in which the second pose of at least one of the first appendage or the second appendage is a pose in which the portion of at least one piece of fruit is transferrable from the respective end effector carried by one of the first or the second appendages to the respective end effector carried by the other one of the first or the second appendages. The second appendage may carry a respective end effector, and generating a second motion plan may include generating a second motion plan in which the respective second pose of the second appendage positions the end effector carried by the second appendage to operatively engage a first piece of fruit, and generating a first motion plan may include generating a first motion plan in which the respective second pose of the first appendage positions the respective end effector carried by the first appendage to operatively engage the first piece of fruit while the respective end effector carried by the second appendage operatively engages the first piece of fruit. The second appendage may carry a respective end effector, and generating a second motion plan may include generating a second motion plan in which the respective second pose of the second appendage positions the end effector carried by the second appendage to operatively engage a portion of the box after the first appendage positions the respective end effector carried by the first appendage to deposit the piece of fruit in the box. Generating a first motion plan may include generating a first motion plan in which the second pose of the first appendage positions a portion of the first appendage to transfer the piece of fruit into the box, and generating a second motion plan includes generating a second motion plan in which the first pose of the second appendage positions a portion of the second appendage to retrieve packaging materials and the second pose of the second appendage positions a portion of the second appendage to transfer the retrieved packaging material into an interior of the box. The second appendage may further carry at least one sensor, and the method may further include: receiving information via the at least one sensor carried by the second appendage when the second appendage is in the respective first pose, wherein generating at least a second motion plan may include generating at least a second motion plan where the second pose is based at least in part on the information received via the at least one sensor carried by the second appendage in the second pose. The second appendage may further carry at least one image sensor, and the method may further include: receiving image information via the at least one image sensor carried by the second appendage when the second appendage is in the respective first pose, wherein generating at least a second motion plan may include generating at least a second motion plan where the second pose is based at least in part on the image information received via the at least one image sensor carried by the second appendage in the second pose. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors mounted to a non-appendage portion of the self-propelled robot, and receiving information via that at least one sensor may include receiving the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: dynamically generating a plurality of updated first motion plans while causing the first appendage to move at least partially between the respective first and the respective second poses. The robotic system may include a first self-propelled robot, and generating at least a first motion plan may include generating at least a first motion plan that specifies a trajectory for the first self-propelled robot through at least a portion of a packing environment. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; and causing the third appendage to move according to the third motion plan. Generating at least a first motion plan for the first appendage may include generating at least a first motion plan for the first appendage based on a location of at least one human and that eliminates or reduces a probability of a collision between the at least the first appendage and the at least one human. Generating at least a first motion plan for the first appendage may include generating at least a first motion plan for the first appendage based on a canopy of a plurality of trees that eliminates or reduces a probability of a collision between the appendage and the canopy of the plurality of trees. The robotic system may perform the acts autonomously.

A robotic system to package fruit in boxes may include: at least a first appendage that is moveable within a first operational volume; at least one motion planning processor; and at least one nontransitory processor-readable medium that stores at least one of processor-executable instructions or data which, when executed by the at least one motion planning processor, causes that at least one motion planning processor to: generate at least a first motion plan for the first appendage that moves the first appendage between at least a respective first pose and a respective second pose within the first operational volume without collisions, the second pose locating the at least one end effector carried by the first appendage at least one of above or within a box to place a piece of fruit in the box; and cause the first appendage to move according to the first motion plan.

A method of operation in a robotic system to perform actions in an environment populated by humans, the robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another, the method may include: generating at least a first motion plan for a first appendage that moves the first appendage between at least a respective first pose and a respective second pose within the first operational volume without collisions at least between the first and the second appendages, the second pose locating a portion of the first appendage to interact with at least one object in the environment; generating at least a second motion plan for a second appendage that moves the second appendage between at least a respective first pose and a respective second pose within the second operational volume without collisions at least between the first and the second appendages; causing the first appendage to move according to the first motion plan; and causing the second appendage to move according to the second motion plan.

Generating a first motion plan and a second motion plan may include generating a first motion plan and a second motion plan in which the second pose of at least one of the first appendage or the second appendage is a pose in which at least one object in the environment is moved from one location to another location in the environment. Generating a first motion plan may include generating a first motion plan in which the second pose of the first appendage positions a portion of the first appendage to transfer at least one object in the environment between the first and the second appendage without collisions. Generating a first motion plan may include generating a first motion plan in which the first appendage move between the respective first and the second poses while maintaining an object held by the first appendage in an upright orientation through the movement between the first and the second poses. Generating a first motion plan may include generating a first motion plan in which the first appendage holds a first portion of an object in the environment to resist rotation thereof, and generating a second motion plan may include generating a second motion plan in which the second appendage causes a second portion of the object in the environment to rotate the second portion with respect to the first portion. The first appendage may hold a first implement, and generating a first motion plan may include generating a first motion plan in which the first implement moves from the first pose to the second pose in close proximity to a first human in the environment. The first appendage may hold a first implement, and generating a first motion plan may include generating a first motion plan in which the first implement moves from the first pose to the second pose in contact with a portion of a first human in the environment. The first appendage may hold a first comb or brush, and generating a first motion plan may include generating a first motion plan in which the first comb or brush moves from the first pose to the second pose in contact with at least one of hair or teeth of a first human in the environment. The first appendage may hold a first human, and generating a first motion plan may include generating a first motion plan in which the first appendage moves from the first pose to the second pose while supporting the first human. The first appendage may hold a first human, and generating a first motion plan may include generating a first motion plan in which the first appendage moves from the first pose to the second pose while carrying the first human. Generating a first motion plan may include generating a first motion plan in which the second pose of the first appendage positions a portion of the first appendage to operatively engage a drawer in an environment, and generating a second motion plan may include generating a second motion plan in which the second pose of the second appendage positions a portion of the second appendage to at least one of place or retrieve an object from the drawer. The first appendage may carry an end effector and generating a first motion plan may include generating a first motion plan in which the first appendage changes an orientation of a first object as gripped the first object is gripped by the end effector. The first appendage may carry a respective end effector, the second appendage may carry a respective end effector, and generating a first motion plan and a second motion plan may include generating a first motion plan and a second motion plan in which the second pose of at least one of the first appendage or the second appendage is a pose in which an object is transferrable from the respective end effector carried by one of the first or the second appendages to the respective end effector carried by the other one of the first or the second appendages. Generating a first motion plan may include generating a first motion plan that accommodates for at least one medical restraint that applies to a first human in the environment. The robotic system includes at least one sensor, and the method may further include: successively capturing information that represents at least one of the operational volumes of space in which at least one of the first or the second appendage operates; successively determining a number of successive motion plans based at least in part on the captured information; and successively causing at least one of the first or the second appendage to move to each of a plurality of successive poses according to a current one of the motion plan. Successively determining a number of successive motion plans based at least in part on the captured information may include successively determining a number of successive motion plans that specifies a respective trajectory for at least one of the first or the second appendages that stops the at least one of the first or the second appendage if a human-like object other than a patient or subject with which the robotic system is working is detected in the trajectory of the at least one of the first or the second appendage. Successively determining a number of successive motion plans based at least in part on the captured information may include successively determining a number of successive motion plans that specifies a respective trajectory for at least one of the first or the second appendages that provides a subsequent trajectory through a portion of the operational volume of space for the at least one of the first or second appendages that moves the at least one of the first or the second appendages between a number of successive poses and that avoids a dynamic object that would otherwise present a risk of collision above a defined threshold for the previous first trajectory. The robotic system may include a self-propelled robot, and successively determining a number of successive motion plans based at least in part on the captured information may include successively determining a number of successive motion plans that specifies a respective trajectory for the self-propelled robot that stops the self-propelled robot if a human-like object other than a patient or subject with which the robotic system is working is detected in the trajectory of the self-propelled robot. The robotic system may include a self-propelled robot, and successively determining a number of successive motion plans based at least in part on the captured information may include generating at least a first motion plan that specifies a trajectory for the self-propelled robot that changes the trajectory of the self-propelled robot to avoid a human-like object other than a patient or subject with which the robotic system is working that is detected in the trajectory of the self-propelled robot, without stopping a movement of the self-propelled robot. At least one of the first or the second appendages may carry at least one sensor, and generating at least a first motion plan for the first appendage or a second motion plan for the second appendage may include generating at least a first motion plan or a second motion plan based at least in part on information representing at least a portion of the environment sensed by that at least one sensor. The at least one sensor may include one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and the method may further include: successively capturing information that represents the at least a portion of the first environment via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages. The method may further include: dynamically generating a plurality of updated first motion plans while causing the first appendage to move at least partially between the respective first and the respective second poses. The method may further include: after causing the first appendage to move at least partially between the respective first and the respective second poses, generating at least one updated first motion plan for the first appendage that moves the first appendage between a respective current or a respective expected pose to the respective second pose within the first operational volume without collisions at least between the first and the second appendages; and after causing the second appendage to move at least partially between the respective first and the respective second poses, generating at least one updated second motion plan for the second appendage that moves the second appendage between a respective current or a respective expected pose to the respective second pose within the second operational volume without collisions at least between the first and the second appendages. The robotic system may include at least a third appendage that carries at least one of a respective sensor or a respective end effector, the third appendage moveable within a third operational volume, at least a portion of the third operational volume overlapping with at least a portion of at least one of the first or the second operational volumes such that the first, the second, and the third appendages are capable of physically colliding with one another, the method may include: generating at least a third motion plan for a third appendage that moves the third appendage between at least a respective first pose and a respective second pose within the third operational volume without collisions at least between the first, the second and the third appendages; causing the third appendage to move according to the third motion plan. The robotic system may perform the acts autonomously.

A robotic system to perform actions in an environment populated by humans may include: a first appendage that is moveable within a first operational volume; a second appendage that is moveable within a second operational volume, at least a portion of the second operational volume overlaps with at least a portion of the first operational volume such that the first and second appendages are capable of physically colliding with one another; at least one motion planning processor; and at least one nontransitory processor-readable medium that stores at least one of processor-executable instructions or data which, when executed by the at least one motion planning processor, causes that at least one motion planning processor to: generate at least a first motion plan for a first appendage that moves the first appendage between at least a respective first pose and a respective second pose within the first operational volume without collisions at least between the first and the second appendages, the second pose locating a portion of the first appendage to interact with at least one object in the environment; generate at least a second motion plan for a second appendage that moves the second appendage between at least a respective first pose and a respective second pose within the second operational volume without collisions at least between the first and the second appendages; cause the first appendage to move according to the first motion plan; and cause the second appendage to move according to the second motion plan.

The robotic system to perform actions in an environment populated by humans may include processor-executable instructions or data that, when executed by the at least one motion planning processor, may cause that at least one motion planning processor to perform any of the methods described above.

Figure 5:
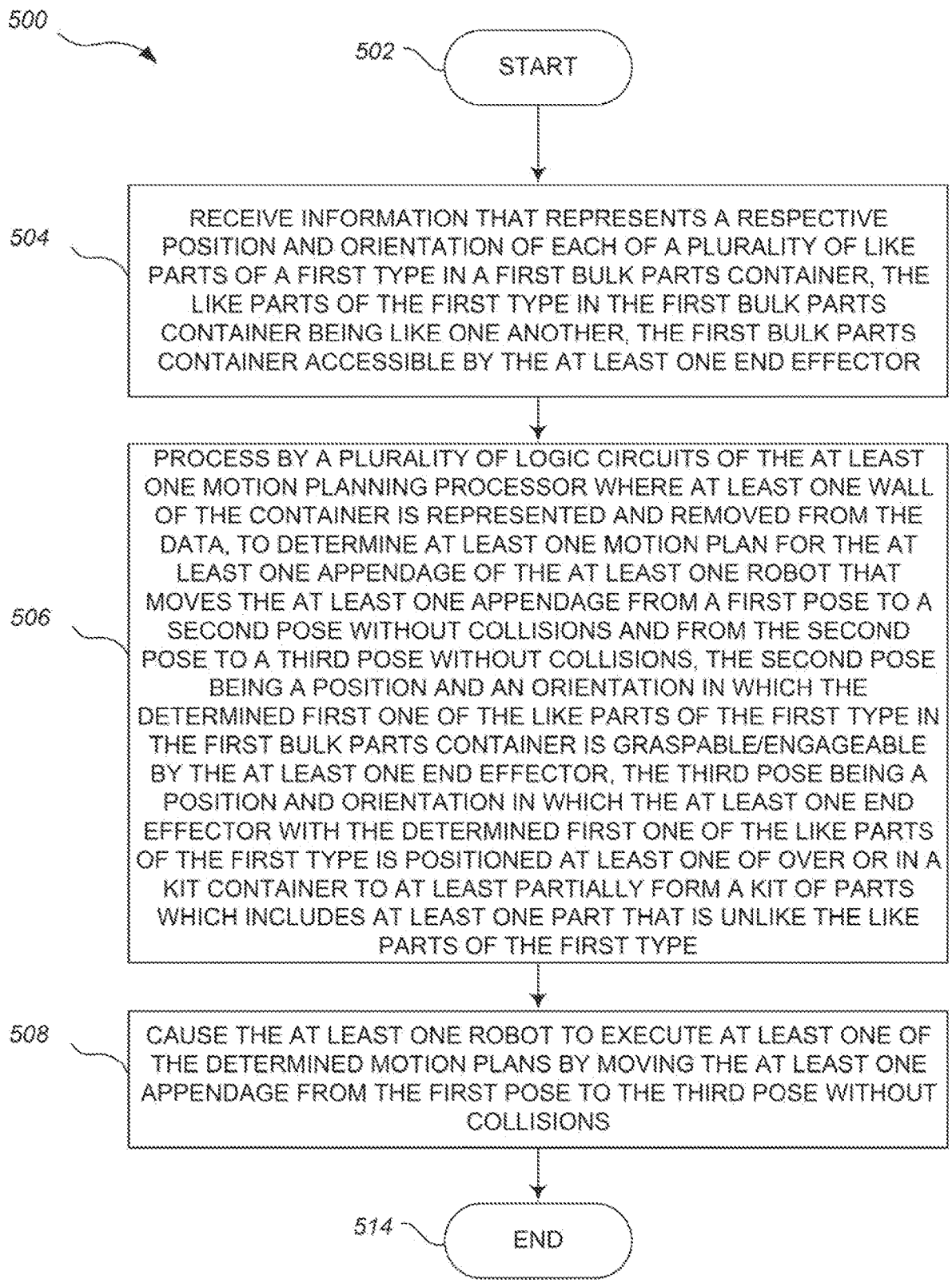
FIG. 5 is a flow diagram showing a method of operation in a robotic system regarding kitting, according to one illustrated embodiment.

FIG. 5 is a flow diagram showing a method 500 of operation in a robotic system regarding kitting, according to one illustrated embodiment. The method 500 of operation is in a robotic system, the robotic system including at least one motion planning processor and at least one robot, the at least one robot having at least one appendage, the at least one appendage having at least one joint and at least one end effector. The method 500 of operation in a robotic system regarding kitting, according to one illustrated embodiment commences at 502.

At 504, the system 200 receives information that represents a respective position and orientation of each of a plurality of like parts of a first type in a first bulk parts container. The like parts of the first type in the first bulk parts container are like one another and the first bulk parts container is accessible by the at least one end effector.

At 506, the system 200 determines a first one of the like parts of the first type to retrieve from the first bulk parts container.

At 508, the system 200 processes by a plurality of logic circuits of the at least one motion planning processor where at least one wall of the container is represented and removed from the data, to determine at least one motion plan for the at least one appendage of the at least one robot that moves the at least one appendage from a first pose to a second pose without collisions and from the second pose to a third pose without collisions. The second pose is a position and an orientation in which the determined first one of the like parts of the first type in the first bulk parts container is graspable/engageable by the at least one end effector. The third pose is a position and orientation in which the at least one end effector with the determined first one of the like parts of the first type is positioned at least one of over or in a kit container to at least partially form a kit of parts which includes at least one part that is unlike the like parts of the first type.

At 510, the system 200 causes the at least one robot to execute at least one of the determined motion plans by moving the at least one appendage from the first pose to the third pose without collisions. The method 500 of operation in a robotic system regarding kitting, according to one illustrated embodiment concludes at 512.

Figure 6:
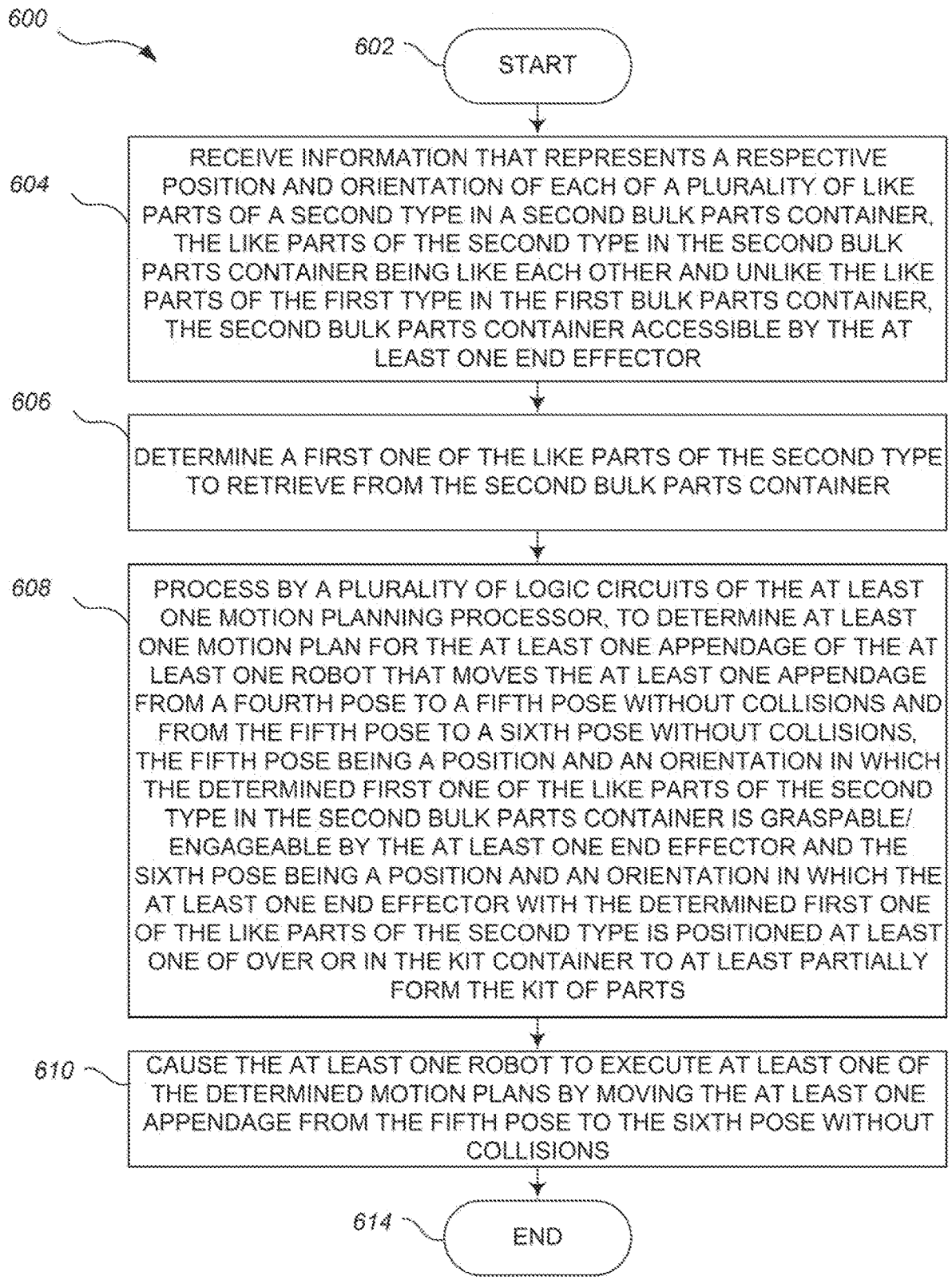
FIG. 6 is a flow diagram showing a method of operation in a robotic system regarding kitting useful in the method of FIG. 5, according to one illustrated embodiment.

FIG. 6 is a flow diagram showing a method 600 of operation in a robotic system regarding kitting useful in the method 500 of FIG. 5. The method 600 of operation is in a robotic system, the robotic system including at least one motion planning processor and at least one robot, the at least one robot having at least one appendage, the at least one appendage having at least one joint and at least one end effector. The method 600 of operation in a method of operation in a robotic system regarding kitting useful in the method 500 in FIG. 5 commences at 602.

At 604, the system 200 receives information that represents a respective position and orientation of each of a plurality of like parts of a second type in a second bulk parts container. The like parts of the second type in the second bulk parts container are like each other and unlike the like parts of the first type in the first bulk parts container. The second bulk parts container is accessible by the at least one end effector.

At 606, the system 200 determines a first one of the like parts of the second type to retrieve from the second bulk parts container.

At 608, the system 200 processes by a plurality of logic circuits of the at least one motion planning processor, to determine at least one motion plan for the at least one appendage of the at least one robot that moves the at least one appendage from a fourth pose to a fifth pose without collisions and from the fifth pose to a sixth pose without collisions. The fifth pose is a position and an orientation in which the determined first one of the like parts of the second type in the second bulk parts container is graspable/engageable by the at least one end effector and the sixth pose is a position and an orientation in which the at least one end effector with the determined first one of the like parts of the second type is positioned at least one of over or in the kit container to at least partially form the kit of parts.

At 610, the system 200 causes the at least one robot to execute at least one of the determined motion plans by moving the at least one appendage from the fifth pose to the sixth pose without collisions.

The method 600 of operation in a robotic system regarding kitting concludes at 612.

Figure 7:
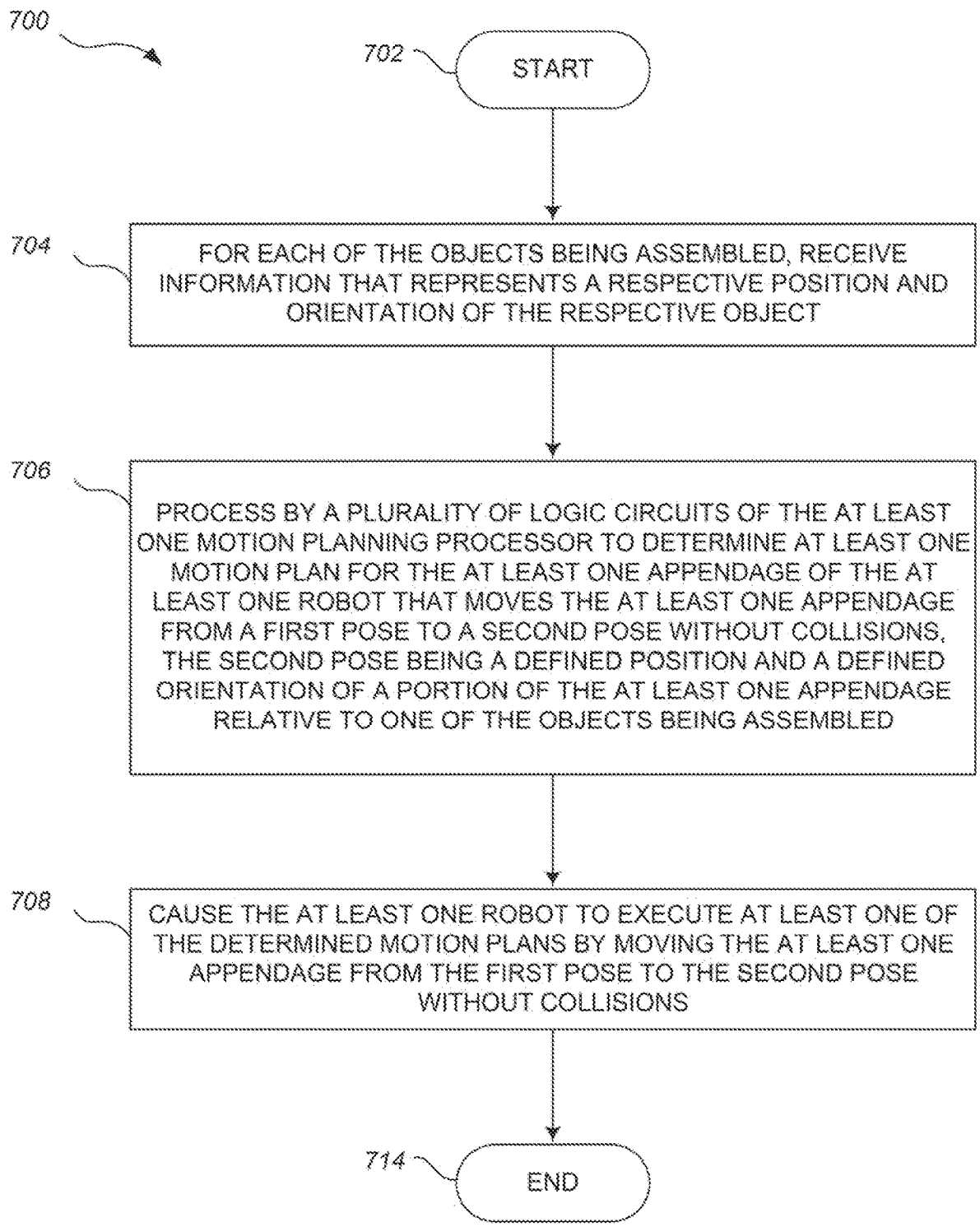
FIG. 7 is a flow diagram showing a method of operation in a robotic system regarding conveyors, according to one illustrated embodiment.

FIG. 7 is a flow diagram showing a method 700 of operation in a robotic system regarding conveyors, according to one illustrated embodiment. The method 700 of operation is in a robotic system on an assembly line that includes at least one conveyor that transports a plurality of objects being assembled along an assembly line, the robotic system including at least one motion planning processor and at least one robot, the at least one robot having at least one appendage, the at least one appendage having at least one joint and at least one end effector. The method 700 of operation in a flow diagram showing a method of operation in a robotic system regarding conveyors commences at 702.

At 704, for each of the objects being assembled, the system 200 receives information that represents a respective position and orientation of the respective object.

At 706, for each of the objects being assembled, the system 200 processes by a plurality of logic circuits of the at least one motion planning processor to determine at least one motion plan for the at least one appendage of the at least one robot that moves the at least one appendage from a first pose to a second pose without collisions, the second pose being a defined position and a defined orientation of a portion of the at least one appendage relative to one of the objects being assembled.

At 708, for each of the objects being assembled, the system 200 causes the at least one robot to execute at least one of the determined motion plans by moving the at least one appendage from the first pose to the second pose without collisions.

The method 700 of operation in a robotic system regarding conveyors concludes at 712.

Figure 8:
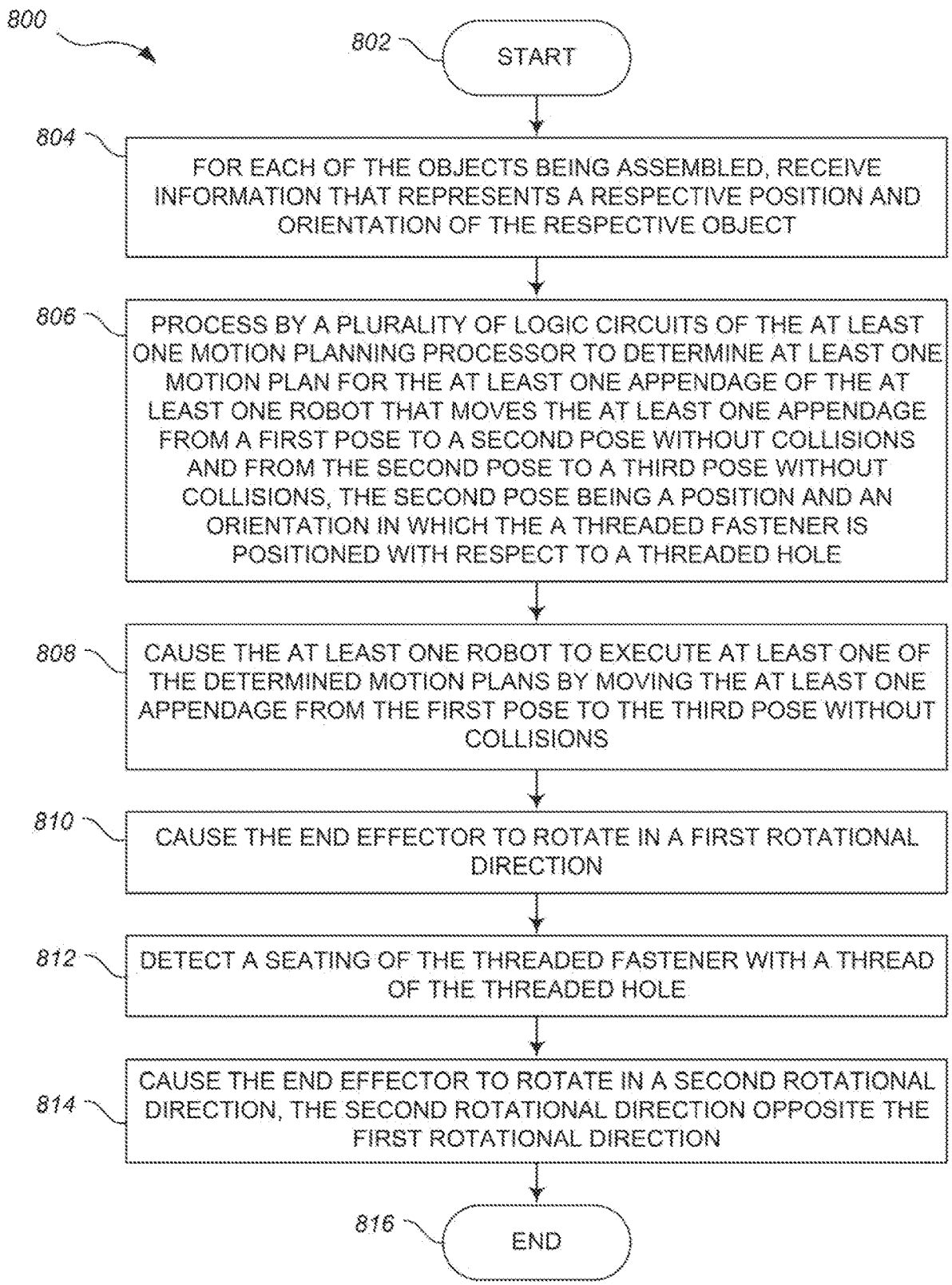
FIG. 8 is a flow diagram showing a method of operation in a robotic system regarding threaded fasteners, according to one illustrated embodiment.

FIG. 8 is a flow diagram showing a method 800 of operation in a robotic system regarding threaded fasteners, according to one illustrated embodiment. The method 800 of operation is in a robotic system on an assembly line that includes at least one conveyor that transports a plurality of objects being assembled along an assembly line, the robotic system including at least one motion planning processor and at least one robot, the at least one robot having at least one appendage, the at least one appendage having at least one joint and at least one end effector. The method 800 of operation in a operation in a robotic system regarding threaded fasteners commences at 802.

At 804, the system 200, for each of the objects being assembled, receives information that represents a respective position and orientation of the respective object.

At 806, the system 200 processes by a plurality of logic circuits of the at least one motion planning processor to determine at least one motion plan for the at least one appendage of the at least one robot that moves the at least one appendage from a first pose to a second pose without collisions and from the second pose to a third pose without collisions, the second pose being a position and an orientation in which a threaded fastener is positioned with respect to a threaded hole.

At 808, the system 200 causes the at least one robot to execute at least one of the determined motion plans by moving the at least one appendage from the first pose to the third pose without collisions.

At 810, the system 200 causes the end effector to rotate in a first rotational direction.

At 812, the system 200 detects a seating of the threaded fastener with a thread of the threaded hole.

At 814, the system 200 causes the end effector to rotate in a second rotational direction, the second rotational direction opposite the first rotational direction.

The method 800 of operation in a robotic system regarding threaded fasteners, according to one illustrated embodiment concludes at 816.

Figure 9:
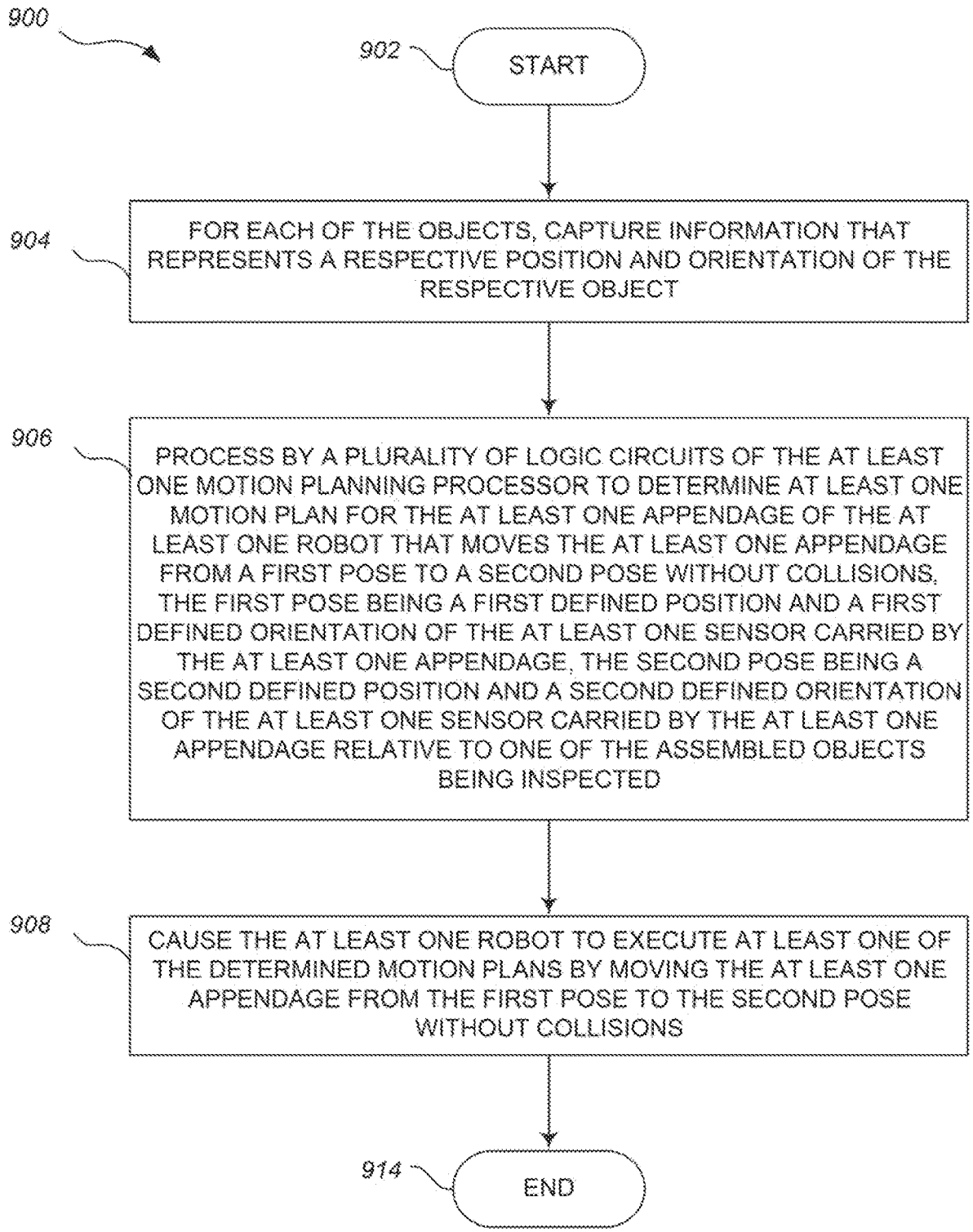
FIG. 9 is a flow diagram showing a method of operation in a robotic system regarding inspections, according to one illustrated embodiment.

FIG. 9 is a flow diagram showing a method 900 of operation in a robotic system regarding inspections, according to one illustrated embodiment. The method 900 of operation is in a robotic system to perform an inspection of each of a plurality of assembled objects as the assembled objects are transported past one or more inspection stations, the robotic system including at least one motion planning processor and at least one robot, the at least one robot having at least one appendage, the at least one appendage having at least one joint and at least one sensor. The method 900 of operation in a robotic system regarding inspections commences at 902.

At 904, the system 200, for each of the objects, captures information that represents a respective position and orientation of the respective object.

At 906, the system 200 processes by a plurality of logic circuits of the at least one motion planning processor to determine at least one motion plan for the at least one appendage of the at least one robot that moves the at least one appendage from a first pose to a second pose without collisions. The first pose is a first defined position and a first defined orientation of the at least one sensor carried by the at least one appendage and the second pose is a second defined position and a second defined orientation of the at least one sensor carried by the at least one appendage relative to one of the assembled objects being inspected.

At 908, the system 200 causes the at least one robot to execute at least one of the determined motion plans by moving the at least one appendage from the first pose to the second pose without collisions.

The method 900 of operation in a robotic system regarding inspections concludes at 910.

Figure 10:
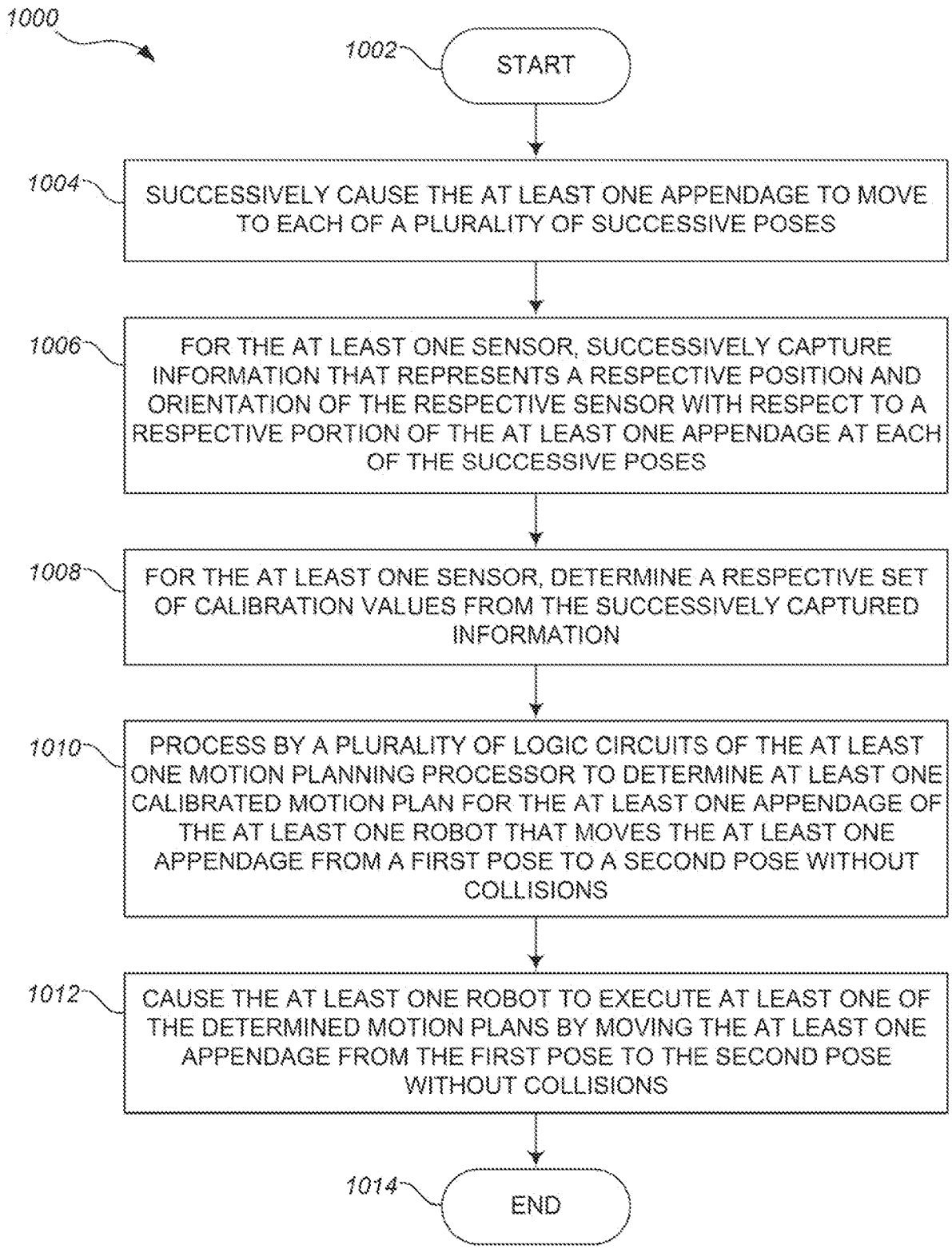
FIG. 10 is a flow diagram showing a method of operation in a robotic system regarding self-calibration, according to one illustrated embodiment.

FIG. 10 is a flow diagram showing a method 1000 of operation in a robotic system regarding self-calibration, according to one illustrated embodiment. The method 1000 of operation is in a robotic system, the robotic system including at least one motion planning processor, at least one sensor, and at least one robot, the at least one robot having at least one appendage, the at least one appendage having at least one joint and at least one end effector. The method 1000 of operation in a robotic system regarding self-calibration commences at 1002.

At 1004, the system 200 successively causes the at least one appendage to move to each of a plurality of successive poses.

At 1006, the system 200, for the at least one sensor, successively captures information that represents a respective position and orientation of the respective sensor with respect to a respective portion of the at least one appendage at each of the successive poses.

At 1008, the system 200, for the at least one sensor, determines a respective set of calibration values from the successively captured information.

At 1010, the system 200 processes by a plurality of logic circuits of the at least one motion planning processor to determine at least one calibrated motion plan for the at least one appendage of the at least one robot that moves the at least one appendage from a first pose to a second pose without collisions.

At 1012, the system 200 causes the at least one robot to execute at least one of the determined motion plans by moving the at least one appendage from the first pose to the third pose without collisions.

The method 1000 of a flow diagram showing a method of operation in a robotic system regarding self-calibration concludes at 1014.

Figure 11:
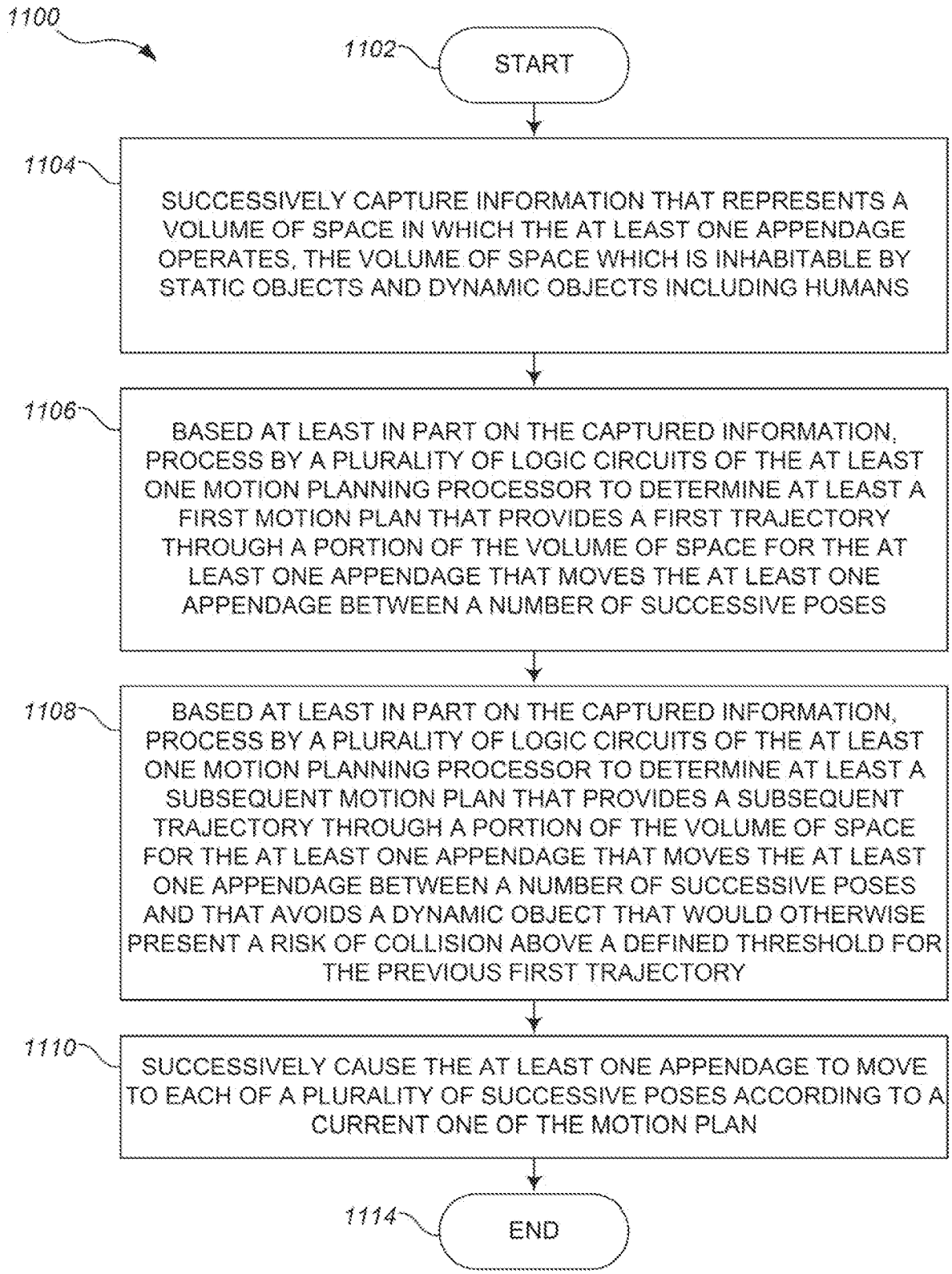
FIG. 11 is a flow diagram showing a method of operation in a robotic system operating in a volume of space which is inhabitable by static objects and dynamic objects including humans, according to one illustrated embodiment.

FIG. 11 is a flow diagram showing a method 1100 of operation in a robotic system operating in a volume of space which is inhabitable by static objects and dynamic objects including humans, according to one illustrated embodiment. The robotic system includes at least one motion planning processor, at least one sensor, and at least one robot, the at least one robot having at least one appendage, the at least one appendage having at least one joint and at least one end effector. The method 1100 of operation in a robotic system operating in a volume of space which is inhabitable by static objects and dynamic objects including humans commences at 1102.

At 1104, the system 200 successively captures information that represents a volume of space in which the at least one appendage operates, the volume of space which is inhabitable by static objects and dynamic objects including humans.

At 1106, the system 200, based at least in part on the captured information, processes by a plurality of logic circuits of the at least one motion planning processor to determine at least a first motion plan that provides a first trajectory through a portion of the volume of space for the at least one appendage that moves the at least one appendage between a number of successive poses.

At 1108, the system 200, based at least in part on the captured information, processes by a plurality of logic circuits of the at least one motion planning processor to determine at least a subsequent motion plan that provides a subsequent trajectory through a portion of the volume of space for the at least one appendage that moves the at least one appendage between a number of successive poses and that avoids a dynamic object that would otherwise present a risk of collision above a defined threshold for the previous first trajectory.

At 1110, the system 200 successively causes the at least one appendage to move to each of a plurality of successive poses according to a current one of the motion plan.

The method 1100 of operation in a robotic system operating in a volume of space which is inhabitable by static objects and dynamic objects including humans concludes at 1112.

Figure 12:
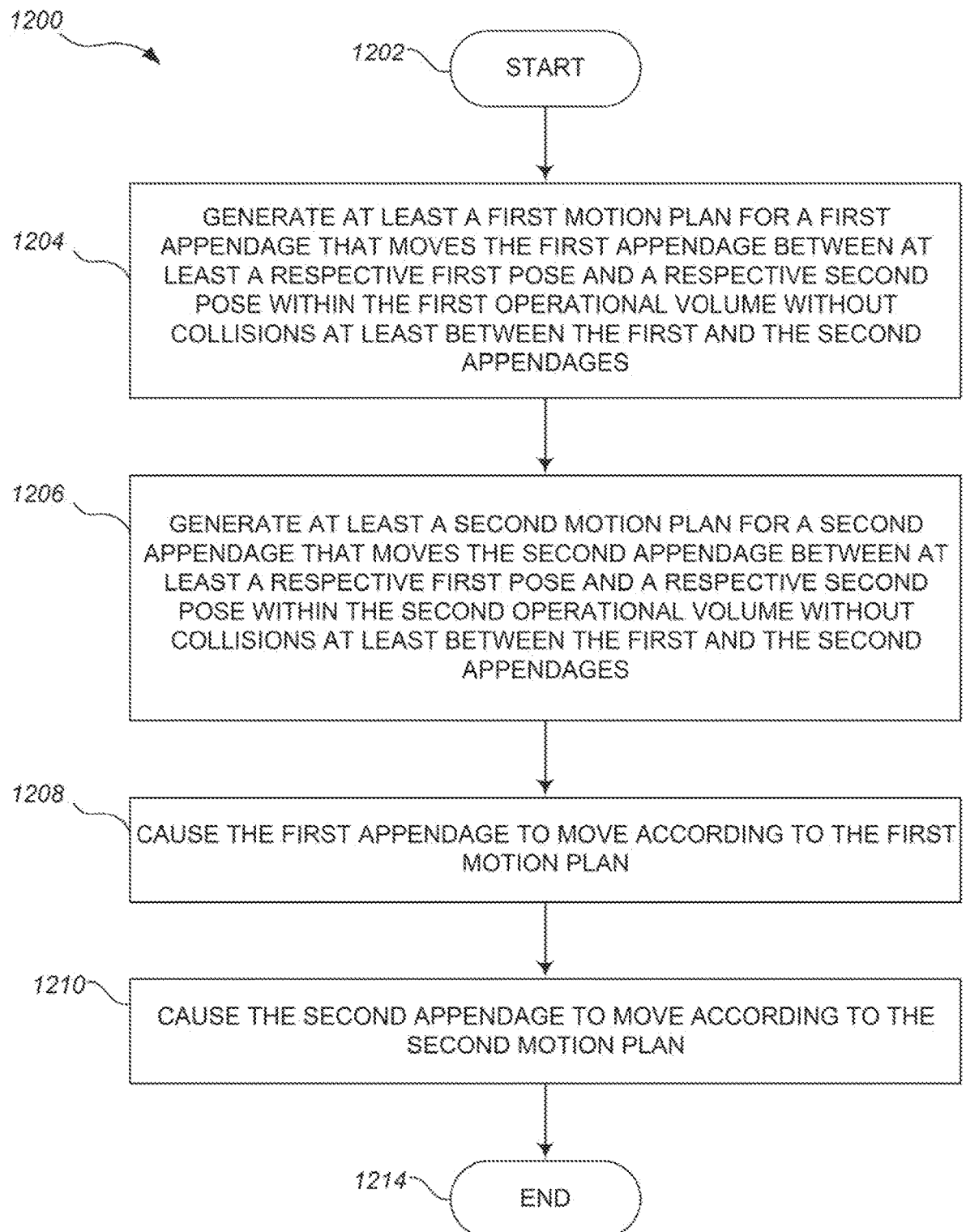
FIG. 12 is a flow diagram showing a method of operation in a robotic system regarding multi-manual grasping, according to one illustrated embodiment.

FIG. 12 is a flow diagram showing a method 1200 of operation in a robotic system regarding multi-manual grasping, according to one illustrated embodiment. The method 1200 of operation is in a robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another. The method 1200 of operation in a robotic system regarding multi-manual grasping commences at 1202.

At 1204, the system 200 generates at least a first motion plan for a first appendage that moves the first appendage between at least a respective first pose and a respective second pose within the first operational volume without collisions at least between the first and the second appendages.

At 1206, the system 200 generates at least a second motion plan for a second appendage that moves the second appendage between at least a respective first pose and a respective second pose within the second operational volume without collisions at least between the first and the second appendages.

At 1208, the system 200 causes the first appendage to move according to the first motion plan.

At 1210, the system 200 causes the second appendage to move according to the second motion plan.

The method 1200 operation in a robotic system regarding multi-manual grasping, according to one illustrated embodiment concludes at 1212.

Figure 13:
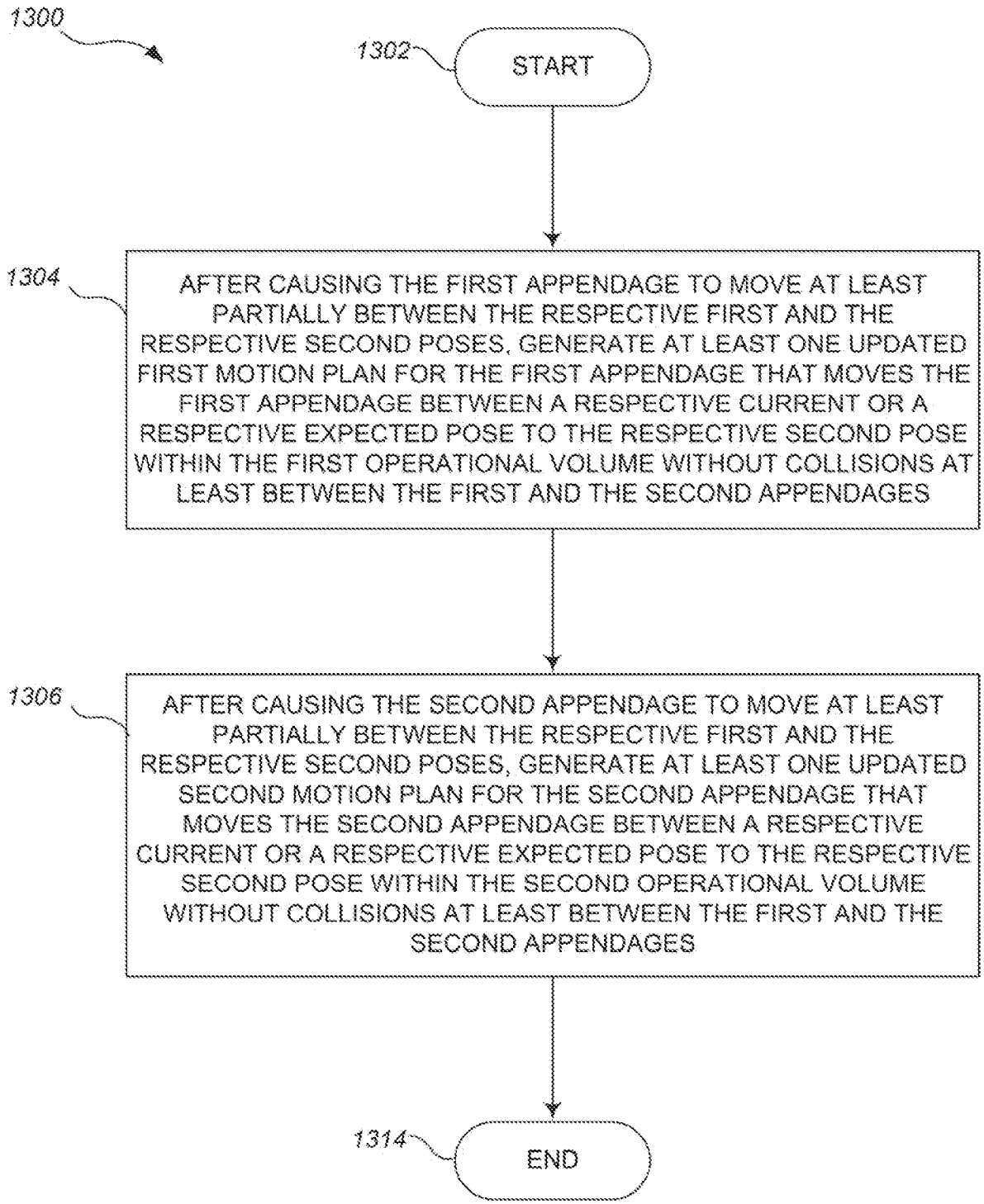
FIG. 13 is a flow diagram showing a method of operation in a robotic system regarding multi-manual grasping useful in the method of FIG. 12, according to one illustrated embodiment.

FIG. 13 is a flow diagram showing a method 1300 of operation in a robotic system regarding multi-manual grasping useful in the method of FIG. 12, according to one illustrated embodiment. The method 1300 is in a robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another. The method 1300 of operation in a robotic system regarding multi-manual grasping useful in the method of FIG. 12 commences at 1302.

At 1304, the system 200, after causing the first appendage to move at least partially between the respective first and the respective second poses, generates at least one updated first motion plan for the first appendage that moves the first appendage between a respective current or a respective expected pose to the respective second pose within the first operational volume without collisions at least between the first and the second appendages.

At 1306, the system 200, after causing the second appendage to move at least partially between the respective first and the respective second poses, generates at least one updated second motion plan for the second appendage that moves the second appendage between a respective current or a respective expected pose to the respective second pose within the second operational volume without collisions at least between the first and the second appendages.

The method 1300 of operation in a robotic system regarding multi-manual grasping useful in the method of FIG. 12 concludes at 1308.

Figure 14:
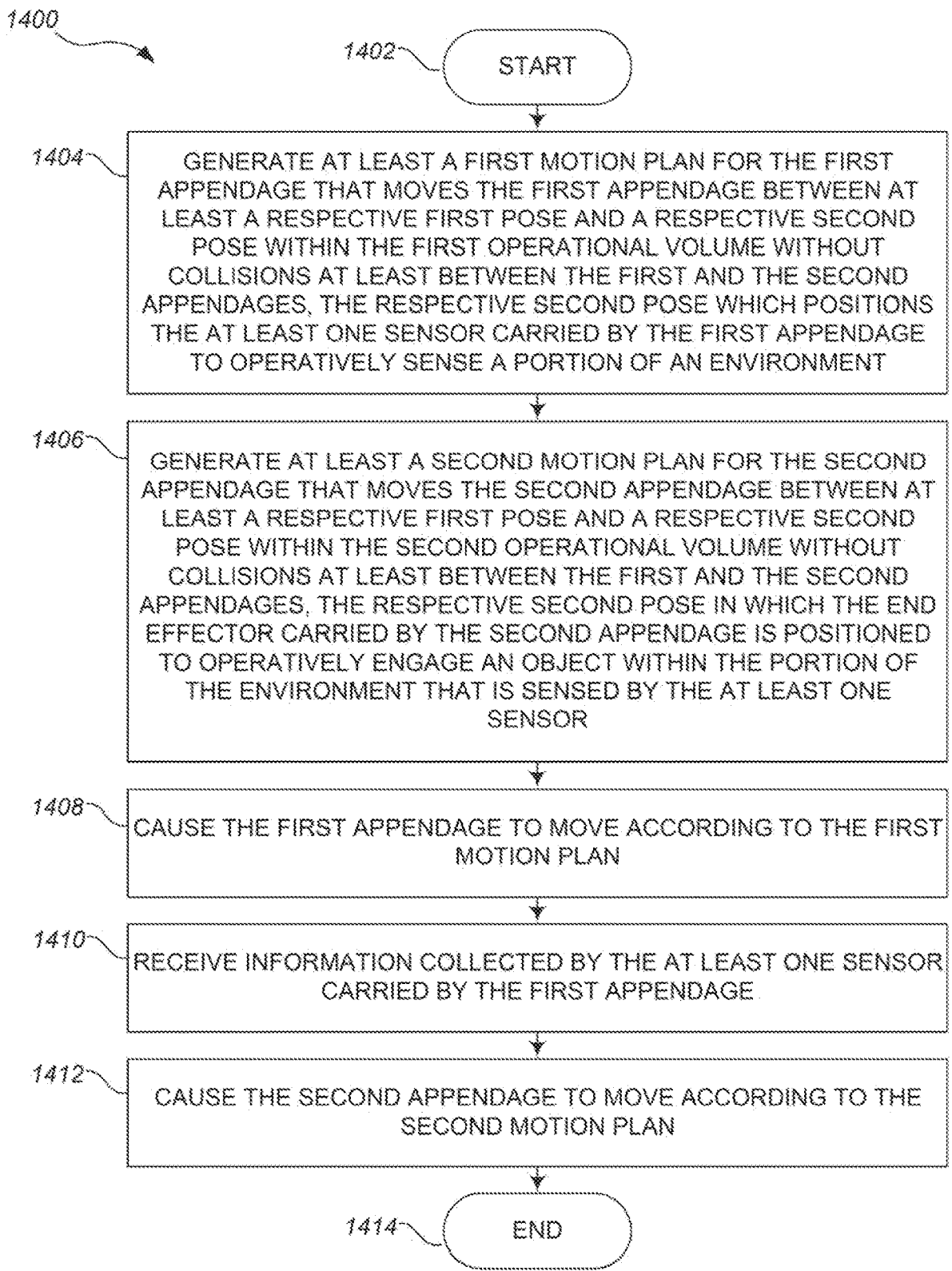
FIG. 14 is a flow diagram showing a method of operation in a robotic system regarding grasping by touch, according to one illustrated embodiment.

FIG. 14 is a flow diagram showing a method 1400 of operation in a robotic system regarding grasping by touch, according to one illustrated embodiment. The method 1400 of operation is a robotic system including a first appendage that carries at least one sensor and at least a second appendage that carries at least one end effector, the first and the second appendages moveable within a first operational volume and a second operational volume, respectively, at least a portion of the second operational volume overlapping with at least a portion of the first operational volume such that the first and the second appendages are capable of physically colliding with one another. The method 1400 of operation in a robotic system regarding grasping by touch commences at 1402.

At 1404, the system 200 generates at least a first motion plan for the first appendage that moves the first appendage between at least a respective first pose and a respective second pose within the first operational volume without collisions at least between the first and the second appendages, the respective second pose which positions the at least one sensor carried by the first appendage to operatively sense a portion of an environment.

At 1406, the system 200 generates at least a second motion plan for the second appendage that moves the second appendage between at least a respective first pose and a respective second pose within the second operational volume without collisions at least between the first and the second appendages, the respective second pose in which the end effector carried by the second appendage is positioned to operatively engage an object within the portion of the environment that is sensed by the at least one sensor.

At 1408, the system 200 causes the first appendage to move according to the first motion plan.

At 1410, the system 200 receives information collected by the at least one sensor carried by the first appendage.

At 1412, the system 200 causes the second appendage to move according to the second motion plan.

The method 1400 of operation in a robotic system regarding grasping by touch concludes at 1414.

Figure 15:
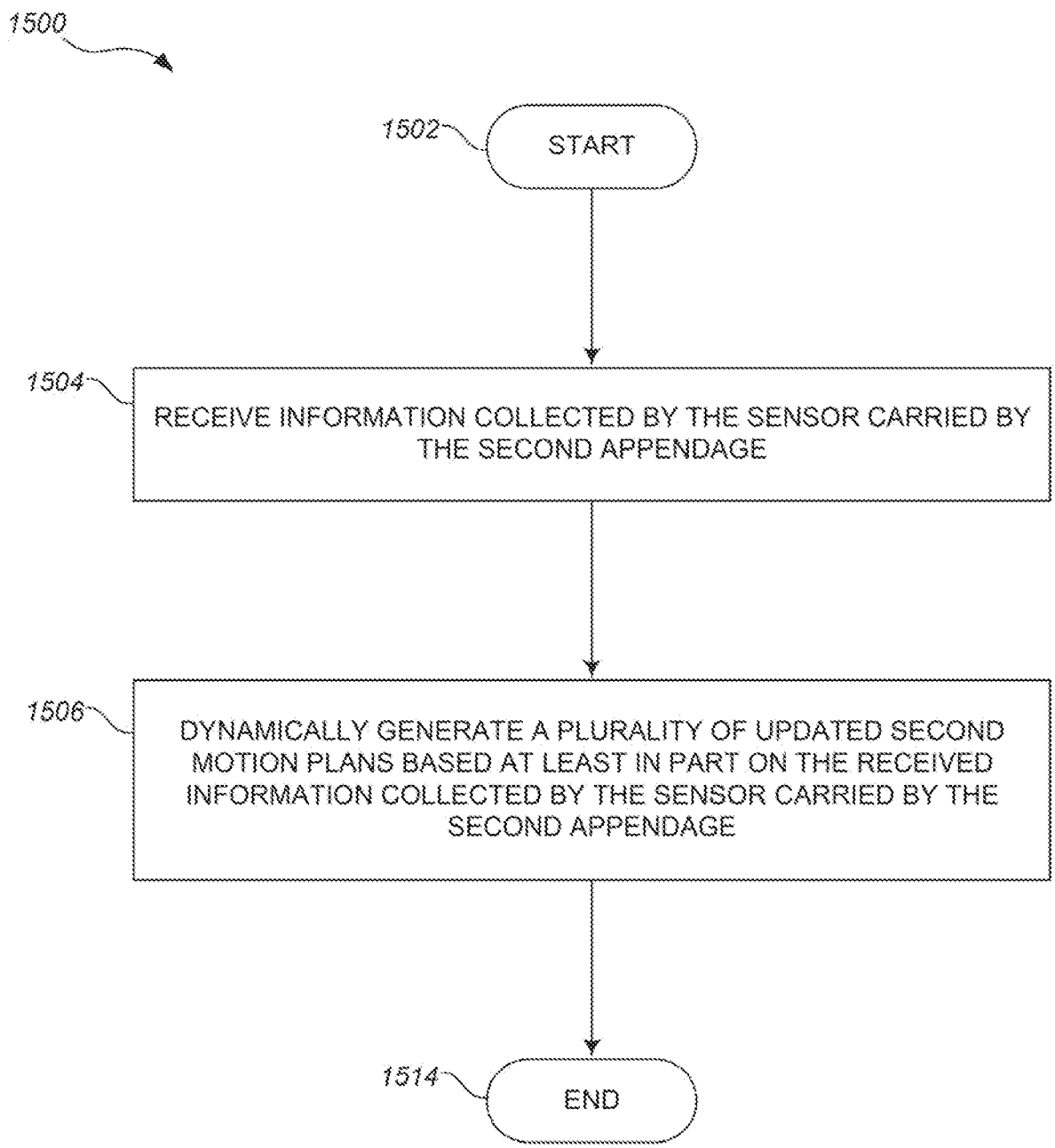
FIG. 15 is a flow diagram showing a method of operation in a robotic system regarding grasping by touch useful in the method of FIG. 14, according to one illustrated embodiment.

FIG. 15 is a flow diagram showing a method 1500 of operation in a robotic system regarding grasping by touch useful in the method of FIG. 14, according to one illustrated embodiment. The method 1500 is a method of operation in a robotic system wherein the second appendage also carries a respective sensor in addition to the respective end effector carried by the second appendage. The method 1500 of operation in a robotic system regarding grasping by touch useful in the method of FIG. 14 commences at 1502.

At 1504, the system 200 receives information collected by the sensor carried by the second appendage.

At 1506, the system 200 dynamically generates a plurality of updated second motion plans based at least in part on the received information collected by the sensor carried by the second appendage.

The method 1500 of operation in a method of operation in a robotic system regarding grasping by touch useful in the method of FIG. 14 concludes at 1508.

Figure 16:
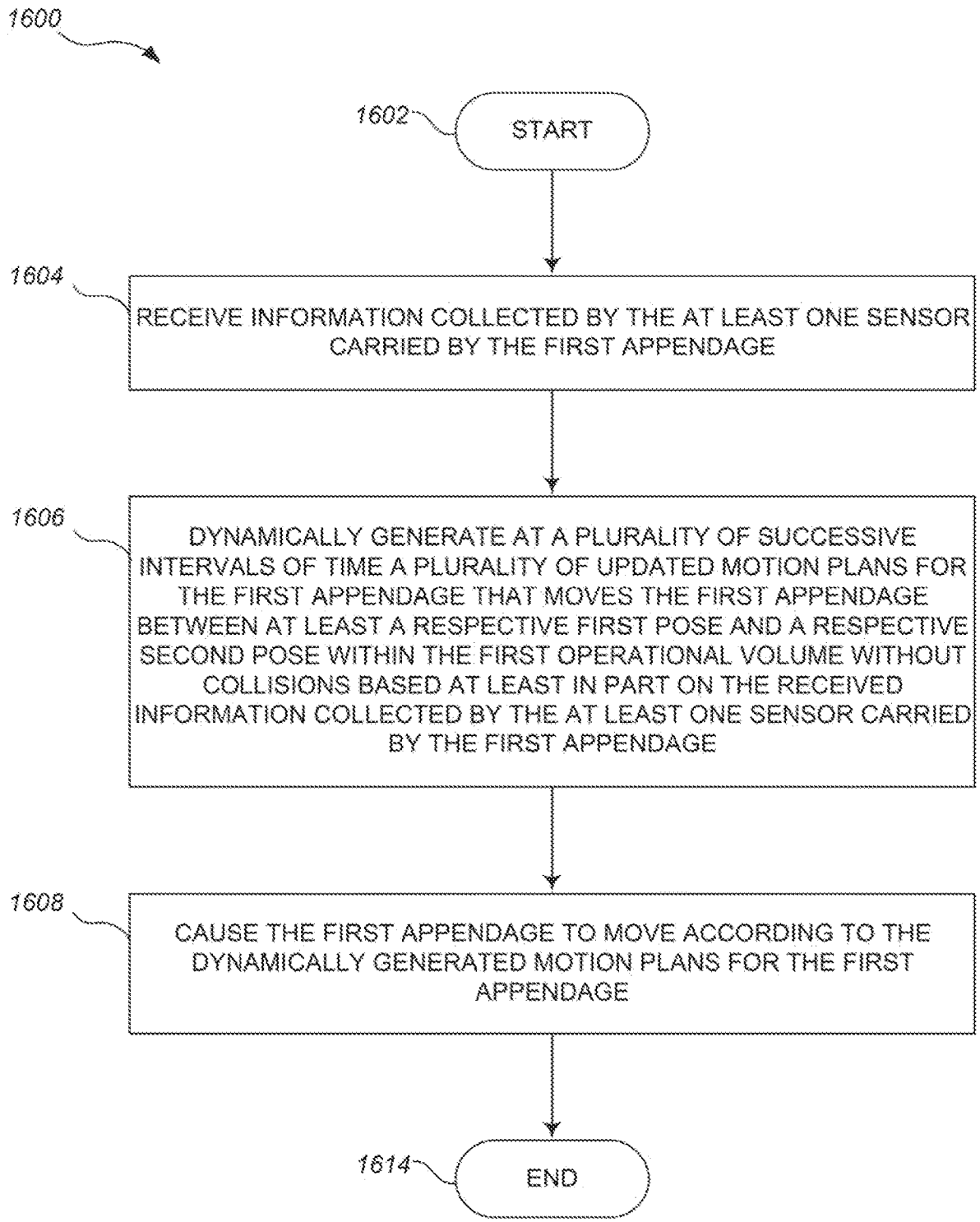
FIG. 16 is a flow diagram showing a method of operation in a robotic system regarding information collected by a sensor carried by an appendage, according to one illustrated embodiment.

FIG. 16 is a flow diagram showing a method 1600 of operation in a robotic system regarding information collected by a sensor carried by an appendage, according to one illustrated embodiment. The method 1600 of operation is in a robotic system including a first appendage that carries at least one sensor and at least one end effector, the first appendage moveable within a first operational volume. The method 1600 of operation in a robotic system regarding information collected by a sensor carried by an appendage commences at 1602.

At 1604, the system 200 receives information collected by the at least one sensor carried by the first appendage.

At 1606, the system 200 dynamically generates at a plurality of successive intervals of time a plurality of updated motion plans for the first appendage that moves the first appendage between at least a respective first pose and a respective second pose within the first operational volume without collisions based at least in part on the received information collected by the at least one sensor carried by the first appendage.

At 1608, the system 200 causes the first appendage to move according to the dynamically generated motion plans for the first appendage.

The method 1600 of robotic system regarding information collected by a sensor carried by an appendage concludes at 1610.

Figure 17:
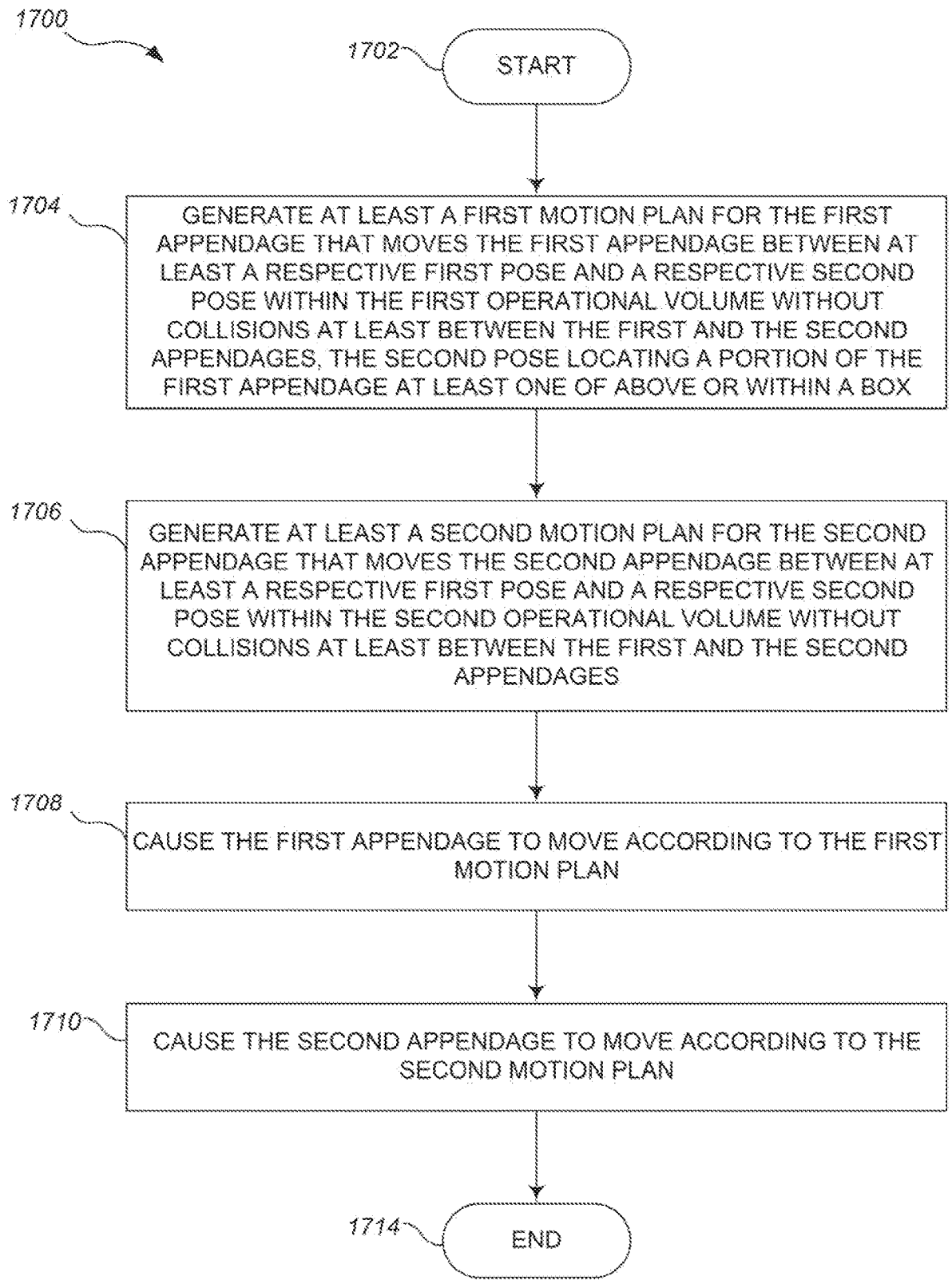
FIG. 17 is a flow diagram showing a method of operation in a robotic system regarding box packing, according to one illustrated embodiment.

FIG. 17 is a flow diagram showing a method 1700 of operation in a robotic system regarding box packing, according to one illustrated embodiment. The method 1700 of operation is in a robotic system to package items in boxes, the robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another. The method 1700 of operation in a robotic system regarding box packing commences at 1702.

At 1704, the system 200 generates at least a first motion plan for the first appendage that moves the first appendage between at least a respective first pose and a respective second pose within the first operational volume without collisions at least between the first and the second appendages, the second pose locating a portion of the first appendage at least one of above or within a box.

At 1706, the system 200 generates at least a second motion plan for the second appendage that moves the second appendage between at least a respective first pose and a respective second pose within the second operational volume without collisions at least between the first and the second appendages.

At 1708, the system 200 causes the first appendage to move according to the first motion plan.

At 1710, the system 200 causes the second appendage to move according to the second motion plan.

The method 1700 of operation in a robotic system regarding box packing concludes at 1712.

Figure 18:
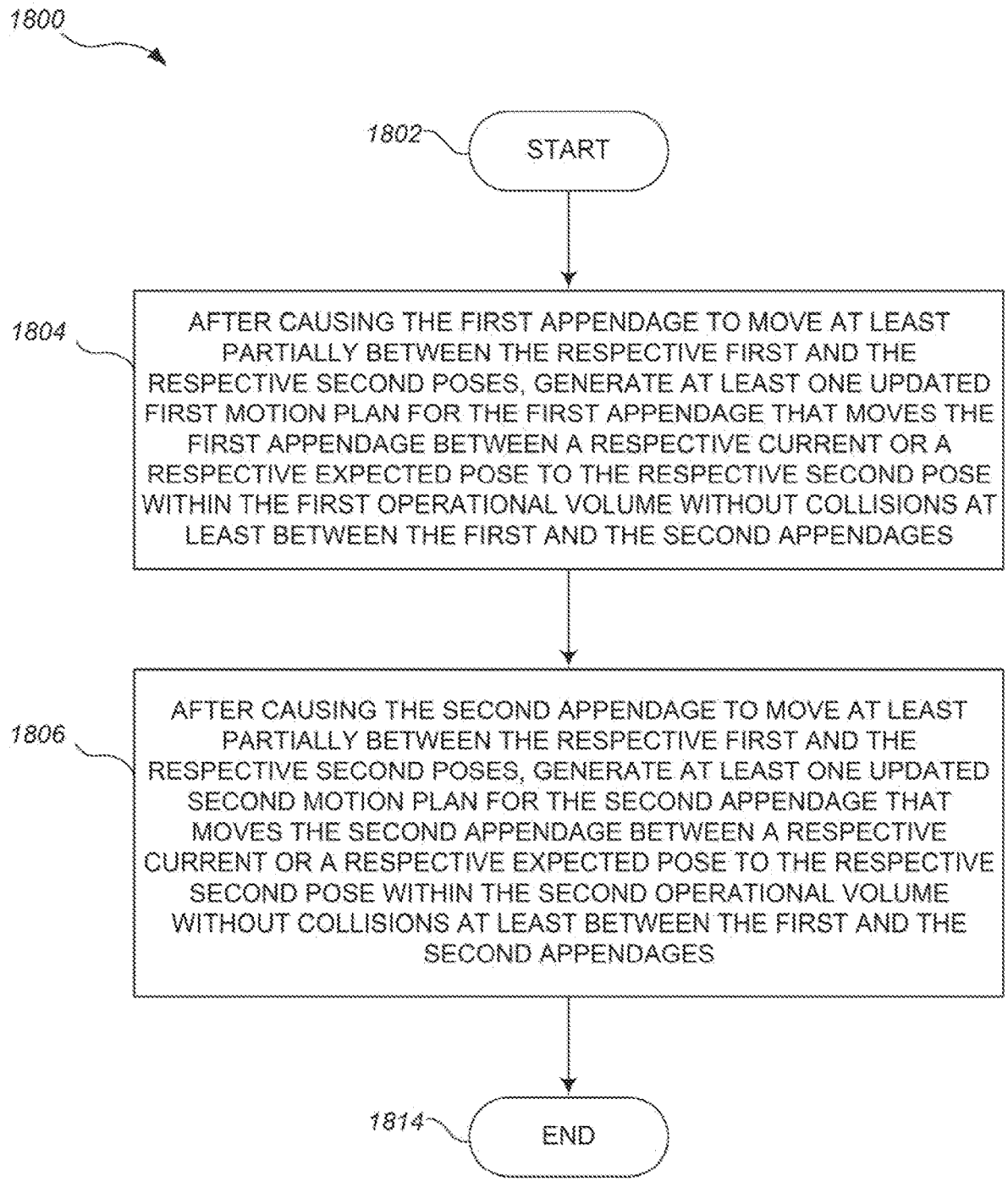
FIG. 18 is a flow diagram showing a method of operation in a robotic system regarding box packing useful in the method of FIG. 17, according to one illustrated embodiment.

FIG. 18 is a flow diagram showing a method 1800 of operation in a robotic system regarding box packing useful in the method of FIG. 17, according to one illustrated embodiment. The method 1800 of operation is in a robotic system to package items in boxes, the robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another. The method 1800 of operation in a robotic system regarding box packing useful in the method of FIG. 17 commences at 1802.

At 1804, the system 200, after causing the first appendage to move at least partially between the respective first and the respective second poses, generates at least one updated first motion plan for the first appendage that moves the first appendage between a respective current or a respective expected pose to the respective second pose within the first operational volume without collisions at least between the first and the second appendages.

At 1806, the system 200, after causing the second appendage to move at least partially between the respective first and the respective second poses, generates at least one updated second motion plan for the second appendage that moves the second appendage between a respective current or a respective expected pose to the respective second pose within the second operational volume without collisions at least between the first and the second appendages.

The method 1800 of operation in a robotic system regarding box packing useful in the method of FIG. 17 concludes at 1808.

Figure 19:
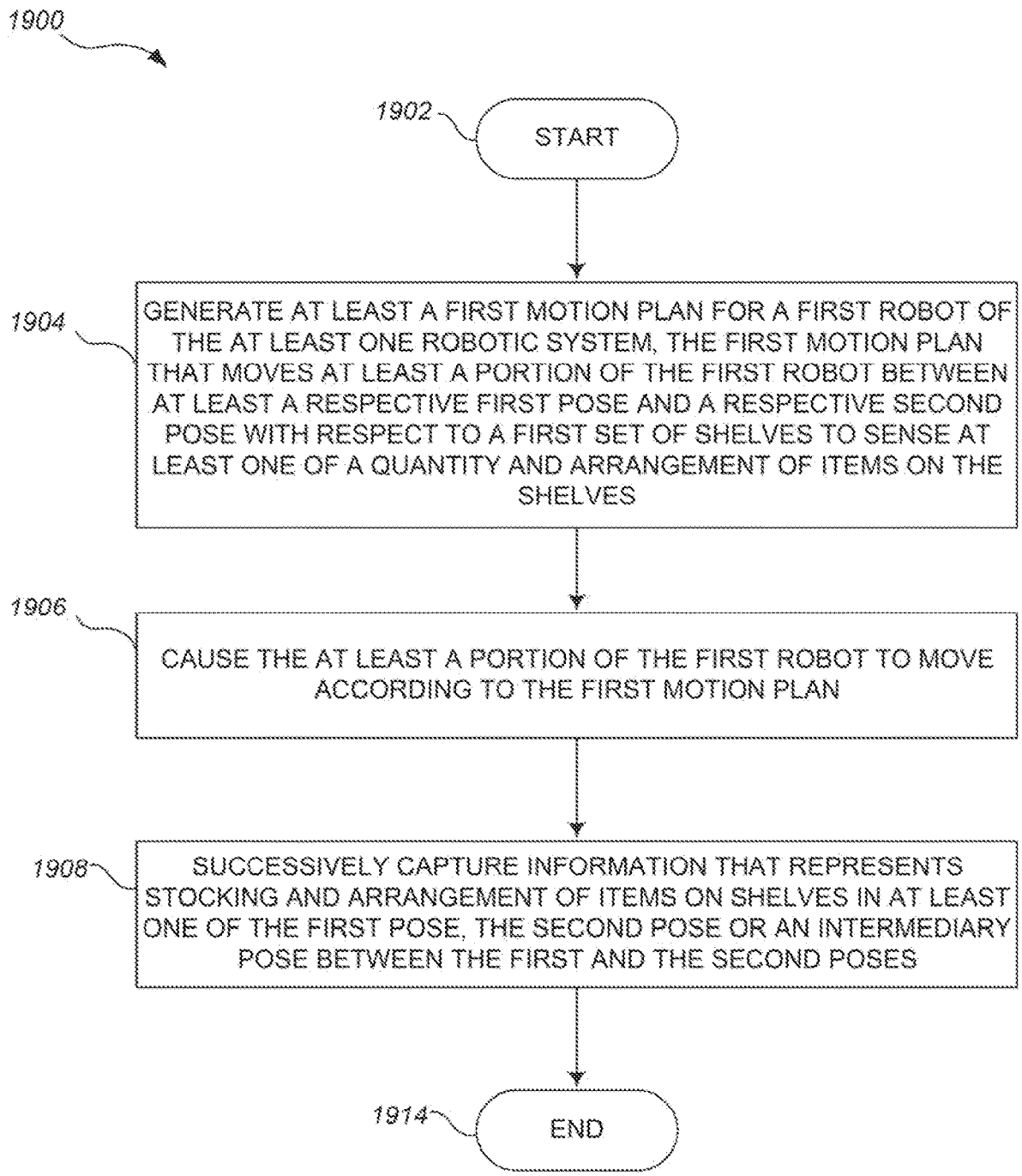
FIG. 19 is a flow diagram showing a method of operation in a robotic system regarding shelf inspection, according to one illustrated embodiment.

FIG. 19 is a flow diagram showing a method 1900 of operation in a robotic system regarding shelf inspection, according to one illustrated embodiment. The method 1900 of operation is in a robotic system to handle shelf stocking and arrangement of items on shelves, the robotic system including at least one robot that carries at least one sensor. The method 1900 of operation in a robotic system regarding shelf inspection commences at 1902.

At 1904, the system 200 generates at least a first motion plan for a first robot of the at least one robotic system, the first motion plan that moves at least a portion of the first robot between at least a respective first pose and a respective second pose with respect to a first set of shelves to sense at least one of a quantity and arrangement of items on the shelves.

At 1906, the system 200 causes the at least a portion of the first robot to move according to the first motion plan.

At 1908, the system 200 successively captures information that represents stocking and arrangement of items on shelves in at least one of the first pose, the second pose or an intermediary pose between the first and the second poses.

The method 1900 of operation in a robotic system regarding shelf inspection concludes at 1910.

Figure 20:
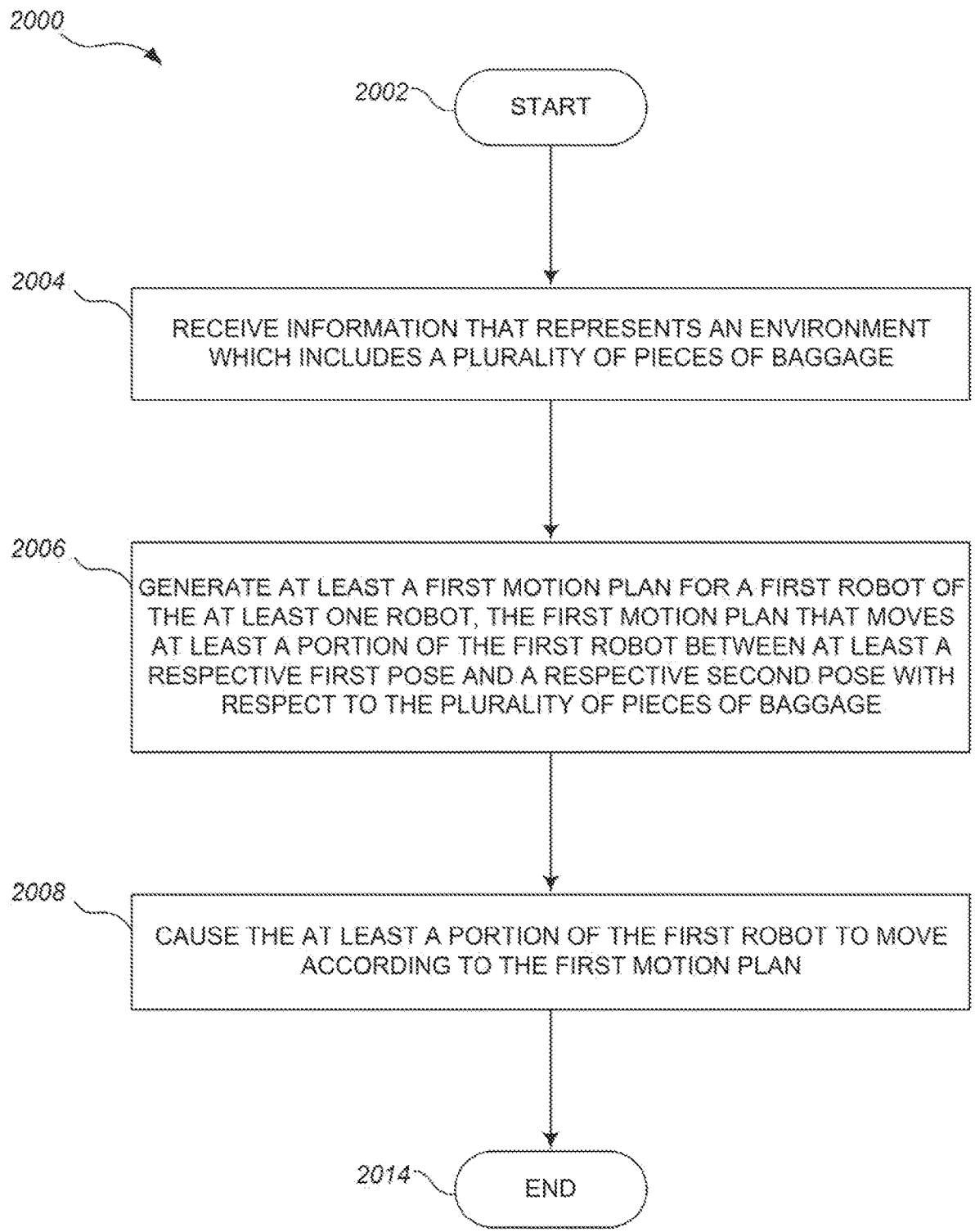
FIG. 20 is a flow diagram showing a method of operation in a robotic system regarding baggage handling, according to one illustrated embodiment.

FIG. 20 is a flow diagram showing a method 2000 of operation in a robotic system regarding baggage handling, according to one illustrated embodiment. The method 2000 of operation is in a robotic system to handle baggage, the robotic system including at least one robot and at least one sensor. The method 2000 of operation in a robotic system regarding baggage handling commences at 2002.

At 2004, the system 200 receives information that represents an environment which includes a plurality of pieces of baggage.

At 2006, the system 200 generates at least a first motion plan for a first robot of the at least one robot, the first motion plan that moves at least a portion of the first robot between at least a respective first pose and a respective second pose with respect to the plurality of pieces of baggage.

At 2008, the system 200 causes the at least a portion of the first robot to move according to the first motion plan.

The method 2000 of robotic system regarding baggage handling concludes at 2010.

Figure 21:
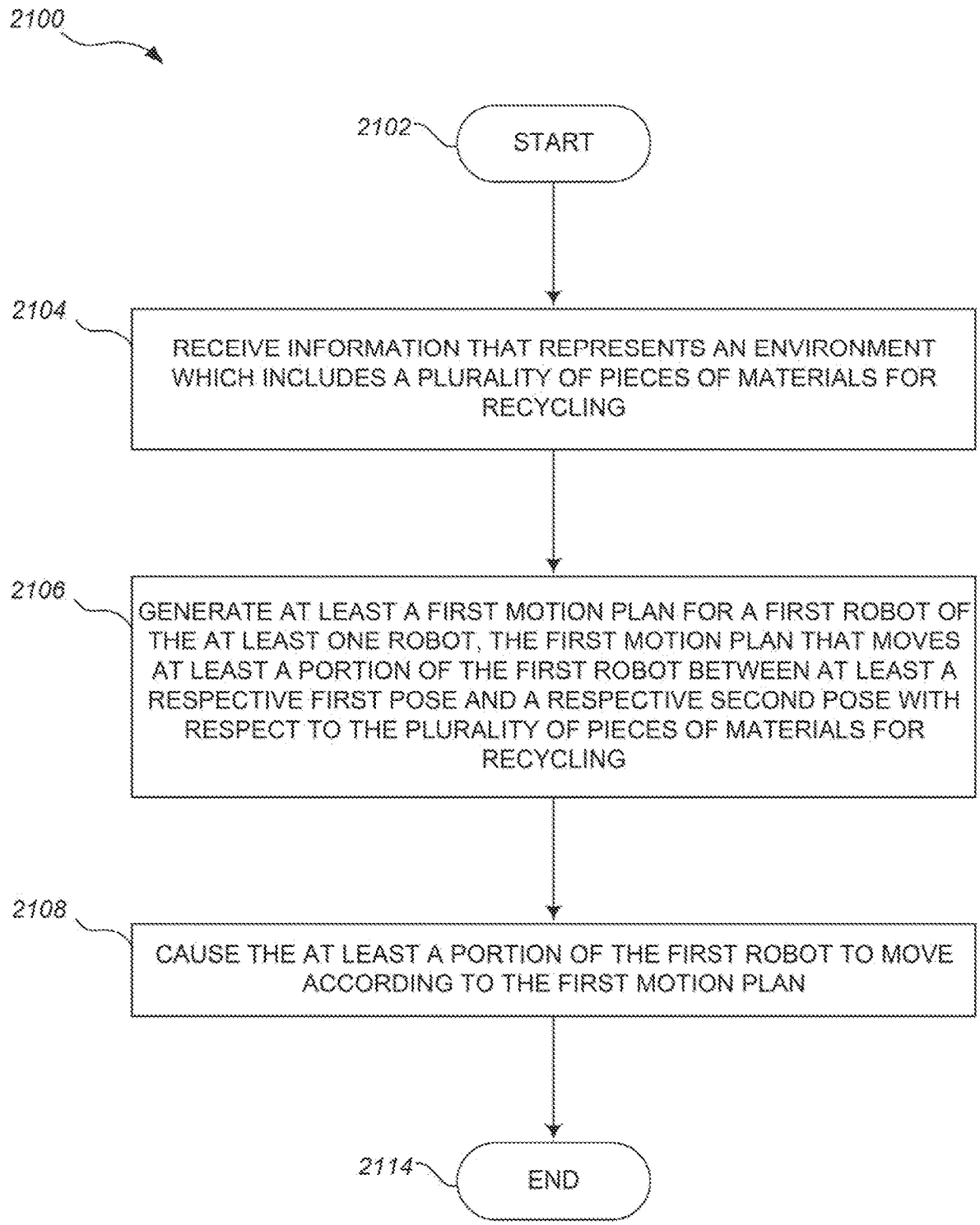
FIG. 21 is a flow diagram showing a method of operation in a robotic system regarding recycling, according to one illustrated embodiment.

FIG. 21 is a flow diagram showing a method 2100 of operation in a robotic system regarding recycling, according to one illustrated embodiment. The method 2100 of operation is in a robotic system to handle materials to be recycled, the robotic system including at least one robot and at least one sensor. The method 2100 of operation in a robotic system regarding recycling commences at 2102.

At 2104, the system 200 receives information that represents an environment which includes a plurality of pieces of materials for recycling.

At 2106, the system 200 generates at least a first motion plan for a first robot of the at least one robot, the first motion plan that moves at least a portion of the first robot between at least a respective first pose and a respective second pose with respect to the plurality of pieces of materials for recycling.

At 2108, the system 200 causes the at least a portion of the first robot to move according to the first motion plan.

The method 2100 of operation in a robotic system regarding recycling concludes at 2110.

Figure 22:
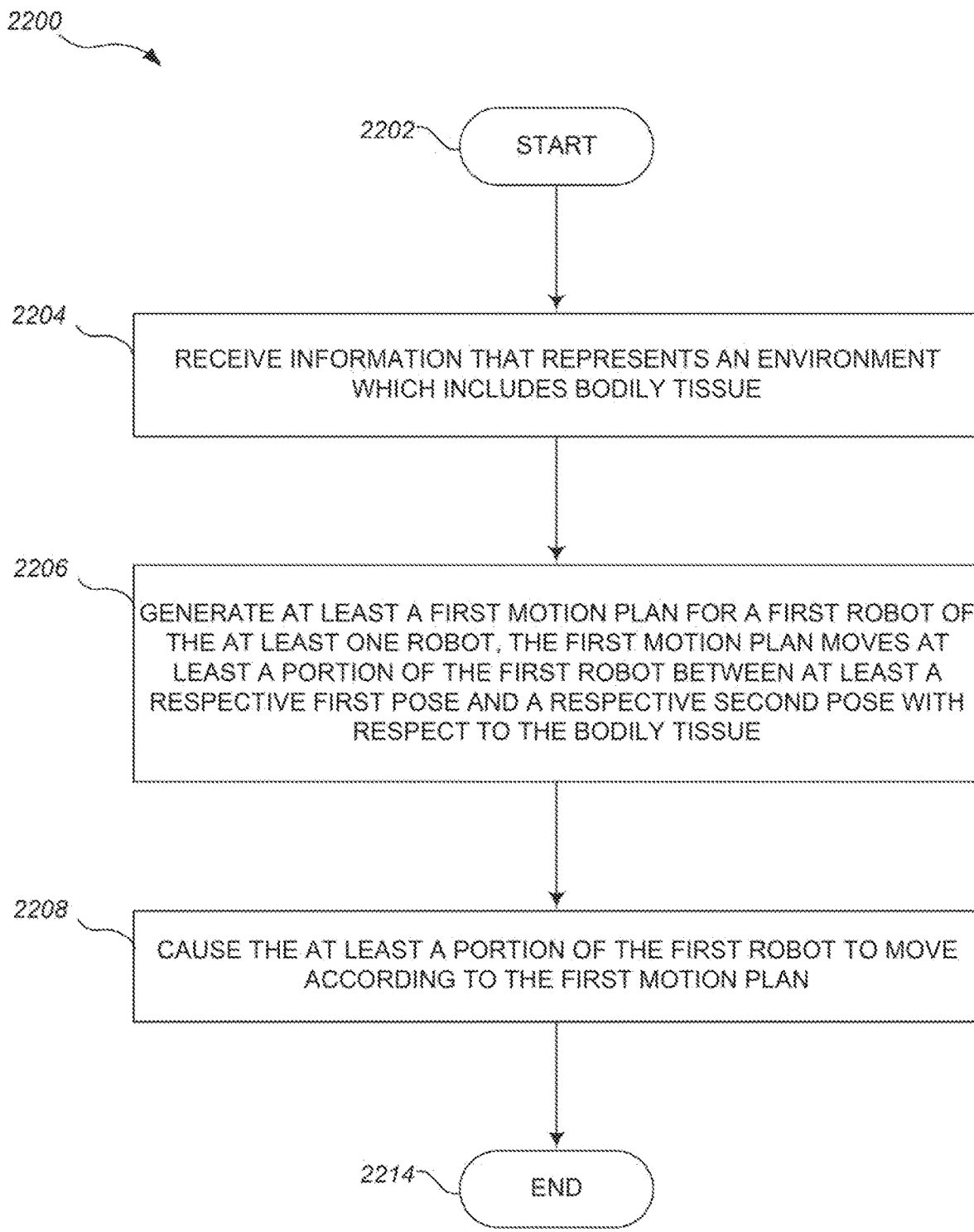
FIG. 22 is a flow diagram showing a method of operation in a robotic system regarding medical procedures, according to one illustrated embodiment.

FIG. 22 is a flow diagram showing a method 2200 of operation in a robotic system regarding medical procedures, according to one illustrated embodiment. The method 2200 of operation is in a robotic medical system, the robotic medical system including at least one robot and at least one sensor. The method 2200 of operation in a robotic system regarding medical procedures commences at 2202.

At 2204, the system 200 receives information that represents an environment which includes bodily tissue.

At 2206, the system 200 generates at least a first motion plan for a first robot of the at least one robot, the first motion plan moves at least a portion of the first robot between at least a respective first pose and a respective second pose with respect to the bodily tissue.

At 2208, the system 200 causes the at least a portion of the first robot to move according to the first motion plan.

The method 2200 of operation in a robotic system regarding medical procedures concludes at 2210.

Figure 23:
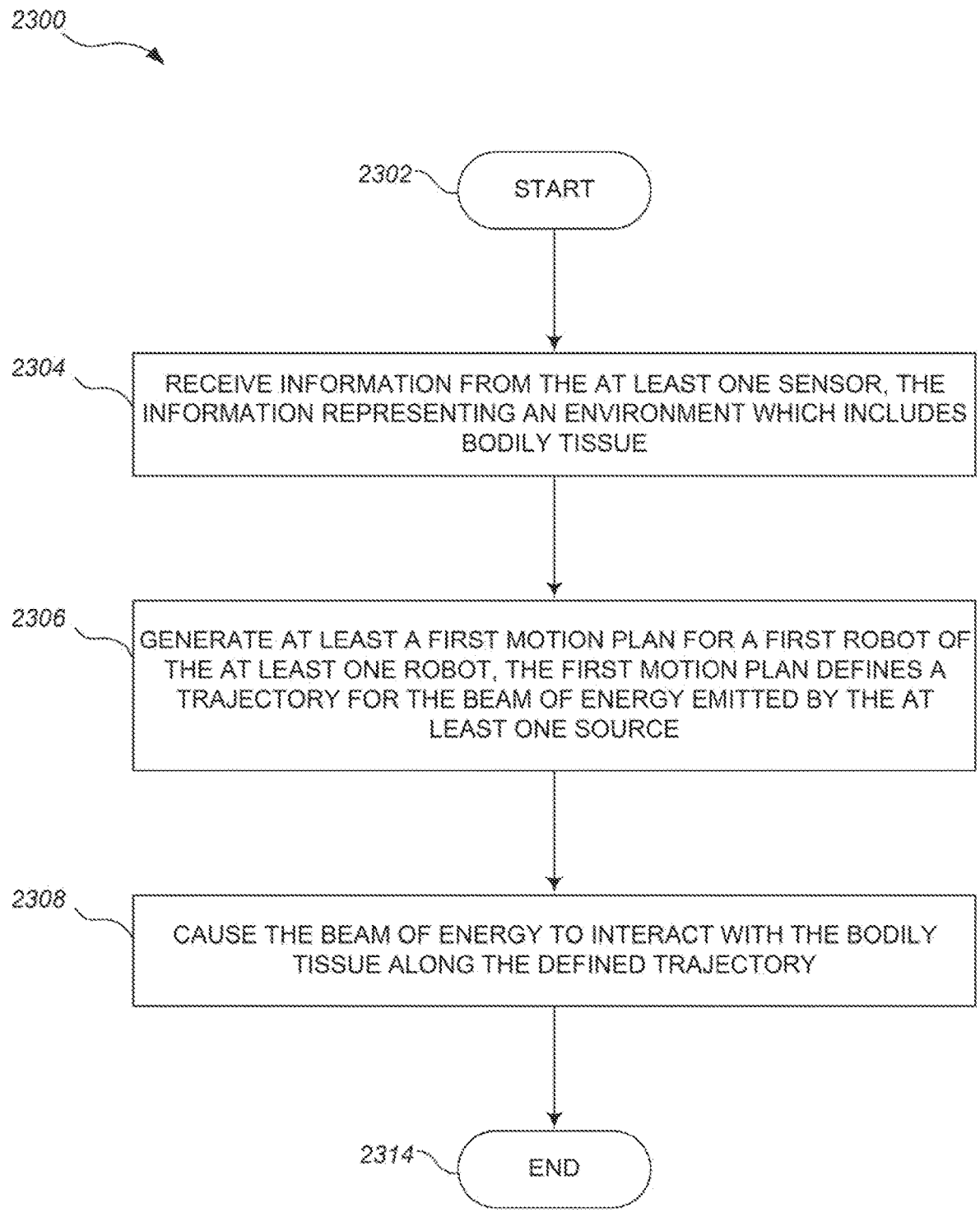
FIG. 23 is a flow diagram showing another method of operation in a robotic system regarding medical procedures, according to one illustrated embodiment.

FIG. 23 is a flow diagram showing a method 2300 of operation in a robotic system regarding medical procedures, according to another illustrated embodiment. The method 2300 of operation is in a robotic medical system, the robotic medical system including at least one robot and at least one sensor, the at least one robot including at least one source that is operable to emit at least one beam of energy. The method 2300 of operation in a robotic system regarding medical procedures commences at 2302.

At 2304, the system 200 receives information from the at least one sensor, the information representing an environment which includes bodily tissue.

At 2306, the system 200 generates at least a first motion plan for a first robot of the at least one robot, the first motion plan defines a trajectory for the beam of energy emitted by the at least one source.

At 2308, the system 200 causes the beam of energy to interact with the bodily tissue along the defined trajectory.

The method 2300 of operation in a robotic system regarding medical procedures concludes at 2310.

Figure 24:
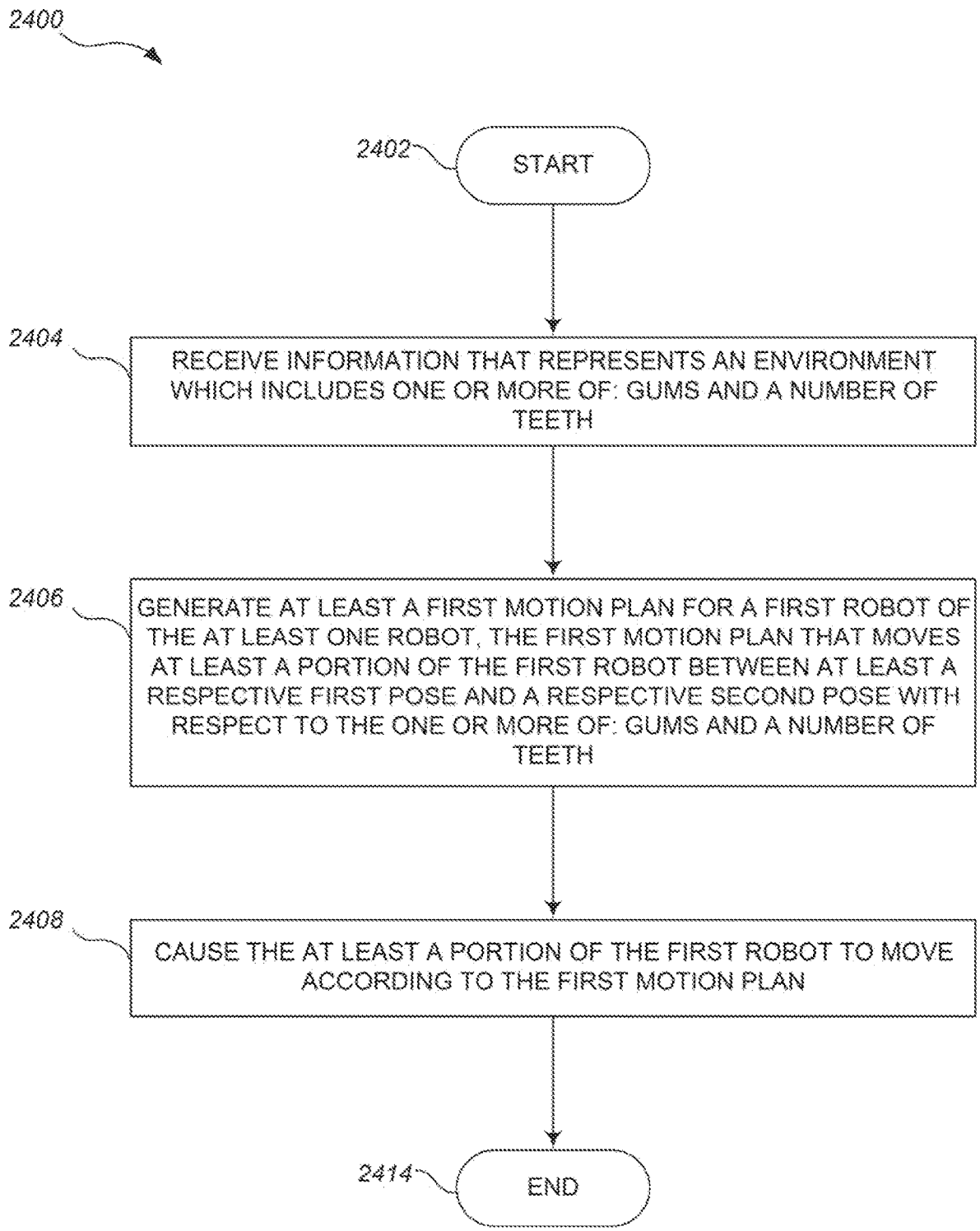
FIG. 24 is a flow diagram showing a method of operation in a robotic system regarding dental procedures, according to one illustrated embodiment.

FIG. 24 is a flow diagram showing a method 2400 of operation in a robotic system regarding dental procedures, according to one illustrated embodiment. The method 2400 of operation is in a robotic dental system, the robotic dental system including at least one robot and at least one sensor. The method 2400 of operation in a robotic system regarding dental procedures commences at 2402.

At 2404, the system 200 receives information that represents an environment which includes one or more of: gums and a number of teeth in a mouth.

At 2406, the system 200 generates at least a first motion plan for a first robot of the at least one robot, the first motion plan that moves at least a portion of the first robot between at least a respective first pose and a respective second pose with respect to the number of teeth.

At 2408, the system 200 causes the at least a portion of the first robot to move according to the first motion plan.

The method 2400 of operation in a robotic system regarding dental procedures concludes at 2410.

Figure 25:
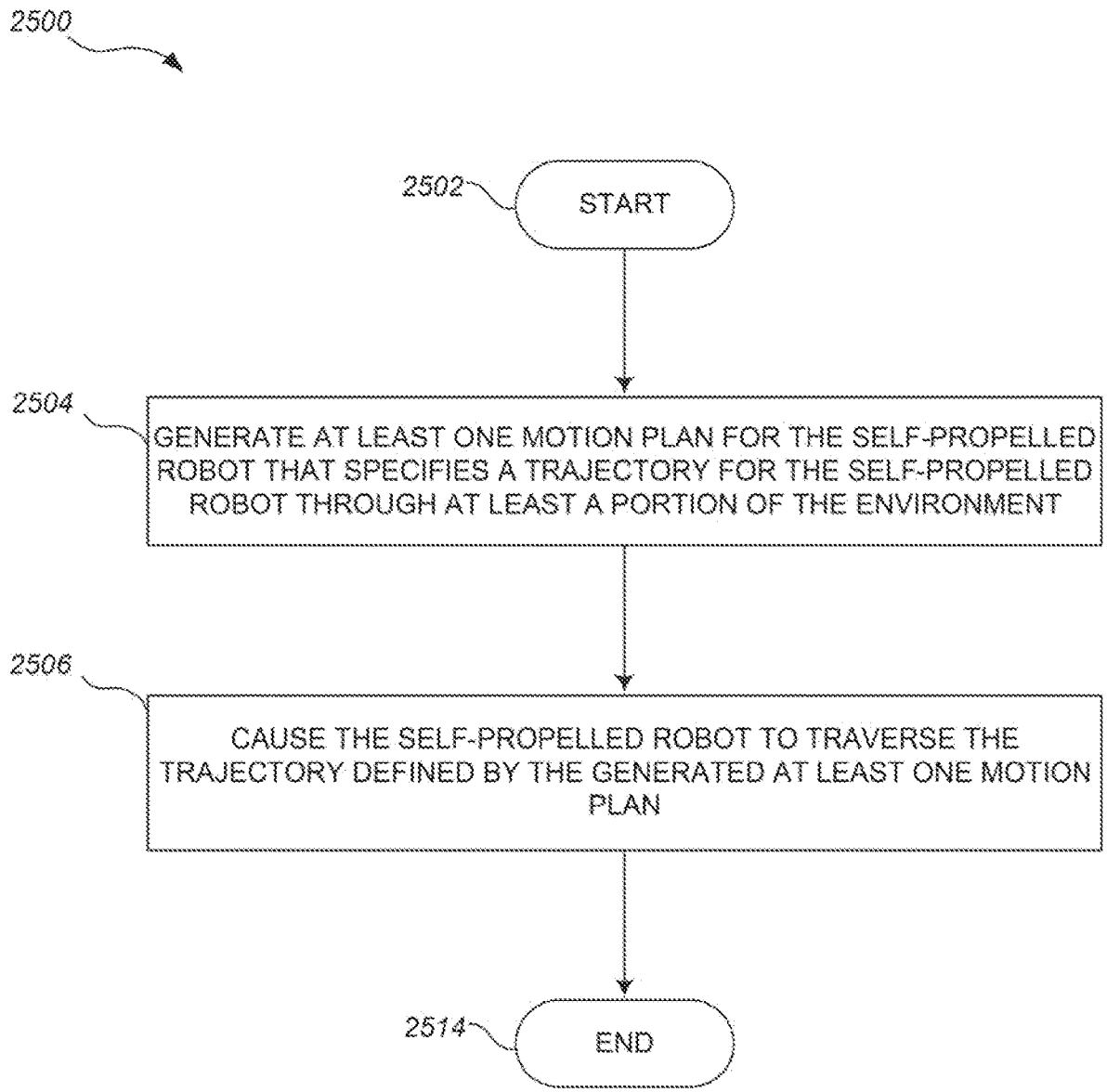
FIG. 25 is a flow diagram showing a method of operation in a robotic system regarding dental procedures useful in the method of FIG. 24, according to one illustrated embodiment.

FIG. 25 is a flow diagram showing a method 2500 of operation in a robotic system regarding dental procedures useful in the method of FIG. 24, according to one illustrated embodiment. The method 2500 of operation is in a robotic dental system, the robotic dental system including at least one robot and at least one sensor. The method 2500 of operation in a robotic system regarding dental procedures useful in the method of FIG. 24 commences at 2502.

At 2504, the system 200 generates at least one motion plan for the self-propelled robot that specifies a trajectory for the self-propelled robot through at least a portion of the environment.

At 2506, the system 200 causes the self-propelled robot to traverse the trajectory defined by the generated at least one motion plan.

The method 2500 of operation in a robotic system regarding dental procedures useful in the method of FIG. 24 concludes at 2508.

Figure 26:
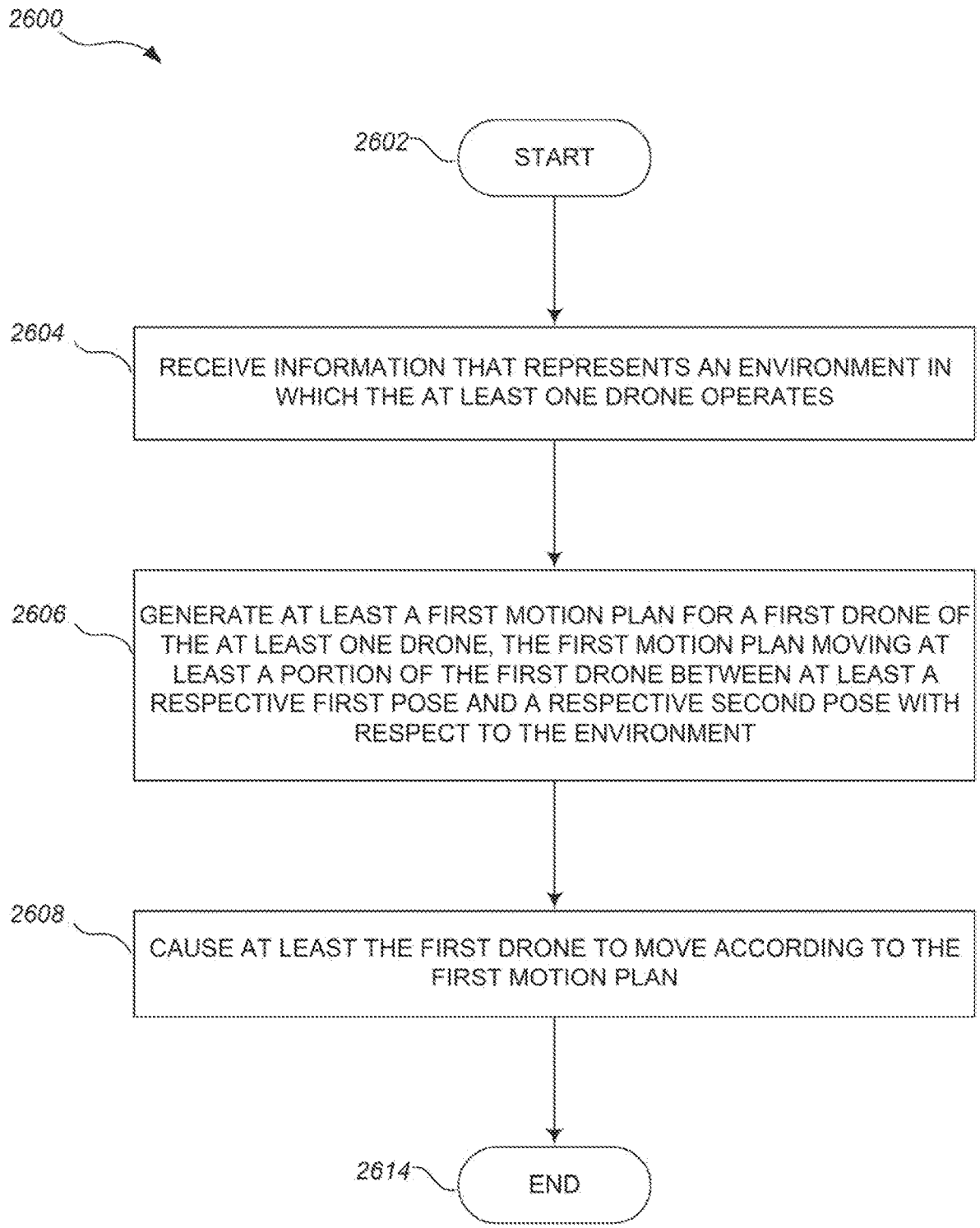
FIG. 26 is a flow diagram showing a method of operation in a robotic system regarding drones, according to one illustrated embodiment.

FIG. 26 is a flow diagram showing a method 2600 of operation in a robotic system regarding drones, according to one illustrated embodiment. The method 2600 of operation is in a drone system including at least one drone and at least one sensor. The method 2600 of operation in a robotic system regarding drones commences at 2602.

At 2604, the system 200 receives information that represents an environment in which the at least one drone operates.

At 2606, the system 200 generates at least a first motion plan for a first drone of the at least one drone, the first motion plan moving at least a portion of the first drone between at least a respective first pose and a respective second pose with respect to the environment.

At 2608, the system 200 causes at least the first drone to move according to the first motion plan.

The method 2600 of operation in a robotic system regarding drones concludes at 2610.

Figure 27:
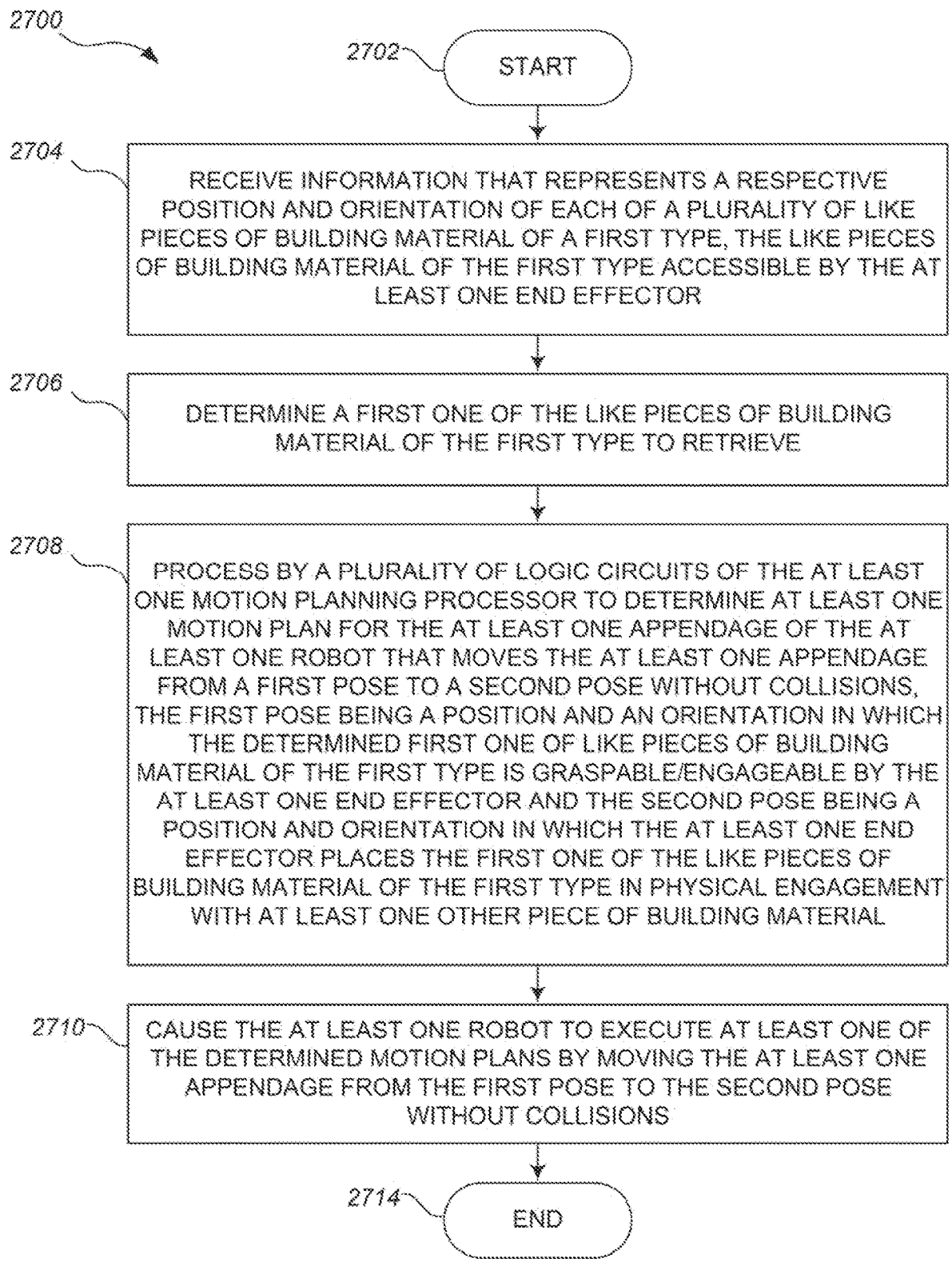
FIG. 27 is a flow diagram showing a method of operation in a robotic system regarding construction, according to one illustrated embodiment.

FIG. 27 is a flow diagram showing a method 2700 of operation in a robotic system regarding construction, according to one illustrated embodiment. The method 2700 of operation is in a robotic system, the robotic system including at least one motion planning processor and at least one robot, the at least one robot having at least one appendage, the at least one appendage having at least one joint and at least one end effector. The method 2700 of operation in a robotic system regarding construction commences at 2702.

At 2704, the system 200 receives information that represents a respective position and orientation of each of a plurality of like pieces of building material of a first type, the like pieces of building material of the first type accessible by the at least one end effector.

At 2706, the system 200 determines a first one of the like pieces of building material of the first type to retrieve.

At 2708, the system 200 processes by a plurality of logic circuits of the at least one motion planning processor to determine at least one motion plan for the at least one appendage of the at least one robot that moves the at least one appendage from a first pose to a second pose without collisions. The first pose is a position and an orientation in which the determined first one of like pieces of building material of the first type is graspable/engageable by the at least one end effector and the second pose is a position and orientation in which the at least one end effector places the first one of the like pieces of building material of the first type in physical engagement with at least one other piece of building material.

At 2710, the system 200 causes the at least one robot to execute at least one of the determined motion plans by moving the at least one appendage from the first pose to the second pose without collisions.

The method 2700 of operation in a robotic system regarding construction concludes at 2712.

Figure 28:
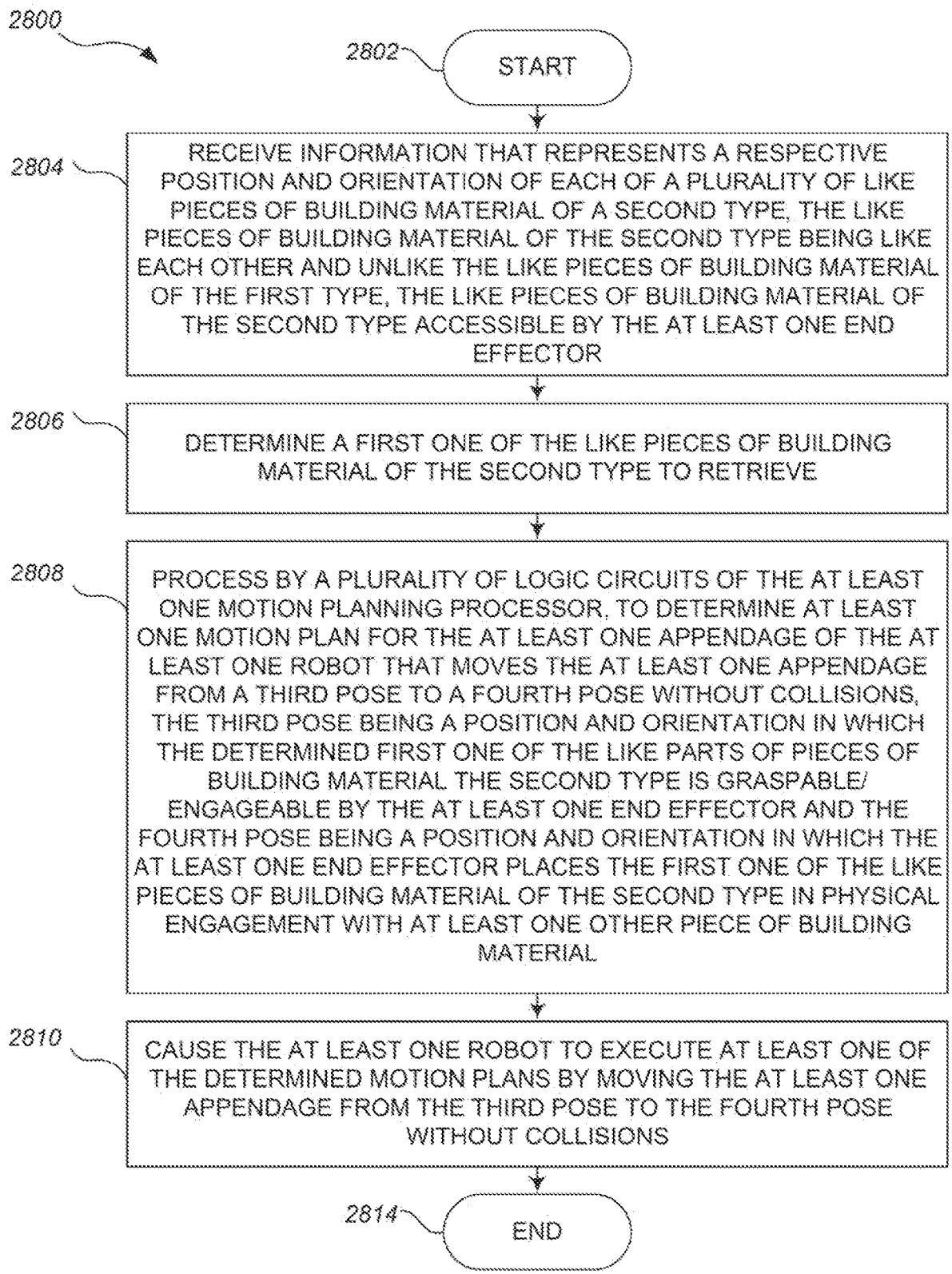
FIG. 28 is a flow diagram showing a method of operation in a robotic system regarding construction useful in the method of FIG. 27, according to one illustrated embodiment.

FIG. 28 is a flow diagram showing a method 2800 of operation in a robotic system regarding construction useful in the method of FIG. 27, according to one illustrated embodiment. The method 2800 of operation is in a robotic system, the robotic system including at least one motion planning processor and at least one robot, the at least one robot having at least one appendage, the at least one appendage having at least one joint and at least one end effector. The method 2800 of operation in a robotic system regarding construction useful in the method of FIG. 27 commences at 2802.

At 2804, the system 200 receives information that represents a respective position and orientation of each of a plurality of like pieces of building material of a second type, the like pieces of building material of the second type being like each other and unlike the like pieces of building material of the first type, the like pieces of building material of the second type accessible by the at least one end effector.

At 2806, the system 200 determines a first one of the like pieces of building material of the second type to retrieve.

At 2808, the system 200 processes by a plurality of logic circuits of the at least one motion planning processor, to determine at least one motion plan for the at least one appendage of the at least one robot that moves the at least one appendage from a third pose to a fourth pose without collisions. The third pose is a position and orientation in which the determined first one of the like parts of pieces of building material the second type is graspable/engageable by the at least one end effector and the fourth pose is a position and orientation in which the at least one end effector places the first one of the like pieces of building material of the second type in physical engagement with at least one other piece of building material.

At 2810, the system 200 causes the at least one robot to execute at least one of the determined motion plans by moving the at least one appendage from the third pose to the fourth pose without collisions.

The method 2800 of operation in a robotic system regarding construction useful in the method of FIG. 27 concludes at 2812.

Figure 29:
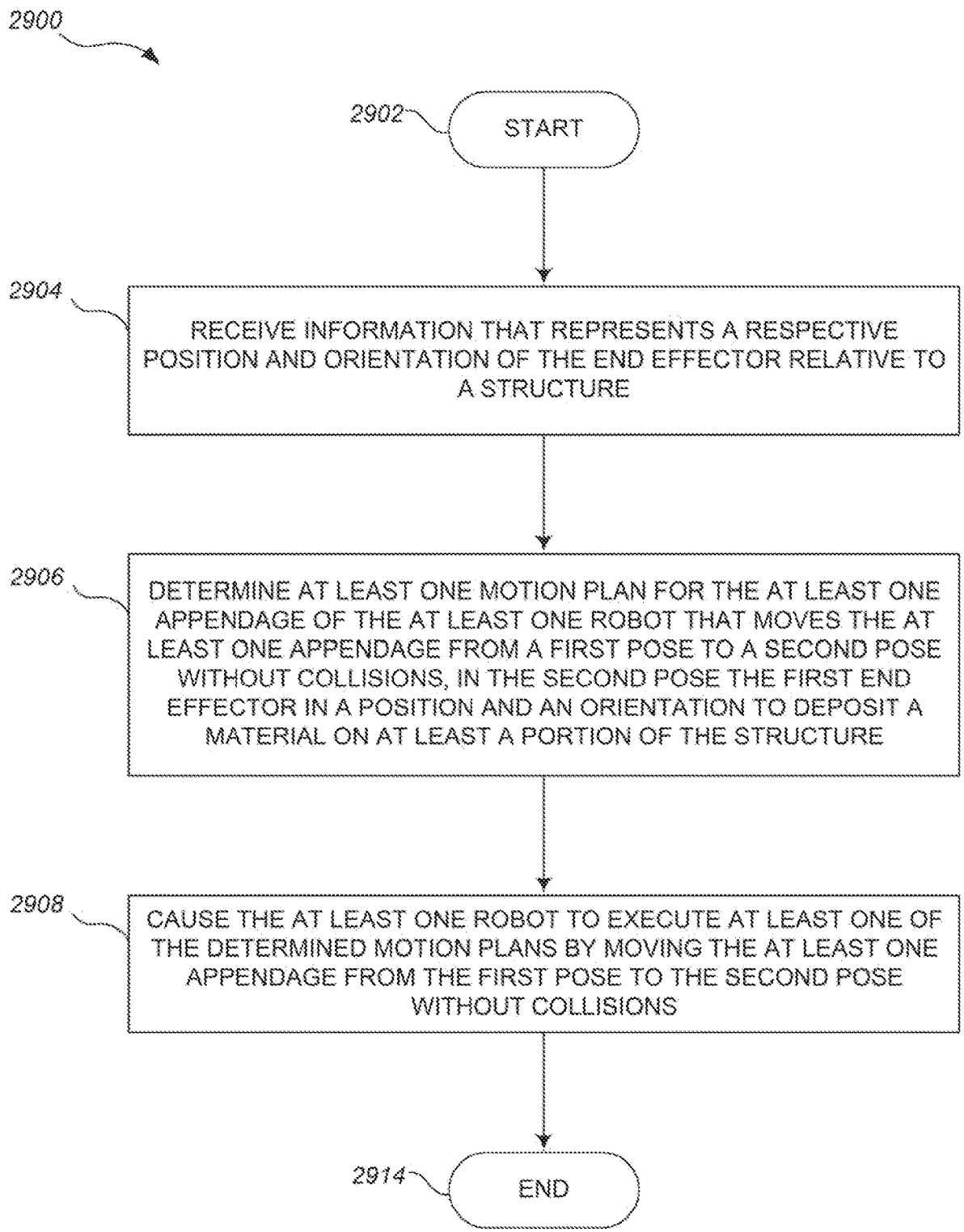
FIG. 29 is a flow diagram showing a method of operation in a robotic system regarding painting, according to one illustrated embodiment.

FIG. 29 is a flow diagram showing a method 2900 of operation in a robotic system regarding painting, according to one illustrated embodiment. The method 2900 of operation is in a robotic system, the robotic system including at least one motion planning processor and at least one robot, the at least one robot having at least one appendage, the at least one appendage having at least one joint and at least one end effector, the at least one end effector including at least one of a brush or a nozzle. The method 2900 of operation in a robotic system regarding painting commences at 2902.

At 2904, the system 200 receives information that represents a respective position and orientation of the end effector relative to a structure.

At 2906, the system 200 determines at least one motion plan for the at least one appendage of the at least one robot that moves the at least one appendage from a first pose to a second pose without collisions, in the second pose the first end effector in a position and an orientation to deposit a material on at least a portion of the structure.

At 2908, the system 200 causes the at least one robot to execute at least one of the determined motion plans by moving the at least one appendage from the first pose to the second pose without collisions.

The method 2900 of operation in a robotic system regarding painting concludes at 2910.

Figure 30:
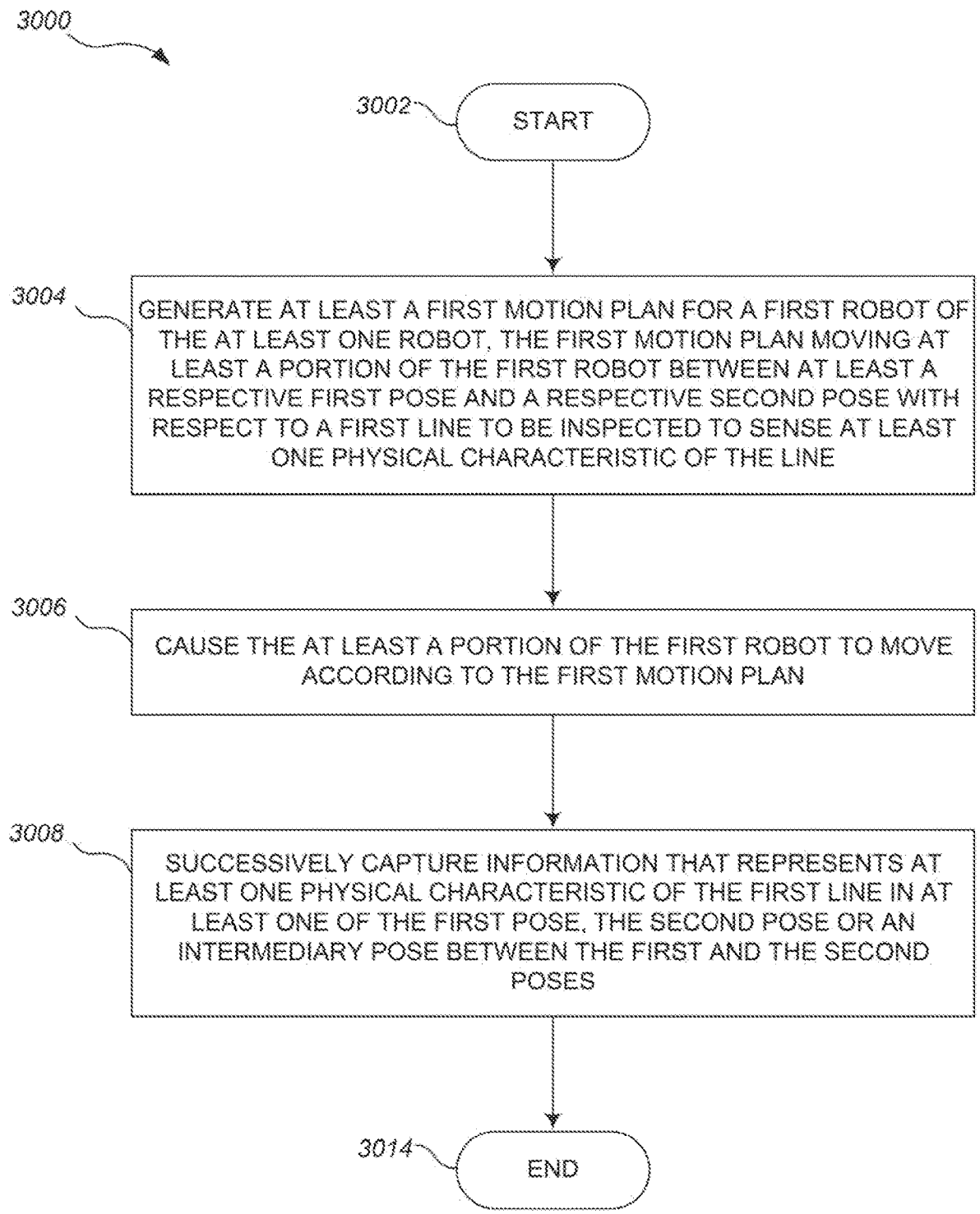
FIG. 30 is a flow diagram showing a method of operation in a robotic system regarding inspection of lines, according to one illustrated embodiment.

FIG. 30 is a flow diagram showing a method 3000 of operation in a robotic system regarding inspection of lines, according to one illustrated embodiment. The method 3000 of operation is in a robotic system to perform line inspection, the robotic system including at least one robot that carries at least one sensor. The method 3000 of operation in a robotic system regarding inspection of lines commences at 3002.

At 3004, the system 200 generates at least a first motion plan for a first robot of the at least one robot, the first motion plan moving at least a portion of the first robot between at least a respective first pose and a respective second pose with respect to a first line to be inspected to sense at least one physical characteristic of the line.

At 3006, the system 200 causes the at least a portion of the first robot to move according to the first motion plan.

At 3008, the system 200 successively captures information that represents at least one physical characteristic of the first line in at least one of the first pose, the second pose or an intermediary pose between the first and the second poses.

The method 3000 of operation in a robotic system regarding inspection of lines concludes at 3010.

Figure 31:
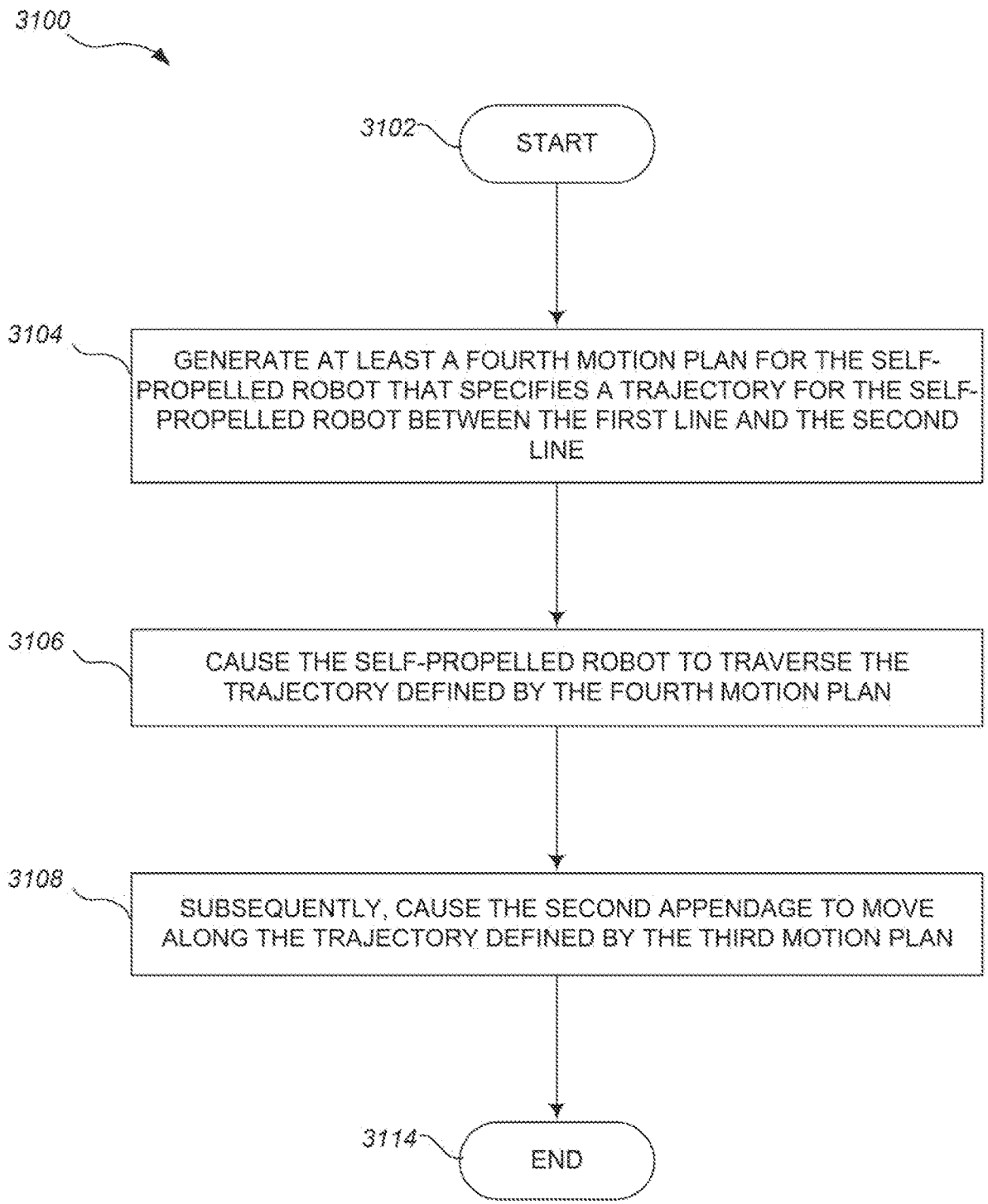
FIG. 31 is a flow diagram showing a method of operation in a robotic system regarding inspection of lines useful in the method of FIG. 30, according to one illustrated embodiment.

FIG. 31 is a flow diagram showing a method 3100 of operation in a robotic system regarding inspection of lines useful in the method of FIG. 30, according to one illustrated embodiment. The method 3100 of operation is in a robotic system to perform line inspection, the robotic system including at least one robot that carries at least one sensor wherein the first robot is a self-propelled robot. The method 3100 of operation in a robotic system regarding inspection of lines useful in the method of FIG. 30 commences at 3102.

At 3104, the system 200 generates at least a fourth motion plan for the self-propelled robot that specifies a trajectory for the self-propelled robot between the first line and the second line.

At 3106, the system 200 causes the self-propelled robot to traverse the trajectory defined by the fourth motion plan.

At 3108, the system 200 subsequently, causes the second appendage to move along the trajectory defined by the third motion plan.

The method 3100 of operation in a robotic system regarding inspection of lines useful in the method of FIG. 30 concludes at 3110.

Figure 32:
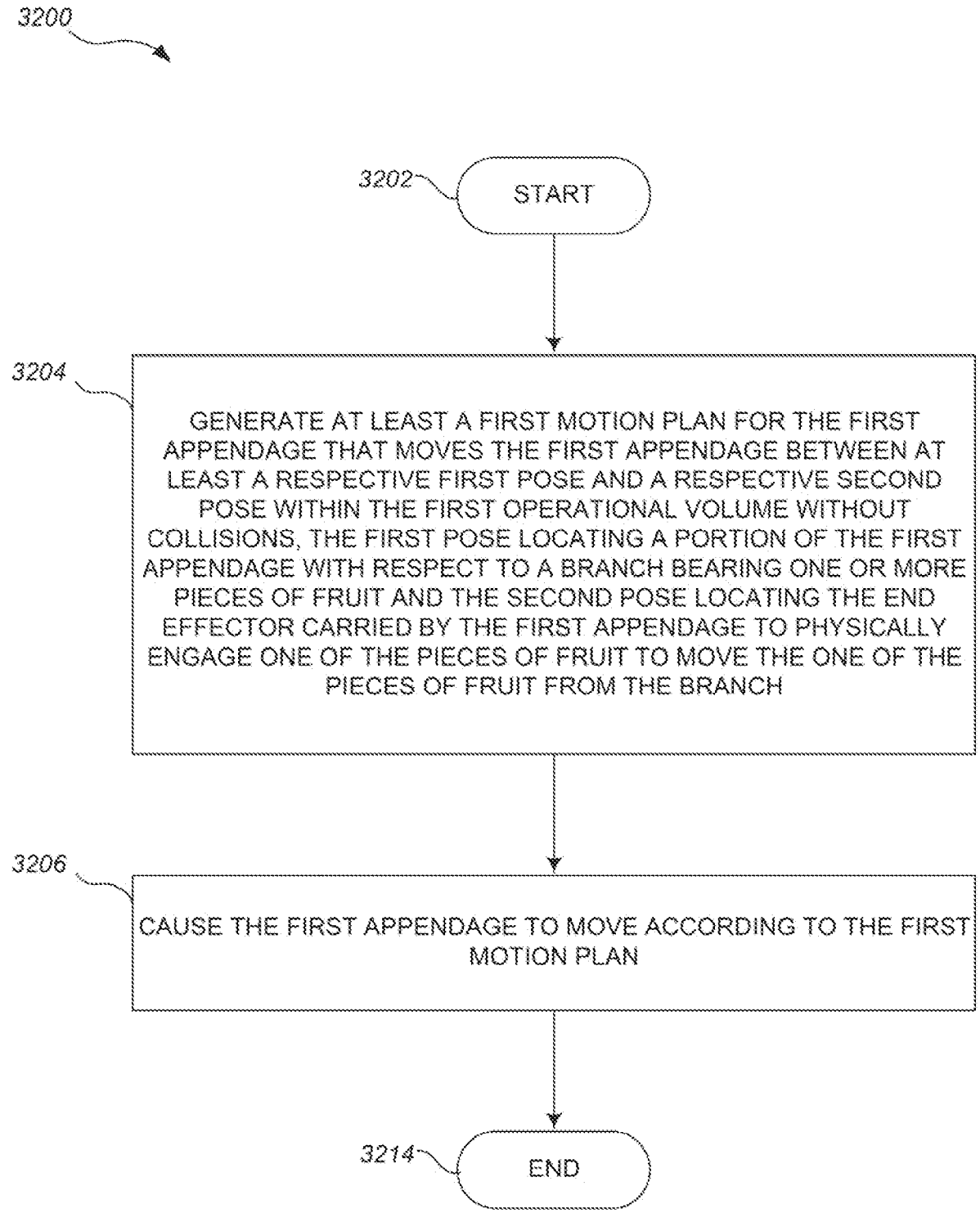
FIG. 32 is a flow diagram showing a method of operation in a robotic system regarding fruit picking, according to one illustrated embodiment.

FIG. 32 is a flow diagram showing a method 3200 of operation in a robotic system regarding fruit picking, according to one illustrated embodiment. The method 3200 of operation is in a robotic system to pick fruit, the robotic system including at least a first appendage, the first appendage moveable within a first operational volume, the first appendage carrying a respective end effector. The method 3200 of operation in a robotic system regarding fruit picking commences at 3202.

At 3204, the system 200 generates at least a first motion plan for the first appendage that moves the first appendage between at least a respective first pose and a respective second pose within the first operational volume without collisions, the first pose locating a portion of the first appendage with respect to a branch bearing one or more pieces of fruit and the second pose locating the end effector carried by the first appendage to physically engage one of the pieces of fruit to move the one of the pieces of fruit from the branch.

At 3206, the system 200 causes the first appendage to move according to the first motion plan.

The method 3200 of operation in a robotic system regarding fruit picking concludes at 3208.

Figure 33:
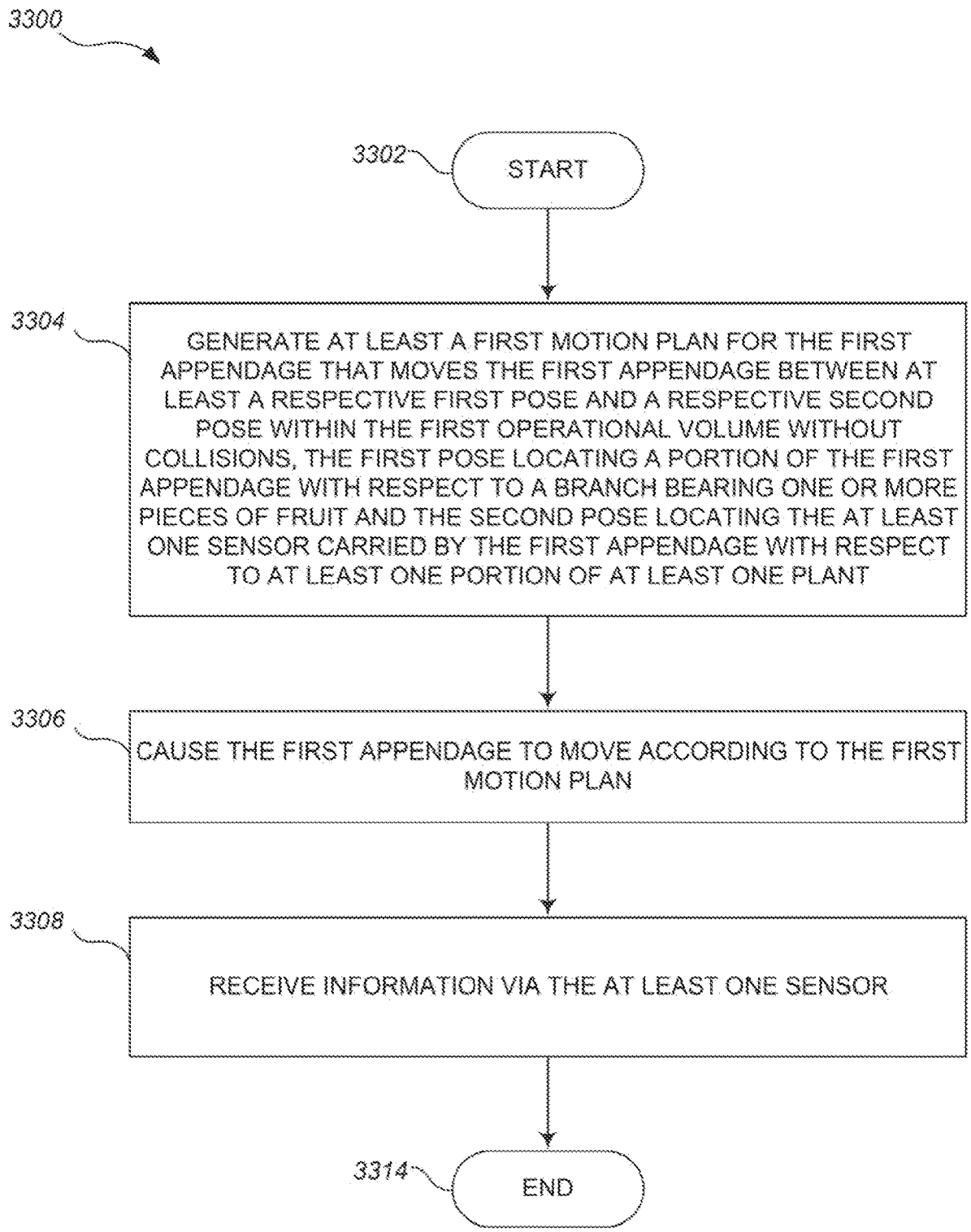
FIG. 33 is a flow diagram showing a method of operation in a robotic system to interact with plants, according to one illustrated embodiment.

FIG. 33 is a flow diagram showing a method 3300 of operation in a robotic system to interact with plants, according to one illustrated embodiment. The method 3300 of operation is in a robotic system to interact with plants, the robotic system including at least a first appendage, the first appendage moveable within a first operational volume, the first appendage carrying at least one sensor. The method 3300 of operation in a robotic system to interact with plants commences at 3302.

At 3304, the system 200 generates at least a first motion plan for the first appendage that moves the first appendage between at least a respective first pose and a respective second pose within the first operational volume without collisions, the first pose locating a portion of the first appendage with respect to a branch bearing one or more pieces of fruit and the second pose locating the at least one sensor carried by the first appendage with respect to at least one portion of at least one plant.

At 3306, the system 200 causes the first appendage to move according to the first motion plan.

At 3308, the system 200 receives information via the at least one sensor.

The method 3300 of operation in a robotic system to interact with plants concludes at 3310.

Figure 34:
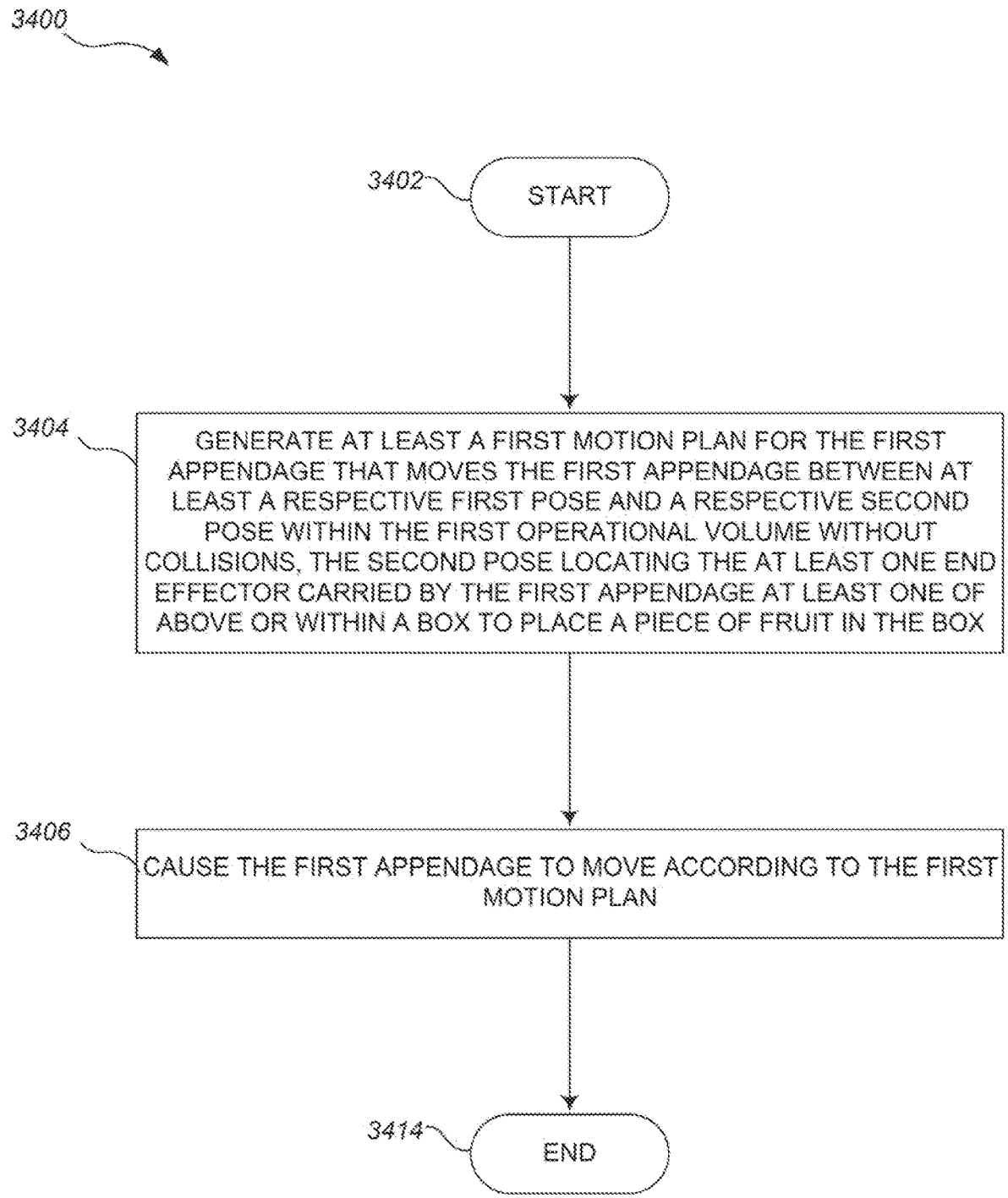
FIG. 34 is a flow diagram showing a method of operation in a robotic system to package fruit in boxes, according to one illustrated embodiment.

FIG. 34 is a flow diagram showing a method 3400 of operation in a robotic system to package fruit in boxes, according to one illustrated embodiment. The method 3400 of operation is in a robotic system to package fruit in boxes, the robotic system including a first appendage, the first appendage having at least one end effector and moveable within a first operational volume. The method 3400 of operation in a robotic system to package fruit in boxes commences at 3402.

At 3404, the system 200 generates at least a first motion plan for the first appendage that moves the first appendage between at least a respective first pose and a respective second pose within the first operational volume without collisions, the second pose locating the at least one end effector carried by the first appendage at least one of above or within a box to place a piece of fruit in the box.

At 3406, the system 200 causes the first appendage to move according to the first motion plan.

The method 3400 of operation in a robotic system to package fruit in boxes concludes at 3408.

Figure 35:
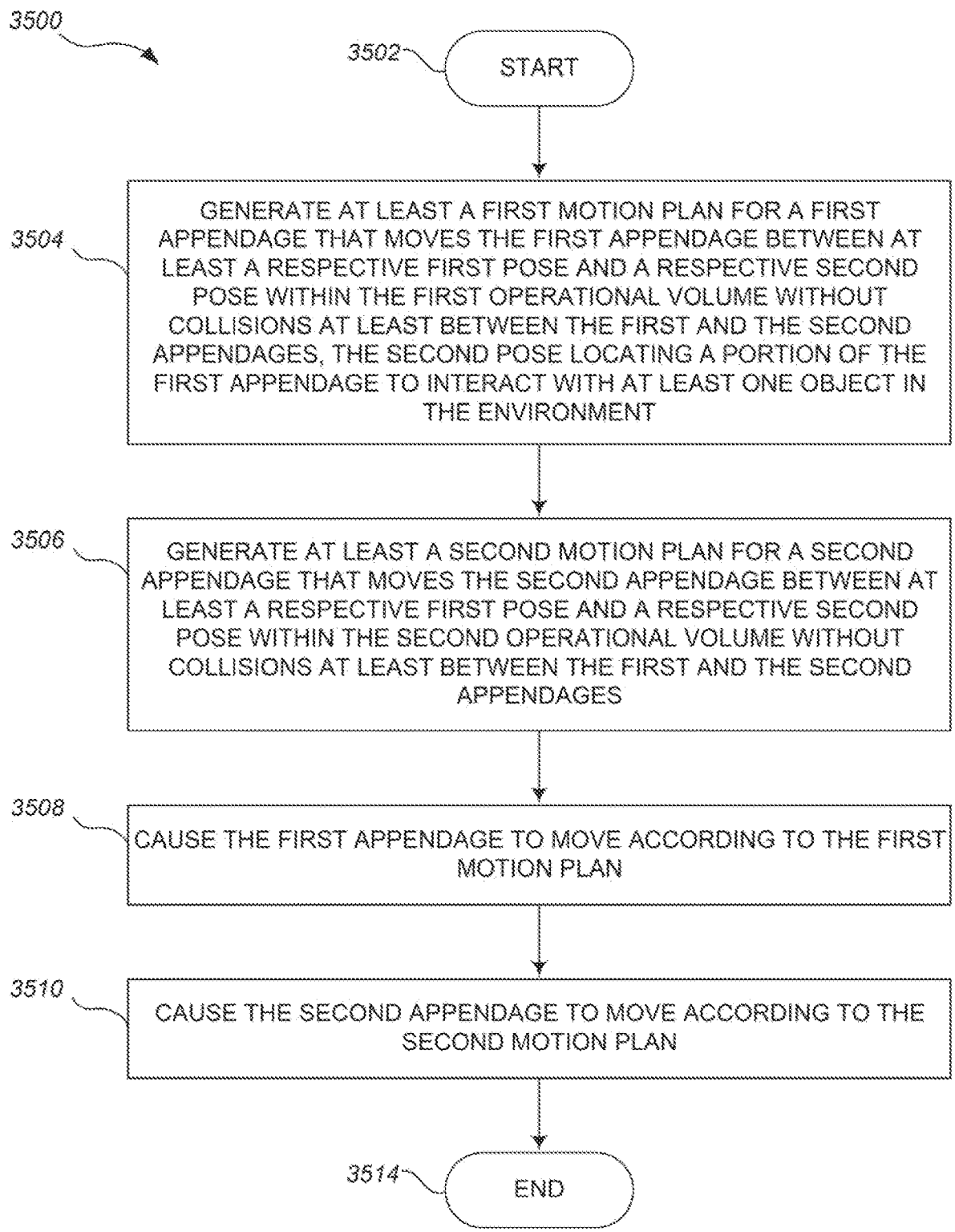
FIG. 35 is a flow diagram showing a method of operation in a robotic system to perform actions in an environment populated by humans, according to one illustrated embodiment.

FIG. 35 is a flow diagram showing a method 3500 of operation in a robotic system to perform actions in an environment populated by humans, according to one illustrated embodiment. The method 3500 of operation is in a robotic system to perform actions in an environment populated by humans, the robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another. The method 3500 of operation in a robotic system to perform actions in an environment populated by humans commences at 3502.

At 3504, the system 200 generates at least a first motion plan for a first appendage that moves the first appendage between at least a respective first pose and a respective second pose within the first operational volume without collisions at least between the first and the second appendages, the second pose locating a portion of the first appendage to interact with at least one object in the environment.

At 3506, the system 200 generates at least a second motion plan for a second appendage that moves the second appendage between at least a respective first pose and a respective second pose within the second operational volume without collisions at least between the first and the second appendages.

At 3508, the system 200 causes the first appendage to move according to the first motion plan.

At 3510, the system 200 causes the second appendage to move according to the second motion plan.

The method 3500 of operation in a robotic system to perform actions in an environment populated by humans concludes at 3512.

Figure 36:
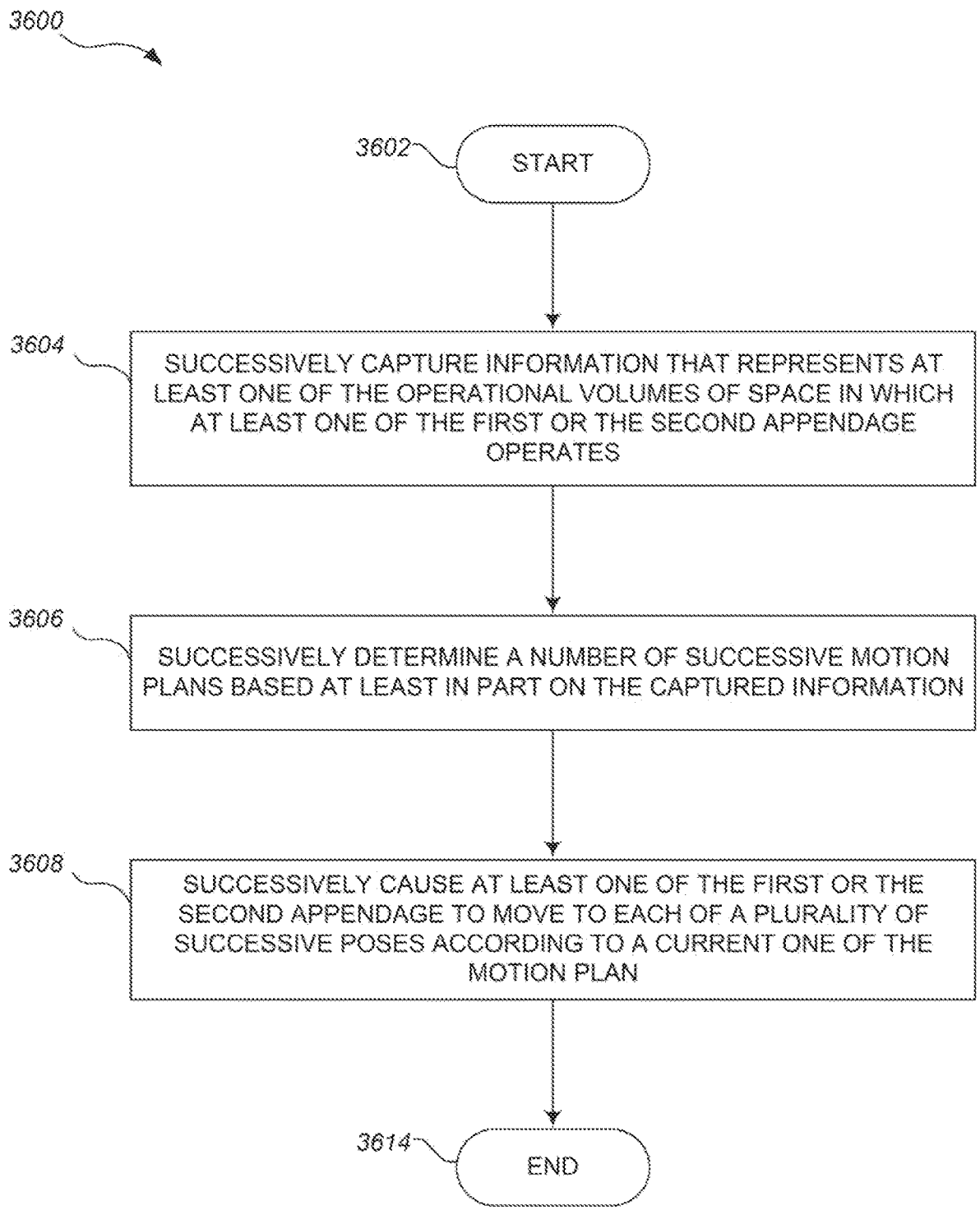
FIG. 36 is a flow diagram showing a method of operation in a robotic system to perform actions in an environment populated by humans useful in the method of FIG. 35, according to one illustrated embodiment.

FIG. 36 is a flow diagram showing a method 3600 of operation in a robotic system to perform actions in an environment populated by humans useful in the method of FIG. 35, according to one illustrated embodiment. The method 3600 of operation is in a robotic system to perform actions in an environment populated by humans, the robotic system including a first appendage and at least a second appendage, the first and the second appendage moveable within a first operational volume and a second operational volume, respectively, at least a portion of the second operational volume overlapping with at least a portion of the first operational volume such that the first and second appendages are capable of physically colliding with one another wherein the robotic system includes at least one sensor. The method 3600 of operation in a robotic system to perform actions in an environment populated by humans useful in the method of FIG. 35 commences at 3602.

At 3604, the system 200 successively captures information that represents at least one of the operational volumes of space in which at least one of the first or the second appendage operates.

At 3606, the system 200 successively determines a number of successive motion plans based at least in part on the captured information.

At 3608, the system 200 successively causes at least one of the first or the second appendage to move to each of a plurality of successive poses according to a current one of the motion plan.

The method 3600 of operation in a robotic system to perform actions in an environment populated by humans useful in the method of FIG. 35 concludes at 3610.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as hard disk drives, CD ROMs and computer memory.

The various embodiments described above can be combined to provide further embodiments. All of the commonly assigned US patent application publications, US patent applications, foreign patents, and foreign patent applications referred to in this specification and/or listed in the Application Data Sheet, including but not limited International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," and International Patent Application Publication No. WO 016/122840, filed Jan. 5, 2016, entitled "SPECIALIZED ROBOT MOTION PLANNING HARDWARE AND METHODS OF MAKING AND USING SAME" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a robotic system to perform an inspection of each of a plurality of assembled objects as the assembled objects are transported past one or more inspection stations, the robotic system including at least one motion planning processor and at least one robot, the at least one robot having at least one appendage, the at least one appendage having at least one joint and at least one sensor, the method comprising:
for each of the objects, capturing information that represents a respective position and orientation of the respective object;
processing by a plurality of logic circuits of the at least one motion planning processor to determine at least one motion plan for the at least one appendage of the at least one robot that moves the at least one appendage from a first pose to a second pose without collisions, the first pose being a first defined position and a first defined orientation of the at least one sensor carried by the at least one appendage, the second pose being a second defined position and a second defined orientation of the at least one sensor carried by the at least one appendage relative to one of the assembled objects being inspected; and
causing the at least one robot to execute at least one of the determined motion plans by moving the at least one appendage from the first pose to the second pose without collisions,
wherein the processing by a plurality of logic circuits of the at least one motion planning processor to determine at least one motion plan for the at least one appendage includes processing to account for at least one of a motion of a conveyor or a motion of the respective object to be assembled with respect to the conveyor.

2. The method of claim 1 wherein processing by a plurality of logic circuits of the at least one motion planning processor to determine at least one motion plan for the at least one appendage of the at least one robot includes a motion plan that moves the at least one appendage from the first pose to the second pose passing through at least a third pose all without collisions, the third pose being a third defined position and a third defined orientation of the at least one sensor carried by the at least one appendage relative to one of the assembled objects being inspected, at least one of the third defined position and the third defined orientation different from a respective one of the second defined position and the second defined orientation.

3. The method of claim 1 wherein the at least one robot includes a base that is at a fixed position and the assembled objects move relative to the base, and processing by a plurality of logic circuits of the at least one motion planning processor to determine at least one motion plan for the at least one appendage includes processing to account for both the motion of travel of the assembled object in a real world reference frame and the motion of the respective object to be assembled with respect to the conveyor.

4. The method of claim 1 wherein the at least one robot includes a base that is moves in sequence and in parallel with movement of the assembled objects, and processing by a plurality of logic circuits of the at least one motion planning processor to determine at least one motion plan for the at least one appendage includes processing to account for both the motion of the conveyor and the motion of the respective object to be assembled with respect to the conveyor.

5. The method of claim 1 wherein the at least one appendage is removably coupleable to at least one of a moving portion of the conveyor, to a fixture carried by a portion of the conveyor or to the objects to be assembled to move along therewith, and processing by a plurality of logic circuits of the at least one motion planning processor to determine at least one motion plan for the at least one appendage includes processing to account for the motion of the respective object to be assembled with respect to the moving portion of the conveyor.

6. The method of claim 1 wherein processing by a plurality of logic circuits of the at least one motion planning processor to determine at least one motion plan for the at least one appendage includes processing to determine a motion plan for a first appendage of the at least one appendage to detachably couple a second appendage of the at least one appendage to at least one of: a moving portion of a conveyance, a fixture carried by the moving portion of the conveyance, or the object being assembled and transported by the moving portion of the conveyance.

7. The method of claim 6 wherein processing by a plurality of logic circuits of the at least one motion planning processor to determine at least one motion plan for the at least one appendage includes processing to determine a motion plan for the first appendage of the at least one appendage to uncouple the second appendage of the at least one appendage from at least one of: the moving portion of the conveyance, the fixture carried by the moving portion of the conveyance, or the object being assembled and transported by the moving portion of the conveyance.

8. The method of claim 1 wherein processing by a plurality of logic circuits of the at least one motion planning processor to determine at least one motion plan for the at least one appendage includes processing to determine a motion plan for a first appendage of the at least one appendage to uncouple a second appendage of the at least one appendage from at least one of: a moving portion of a conveyance, a fixture carried by the moving portion of the conveyance, or the object being assembled and transported by the moving portion of the conveyance.

9. The method of claim 1 wherein the at least one appendage includes a first appendage and at least a second appendage, the second appendage is separately moveable from the first appendage, and processing by a plurality of logic circuits of the at least one motion planning processor to determine at least one motion plan for the at least one appendage includes processing by the plurality of logic circuits of the at least one motion planning processor to determine at least one motion plan for the first appendage and wherein capturing information that represents a respective position and orientation of the respective object includes capturing image information from at least one camera carried by the second appendage.

10. The method of claim 9, further comprising:
processing by a plurality of logic circuits of the at least one motion planning processor to determine at least one motion plan for the second appendage which carries the at least one camera between at least two different poses without collisions.

11. The method of claim 1 wherein the at least one robot includes one or more external cables, and the processing by a plurality of logic circuits of the motion planning processor includes processing by a plurality of logic circuits of by the motion planning processor to produce a motion plan where at least a portion of one or more external cables that are part of the at least one robot are modeled.

12. The method of 1 wherein the at least one robot includes one or more external cables, and the processing by a plurality of logic circuits of the motion planning processor includes processing by a plurality of logic circuits of by the motion planning processor to produce a motion plan where at least a portion of one or more external cables that are part of the at least one robot are modeled including a representation of a relative flexibility of the respective cable.

13. The method of claim 1 wherein the processing by a plurality of logic circuits of the motion planning processor includes processing by a plurality of logic circuits of the motion planning processor to produce a motion plan based on a predicted future position and a future orientation of a given one of the assembled objects.

14. The method of claim 1 wherein a first appendage of the at least one appendage carries at least one image sensor, and wherein processing by a plurality of logic circuits of the at least one motion planning processor to determine at least one motion plan for the at least one appendage includes processing by a plurality of logic circuits of the at least one motion planning processor to determine at least a first motion plan in which the second pose of the first appendage positions the at least one image sensor carried by the first appendage to operatively sense a portion of an environment, and generating a second motion plan includes generating a second motion plan in which the second pose of the second appendage positions a portion of the second appendage to operatively engage an object within the portion of the environment that is sensed by the at least one image sensor.

15. The method of claim 1 wherein a first appendage of the at least one appendage carries at least one contact sensor, and wherein processing by a plurality of logic circuits of the at least one motion planning processor to determine at least one motion plan for the at least one appendage includes processing by a plurality of logic circuits of the at least one motion planning processor to determine at least a first motion plan in which the second pose of the first appendage positions the at least one contact sensor carried by the first appendage to operatively sense a portion of an environment, and generating a second motion plan includes generating a second motion plan in which the second pose of the second appendage positions a portion of the second appendage to operatively engage an object within the portion of the environment that is sensed by the at least one contact sensor.

16. The method of claim 1 wherein a first appendage of the at least one appendage carries at least one capacitive sensor, and wherein processing by a plurality of logic circuits of the at least one motion planning processor to determine at least one motion plan for the at least one appendage includes processing by a plurality of logic circuits of the at least one motion planning processor to determine at least a first motion plan in which a respective second pose of the first appendage positions the at least one capacitive sensor carried by the first appendage to operatively sense a portion of an environment.

17. The method of claim 1 wherein a first appendage of the at least one appendage carries at least one force sensor, and wherein processing by a plurality of logic circuits of the at least one motion planning processor to determine at least one motion plan for the at least one appendage includes processing by a plurality of logic circuits of the at least one motion planning processor to determine at least a first motion plan in which a respective second pose of the first appendage positions the at least one force sensor carried by the first appendage to operatively sense a portion of an environment.

18. The method of claim 1 wherein a first appendage of the at least one appendage carries at least one proximity sensor, and processing by a plurality of logic circuits of the at least one motion planning processor to determine at least one motion plan for the at least one appendage includes processing by a plurality of logic circuits of the at least one motion planning processor to determine at least a first motion plan in which a respective second pose of the first appendage positions the at least one proximity sensor carried by the first appendage to operatively sense a portion of an environment.

19. The method of any of claim 1 wherein the at least one appendage includes two or more appendages, and the at least one sensor includes one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors, and wherein capturing information that represents a respective position and orientation of the respective object includes capturing the information via one or more of: one or more cameras, one or more contact sensors, one or more inductive sensors, one or more ultrasound sensors, one or more microwave sensors, one or more x-ray sensors, one or more laser sensors, one or more near-IR sensors, one or more capacitive sensors, one or more force sensors, one or more motion sensors, and, or, one or more proximity sensors.

20. The method of claim 1 wherein the robotic system includes at least a first appendage and a second appendage, and motion planning includes determining motion plans for each of the first and the second appendages to pass at least one end effector between the first and the second appendages.

21. A robotic system to perform an inspection of each of a plurality of assembled objects as the assembled objects are transported past one or more inspection stations, the robotic system comprising:
at least one robot, the at least one robot having at least one appendage, the at least one appendage having at least one joint and at least one sensor;
at least one motion planning processor; and
at least one nontransitory processor-readable medium that stores at least one of processor-executable instructions or data which, when executed by the at least one motion planning processor, causes the at least one motion planning processor to:
for each of the objects, capture information that represents a respective position and orientation of the respective object;
process by a plurality of logic circuits of the at least one motion planning processor to determine at least one motion plan for the at least one appendage of the at least one robot that moves the at least one appendage from a first pose to a second pose without collisions, the first pose being a first defined position and a first defined orientation of the at least one sensor carried by the at least one appendage, the second pose being a second defined position and a second defined orientation of the at least one sensor carried by the at least one appendage relative to one of the assembled objects being inspected; and
cause the at least one robot to execute at least one of the determined motion plans by moving the at least one appendage from the first pose to the second pose without collisions.

* * * * *